US011070908B2

(12) United States Patent
Dohi et al.

(10) Patent No.: US 11,070,908 B2
(45) Date of Patent: Jul. 20, 2021

(54) SOUND GENERATOR FOR MOBILE ENTITIES

(71) Applicants: PIONEER CORPORATION, Tokyo (JP); TOHOKU PIONEER CORPORATION, Tendo (JP)

(72) Inventors: Hiroyuki Dohi, Tendo (JP); Satoru Hiwatari, Tendo (JP); Takayuki Negishi, Tendo (JP); Hiroyuki Kobayashi, Tendo (JP)

(73) Assignees: PIONEER CORPORATION, Tokyo (JP); TOHOKU PIONEER CORPORATION, Tendo (JP)

( * ) Notice: Subject to any disclaimer, the term of this patent is extended or adjusted under 35 U.S.C. 154(b) by 0 days.

(21) Appl. No.: 16/493,348

(22) PCT Filed: Feb. 28, 2018

(86) PCT No.: PCT/JP2018/007618
§ 371 (c)(1),
(2) Date: Sep. 12, 2019

(87) PCT Pub. No.: WO2018/168478
PCT Pub. Date: Sep. 20, 2018

(65) Prior Publication Data
US 2020/0137482 A1 Apr. 30, 2020

(30) Foreign Application Priority Data

Mar. 14, 2017 (JP) .............................. JP2017-048662
Mar. 14, 2017 (JP) .............................. JP2017-048663
(Continued)

(51) Int. Cl.
*H04R 1/28* (2006.01)
*H04R 1/02* (2006.01)
*H04R 9/06* (2006.01)

(52) U.S. Cl.
CPC ........... *H04R 1/2803* (2013.01); *H04R 1/025* (2013.01); *H04R 9/06* (2013.01); *H04R 2400/11* (2013.01)

(58) Field of Classification Search
CPC ........ H04R 1/2803; H04R 1/025; H04R 9/06; H04R 2400/11
(Continued)

(56) References Cited

U.S. PATENT DOCUMENTS 5,143,169 A 9/1992 Ziegenberg et al.
2017/0013336 A1* 1/2017 Stys ..................... H04R 1/2811

FOREIGN PATENT DOCUMENTS

EP 3343944 A1 7/2018
JP H09-247777 A 9/1997
(Continued)

OTHER PUBLICATIONS

International Search Report, dated May 22, 2018, from corresponding PCT application No. PCT/JP2018/007618.

*Primary Examiner* — Vivian C Chin
*Assistant Examiner* — Douglas J Suthers
(74) *Attorney, Agent, or Firm* — Nixon & Vanderhye

(57) ABSTRACT

A speaker unit emits a sound towards a box-like space formed by a vehicle. The speaker unit is accommodated in an enclosure. At least one of the enclosure and the speaker unit is provided with a tubular member and/or a vibration member configured to generate a resonance sound of a frequency different from a lowest resonance frequency of the speaker unit. At least a part of the enclosure also serves as a body of the vehicle.

12 Claims, 57 Drawing Sheets

(30) Foreign Application Priority Data

Mar. 14, 2017 (JP) .............................. JP2017-048664
Mar. 14, 2017 (JP) .............................. JP2017-048665
Mar. 14, 2017 (JP) .............................. JP2017-048666
Mar. 14, 2017 (JP) .............................. JP2017-048667

(58) Field of Classification Search
USPC ......................................................... 381/332
See application file for complete search history.

(56) References Cited

FOREIGN PATENT DOCUMENTS

| | | | |
|---|---|---|---|
| JP | 2004-172945 | A | 6/2004 |
| JP | 2006-345498 | A | 12/2006 |
| WO | 2017/038443 | A1 | 7/2018 |

* cited by examiner

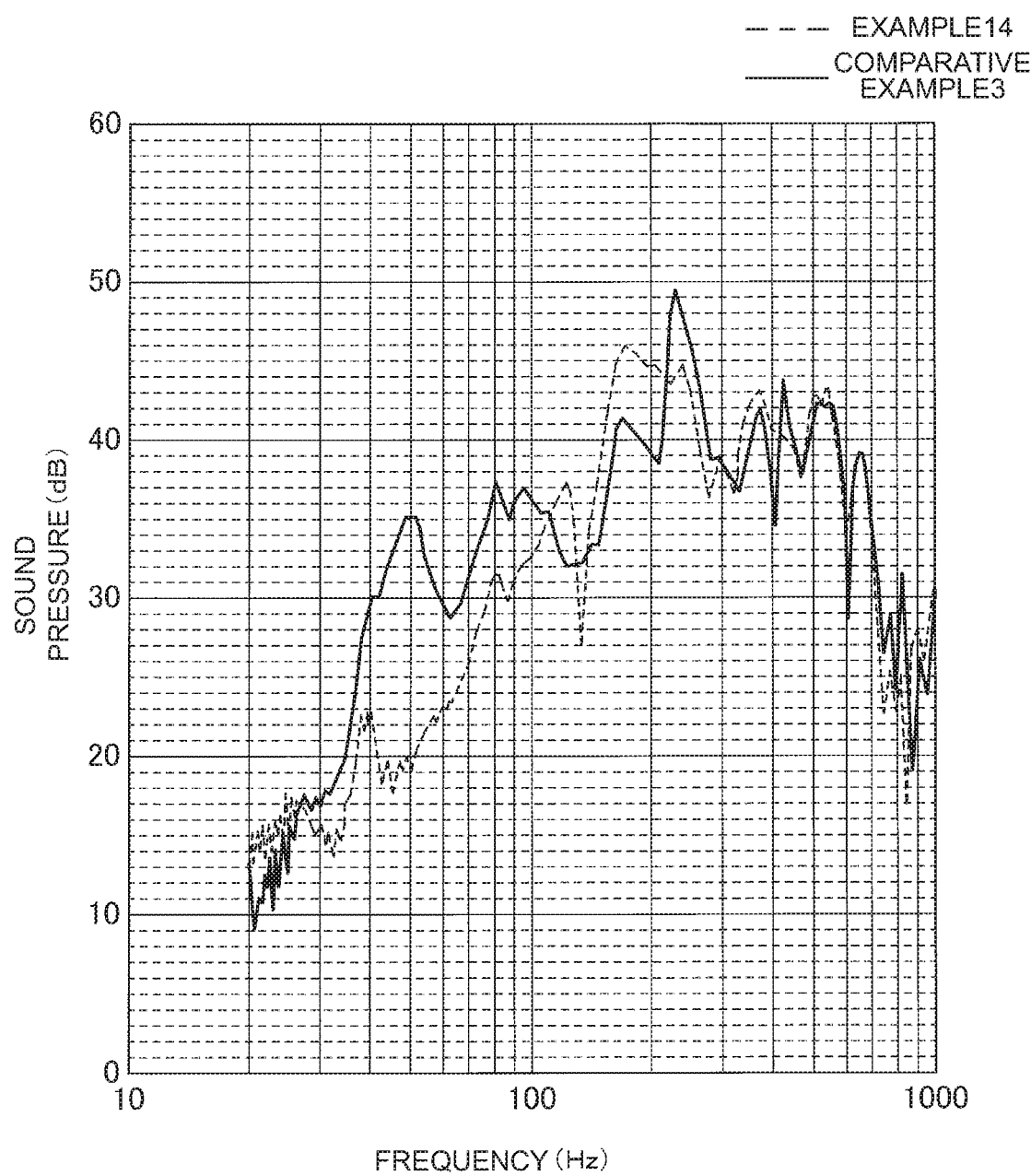

SOUND GENERATOR FOR MOBILE ENTITIES

TECHNICAL FIELD

The present invention relates to a sound generating device for mobile object.

BACKGROUND ART

It is generally known that, in a speaker device (sound generating device), a phase difference is produced between an input signal inputted to a magnetic circuit and a generated sound generated from a vibration of a diaphragm. Such speaker device may be used as a noise cancelling device. In this case, when attempting to collect a noise and cancel out the noise by generating a sound having a phase opposite to a phase of the noise, since the phase of the generated sound is likely to shift from the phase opposite to the phase of the noise not only due to a temporal difference between the collection of the noise and the generation of the sound but also due to the above-described phase difference, it is difficult to cancel out the noise with the generated sound. One possible approach may include measuring or calculating in advance a frequency characteristic of the phase difference (i.e., phase characteristic) and controlling the input signal such that the generated sound has the phase opposite to the phase of the noise. However, there is a drawback that, since there may exist a frequency range in which a rate of change of the phase difference is large, such as a frequency range in the vicinity of a lowest resonance frequency, for example, the generated sound is likely to shift from the phase opposite to the phase of the noise in the vicinity of such frequency range.

Meanwhile, there has been proposed a speaker unit that can reduce a phase difference between an input signal and a generated sound by adjusting an equivalent mass of a diaphragm and a lowest resonance frequency (for example, refer to Patent Document 1). In a conventional speaker unit described in Patent Document 1, a product of an equivalent mass of a diaphragm and a lowest resonance frequency is set to be equal to or less than 400 g·Hz, thereby reducing a phase difference, that is, a rate of change of the phase difference is also decreased.

However, the speaker unit described in Patent Document 1 requires reducing a weight of the diaphragm and lowering the lowest resonance frequency, thus there is a drawback that a degree of freedom in designing is low and only a noise having a certain frequency is reduced.

In addition, while a technique described in Patent Document 1 is for cancelling out a noise for a certain target person whose head is placed on a headrest, there is a demand for cancelling out a noise across an entire interior of a box-shaped space formed by a mobile object such as a vehicle. When a speaker unit for cancelling out a noise is installed in an interior of a box-shaped space to meet such demand, a generated sound from the speaker unit may be affected by a standing wave caused by a reflected sound reflected between opposed wall surfaces.

Such effect of the standing wave may cause a disturbance, in which a phase difference between an input signal to the speaker unit and a noise cancelling sound transmitted to each location in the box-shaped space changes suddenly when a frequency of the input signal changes. When such disturbance of the phase difference exists, it may be difficult to cancel out the noise even if the phase of the input signal at the speaker unit is adjusted so as to cancel out the collected noise with the sound having the opposite phase. Further, a degree of the disturbance of the phase difference due to the standing wave may vary from a location to a location in the box-shaped space. Such variation in the degree of disturbance may lead to a variation in a degree of cancelling out of the noise between the respective locations in the box-shaped space.

PRIOR ART DOCUMENT

Patent Document

Patent Document 1: JPH 9-247777 A

SUMMARY OF THE INVENTION

Problem to be Solved by the Invention

Therefore, a first problem to be solved is to provide a sound generating device capable of adjusting a frequency range in which a noise can be reduced easily, for example.

A second problem to be solved is to provide a speaker system for active noise control which can provide a good noise cancellation at respective locations in a box-shaped space, for example.

How to Solve the Problem

In order to solve the above-described problems and to achieve an object, a sound generating device for mobile object of the present invention according to a first aspect includes a speaker unit configured to emit a sound towards a box-like space formed by a mobile object, and an enclosure accommodating the speaker unit, wherein at least one of the enclosure and the speaker unit is provided with a resonance element configured to generate a resonance sound of a frequency different from a lowest resonance frequency of the speaker unit, and at least a part of the enclosure is configured to also serve as a body of the mobile object.

BRIEF DESCRIPTION OF THE DRAWINGS

FIG. 36 is a graph showing a frequency dependency of a sound pressure in the sound generating device of Example 14 and a sound generating device of Comparative Example 3;

DESCRIPTION OF EMBODIMENTS

Figure 1:
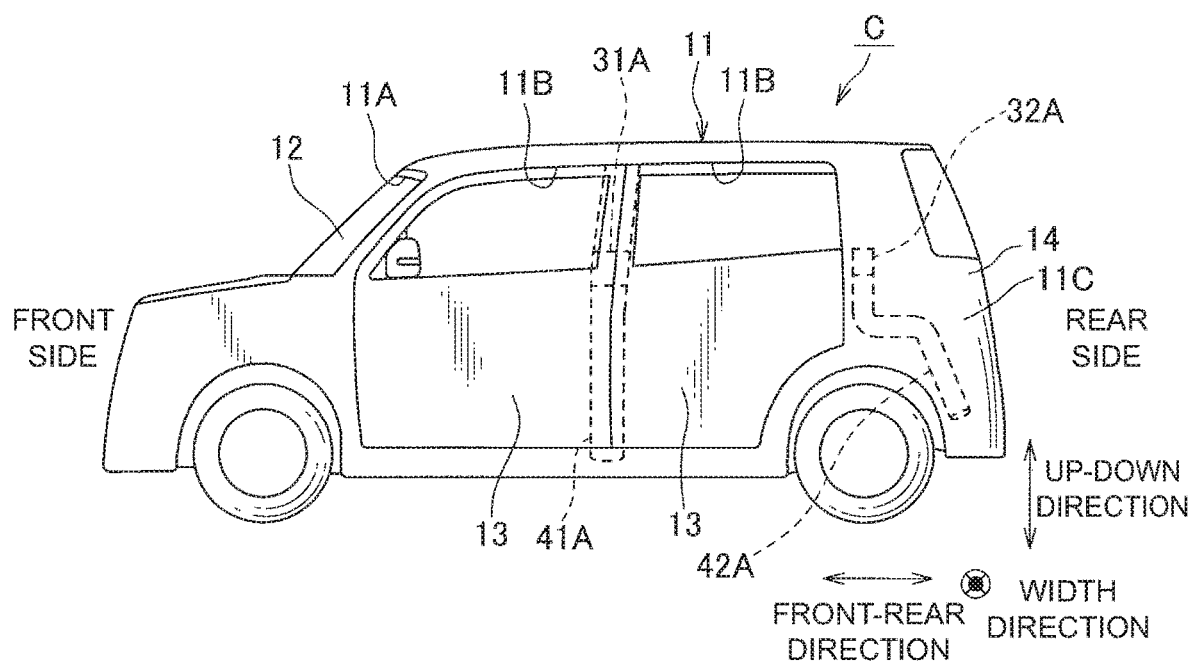
FIG. 1 is a side view of a vehicle provided with a sound generating device for mobile object according to Example 1 of the present invention.

Embodiments of the present invention will be described in the following. A sound generating device for mobile object according to a first embodiment of the present invention includes a speaker unit and an enclosure configured to accommodate the speaker unit. A resonance element configured to generate a resonance sound of a frequency different from a lowest resonance frequency of the speaker unit, is arranged at at least one of the enclosure and the speaker unit.

A frequency characteristic of a phase difference (phase characteristic) between an input signal and a generated sound in the sound generating device exhibits a tendency that the phase difference decreases as the frequency increases. If there is no phase difference between the input signal and the generated sound in the sound generating device at an arbitrary frequency range, then an absolute value of the phase difference between the input signal and the generated sound in the sound generating device tends to increase from the arbitrary frequency range as the frequency increases.

By arranging the resonance element at at least one of the enclosure and the speaker unit as described above, a frequency characteristic of a sound pressure (sound pressure characteristic) of a generated sound by the sound generating device for mobile object has a sub-peak at a frequency corresponding to a resonance frequency of a resonance sound generated by the resonance element (element resonance frequency), other than a peak corresponding to the lowest resonance frequency of the speaker unit. Expression of "a lowest resonance frequency of a speaker unit", as used herein, refers to a resonance frequency of a part excluding the resonance element. While the frequency characteristic of the phase difference (phase characteristic) between the input signal and the generated sound in the sound generating device for mobile object exhibits a tendency that the phase difference decreases as the frequency increases, since the sound pressure characteristic has the sub-peak, a graph of the phase characteristic tends to deform so as to be convex downward at the frequency of the sub-peak or in the vicinity thereof. Thus, the graph of the phase characteristic includes a flat region where the change in the phase difference is relatively small. At frequencies in such flat region, the sound generated by the sound generating device for mobile object can be easily made to have a phase opposite to a phase of the noise, making it easy to reduce the noise. The flat region can be adjusted by appropriately setting the element resonance frequency, thereby the frequency range in which the noise can be easily reduced can be adjusted. In addition, at the lowest resonance frequency of the speaker unit and at frequencies in the vicinity thereof, a rate of change of the phase difference between the input signal and the generated sound in the sound generating device tends to change relatively suddenly. Thus, it is preferable that the frequency of the sub-peak is set to be near the lowest resonance frequency of the speaker unit.

Further, at least a part of the enclosure may also serve as a body of a mobile object, thereby saving space.

Further, the enclosure may also serve as a frame that forms the body of the mobile object.

Further, the frame may be formed into a tubular shape and is closed by a stopper member, and the enclosure may be formed by the stopper member and the frame. As such, the structure of the frame can be used effectively, thereby further saving space.

Further, the enclosure is formed by at least one of a pillar as the body, a side sill, a reinforcement, a cross member, an under cover and a center tunnel.

At least a part of the resonance element may also serve as a grommet attached to the body. As such, there is no need to provide the resonance element separately from the grommet, thereby reducing cost.

Further, a ¼ wavelength of the resonance sound of the resonance element is preferably longer than a distance between tragi of a human head, and is more preferably longer than twice the distance between the tragi. As such, a difference between absolute values of sound pressures at right and left ears produced when a sound wave of the resonance sound has reached to a head of a user can be reduced. That is, a path difference of up to the distance between the tragi may be produced between the sound waves reaching to the right and left ears of the user. At this time, with the ¼ wavelength of the resonance sound being longer than the distance (or twice the distance) between the tragi, the phase difference between the sound waves reaching to the right and left ears is reduced, and thus the difference between the absolute values of the sound pressures is reduced. Consequently, the right/left difference of the effect obtained by forming the above-described flat region can be reduced. Further, even when the positional relationship between the sound generating device and the head of the user has changed, the right/left difference can be reduced in the similar manner.

Herein, the distance between the tragi is a linear distance between the right and left tragus points, and in general it is about 0.15 m. However, an appropriate value may be employed in accordance with race, gender and such of an intended user. In addition, the frequency of the resonance sound that provides the ¼ wavelength that is 0.15 m is 567 Hz.

Further, a mobile object according to this embodiment includes the sound generating device for mobile object as described above. According to such mobile object, the acoustic characteristic of the low-pitched sound region can be improved in the box-like space by making the sound generating device for mobile object to emit a sound.

Further, the sound generating device for mobile object according to one embodiment of the present invention includes the speaker unit. The speaker unit is provided with the resonance element configured to generate the resonance sound having the frequency different from the lowest resonance frequency of the speaker unit, and the sound of the speaker unit is emitted towards an intersecting part at which at least two of a plurality of faces surrounding the space meet. Herein, the mobile object that forms the box-like space includes the plurality of faces, and includes, for example, a front face, a rear face, a left face, a right face, a lower face (bottom face) and an upper face (top face) in a traveling direction of the mobile object.

By arranging the resonance element to the speaker unit as described above, the frequency range in which the noise can be easily reduced can be adjusted by appropriately setting the resonance frequency of the resonance element.

Further, since the sound of the speaker unit is emitted towards the intersecting part, the low-pitched sound emitted from the speaker unit is reflected on at least two faces so it is likely to echo within the space of the mobile object. Further, the acoustic characteristic such as the sound pressure of the low-pitched sound region of the sound generating device for mobile object can be improved, thereby making it easy to reduce the noise in the low-pitched sound region.

A sound generating device for mobile object according to one embodiment of the present invention includes a speaker unit and an enclosure accommodating the speaker unit. At least one of the enclosure and the speaker unit is provided with a resonance element configured to generate a resonance sound of a frequency different from a lowest resonance frequency of the speaker unit, and the sound of the sound generating device for mobile object is emitted towards the intersecting part at which at least two of a plurality of faces surrounding the space meet.

By arranging the resonance element to at least one of the enclosure and the speaker unit as described above, the frequency range in which the noise can be easily reduced can be adjusted by appropriately setting the resonance frequency of the resonance element.

Further, since the sound of the sound generating device for mobile object is emitted towards the intersecting part, the low-pitched sound emitted from the speaker unit is reflected on at least two faces so it is likely to echo within the space of the mobile object. Further, the acoustic characteristic such as the sound pressure of the low-pitched sound region of the sound generating device for mobile object can be improved, thereby making it easy to reduce the noise in the low-pitched sound region.

A sound generating device for mobile object according to one embodiment of the present invention includes a speaker unit, an enclosure accommodating the speaker unit and a tubular member having one end communicated with an interior space of the enclosure. At least one of the speaker unit, the enclosure and the tubular member is provided with a resonance element configured to generate a resonance sound of a frequency different from a lowest resonance frequency of the speaker unit, and the other end of the tubular member opens towards an intersecting part at which at least two of a plurality of faces surrounding a space meet.

By arranging the resonance element to at least one of the speaker unit, the enclosure and the tubular member as described above, the frequency range in which the noise can be easily reduced can be adjusted by appropriately setting the resonance frequency of the resonance element.

With the one end of the tubular member being communicated with the interior space (space accommodating the speaker unit) of the enclosure, of the sound generated on the back face side of the speaker unit, a low-pitched sound region component according to the length of the tubular member resonates in the tubular member and is emitted from the other end. Herein, the enclosure and the tubular member may be integrally formed. Further, since the other end of the tubular member opens towards the intersecting part at which at least two of the plurality of faces surrounding the space of the mobile object meet, the low-pitched sound emitted from the other end is reflected on the at least two faces so it is likely to echo within the space of the mobile object. Consequently, the acoustic characteristic such as the sound pressure of the low-pitched sound region of the sound generating device for mobile object can be improved, thereby making it easy to reduce the noise in the low-pitched sound region.

The other end of the tubular member may open towards the corner at which three faces of the plurality of faces meet. As such, the low-pitched sound emitted from the other end is reflected on the three faces so it is likely to echo within the space of the mobile object. Consequently, the acoustic characteristic such as the sound pressure of the low-pitched sound region of the sound generating device for mobile object can be improved, thereby making it easy to reduce the noise in the low-pitched sound region even more.

The speaker unit is provided to the instrumental panel so as to emit a sound from the front face side at the upper face of the instrumental panel of the mobile object, and, below the instrumental panel, the other end of the tubular member may open towards the corner at which the front face, the lower face and the side face of the plurality of faces included in the mobile object described above meet. As such, with the speaker unit provided to the instrumental panel and configured to emit a sound from the front face side at the upper face of the instrumental panel, it is possible to make the emitted sound to easily reach to a passenger, thereby improving the noise cancelling effect with respect to the passenger.

Further, since the other end of the tubular member opens towards the corner at which the front face, the lower face and the side face of the mobile object meet below the instrumental panel, a sound emitted from the other end and reflected around the corner travels towards the opposed corner (corner at which the rear face, the upper face and the side face on the opposite side of the mobile object meet) and forms a standing wave between the corners. At this time, since a distance between the corners is longer than a distance between the pair of opposing faces, the standing wave having the long wavelength can be formed, thus it is possible to make the low-pitched sound to effectively echo in the space of the mobile object.

The speaker and the enclosure may be provided in the instrumental panel, and the tubular member may be arranged to pass through the instrumental panel. As such, by providing the speaker unit and the enclosure inside the instrumental panel, and arranging the tubular member to pass through the instrumental panel, it is possible to keep a good appearance when the sound generating device for mobile object is provided to the mobile object. In addition, even if around the other end of the tubular member projects from the instrumental panel and is exposed, it is unnoticeable since the other end is positioned below the instrumental panel.

The tubular member may be arranged such that, at least in one region in the lengthwise direction, the cross-sectional shape varies as approaching to the other end. As such, the acoustic characteristic of the sound emitted from the other end of the tubular member can be improved. Further, it is more preferable that the tubular member is arranged such that, in the region near the other end, the cross-sectional shape varies as approaching to the other end.

The speaker unit and the enclosure may be provided below a seat of the mobile object, and a part of the tubular member may be integral with an air conditioning duct of the mobile object, and the tubular member may extend to the front side in the traveling direction of the mobile object. As such, the air conditioning duct can be used as the tubular member to reduce cost, and a space formed at the mobile object to pass the duct can be utilized. A part of the tubular member may be used in common as a passage portion of the air conditioning duct through which warm air or cool air passes. Further, the passage portion may be partitioned by a partition part and may thereby include two or more passages, in which one passage is used for passing warm air or cool air, and the other passage may be a part of the tubular member. In addition, even if an installation space of the speaker unit below the seat is narrow (i.e., even if the speaker unit is downsized), since the other end of the tubular member opens towards the intersecting part, the acoustic characteristic such as the sound pressure of the low-pitched sound region can be improved.

The enclosure may be a part of a box portion provided to the instrumental panel of the mobile object, the front face of the speaker unit may face to the outside of the box portion, and the other end of the tubular member may open towards the intersecting part at which at least the front face and the lower face in the traveling direction of the mobile object meet. As such, the space inside the box portion can be used to echo the sound emitted from the back face side of the speaker unit. Further, since the instrumental panel is provided to the front side of the mobile object, it is easy to direct the other end of the tubular member to the intersecting part at which the front face and the lower face of the mobile object meet. Further, even if the speaker unit is downsized to prevent narrowing of the space in the box portion, since the other end of the tubular member opens towards the intersecting part, the acoustic characteristic such as a sound pressure of the low-pitched sound region can be improved.

The speaker unit and the enclosure may be provided inside a wheel of a spare tire accommodated in the box-like space formed by the mobile object. As such, the space inside the wheel of the spare tire can be used to install the speaker unit and the enclosure. Herein, the wheel of the spare tire is arranged such that, when attached to the mobile object and viewed from the width direction, any one of the faces (for example, an inner face in the width direction of the mobile object) is formed into a concave shape. The state in which the speaker unit and the enclosure are arranged to this concave shaped portion is referred herein as "accommodated in a wheel". Further, the speaker unit and the enclosure may be entirely accommodated in the wheel, or may be partially accommodated. As such, even if the speaker unit is downsized to be accommodated in the wheel of the spare tire, since the other end of the tubular member opens towards the intersecting part, the acoustic characteristic such as a sound pressure of the low-pitched sound region can be improved.

The speaker unit and the enclosure may be provided to a central portion in the width direction of the mobile object, two tubular members can be connected to the enclosure, the two tubular members may extend in opposite directions with respect to each other in the width direction, and the other ends of the two tubular members may open towards an intersecting part at which a side face and at least one other face of the mobile object meet. As such, low-pitched sound emitted from the other ends of the tubular members on both sides in the width direction echoes, thereby providing a reproduced sound having a tremendous impact to a passenger. Further, even if the installation space of the speaker unit is narrow in the central portion in the widthwise direction, since the other end of the tubular member opens towards the intersecting part, the acoustic characteristic such as a sound pressure of the low-pitched sound region can be improved.

The speaker unit and the enclosure may be provided in the vicinity of the intersecting part on the rear side in the traveling direction of the mobile object, the tubular member may pass inside a side sill of the mobile object, and the other end of the tubular member may open towards the intersecting part located on the front side with respect to the side sill in the traveling direction. As such, the low-pitched sound emitted from the other end of the tubular member is reflected on the intersecting part, thereby further improving the acoustic characteristic such as a sound pressure of the low-pitched sound region. Further, the speaker unit may be a speaker unit for reproducing a low-pitched sound (for example, a speaker capable of reproducing a sound of equal to or less than 100 Hz, or a speaker unit having a lowest resonance frequency that is equal to or less than 100 Hz). A sound wave equal to or less than 100 Hz is not likely to give directionality, thus even if the speaker unit that emits such sound wave is arranged far away from a passenger, it is possible to make the sound wave sufficiently reached to the passenger.

Further, a sound generating device for mobile object according to an embodiment of the present invention includes a speaker unit configured to emit a sound towards a box-like space formed by a mobile object having a door body, and an enclosure accommodating the speaker unit. At least one of the enclosure and the speaker unit is provided with a resonance element configured to generate a resonance sound of a frequency different from a lowest resonance frequency of the speaker unit, and the speaker unit and the enclosure are accommodated in the door body.

A frequency characteristic of a phase difference (phase characteristic) between an input signal and a generated sound in the sound generating device exhibits a tendency that the phase difference decreases as the frequency increases. If there is no phase difference between the input signal and the generated sound in the sound generating device at an arbitrary frequency range, then an absolute value of the phase difference between the input signal and the generated sound in the sound generating device tends to increase from the arbitrary frequency range as the frequency increases.

By providing the resonance element to at least one of the enclosure and the speaker unit, the frequency range in which the noise can be easily reduced can be adjusted by appropriately setting the resonance frequency of the resonance element.

Further, it is preferable to include the tubular member having one end communicated with an interior space of the enclosure and the other end opening in the space. With the one end of the tubular member communicated with the interior space of the enclosure, of the sound generated in the rear side (an opposite side of a side at which a sound is emitted towards the box-like space (sound emitting side)) of the speaker unit, a low-pitched sound region component according to the length of the tubular member resonates in the tubular member and is emitted from the other end. The enclosure and the tubular member may be formed integrally.

Further, it is preferable that the speaker unit is provided above a seat face of a seat in the mobile object, and that the other end of the tubular member opens towards the space below the door body. As such, even if the speaker unit is provided above the seat face of the seat in the mobile object, since the low-pitched sound region component is emitted at a lower position of the door body at which the acoustic characteristic of the low-pitched sound region component is high, the acoustic characteristic such as a sound pressure of the low-pitched sound region in the sound generating device for mobile object can be improved.

Further, with the acoustic characteristic of the low-pitched sound region improved as described above, it is possible to obtain a good acoustic characteristic even when using a small-sized speaker unit in which a sound pressure in the low-pitched sound region is lower compared to the low-pitched sound reproducing speaker (e.g., a woofer or a subwoofer). Consequently, it is possible to reduce a diameter of the speaker unit.

Further, it is preferable that the other end of the tubular member opens towards a gap between the lower end part of the door body and a part of the mobile object facing the lower end part of the door body. As such, the low-pitched sound region component emitted from this other end reflects on the two faces that are the lower face of the door body and part of the mobile body that form the gap. Consequently, it is likely to echo in the space of the mobile object, thus the acoustic characteristic such as a sound pressure in the low-pitched sound region in the sound generating device for mobile object can be improved.

Further, it is preferable that the other end of the tubular member opens towards a part of the mobile object forming the gap. As such, the low-pitched sound region component emitted from the other end reflects on the two faces that are the lower face of the door body and part of the mobile body that form the gap. Consequently, it is likely to echo in the space of the mobile object, thus the acoustic characteristic such as a sound pressure in the low-pitched sound region in the sound generating device for mobile object can be improved.

Further, it is preferable that the length of the gap in the up-down direction of the door body increases as approaching inside the box-like space (e.g., a location where the seat is located). With the length of the gap in the up-down direction of the door body is widened as approaching inside the box-like space as described above, a wind noise can be prevented or an air disturbance can be prevented due to the flare effect. Moreover, the low-pitched sound region component emitted from the other end of the tubular member is reflected on the two faces that are the lower face of the door body and the part of the mobile object that form the gap and is likely to echo in the space of the mobile object, thereby improving the acoustic characteristic such as a sound pressure of the low-pitched sound region in the sound generating device for mobile object.

Further, it is preferable that the other end of the tubular member opens at the position lower than the position of the seat face of the seat in the mobile object. As such, it is possible to make the low-pitched sound to echo efficiently in the space of the mobile object.

Further, it is preferable that the tubular member is arranged inside the door body. As such, it is possible to make the low-pitched sound to echo efficiently in the space of the mobile object.

Further, in the speaker system for active noise control of an embodiment of the present invention, a speaker device configured to emit a sound from a sound emitting part towards a box-like space formed by a mobile object may be arranged as follows. That is, this speaker device is arranged such that, in the box-like space, at least a part of the sound emitting part is positioned substantially at the center in both of the front-rear direction and the right-left direction of the mobile object.

By generating a sound at substantially the center in the box-like space, a first resonance sound of a standing wave in the space and a sound transmitting from the speaker device to each location in the space will appear in the high-pitched sound region than a first resonance sound produced when a sound is generated at a location other than a center. Consequently, for the middle and low-pitched sound region which is effective in the noise cancelling, the phase difference with respect to the input signal is stabilized regardless of the frequency of the input signal and the locations in the space. As a result, the noise in respective location in the box-like space can be successfully cancelled.

Herein, in the speaker system for active noise control of this embodiment, it is preferable that the speaker device is arranged such that, in the box-like space, at least a part of the sound emitting part is positioned substantially at the center also in the up-down direction of the mobile object. As such, the phase difference with respect to the input signal for the noise cancelling can be further stabilized. As a result, the noise in respective location in the box-like space can be further successfully cancelled.

Further, in the speaker system for active noise control of this embodiment, the speaker device may include a speaker unit that emits a sound as the sound emitting part. In the box-like space, the speaker unit itself may be arranged at substantially center in both of the front-rear direction and the right-left direction of the mobile object. As such, the structure of the system can be simplified and the installation to the vehicle can be performed easily.

Further, in the speaker system for active noise control of this embodiment, the speaker device may include a speaker unit that emits a sound and an acoustic tube as the sound emitting part that is configured to guide the sound of the speaker unit and emits the sound from an opening at one end. In the box-like space, the opening of the acoustic tube may be arranged at substantially center in both of the front-rear direction and the right-left direction of the mobile object. Accordingly, the degree of freedom increases for the arrangement of the speaker unit in the box-like space, making the designing and the installation to the vehicle to be easy.

Further, in the speaker system for active noise control of this embodiment, the speaker device may include a speaker unit that emits a sound. It is preferable that a resonance element configured to generate a resonance sound of a frequency different from the lowest resonance frequency of the speaker unit is arranged at one of elements that constitute this speaker device.

By providing the resonance element, a frequency range in which the noise can be reduced easily can be adjusted by appropriately setting the resonance frequency of the resonance element. As a result, the noise in respective location in the box-like space can be further successfully cancelled.

A sound generating device for mobile object according to an embodiment of the present invention may include a speaker unit configured to emit a sound towards a box-like space formed by a mobile object, an accommodation part accommodating the speaker unit, and a tubular member having one end communicated with an inner space of the accommodation part and the other end opening in the box-like space of the mobile object. At least one of the accommodation part, the tubular member and the speaker unit is provided with the resonance element configured to generate a resonance sound of a frequency different from the lowest resonance frequency of the speaker unit. Further, the speaker unit, the accommodation part and the tubular member are accommodated in a seat provided in the box-like space of the mobile object.

With the resonance element arranged at at least one of the accommodation part, the tubular member and the speaker unit, a frequency range in which the noise can be reduced easily can be adjusted by appropriately setting the resonance frequency of the resonance element.

Further, it is preferable that the tubular member is a frame of a seat. By using the frame that has been conventionally used for the seat also as the tubular member, an increase in a volume and a weight of the seat can be minimized.

Further, it is preferable that the accommodation part is accommodated to a lower part of a backrest, and that the other end of the tubular member is arranged at an upper part of the backrest. As such, the other end of the tubular member that is a sound emitting part is positioned in the vicinity of an ear of a passenger seated on the seat, thus the noise cancelling sound can be transmitted reliably to the seated passenger.

A speaker system for active noise control according to an embodiment of the present invention may include at least two speaker devices configured to emit a sound from a sound emitting part towards a box-like space formed by a mobile object. The two speaker devices are provided with the resonance elements, respectively, configured to generate a resonance sound of a frequency different from the lowest resonance frequency of speaker units provided to the speaker devices, respectively. These two speaker devices are arranged such that, in the box-like space, at least a part of a sound emitting part is positioned at corner parts on a front side and a rear side in the traveling direction of the mobile object, or on one side or the other side in the width direction.

Further, by including the resonance element, a frequency range in which the noise can be reduced easily can be adjusted by appropriately setting the resonance frequency of the resonance element.

Further, the speaker system for active noise control may include at least two speaker devices as described above that are arranged at two corner parts of the mobile object, respectively. As such, even if an empty space at each corner part is narrow and small, a sound pressure characteristic of the emitted sound of the entire speaker system for active noise control can be improved, thereby improving the acoustic characteristic of the noise cancelling sound.

Herein, in the speaker system for active noise control of this embodiment, the four speaker devices may be provided. It is preferable that, these speaker devices are each arranged such that at least a part of the sound emitting part is positioned at four corner parts on the front side and the rear side in the traveling direction and on one side and the other side in the width direction. Consequently, the sound pressure characteristic of the emitted sound of the entire speaker system for active noise control can be further improved, thereby further improving the acoustic characteristic of the noise cancelling sound.

Further, in the speaker system for active noise control of this embodiment, it is preferable to include an accommodation part accommodating a back face of the speaker unit and a tubular member having one end communicated with the inner space of the accommodation part and the other end opening in the box-like space. Consequently, on the sound generated on the back face side of the speaker unit, the low-pitched sound region component according to a length of the tubular member resonates in the tubular member and is emitted from the other end. Since the low-pitched sound is likely to echo at the corner part, the low-pitched sound emitted from the other end of the tubular member echoes, thereby the acoustic characteristic of especially the low-pitched sound region can be improved for the noise cancelling sound. It is noted that the accommodation part and the tubular member may be formed integrally.

Further, in the speaker system for active noise control of this embodiment, the two speaker devices are each arranged such that at least a part of the sound emitting part is positioned at corners on the front side and the rear side. It is preferable that the speaker unit of the speaker device arranged on the front side and the speaker unit of the speaker device arranged on the rear side operate with a predetermined time lag. Consequently, the position of the node of the standing wave formed in a space of the mobile object by the emitted sounds of the two speaker units can be adjusted appropriately, thereby a good acoustic characteristic can be obtained for the noise cancelling sound.

Further, in the speaker system for active noise control of this embodiment, the two speaker devices are each arranged such that at least a part of the sound emitting part is positioned at corners on the front side and the rear side, as described above. In addition, the other end of the tubular member of the speaker device arranged on the front side opens towards a front side intersecting part at which at least two faces of a plurality of faces surrounding the box-like space meet. Further, the other end of the tubular member of the speaker device arranged on the rear side opens towards a rear side intersecting part at which at least two other faces of the plurality of faces meet. It is preferable that a wavelength of a standing wave formed by sound waves emitted from the other ends of the tubular members on the front side and the rear side is equal to a distance between the front side intersecting part and the rear side intersecting part. As such, the sound wave emitted from the other end of the front and rear tubular members are reflected on the respective intersecting parts, forming the standing wave between the intersecting parts. With the standing wave having a wavelength equal to the distance between the intersecting parts being generated, the position of the node of this standing wave can be adjusted as described above to improve the acoustic characteristic for a sound having a relatively long wavelength (i.e., a low-pitched sound) for the noise cancelling sound. Meanwhile, when sounds are emitted from the other ends of the tubular members without a time lag between the front side and the rear side, the node of the standing wave having such wavelength is formed in the middle position between the intersecting parts. Thus, in a case where the mobile object includes the front side seat and the rear side seat, the node may be positioned slightly rearward with respect to a head position of the front side seat, making the sound pressure likely to be reduced at the head position of the front seat. Consequently, by displacing the node to further rearward by providing a predetermined time lag, the acoustic characteristic of the low-pitched sound region for a passenger on the front seat can be improved for the noise cancelling sound.

EXAMPLES

Example 1

Figure 2A:
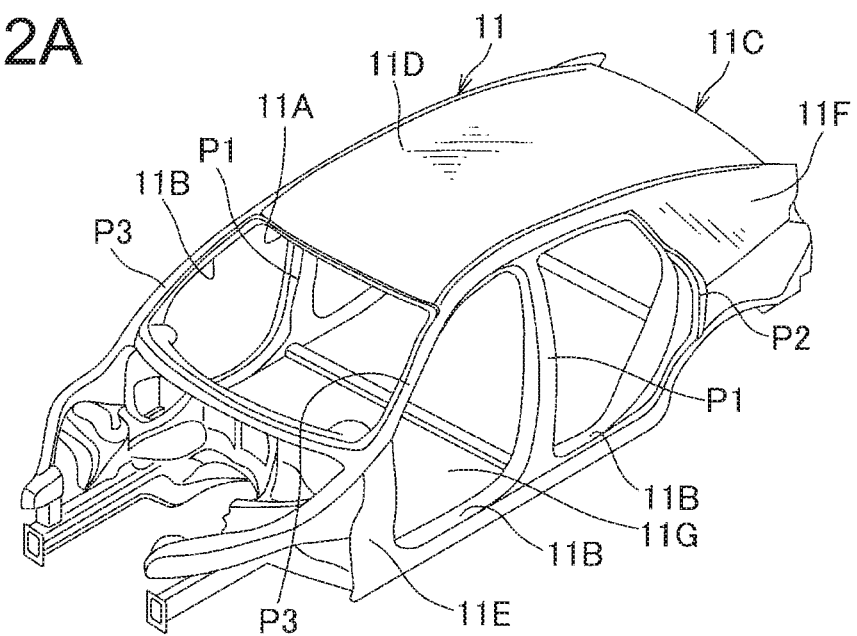
FIG. 2A is a perspective view of a vehicle body constituting the vehicle shown in FIG. 1.
Figure 2B:
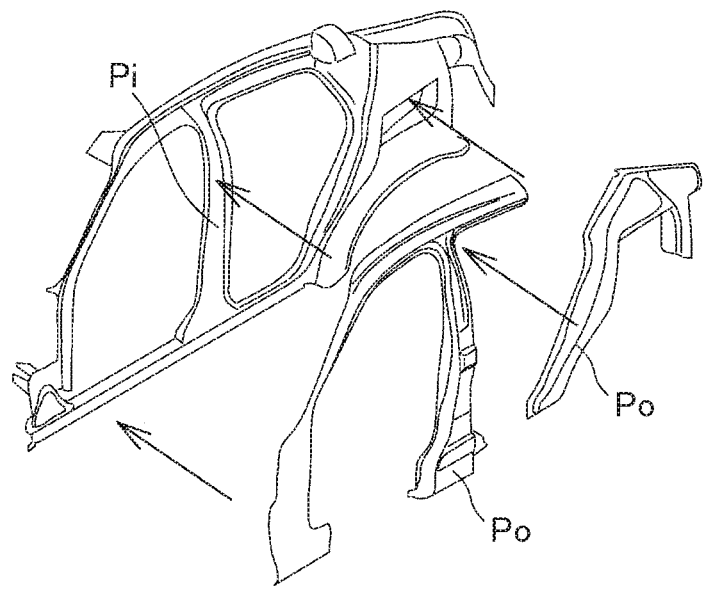
FIG. 2B is an exploded perspective view of a pillar constituting the vehicle body.
Figure 2C:
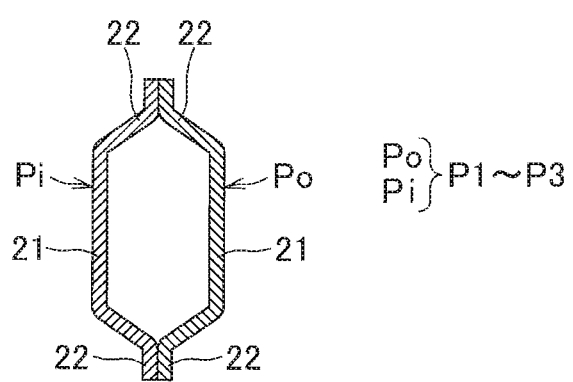
FIG. 2C is a schematic cross-sectional view of FIG. 2A.

FIG. 1 is a side view of a vehicle C provided with a sound generating device for mobile object (hereinafter may be called as "sound generating device") 1A according to Example 1 of the present invention. FIG. 2A is a perspective view of a vehicle body constituting the vehicle shown in FIG. 1, FIG. 2B is an exploded perspective view of a pillar constituting the vehicle body, and FIG. 2C is a schematic cross-sectional view of FIG. 2A.

Firstly, before explaining the sound generating device for mobile object 1A, the vehicle C as a mobile object will be explained. The vehicle C includes a vehicle body 11 made of metal, a windshield (front windshield) 12 covering a front opening 11A provided to a front side in a front-rear direction of the vehicle body 11, side doors 13 covering side openings 11B provided on both sides in a width direction of the vehicle body 11, and a rear door 14 covering a rear opening 11C provided to a rear side in the front-rear direction of the vehicle body 11.

The vehicle C includes, from the front side in the front-rear direction, an engine compartment and a passenger compartment, and may further include a trunk compartment on a rear side of the passenger compartment. A plurality of seats SH including, for example, a driver's seat, an assistant driver's seat, a rear seat and such is arranged in the passenger compartment.

Further, for example as shown in FIGS. 2A-2C and 3, the vehicle body 11 is formed of a plurality of long frames including pillars P1-P3, side sills (not shown), a reinforcement (not shown), a cross member (not shown) and such, and panels 11D, 11E, 11F, 11G and/or an outer panel supported by these frames. The pillars P1-P3 are tubular frames that support intervals between the panels 11D and 11G of the vehicle body 11. As used herein, the term long frame refers to a frame having a planar shape having a long-side direction and a short-side direction.

The pillars P1-P3 constitute a part of a frame of the side opening 11B. In this example, three pillars P1-P3 are provided on each of a right side and a left side. The pillar P1 constitutes a rear frame of the side opening 11B on the front side and a front frame of the side opening 11B on the rear side, and is provided along a up-down direction. The pillar P2 constitutes a rear frame of the side opening 11B on the rear side, and is provided along the up-down direction. The pillar P3 constitutes a front frame of the side opening 11B on the front side, and is provided along the up-down direction. Herein, the side opening 11B refers to an opening that is provided on a side face of the vehicle body 11 and that is configured to be opened and closed by the side door 13 and such. As used herein, the front frame refers to a frame located on the front side of the vehicle C, and the rear frame refers to a frame located on the rear side of the vehicle C.

In this example, the vehicle body 11 is provided with the three pillars P1-P3 provided on each of the right side and the left side, however, it is not limited to this. That is, one or more pillars P1-P3 may be provided. The pillars P1-P3 are a tubular member constituted of an outer pillar Po and an inner pillar Pi, as shown in FIG. 2C. The outer pillar Po and the inner pillar Pi are formed to have a substantially U-shaped cross-section with a long intermediate portion (plate portion) 21 and a pair of ends 22 extending from both sides in the short-side direction of the intermediate portion 21. The intermediate portion 21 is formed into long plate-like shape. The end 22 extends from the intermediate portion 21 and has a bent or curved shape. The outer pillar Po and the inner pillar Pi are arranged such that ends of the pair of ends 22 overlap each other such that the intermediate portions 21 of the outer pillar Po and the inner pillar Pi face each other. In this manner, the tubular shape is formed. It is noted that the outer panel that is arrange outside the outer pillar Po is omitted from FIGS. 2B and 2C.

In this example, the outer pillar Po and the inner pillar Pi are both formed to have a substantially U-shaped cross section, however, it is not limited to this. For example, a first one of the outer pillar Po and the inner pillar Pi may be arranged to have a substantially U-shaped cross section, and a second one of the outer pillar Po and the inner pillar Pi may be formed into a plate-like shape, with the second one having the plate-like shape covering an opening of the substantially U-shaped cross section of the first one to form the tubular shape.

Figure 3:
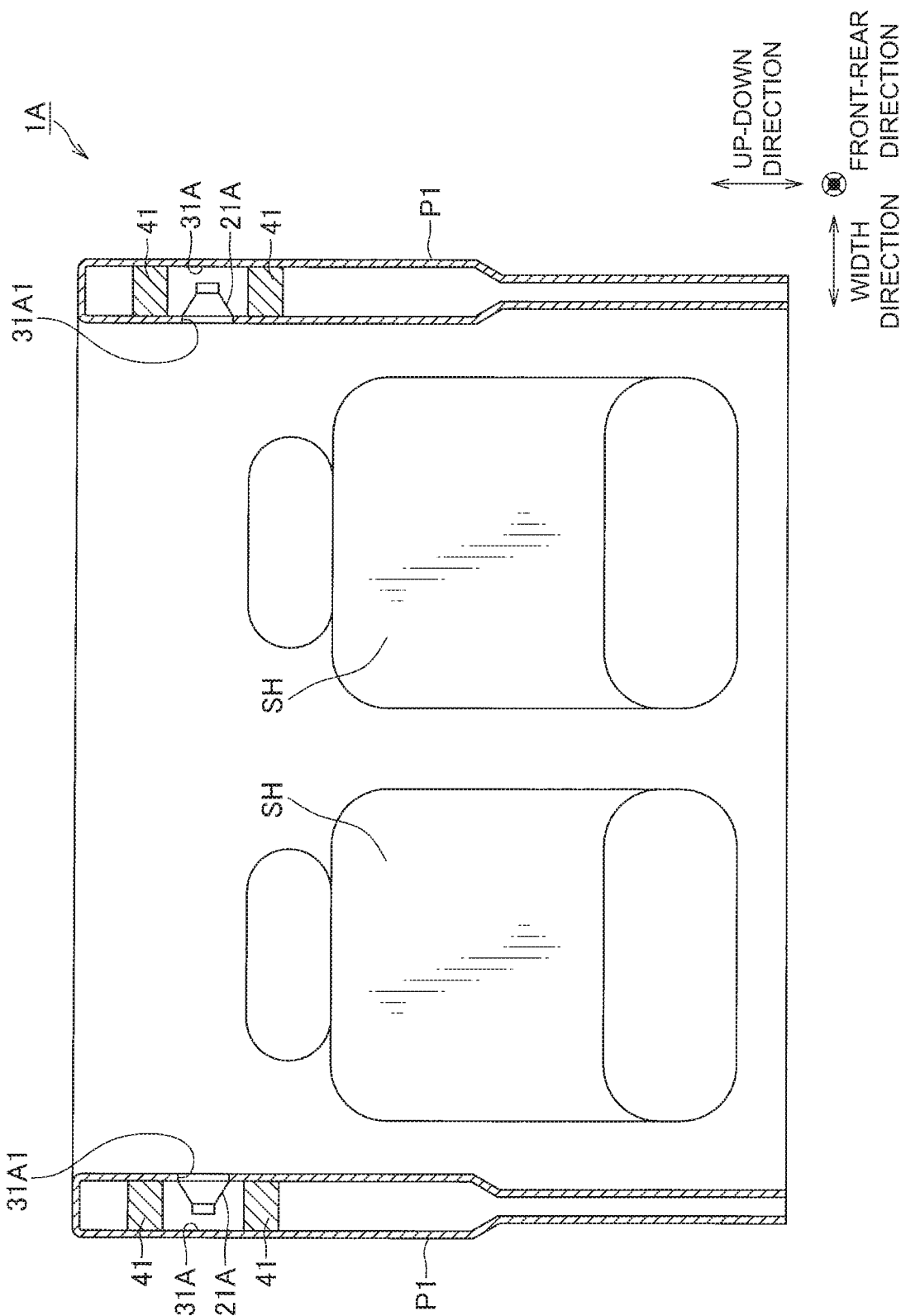
FIG. 3 is a schematic front view of an interior of the vehicle shown in FIG. 1.
Figure 4:
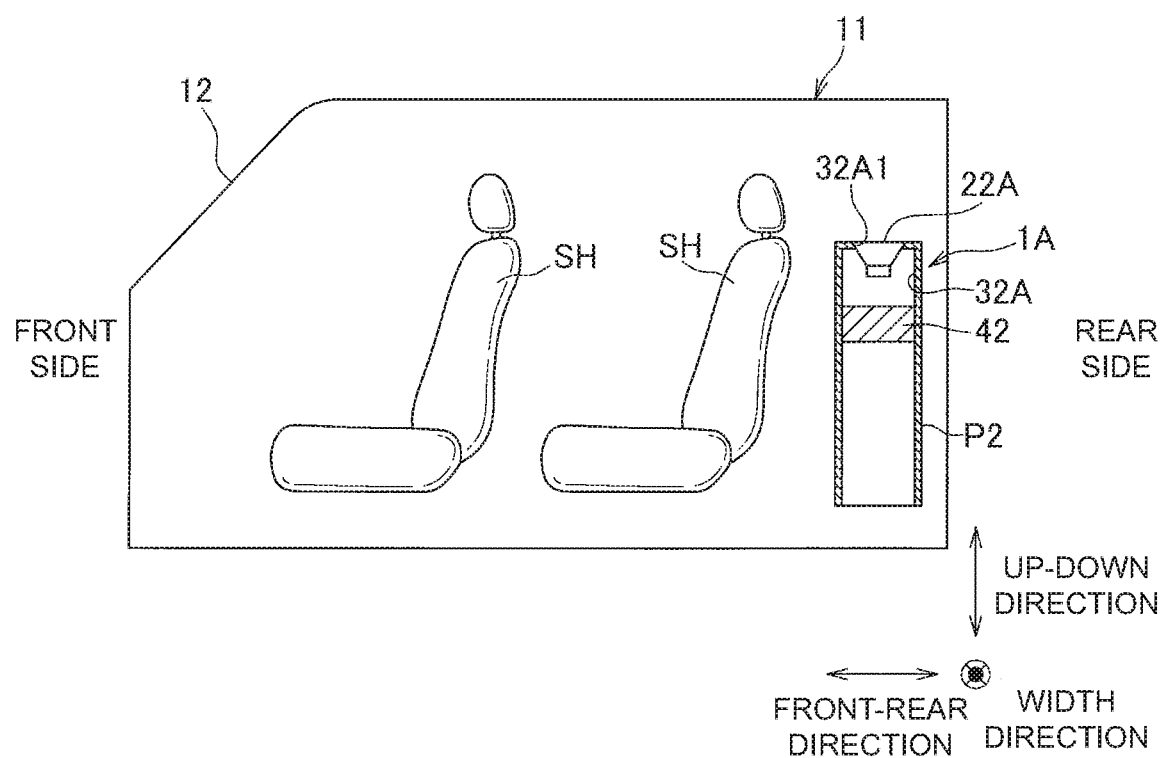
FIG. 4 is a schematic front view of the interior of the vehicle shown in FIG. 1.

Next, the sound generating device for mobile object 1A will be explained. As shown in FIGS. 1, 3 and 4, the sound generating device for mobile object 1A is configured to be provided to the vehicle C as the mobile object, and includes speaker units 21A, 22A, and enclosures 31A, 32A as accommodation parts accommodating the speaker units 21A, 22A. The speaker unit 21A and the enclosure 31A are arranged on the front side of the vehicle C, and the speaker unit 22A and the enclosure 32A are arranged on the rear side of the vehicle C.

As shown in FIG. 3, the speaker unit 21A is arranged inside the pillar P1, and a part of the pillar P1 forms a part of the enclosure 31A. Further, as shown in FIG. 4, the speaker unit 21B is arranged inside the pillar P2, and a part of the pillar P2 forms a part of the enclosure 31A. Detailed configuration of the speaker units 21A, 22A will be explained later.

A part of the enclosure 31A also serves as a part of the pillar P1. In the example shown in FIG. 3, an opening 31A1 is provided at a side face of the pillar P1 on one end side (upper side). The speaker unit 21A is accommodated in the pillar P1 such that this opening 31A1 is covered by a later-described diaphragm of the speaker unit 21A. The opening 31A1 is provided so as to penetrate through, in the width direction, a part of the pillar P1 on the seat SH side. In this manner, the speaker unit 21A is arranged such that its front face faces the seat SH.

Inside the pillar P1 is closed by a pair of stopper members 41 arranged inside the pillar P1 in its longitudinal direction with a space between each other. The pair of stopper members 41 closes both sides in the longitudinal direction of the pillar P1 that sandwich the opening 31A1. The speaker unit 21A is arranged between the pair of stopper members 41. Thus, the pair of stopper members 41 and the pillar P1 between the pair of stopper members 41 form the enclosure 31A.

A part of the enclosure 32A also serves as a part of the pillar P2. In the example shown in FIG. 4, an opening 32A1 is provided at an end face of the pillar P2 on one side (upper side). The speaker unit 22A is accommodated in the pillar P2 such that this opening 32A1 is covered by a later-described diaphragm of the speaker unit 22A. In this manner, the speaker unit 22A is arranged such that its front face faces upward.

The pillar P2 is closed by a stopper member 42. The speaker unit 22A is arranged above the stopper member 42. That is, the stopper member 42 and the pillar P2 located above the stopper member 42 constitute the enclosure 32A. Size of the enclosures 31A, 32A can be adjusted to the arrangement position of the stopper members 41, 42. As described above, since at least a part of the enclosures 31A, 32A also serves as a body of the pillars P1, P2 of the vehicle C, it is possible to make efficient use of the structure of the pillars P1, P2, thereby saving space.

Figure 5:
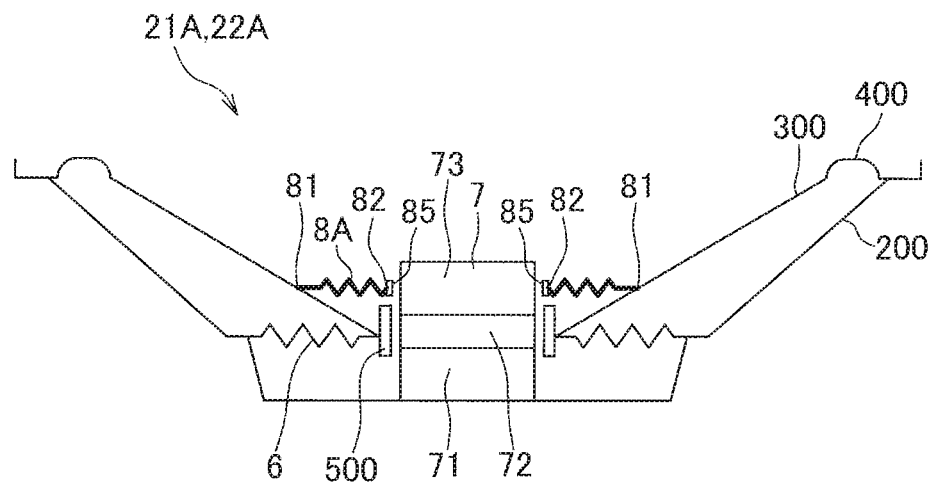
FIG. 5 is a cross-sectional view showing a speaker unit according to Example 1 of the present invention.

Next, a detailed configuration of the above-described speaker units 21A, 22A will be explained with reference to FIG. 5. As shown in FIG. 5, the speaker unit 21A, 22A includes a frame 200, a diaphragm 300 connected to the frame 200, an edge 400 connecting the diaphragm 300 to the frame 200, a tubular voice coil 500 directly connected to the diaphragm 300, a damper 6 connecting the voice coil 500 to the frame 200, a magnetic circuit 7 inserted inside the voice coil 500, and the elastic member 8A (resonance element) connected to the diaphragm 300. That is, the speaker unit 21A, 22A is a commonly used cone-type speaker device with the elastic member 8A. Further, the speaker units 21A, 22A are configured to be provided to the vehicle C as a mobile object together with an external device including a sound collecting part configured to collect noise and a transmission part configured to transmit an input signal to the voice coil, such that the speaker units 21A, 22A and the external device together constitute a noise cancelling device.

The magnetic circuit 7 arranged inside the voice coil 500 has a projected shape formed by a magnet 71, a plate 72 and a magnet 73 that are stacked in order from a bottom side in FIG. 5.

The elastic member 8A is formed from a rubber having a circular ring-like shape in a plan view, for example, and has an outer perimeter 81 connected to a sound emitting surface (in this example, at a side closer to the voice coil 500 than a central portion) of the diaphragm 300, and an inner perimeter 82 as a free end. A weight 85 is connected to an inner side of this free end of the elastic member 8A.

When emitting sound in the speaker units 21A, 22A, the diaphragm 300 and the elastic member 8A vibrate as follows. An entire of the diaphragm 300 integrally vibrates with substantially no generation of a delay at its outer perimeter (edge side) with respect to its inner perimeter side (voice coil 500 side). On the other hand, the elastic member 8A integrally vibrates with the diaphragm 300 at its outer perimeter, but vibrates with a delay at its inner perimeter with respect to the outer perimeter due to its elasticity. In other words, wave of vibration propagating in the elastic member 8A reaches to the inner perimeter with a delay with respect to the outer perimeter, thus a predetermined difference is generated between a phase of a wave of vibration at the inner perimeter and a phase of a wave of vibration at the outer perimeter.

Figure 6:
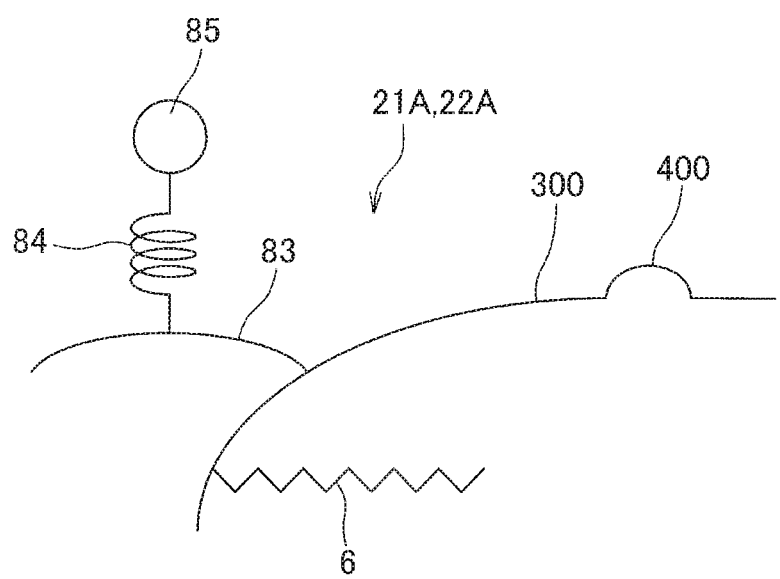
FIG. 6 is a schematic diagram showing mechanical elements of the sound generating device according to Example 1.

Therefore, mechanical elements in the sound generating device for mobile object 1A can be schematically shown as FIG. 6. That is, the elastic member 8A can be regarded as being constituted of a rigid body 83 connected to the diaphragm 300 and having a certain mass, and a spring 84 which is connected to the rigid body 83, configured to produce a mechanical resistance when being extended and contracted and has a certain mass. Further, the weight 85 is connected to the elastic member 8A. With respect to the diaphragm 300, mechanical elements are not shown, however, since the diaphragm 300, the damper 6 and the edge 400 have elasticity and mass, it can be regarded as being constituted of the spring 84, the weight 85 and a mechanical resistance.

Figure 7:
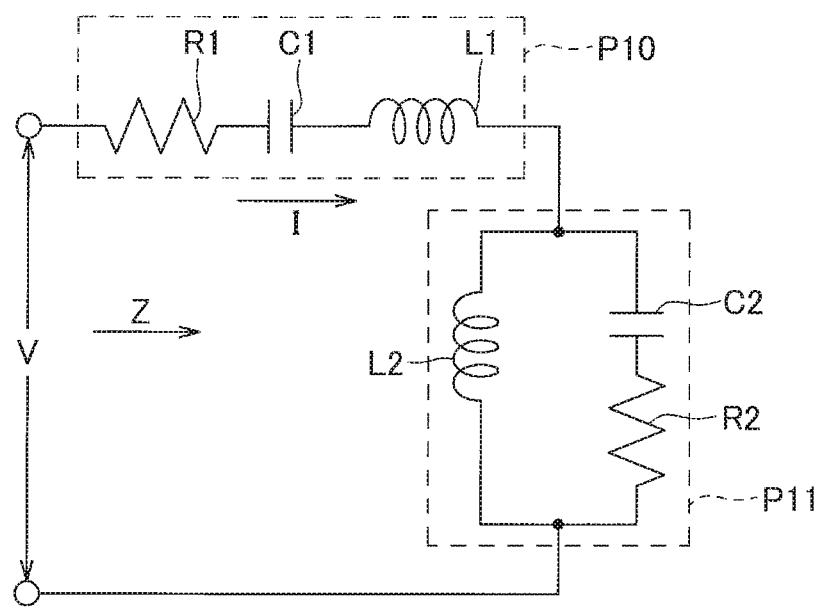
FIG. 7 shows an equivalent circuit produced by replacing the mechanical elements of the sound generating device of Example 1 with circuit elements.

FIG. 7 is an electric circuit provided by replacing the mechanical elements as shown in FIG. 6 with electric circuit elements. That is, the circuit includes a part P10 given by a diaphragm 300 and a part P11 given by the elastic member 8A connected in series. In the part P10 given by the diaphragm 300, a resistor R1, a capacitor C1 and a coil L1 are connected in series, the resistor R1 being given by a mechanical resistance of the damper 6, the edge 400 and the voice coil 500, the capacitor C1 being given by a compliance of the damper 6 and the edge 400, and the coil L1 being given by vibration mass of the diaphragm 300, the damper 6 and the edge 400. Further, in the part P11 given by the elastic member 8A, a capacitor C2 given by a compliance of the spring 84 and a resistor R2 given by a mechanical resistance of the spring 84 are connected in series, while a coil L2 given by a vibration mass of the weight 85 is connected in parallel with the capacitor C2 and the resistor R2.

As can be seen in FIG. 7, the diaphragm 300 is constituted of an RLC resonant circuit and has a resonance frequency according to the mechanical resistance of the damper 6, the edge 400 and the voice coil 500, the compliance, and the vibration mass of the diaphragm 300, the damper 6 and the edge 400. The elastic member 8A is also constituted of an RLC resonant circuit, and has a resonance frequency according to the compliance of the spring 84, the mechanical resistance of the spring 84 and the vibration mass of the weight 85. The resonant frequency of the elastic member 8A is set to a value different from a lowest resonance frequency of the speaker unit 21A, 22A (i.e., a lowest resonance frequency of the speaker unit 21A, 22A without the elastic member 8A). Consequently, when the diaphragm 300 of the speaker unit 21A, 22A vibrates, the elastic member 8A produces a resonance sound of a frequency different from the lowest resonance frequency of the speaker unit 21A, 22A, and thus the elastic member 8A functions as a resonance element. Herein, ¼ wavelength of the resonance sound is sufficiently longer than twice a distance between tragi (e.g., 0.15 m).

Figure 8:
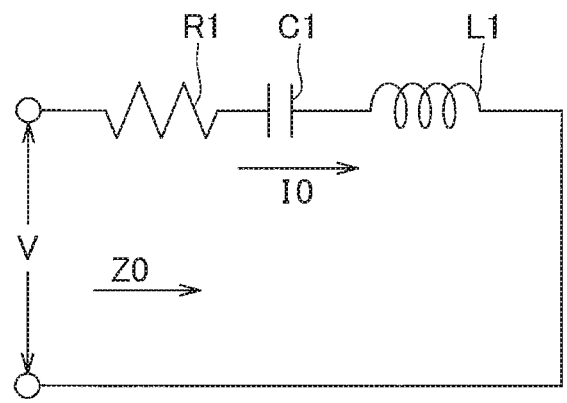
FIG. 8 shows an equivalent circuit produced by replacing mechanical elements of a speaker unit of a comparative example with circuit elements.

With respect to a sound generating device of Comparative Example in which the elastic member 8A is excluded from the speaker unit 21A, 22A, by similarly replacing mechanical elements with circuit elements, an electric circuit as shown in FIG. 8 is provided. That is, this electric circuit includes a resistor R1, a capacitor C1 and a coil L1 connected in series.

Figure 9:
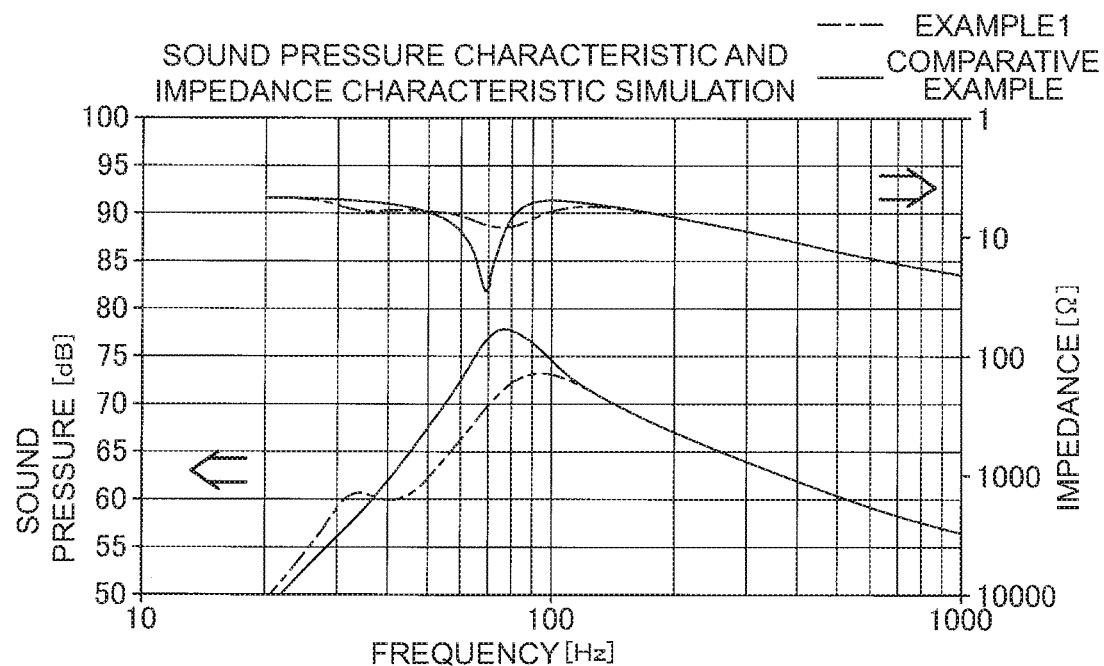
FIG. 9 is a graph showing a simulation result of an impedance of the equivalent circuits and a frequency characteristic of a generated sound of the speaker units of Example 1 and the comparative example.

FIG. 9 shows a simulation result calculated based on the above-described electric circuit for a frequency characteristic of an impedance and a frequency characteristic of a sound pressure (sound pressure characteristic) of the speaker units 21A, 22A of Example 1 and of the sound generating device of Comparative Example. In FIG. 9, a horizontal axis indicates frequency in a logarithmic scale, a vertical axis on a left side indicates sound pressure, and a vertical axis on a right side indicates an impedance. In addition, in FIG. 9, dot-dash lines correspond to Example 1, and solid lines correspond to Comparative Example.

In Comparative Example where the elastic member 8A is not provided, a maximum value of the impedance is obtained at about 70 Hz, and this is the lowest resonance frequency. On the other hand, in Example 1 where the elastic member 8A is provided, a maximum value of the impedance is obtained at about 80 Hz which is the lowest resonance frequency, and also a local maximum value is obtained at 30-40 Hz. Thus, for the speaker units 21A, 22A of Example 1, the sound pressure is maximum at about 90 Hz, and a local maximum value of the sound pressure is obtained at 30-40 Hz. That is, the sound pressure characteristic includes a sub-peak at a certain frequency (30-40 Hz) on lower frequency range side with respect to the lowest resonance frequency. Consequently, by providing the elastic member 8A, the sub-peak is formed at a certain frequency different from the lowest resonance frequency. The frequency of this sub-peak is determined by the resonance frequency (element resonance frequency) of the elastic member 8A described above.

Figure 10:
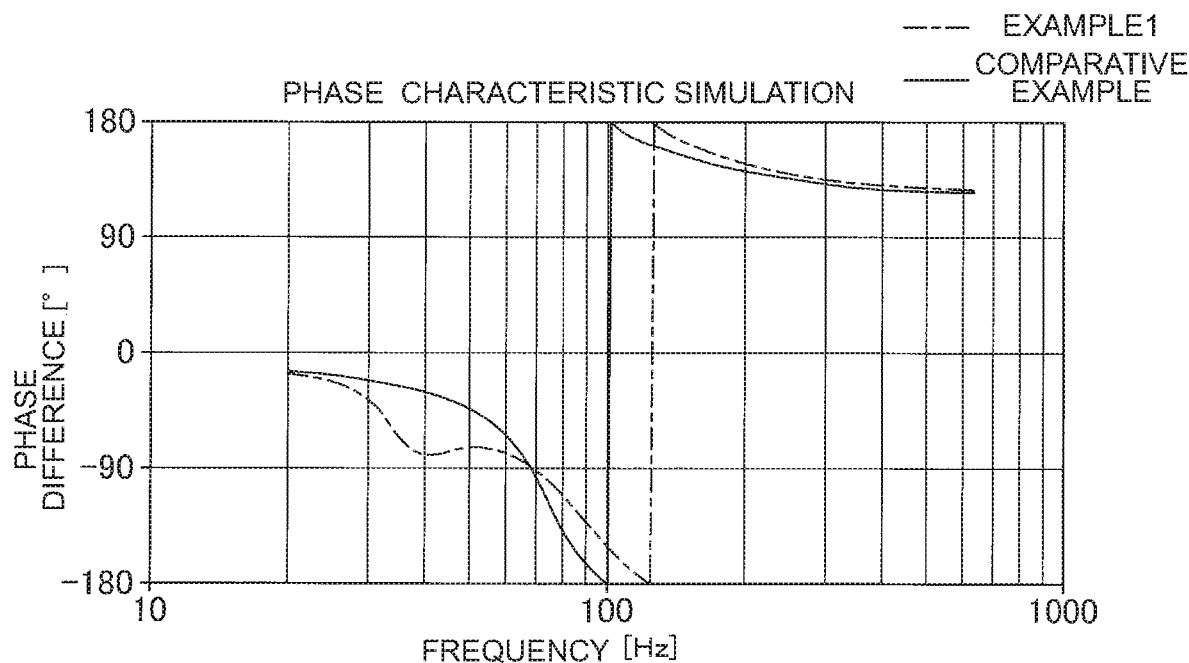
FIG. 10 is a graph showing a simulation result of a phase characteristic of the speaker units of Example 1 and the comparative example.
Figure 11:
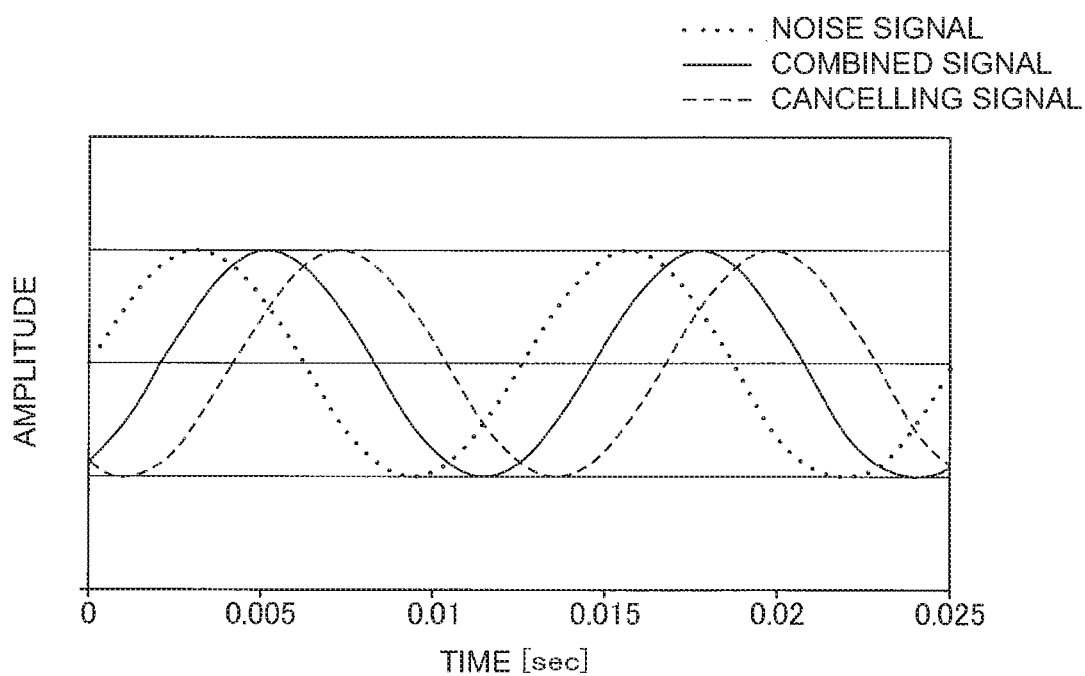
FIG. 11 is a graph showing waves of a noise signal, a cancelling signal generated by the speaker unit and a combined signal obtained by combining these signals.

Next, a simulation result of a phase characteristic of the speaker units 21A, 22A of Example 1 and the sound generating device of Comparative Example is shown in FIG. 10. Herein, the phase characteristic is defined by a frequency dependency of the phase difference between the input signal inputted to the voice coil 500 and the generated sound. In FIG. 10, a horizontal axis indicates frequency in a logarithmic scale, and a vertical axis indicates phase (herein, values for the phase of −180° or less are indicated as values with 360° added). Further, in FIG. 10, dot-dash lines correspond to Example 1, and solid lines correspond to Comparative Example. When a noise signal is detected and a cancelling signal is emitted from the noise generating device for noise cancelling, if there is a phase difference produced between the noise signal and the cancelling signal, then cancelling effect may be deteriorated, or noise may be increased. For example, FIG. 11 shows waves of the noise signal, the cancelling signal having the same amplitude as the noise signal and a combined signal obtained from combining these signals, in the case where the phase difference between the noise signal and the cancelling signal is 60°. The sound pressure of the sound that is actually generated in a space in which the noise signal and the cancelling signal are emitted, corresponds to the amplitude of the combined signal. In the example shown in FIG. 11, if the noise signal and the cancelling signal are equal in the amplitude, then the amplitude of the noise signal and the amplitude of the combined signal are equal, and the cancelling effect cannot be obtained when the phase difference between the noise signal and the cancelling signal exceeds 60°.

For the phase characteristic of the sound generating device of Comparative Example, the phase difference is −90° at the lowest resonance frequency, and the phase difference decreases as the frequency decreases. In contrast, in the sound generating device for mobile object of Example 1, the phase difference is −100° at the lowest resonance frequency, and the phase difference decreases as the frequency decreases, but there is a flat region around a certain frequency in which the phase difference is substantially constant. That is, the rate of change in the phase difference around the certain frequency is smaller in the sound generating device for mobile object 1A of Example 1 than in the sound generating device of Comparative Example. In Example 1, the phase difference is about −80° at the certain frequency. Further, in Example 1, the rate of change in the phase difference at the certain frequency is about zero, which is smaller than the rate of change in the phase difference at the lowest resonance frequency.

With the configuration as described above, by arranging the elastic member 8A as the resonance element at the speaker unit 21A, 22A, the sound generated from the speaker unit 21A, 22A can be easily made to have a phase opposite to a phase of the noise, making it easy to reduce the noise. At this time, the flat region can be adjusted by appropriately setting the element resonance frequency of the elastic member 8A, thereby the frequency range in which the noise can be easily reduced can be adjusted. That is, the resonance frequency of the elastic member 8A may be made different within a range that is capable of producing a sub-peak at a frequency band different from the lowest resonance frequency of the speaker units 21A, 22A as shown in FIG. 9.

According to Example 1 described above, a part of the enclosure 31A, 32A is constituted of the pillar P1, P2, however, it is not limited to this. The enclosure 31A, 32A may be arranged to also serve as the side sill which is a long, tubular frame constituting the vehicle body 11. The side sill forms a lower frame of the side opening 11B of the above-described vehicle body 11. The side sill is arranged into an annular shape along the front-rear direction. Herein, an upper frame and the lower frame are referred to as frames located at an upper side and a lower side of the vehicle.

Figure 12:
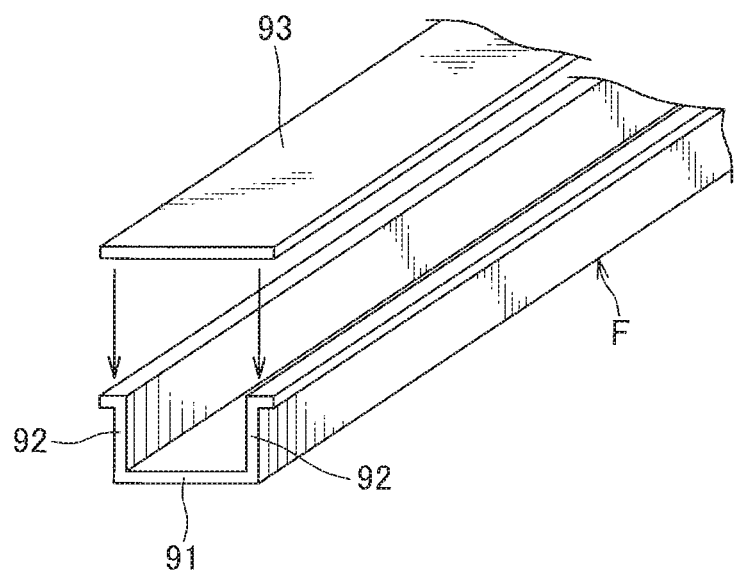
FIG. 12 is an exploded perspective view of a tubular member used in a sound generating device for mobile object according to another example.

Further, according to Example 1 described above, the tubular frame such as the pillar P1-P3 and the side sill SS constituting the vehicle body 11 is utilized as a part of an acoustic tube 41A, 42A, 4B, however, it is not limited to this. For example, of the long frames F constituting the vehicle body 11, a reinforcement, a cross member, a center tunnel or the like may be arranged to have a substantially U-like cross section formed of a bottom plate 91 and a pair of standing plates 92 standing from both sides in the width direction of the bottom plate 91, as shown in FIG. 12. The tubular member may be formed by attaching a cover member 93 provided separately from the vehicle body 11 to such frame F so as to cover an opening thereof, and may be arranged as a part of the enclosure 31A, 32A. That is, the tubular member at least includes the long frame F constituting the vehicle body 11. Furthermore, the enclosure 31A, 32A may be provided by attaching, for example, a housing that is a tray-like separate member to a panel-like vehicle body 11 having a certain area such as an under cover.

Example 2

Figure 13:
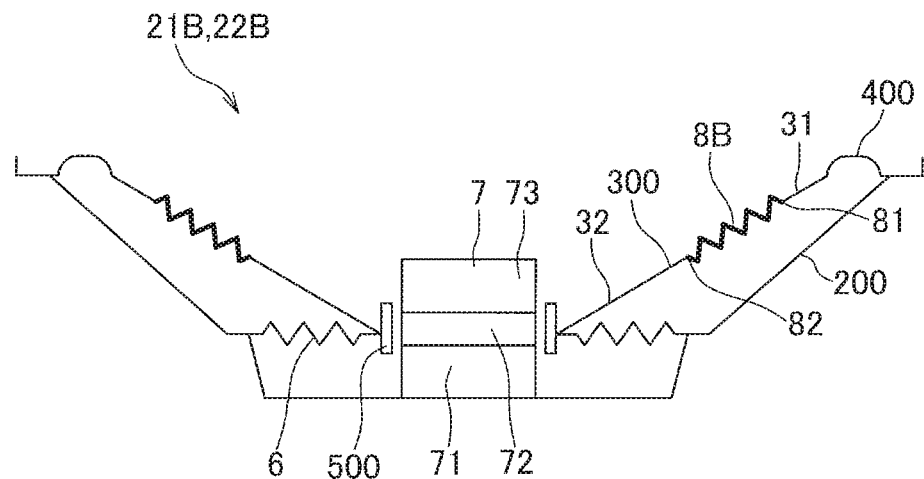
FIG. 13 is a cross-sectional view of a speaker unit according to Example 2 of the present invention.

Next, Example 2 will be explained with reference to FIG. 13. FIG. 13 shows a speaker unit 21B, 22B according to Example 2 of the present invention. The speaker unit 21B, 22B shown in FIG. 13 may be employed in place of the speaker unit 21A, 22A of Example 1.

The speaker unit 21B, 22B of Example 2 includes a frame 200, a diaphragm 300, an edge 400, a voice coil 500, a damper 6, a magnetic circuit 7 and an elastic member 8B, wherein the elastic member 8B is provided as a part of the diaphragm 300. That is, the diaphragm 300 includes a circular ring-like outer perimeter portion 31 connected to the edge 400 and a circular ring-like inner perimeter portion 32 spaced from the outer perimeter portion 31 and connected to the voice coil 500, and the circular ring-like elastic member 8B is provided between the outer perimeter portion 31 and the inner perimeter portion 32. An outer edge 81 of the elastic member 8B is connected to the outer perimeter portion 31, and an inner edge 82 of the elastic member 8B is connected to the inner perimeter portion 82, thereby the diaphragm 300 is integrally formed with the elastic member 8B.

According to the configuration described above, a part that functions as the elastic member 8B may be formed to a part of the diaphragm 300, thereby reducing number of components.

Example 3

Figure 14:
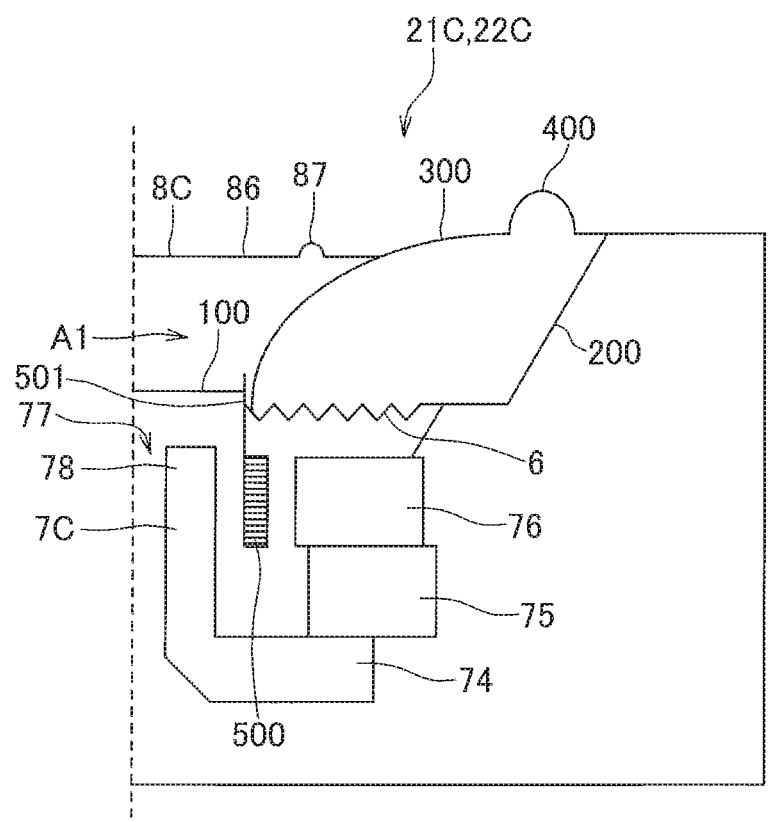
FIG. 14 is a cross-sectional view of a speaker unit according to Example 3 of the present invention.

Next, Example 3 will be explained with reference to FIG. 14. FIG. 14 is a cross-sectional view of a speaker unit 21C, 22C according to Example 3 of the present invention. The speaker units 21C, 22C shown in FIG. 14 may be employed in place of the speaker units 21A, 22A of Example 1. In FIG. 14, a left side of the speaker unit 21C, 22C is omitted, however, the speaker unit 21C, 22C is bilaterally symmetrical and thus the left side thereof has the same configuration as the right side. The speaker unit 21C, 22C includes a frame 200, a diaphragm 300, an edge 400, a voice coil 500, a damper 6, a magnetic circuit 7C and an elastic member 8C that forms a closed space A1 at an inner side. The elastic member 8C is a member shaped so as to conceal the magnetic circuit 7C from an outer side, and includes a circular plate-like body portion 86 and a circular ring-like edge portion 87 provided outside the body portion 86, with an outer edge of the edge portion 87 on its outer side is connected to an intermediate portion (more specifically, a central portion) of a sound emitting surface of the diaphragm 300. The magnetic circuit 7C includes a yoke 74, a magnet 75 stacked on the yoke 74 at outside the voice coil 500, a plate 76 stacked on the magnet 75, and a projecting portion 78 projecting from the yoke 74 at inside the voice coil 500 and including a through-hole 77.

Further, the voice coil 500 is connected to a voice coil support part 501, and the voice coil support part 501 is connected to the frame 200 via the damper 6. An upper end side of the voice coil support part 501 is closed by a cap member 100, and a lower end side of the voice coil support part 501 is opened. By providing the cap member 100 to the upper end side of the voice coil support part 501, the closed space A1 is formed between the cap member 100 and the elastic member 8C. In addition, a space inside the voice coil support part 501 is connected to outside via the through hole 77 formed at the projecting portion 78 of the yoke 74.

Figure 15:
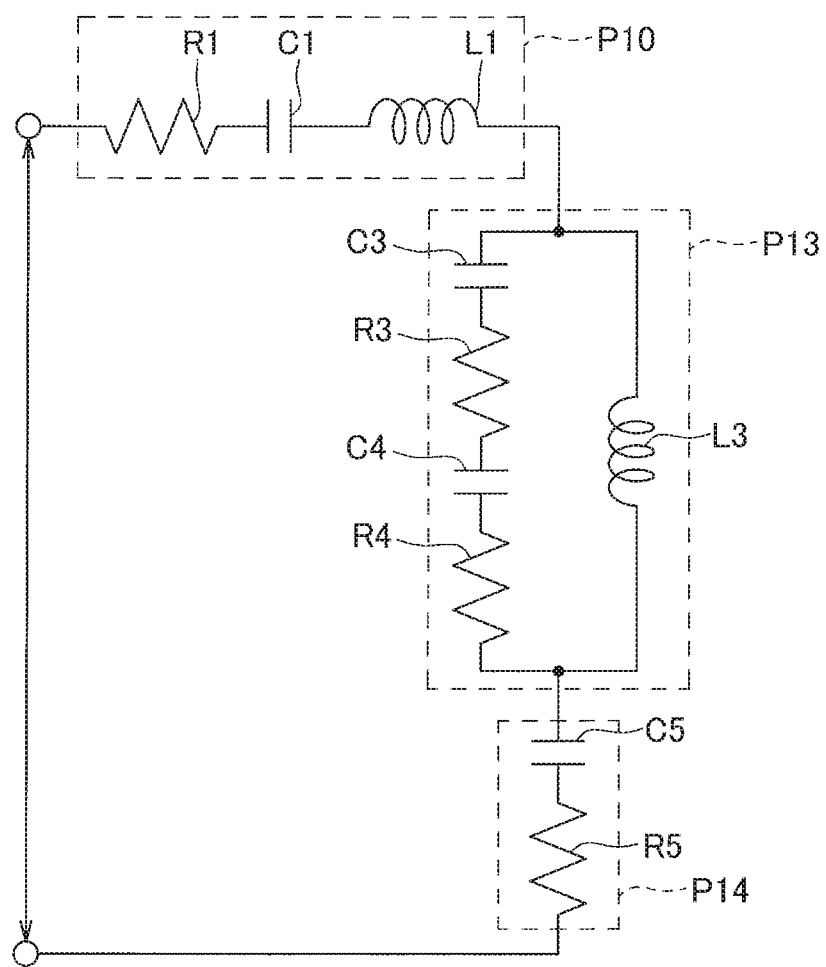
FIG. 15 is an equivalent circuit diagram produced by replacing mechanical elements of the speaker unit of Example 3 with circuit elements.

An electric circuit as shown in FIG. 15 is obtained by replacing into circuit elements of the speaker unit 21C, 22C. That is, the circuit includes a part P10 given by the diaphragm 300, a part P13 given by the elastic member 8C and the closed space A1, and a part P14 given by the diaphragm 300 and the closed space A1, that are connected in series. In the part P13 given by the elastic member 8C and the closed space A1, a capacitor C3, a resistor R3, a capacitor C4 and a resistor R4 are connected in series and are connected in parallel with a coil L3, the capacitor C3 being given by a compliance of the edge portion 87, the resistor R3 being given by a mechanical resistance of the edge portion 87, the capacitor C4 being given by a compliance of the closed space A1 seen from the body portion 86, the resistor R4 being given by a mechanical resistance of the closed space A1 seen from the body portion 86, and the coil L3 being given by a vibration mass of the body portion 86 and the edge portion 87. In the part P14 given by the diaphragm 300 and the closed space A1, a capacitor C5 given by a compliance of the closed space A1 seen from the diaphragm 300 and a resistor R5 given by a mechanical resistance of the closed space A1 seen from the diaphragm 300 are connected in series.

Figure 16:
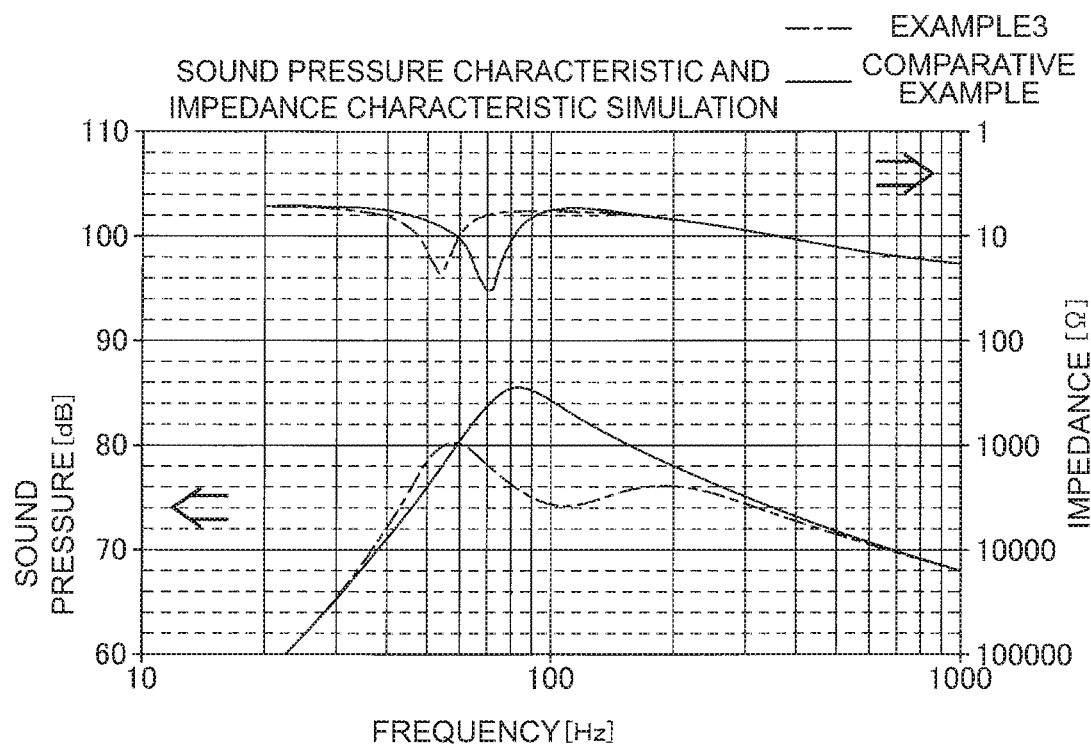
FIG. 16 is a graph showing a simulation result of an impedance of the equivalent circuit and a frequency characteristic of a generated sound of the speaker units of Example 3 and a comparative example.
Figure 17:
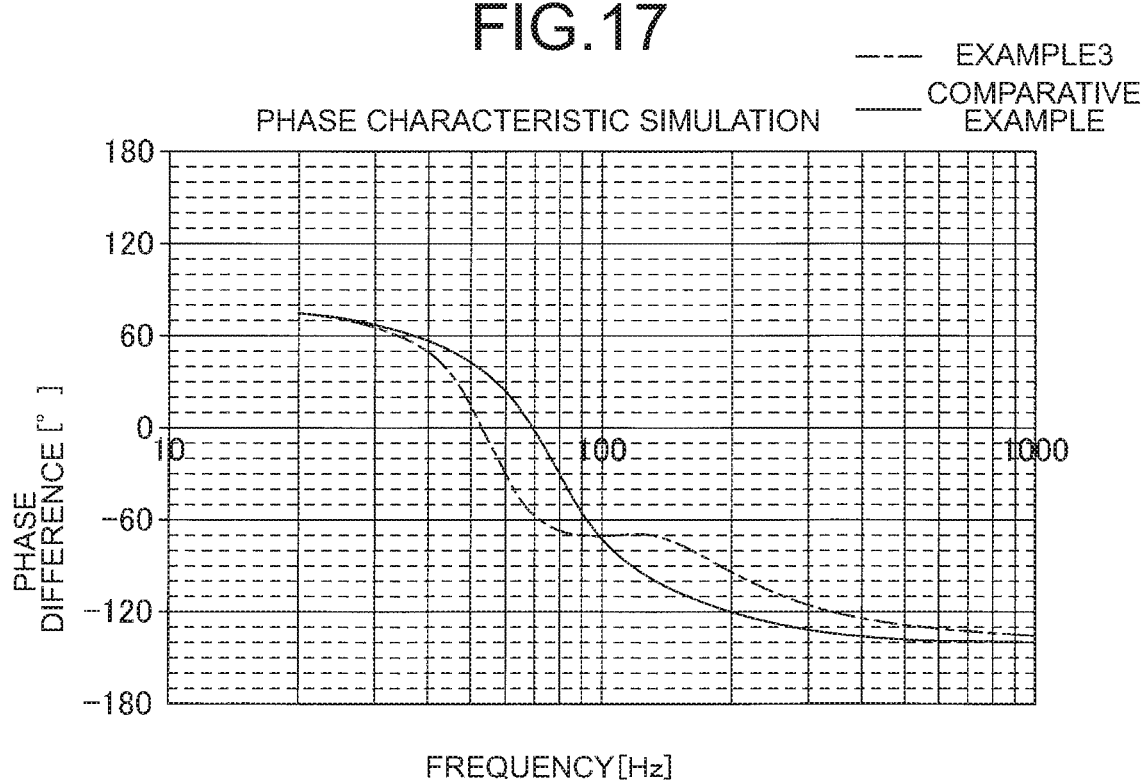
FIG. 17 is a graph showing a simulation result of a phase characteristic of the speaker units of Example 3 and the comparative example.

FIG. 16 shows a graph of a frequency characteristic of an impedance and a frequency characteristic of a sound pressure for the speaker units 21C, 22C of Example 3 calculated based on the above-mentioned electric circuit. In the speaker units 21C, 22C of Example 3 also, a sub-peak is formed at a certain frequency different from the lowest resonance frequency, as is the case with the speaker units 21A, 22A of Example 1. Further, FIG. 17 shows a phase characteristic of the speaker units 21C, 22C of Example 3. For the speaker units 21C, 22C of Example 3 also, rate of change decreases around a certain frequency as is the case with the speaker units 21A, 22A of Example 1.

According to the configuration described above, by providing the elastic member 8C and forming the closed space A1, the certain frequency can be adjusted appropriately by changing the size of the closed space A1.

Example 4

Figure 18:
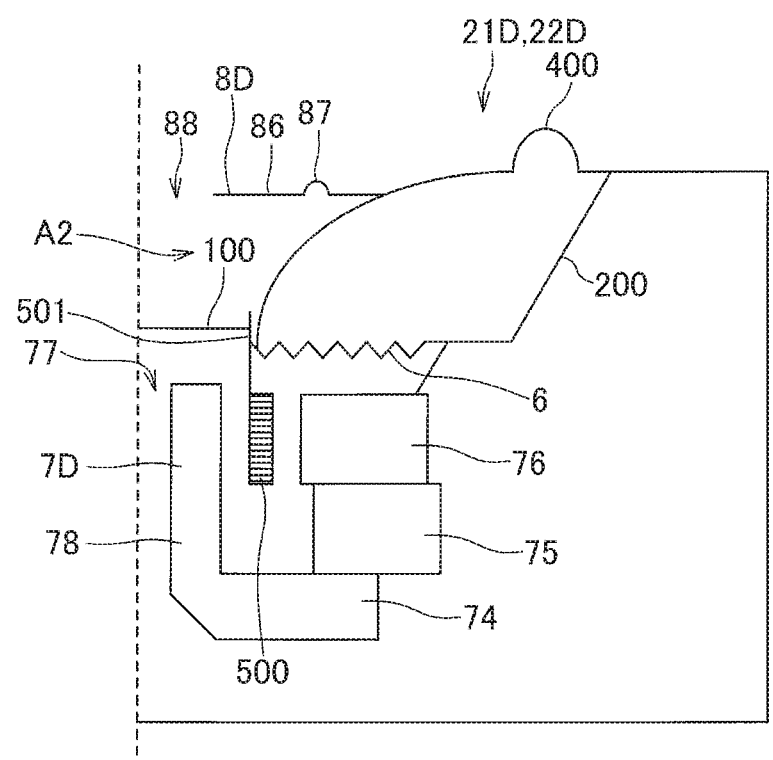
FIG. 18 is a cross-sectional view of a speaker unit according to Example 4 of the present invention.

Next, Example 4 will be explained with reference to FIG. 18. FIG. 18 is a cross-sectional view of a speaker unit 21D, 22D according to Example 4 of the present invention. The speaker units 21D, 22D shown in FIG. 18 may be employed in place of the speaker units 21A, 22A of Example 1.

The speaker unit 21D, 22D may include a frame 200, a diaphragm 300, an edge 400, a voice coil 500, a damper 6, a magnetic circuit 7D and an elastic member 8D. It is noted that the speaker unit 21D, 22D is bilaterally symmetrical as is the case with the speaker unit 21C, 22C of Example 3 (FIG. 14), and thus the left side of the speaker unit 21D, 22D is omitted from FIG. 18. The elastic member 8D is the same as the elastic member 8C of the speaker unit 21C, 22C of Example 3 except a hole 88 is formed at substantially center of the body portion 86. Thus, a closed space is not formed by providing the elastic member 8D.

Further, as in the case with the speaker units 21C, 22C of Example 3, for the speaker units 21D, 22D of Example 4 also, the voice coil 500 is connected to a voice coil support part 501, and the voice coil support part 501 is connected to the frame 200 via the damper 6. An upper end side of the voice coil support part 501 is closed by a cap member 100, and a lower end side of the voice coil support part 501 is opened. By providing the cap member 100 to the upper end side of the voice coil support part 501, a space A2 is formed between the cap member 100 and the elastic member 8D. The space A2 is connected to outside via the hole 88. Further, a space inside the voice coil support part 501 (a space below the cap member 100) is connected to outside via a through hole 77 formed at a projecting portion 78 of a yoke 74.

According to the configuration described above, by providing the elastic member 8D and forming the space A2, the certain frequency can be adjusted appropriately by changing the size of the space A2.

Example 5

Figure 19:
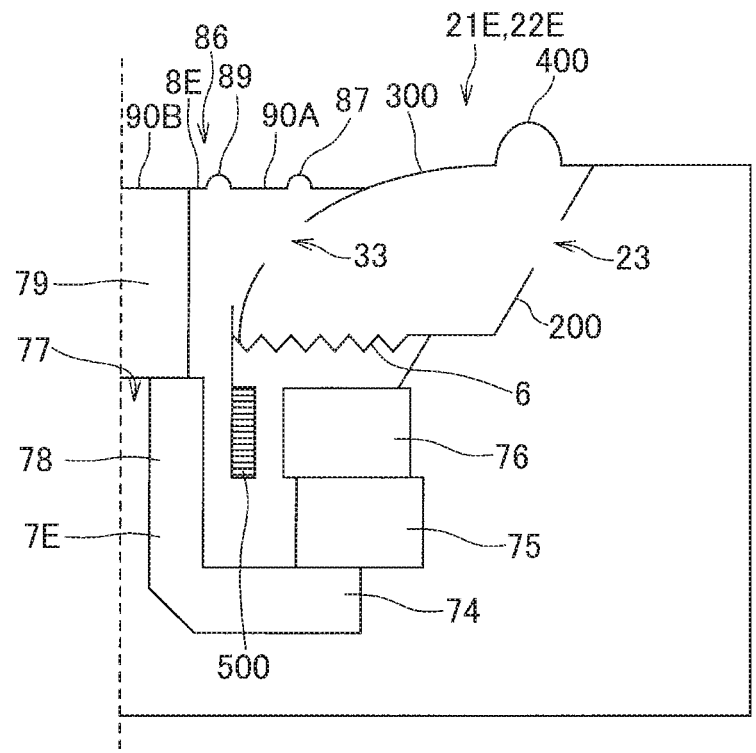
FIG. 19 is a cross-sectional view of a speaker unit according to Example 5 of the present invention.

Next, Example 5 will be explained with reference to FIG. 19. FIG. 19 shows a cross-sectional view of a speaker unit 21E, 22E according to Example 5 of the present invention. The speaker units 21E, 22E shown in FIG. 19 may be employed in place of the speaker units 21A, 22A of Example 1.

FIG. 19 shows a cross-sectional view of a speaker unit 21E, 22E according to Example 5 of the present invention. The speaker unit 21E, 22E may include a frame 200, a diaphragm 300, an edge 400, a voice coil 500, a damper 6, a magnetic circuit 7E and an elastic member 8E. It is noted that the speaker unit 21E, 22E is bilaterally symmetrical as is the case with the speaker unit 21C, 22C of Example 3 (FIG. 14), and thus the left side of the speaker unit 21E, 22E is omitted from FIG. 19. In addition to the configuration of the magnetic circuits 7C, 7D of Examples 3 and 4, the magnetic circuit 7E includes an extending portion 79 extending towards a front side in a sound emitting direction and connected to the elastic member 8E. The extending portion 79 may be formed integrally with the projecting portion 78 of the yoke 74 of the magnetic circuit 7E, or may be formed separately. Further, if the extending portion 79 is not formed integrally with the projecting portion 78, the extending portion 79 may not be constituted of a magnetic body. Further, the voice coil 500 is connected to a voice coil support part 501, and the voice coil support part 501 is connected to the frame 200 via the damper 6. An upper end side of a through hole 77 formed at the projecting portion 78 of the yoke 74 is closed by the extending portion 79, while a lower end side of the through hole 77 formed on the projecting portion 78 is opened and connected to outside.

Furthermore, a hole 33 is formed on the diaphragm 300 at a part on the lower side than the elastic member 8E, and also a hole 23 is formed on the frame 200. Consequently, a space on the side below the elastic member 8E is connected to outside via the hole 33 and the hole 23.

The elastic member 8E is the same as the elastic member 8C of the speaker units 21C, 22C of Example 3 except an edge portion 89 is formed at the body portion 86. That is, a part of the body portion 86 outside the edge portion 89 (i.e., a portion sandwiched between the two edges) corresponds to a vibration body portion 90A, and a part of the body portion 86 inside the edge portion 89 corresponds to a to-be-fixed portion 90B. The extending portion 79 is fixed to a back face of the to-be-fixed portion 90B such that the to-be-fixed portion 90B does not vibrate.

Example 6

Figure 20:
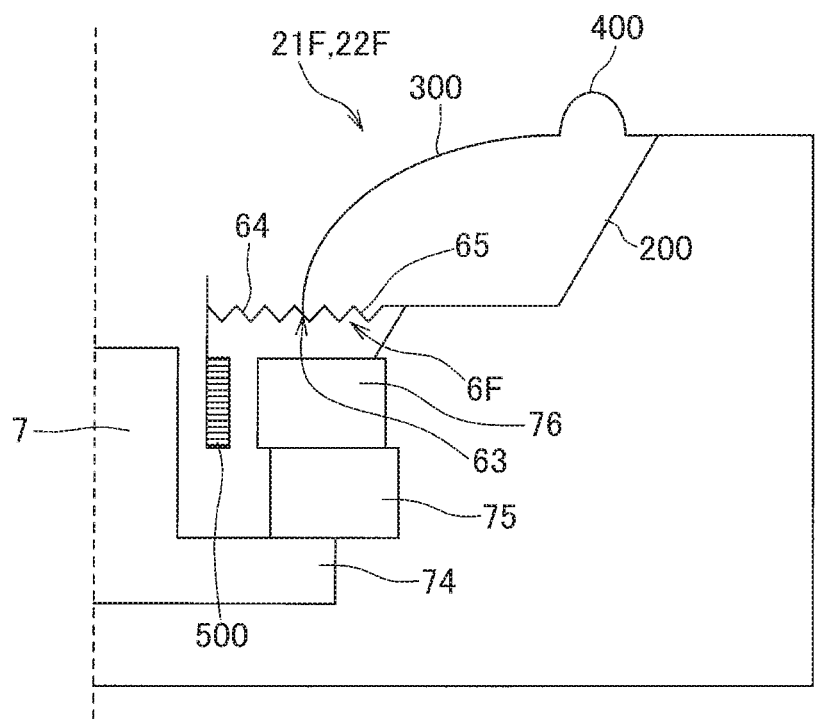
FIG. 20 is a cross-sectional view of a speaker unit according to Example 6 of the present invention.

Next, Example 6 will be explained with reference to FIG. 20. FIG. 20 is a cross-sectional view of a speaker unit 21F, 22F according to Example 6 of the present invention. The speaker units 21F, 22F shown in FIG. 20 may be employed in place of the speaker units 21A, 22A of Example 1.

The speaker unit 21F, 22F may include a frame 200, a diaphragm 300, an edge 400, a voice coil 500, a damper 6F and a magnetic circuit 7. It is noted that the speaker unit 21F, 22F is bilaterally symmetrical as is the case with the speaker unit 21C, 22C of Example 3 (FIG. 14), and thus the left side of the speaker unit 21F, 22F is omitted from FIG. 20. The diaphragm 300 is connected to an intermediate portion (specifically, to a central portion) of the damper 6F. That is, the voice coil 500 is connected indirectly to the diaphragm 300 via an inner portion 64 of the damper 6F located inside with respect to a connection portion 63 with the diaphragm 300, and the diaphragm 300 is connected to the frame 200 by an outer portion 65. Thus, the inner portion 64 connected to the diaphragm 300 functions as the elastic member, so it can be considered that the elastic member is provided between the diaphragm 300 and the voice coil 500.

The present invention should not be limited to Examples 1 through 6 described above, and it may include other configurations that can achieve the object of the present invention. The present invention may include the following modifications and such.

For example, in Example 1 described above, an absolute value of the phase difference between the generated sound and the input signal is about 80° at a certain frequency. However, the phase difference at a certain frequency may be set to an appropriate value. For example, an absolute value of the phase difference at a certain frequency may be equal to or less than 65°, and by setting like that, especially when the sound pressure of the generated sound is equal to the sound pressure of the noise, or when the sound pressure of the noise is smaller than the sound pressure of the generated sound, an amplitude (sound pressure) of a combined wave produced by the generated sound and the noise can be decreased, reducing the noise. In addition, values of the resonance frequency and the certain frequency may be sufficiently separate from each other, thus a range in which the rate of change of the phase difference is small can be increased, thereby making the generated sound not likely to shift from the phase opposite to the phase of the noise within this range.

For example, the phase difference at the lowest frequency (frequency of 20 Hz) in the phase characteristic shown in FIG. 10 lies between 0° and −90°. However, the phase difference is not limited to this, and it may be between 0° and 90°, or it may be set appropriately.

Example 7

Figure 21:
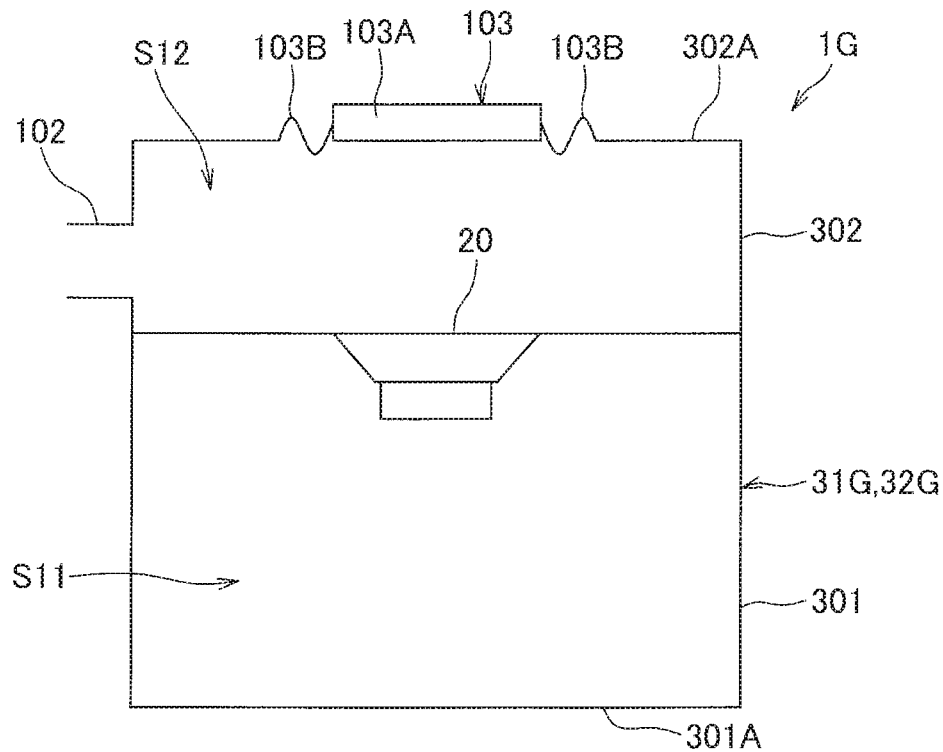
FIG. 21 is a cross-sectional view of a sound generating device for mobile object according to Example 7 of the present invention.
Figure 22:
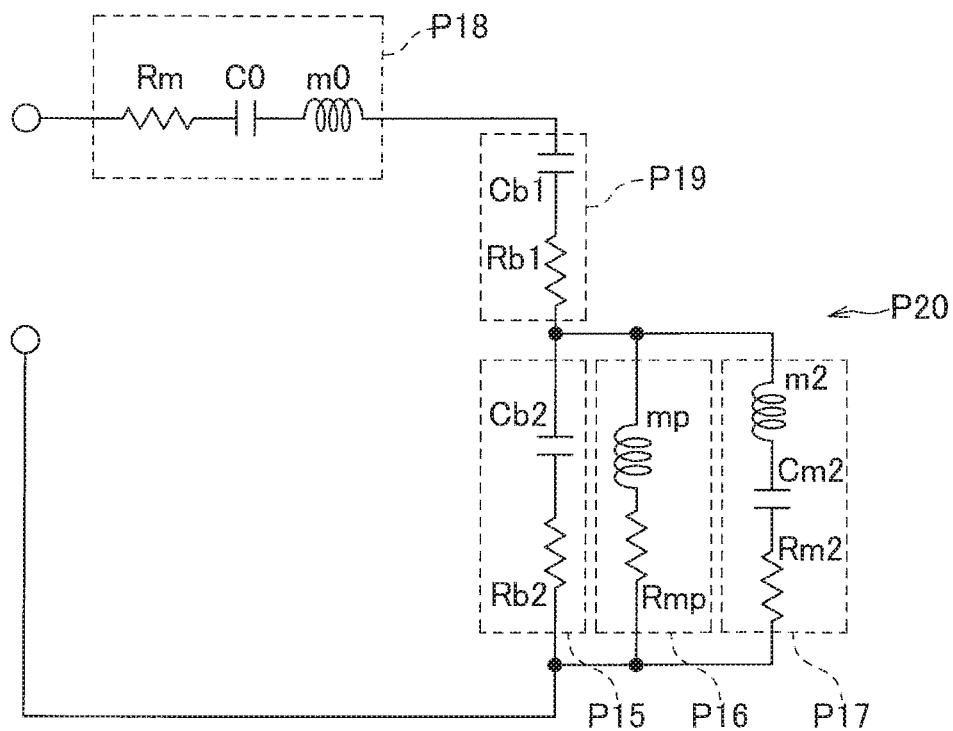
FIG. 22 shows an equivalent circuit produced by replacing mechanical elements of the sound generating device for mobile object of Example 7 with circuit elements.

Next, a sound generating device for mobile object according to Example 7 of the present invention will be explained with reference to FIG. 21. FIG. 21 shows a cross-sectional view of a sound generating device for mobile object 1G according to Example 7 of the present invention. FIG. 22 shows an equivalent circuit produced by replacing mechanical elements of the sound generating device for mobile object 1G with circuit elements. Enclosures 31G, 32G to which a tubular part 102 and a vibration member 103 as resonance elements are arranged as shown in FIG. 21 may be employed in place of the enclosures 31A, 32A of Example 1.

The speaker unit 20 may be the same as the speaker unit 21A-21F, 22A-22F shown in Examples 1-6 described above, or may be the speaker unit 21A-21F, 22A-22F not including the elastic member 8A-8E, that is, not having the resonance element.

The enclosure 31G, 32G may include an enclosure body 301 surrounding a rear side (an opposite side of a sound emitting side) of the speaker unit 20 and forming a rear space S11, and a front accommodation part 302 surrounding a front face side (the sound emitting side) of the speaker unit 20 and forming a front space S12. The enclosure body 301 includes, as a wall part, an outer wall part 301A partitioning the rear space S11 and an outer space. The front accommodation part 302 includes, as a wall part, an outer partition wall 302A partitioning the front space S12 and the outer space. The outer wall part 301A and the outer partition wall 302A are constituted of the pillars P1, P2 and/or the stopper members 41, 42 and such.

The outer partition wall 302A is provided with the tubular part 102 and the vibration member 103. The tubular member 102 is provided to a part of the outer partition wall 302A extending along the sound emitting direction, and the vibration member 103 is provided to a part of the outer partition wall 302A opposed to the speaker unit 20. However, the tubular part 102 and the vibration member 103 may be provided at an appropriate location on the outer partition wall 302A, respectively.

The tubular part 102 penetrates through the outer partition wall 302A and is formed into a circular tube-like shape extending along a direction perpendicular to a plane of the outer partition wall 302A. The tubular part 102 may be inclined with respect to the direction perpendicular to a plane of the outer partition wall 302A, and/or may be formed into a quadrangular tube-like shape. Further, in the shown example, the tubular part 102 projecting only towards outside from the front accommodation part 302 is shown. However, the tubular part 102 may be projected only towards inside, or may be projected towards outside and inside.

When the sound wave passes through the tubular part 102, gas (air) inside the tubular part 102 vibrates. At this time, since the gas inside the tubular part 102 has a vibration mass according to its inner diameter and length, the tubular part 102 has the resonance frequency according to this vibration mass. The resonance frequency of the tubular part 102 is set to a value different from the lowest resonance frequency of the speaker unit 20. Consequently, when the speaker unit 20 emits a sound, the tubular part 102 generates a resonance sound of a frequency different from the lowest resonance frequency of the speaker unit 20, thereby functioning as the resonance element.

The vibration member 103 includes a weight part 103A and an elastic support part 103B. The weight part 103A is a weight that is formed into a plate-like shape from a metallic member, for example. The elastic support part 103B is formed from an elastic member such as rubber, for example, and is provided to a periphery of the weight part 103A. An opening is formed at a portion of the outer partition wall 302A where the vibration member 103 is provided, and this opening is closed by the vibration member 103. That is, the elastic support part 103B connects an outer edge of the weight part 103A and an inner edge of the opening of the outer partition wall 302A, thereby supporting the weight part 103A in a manner capable of being vibrated with respect to the outer partition wall 302A.

The weight part 103A will vibrate due to a compression wave of air (sound wave) produced by vibration of the diaphragm of the speaker unit 20. The vibration member 103 has a resonance frequency according to a mechanical resistance, a compliance and a vibration mass of the weight part 103A and the elastic support part 103B. At this time, the resonance frequency of the vibration member 103 is set to a value different from the lowest resonance frequency of the speaker unit 20. Consequently, when the emitted sound from the speaker unit 20 is reflected on the outer partition wall 302A, the vibration member 103 generates a resonance sound having different frequency from the lowest resonance frequency of the speaker unit 20, thereby functioning as the resonance element.

In the sound generating device 1G as described above, the tubular part 102 and the vibration member 103 as the resonance elements are provided. Thus, a sound emitted from a front side of the speaker unit 20 through the front space S12 and emitted from the tubular part 102 to the outer space will have an increased sound pressure not only at the lowest resonance frequency of the speaker unit 20 but also at the resonance frequency of the tubular part 102 and the vibration member 103.

The following will explain a frequency dependency of a sound pressure (sound pressure characteristic) and a frequency dependency of a phase difference (phase characteristic) between a generated sound and an input signal to an voice coil of the speaker unit 20, with respect to a sound emitted by the sound generating device 1G.

Firstly, an equivalent circuit produced by replacing mechanical elements of the sound generating device 1G with circuit elements is shown in FIG. 22. A part P15 given by the front accommodation part 302, a part P16 given by the tubular part 102 and a part P17 given by the vibration member 103 are connected in parallel. This entire part in which these parts are connected in parallel is referred to as a part P20 given by the front elements. In addition, a part P18 given by the speaker unit 20, a part P19 given by the enclosure body 301 and the part P20 given by the front elements are connected in series.

The front accommodation part 302 includes a compliance determined by its volume and a mechanical resistance at the time of vibration. In the part P15 given by the front accommodation part 302, a capacitor Cb2 given by the compliance and a resistor Rb2 given by the mechanical resistance are connected in series.

The tubular part 102 includes a vibration mass of gas inside the tubular part 102 and a mechanical resistance at the time of vibration. In the part P16 given by the tubular part 102, a coil mp given by the vibration mass and a resistor Rmp given by the mechanical resistance are connected in series.

The vibration member 103 includes vibration masses of the weight part 103A and the elastic support part 103B, a compliance of the elastic support part 103B and a mechanical resistance at the time of vibration. In the part P17 given by the vibration member 103, a coil m2 given by the vibration mass, a capacitor Cm2 given by the compliance and a resistor Rm2 given by the mechanical resistance are connected in series.

The speaker unit 20 includes mechanical resistances of a damper and an edge, compliances of the damper and the edge, vibration masses of the diaphragm, the damper and the edge. In the part P18 given by the speaker unit 20, a resistor Rm given by the mechanical resistances, a capacitor C0 given by the compliances and a coil m0 given by the vibration masses are connected in series.

The enclosure body 301 includes a compliance determined by its volume and a mechanical resistance at the time of vibration. In the part P19 given by the enclosure body 301, a capacitor Cb1 given by the compliance and a resistor Rb1 given by the mechanical resistance are connected in series.

The sound pressure characteristic in the sound generating device 1G includes a peak (about 100 Hz) corresponding to the lowest resonance frequency of the speaker unit 20 and a sub-peak (about 50 Hz) formed by other circuit elements. The frequency of the sub-peak is determined mainly by resonance frequencies of the tubular part 102 and the vibration member 103 (element resonance frequencies).

According to the configuration described above, since the enclosures 31G, 32G are provided with the tubular part 102 and the vibration member 103 as resonance elements, a flat region is formed in the graph of the phase characteristics. At frequencies in the flat region, the sound generated from the sound generating device 1G can be easily made to have a phase opposite to a phase of the noise, making it easy to reduce the noise. At this time, the flat region can be adjusted by appropriately setting the element resonance frequencies of the tubular part 102 and the vibration member 103, thereby the frequency range in which the noise can be easily reduced can be adjusted.

Further, by providing the tubular part 102 and the vibration member 103 as the resonance elements, the element resonance frequencies can be adjusted by adjusting an inner diameter and/or a length of the tubular part 102 and/or by adjusting the mechanical resistance, the compliance and/or the vibration mass of the vibration member 103, enabling to form the flat region at an appropriate frequency range.

Further, since the ¼ wavelength of the resonance sound is longer than twice a distance between tragi (e.g., 0.15 m), a difference between absolute values of the sound pressures at right and left ears produced when the sound wave of the resonance sound has reached to a head of a user (a passenger of the mobile object) can be reduced. That is, a path difference of up to the distance between the tragi may be produced between the sound waves reaching to the right and left ears of the user. At this time, with the ¼ wavelength of the resonance sound being longer than twice the distance between the tragi, the phase difference between the sound waves reaching to the right and left ears is reduced, and thus the difference between the absolute values of the sound pressures is reduced. Consequently, the right/left difference of the effect obtained by forming the above-described flat region can be reduced. Further, even when the positional relationship between the sound generating device and the head of the user has changed (for example when the passenger on a seat has moved his/her head), the right/left difference can be reduced in the similar manner.

Example 8

Figure 23:
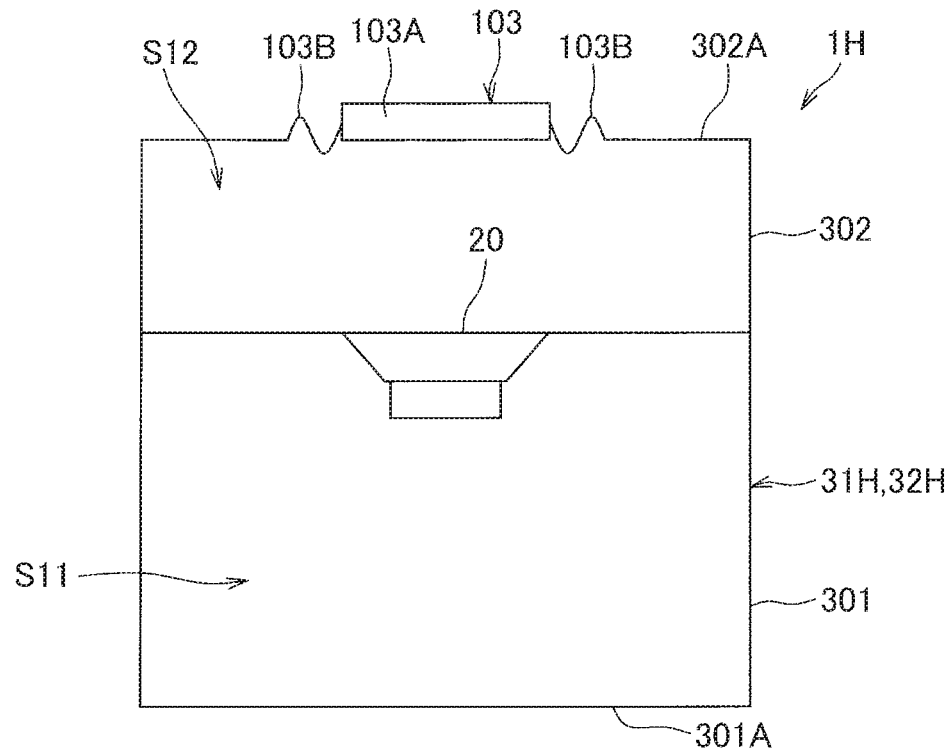
FIG. 23 is a cross-sectional view of a sound generating device for mobile object according to Example 8 of the present invention.

Next, a sound generating device for mobile object according to Example 8 will be explained with reference to FIG. 23. FIG. 23 is a cross-sectional view of a sound generating device 1H according to Example 8 of the present invention. Enclosures 31H, 32H to which vibration members 103 as resonance elements are arranged as shown in FIG. 23 may be employed in place of the enclosures 31A, 32A of Example 1.

The enclosure 31H, 32H may include an enclosure body 301 and a front accommodation part 302, and a vibration member 103 is provided to an outer partition wall 302A of the front accommodation part 302.

According to the configuration described above, since the enclosures 31H, 32H are provided with the vibration member 103, the flat region is formed in the graph of the phase characteristics, as is the case with the sound generating device 1G of Example 8. At the frequencies in the flat region, the sound generated from the sound generating device 1H can be easily made to have a phase opposite to a phase of the noise, making it easy to reduce noise. At this time, the flat region can be adjusted by appropriately setting the element resonance frequency of the vibration member 103, thereby the frequency range in which the noise can be easily reduced can be adjusted.

Example 9

Figure 24:
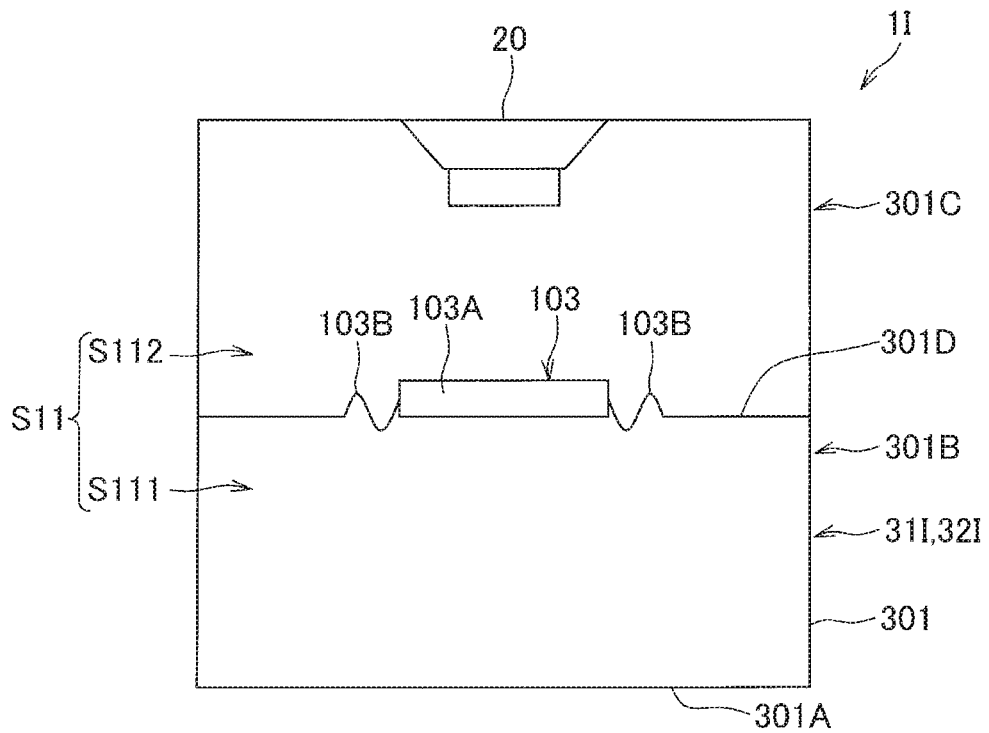
FIG. 24 is a cross-sectional view of a sound generating device for mobile object according to Example 9 of the present invention.

Next, a sound generating device for mobile object according to Example 9 of the present invention will be explained with reference to FIG. 24. Enclosures 31H, 32H to which vibration members 103 as resonance elements are arranged as shown in FIG. 24 may be employed in place of the enclosures 31A, 32A of Example 1.

The enclosure 31H, 32H of Example 9 may include an enclosure body 301, and the enclosure body 301 may include an inner partition wall 301D partitioning a rear space S11 into a first rear space S111 and a second rear space S112. That is, a first accommodation part 301B surrounding the first rear space S111 and a second accommodation part 301C surrounding the second rear space S112 are formed in the enclosure body 301. The inner partition wall 301D is provided with the vibration member 103. A frequency at the sub-peak is determined mainly by the resonance frequency of the vibration member 103.

According to the configuration described above, since the flat region is formed in the graph of the phase characteristics as is the case with the sound generating device 1A of Example 1, at the frequencies in the flat region, the sound generated from the sound generating device 1I can be easily made to have a phase opposite to a phase of the noise, making it easy to reduce noise. At this time, the flat region can be adjusted by appropriately setting the element resonance frequency of the vibration member 103, thereby the frequency range in which the noise can be easily reduced can be adjusted.

Example 10

Figure 25:
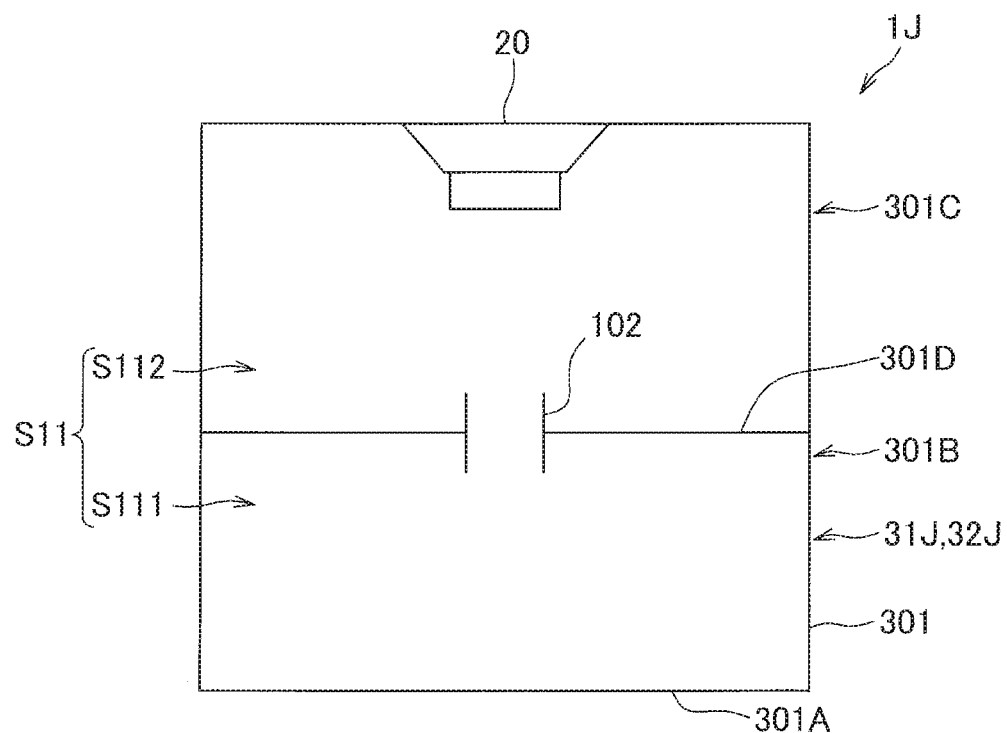
FIG. 25 is a cross-sectional view of a sound generating device for mobile object according to Example 10 of the present invention.

Next, a sound generating device for mobile object according to Example 10 will be explained with reference to FIG. 25. FIG. 25 is a cross-sectional view of a sound generating device 1J according to Example 10 of the present invention. Enclosures 31J, 32J to which tubular members 102 as resonance elements are arranged as shown in FIG. 25 may be employed in place of the enclosures 31A, 32A of Example 1.

The enclosure 31J, 32J may include an enclosure body 301, and the enclosure body 301 may include an inner partition wall 301D. The inner partition wall 301D is provided with the tubular part 102. A frequency at the sub-peak is determined mainly by the resonance frequency of the tubular part 102.

According to the configuration described above, since the enclosures 31J, 32J are provided with the vibration member 103 as the resonance element, the flat region is formed in the graph of the phase characteristics, as is the case with the sound generating device 1A of Example 1. At the frequencies in the flat region, the sound generated from the sound generating device 1J can be easily made to have a phase opposite to a phase of the noise, making it easy to reduce the noise. At this time, the flat region can be adjusted by appropriately setting the element resonance frequency of the tubular part 102, thereby the frequency range in which the noise can be easily reduced can be adjusted.

Example 11

Figure 26:
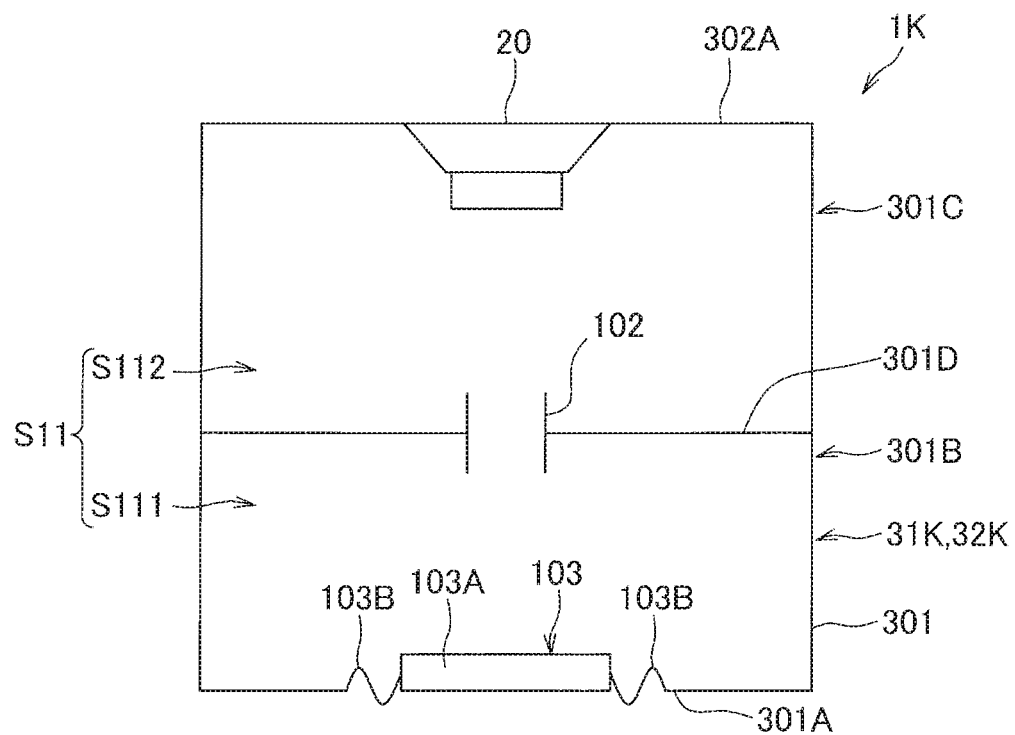
FIG. 26 is a cross-sectional view of a sound generating device for mobile object according to Example 11 of the present invention.

Next, a sound generating device for mobile object according to Example 11 of the present invention will be explained with reference to FIG. 26. FIG. 26 is a cross-sectional view of a sound generating device 1K according to Example 11 of the present invention. Enclosures 31K, 32K to which tubular members 102 as resonance elements are arranged as shown in FIG. 26 may be employed in place of the enclosures 31A, 32A of Example 1.

The enclosure 31K, 32K may include an enclosure body 301, and the enclosure body 301 may include an inner partition wall 301D. The inner partition wall 301D is provided with the tubular part 102. In addition, a vibration member 103 is provided to an outer wall part 301A of the enclosure body 301.

According to the configuration described above, since the enclosures 31K, 32K are provided with the tubular part 102 as the resonance element, the flat region is formed in the graph of the phase characteristics. At the frequencies in the flat region, the sound generated from the sound generating device 1K can be easily made to have a phase opposite to a phase of the noise, making it easy to reduce the noise. At this time, the flat region can be adjusted by appropriately setting the element resonance frequency of the tubular part 102, thereby the frequency range in which the noise can be easily reduced can be adjusted.

The present invention is not limited to Examples 7-11 described above, it may include other configurations and such capable of achieving the object of the present invention, and modifications and such as indicated below are also included in the present invention.

For example, in Examples 7-11 described above, one tubular part 102 or vibration member 103 is provided, or the combination of one tubular part 102 and one vibration member 103 is provided. However, a combination of two or more tubular parts 102 and/or vibration member 103 may be provided. That is, as shown in FIG. 27 and FIG. 28, a plurality of tubular parts 102 may be provided.

Figure 27:
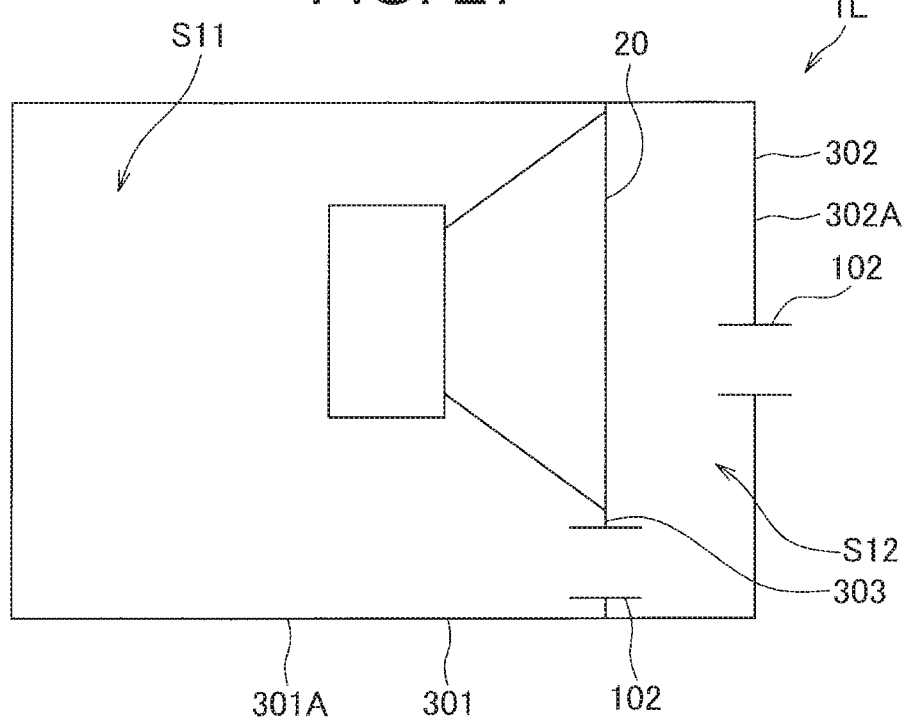
FIG. 27 is a cross-sectional view of a sound generating device for mobile object according to a modified example of Examples 7-11.

In a sound generating device 1L of a modified example shown in FIG. 27, a tubular part 102 is provided to an outer partition wall 302A of a front accommodation part 302, and another tubular part 102 is provided to a wall part 303 of an enclosure body 301 that partitions a rear space S11 and a front space S12. In such configuration, a sound emitted from a front face side of a speaker unit 20 is passed through only the tubular part 102 of the outer partition wall 302A and emitted to an outside space. On the other side, a sound emitted from a rear side of the speaker unit 20 is passed through these two tubular parts 102 and emitted to the outside space.

Figure 28:
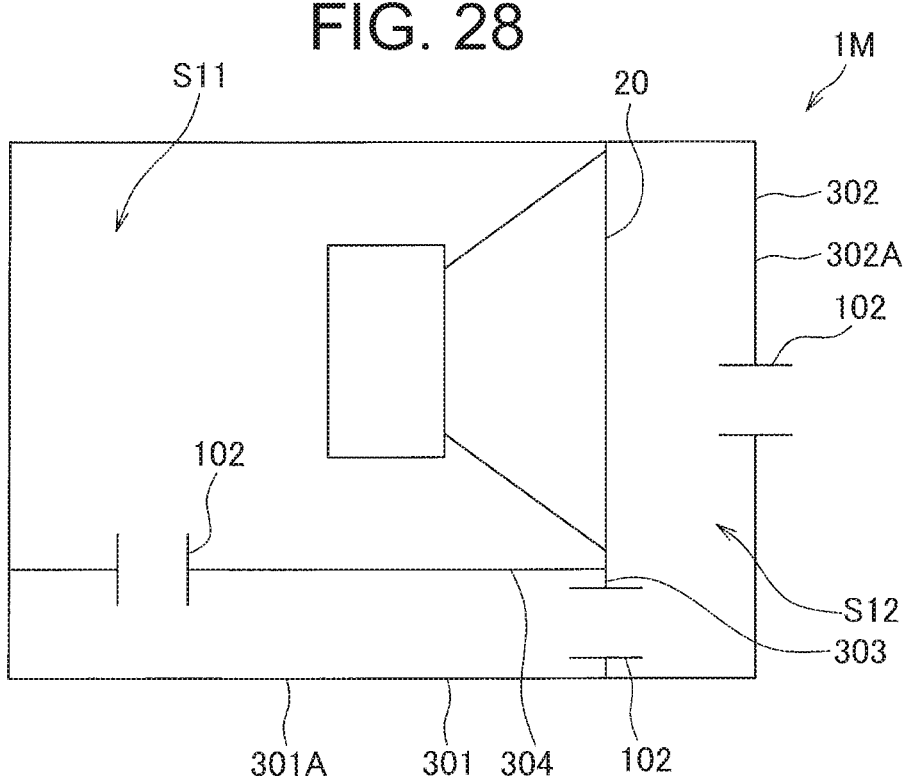
FIG. 28 is a cross-sectional view of a sound generating device for mobile object according to a modified example of Examples 7-11.

In a sound generating device 1M of a modified example shown in FIG. 28, a wall part 304 connecting the wall part 303 described above and an opposing wall part is formed to the enclosure body 301, thereby the rear space S11 is partitioned, and the tubular part 102 is provided to this wall part 304. Thus, a sound emitted from a rear side of the speaker unit 20 is passed through the tubular part 102 of the wall part 304, and then is passed through the tubular part 102 of the wall part 303 and reaches to the front space S12, and then is passed through the tubular part 102 of the outer partition wall 302A and emitted to the outside space.

By providing the combination of the plurality of tubular parts 102 as described above also, it is possible to form the flat region at an appropriate frequency range.

In Examples 7-11 described above, the tubular part 102 and the vibration member 103 are shown for example as the resonance element. However, the resonance element may be any element that vibrates with a resonance frequency and thereby forms a sub-peak in the sound pressure characteristics of the sound generating device. For example, a vibration member constituted of only an elastic member and not having a weight part may be used as the resonance element. In this case, weight of the elastic member itself will be a vibration mass.

Further, in Examples 7-11, the tubular part 102 and/or the vibration member 103 is arranged to the enclosures 31, 32. However, the present invention is not limited to this, and a frame such as the tubular pillar P1, P2 constituting the enclosure 31, 32 itself may be the resonance element.

The vehicle body 11 is provided with a through hole to pass an electric wire therethrough or to serve as a water drain hole used for electrodeposition or wiring or the like. A grommet may be provided to the vehicle body 11 to close a space between the through hole and the electric wire and such or the water drain hole (through hole) for waterproof. The vibration member 103 may also serve as the grommet attached to the vehicle body 11. By doing so, there is no need to provide the vibration member 103 separately from the grommet, thereby reducing cost.

Further, in Example 1, the ¼ wavelength of the resonance sound is set to be longer than twice a distance between tragi. However, the ¼ wavelength of the resonance sound may be set to be longer than a distance between tragi. Alternatively, the ¼ wavelength of the resonance sound may be set to be equal to or less than a distance between tragi, if a phase difference is not likely to be produced between the sound waves reaching to the right and left ears of the user, e.g., if the sound generating device is arranged in front of or at back of a user and a path difference is not likely to be produced between the sound waves reaching to the right and left ears of the user.

Example 12

Figure 29:
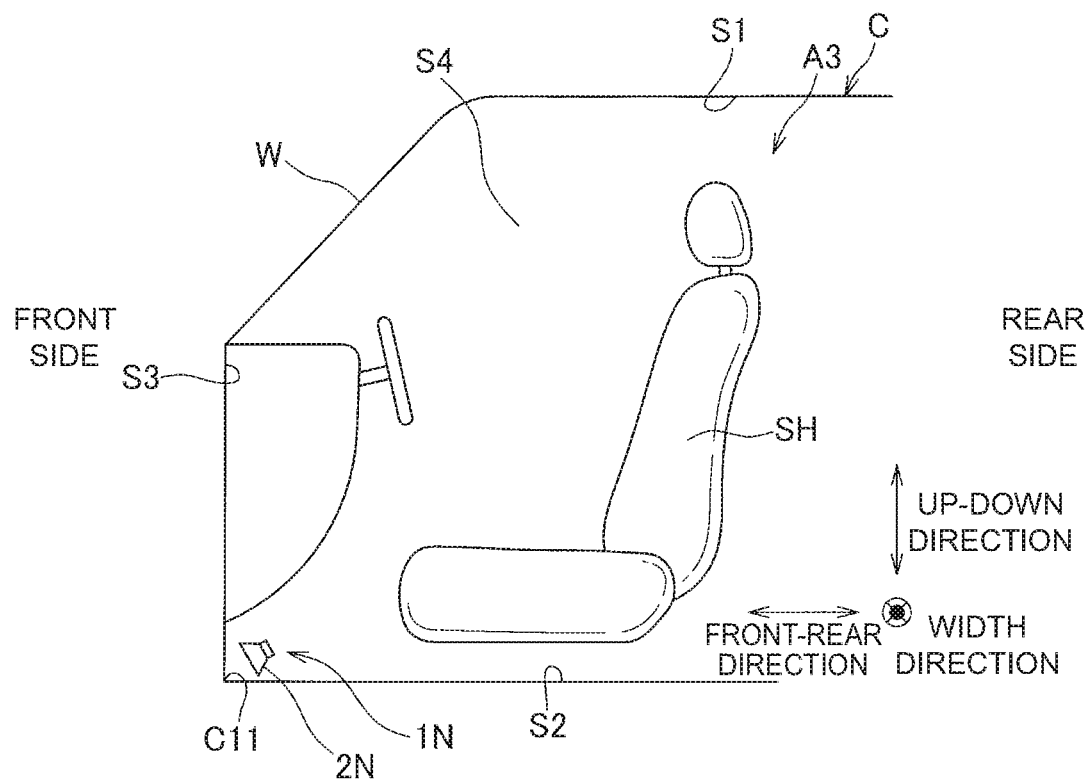
FIG. 29 is a side view of a vehicle provided with a sound generating device for mobile object according to Example 12 of the present invention.

FIG. 29 is a side view of a vehicle C provided with a sound generating device for mobile object (hereinafter referred to as "sound generating device") 1N according to Example 12 of the present invention.

As shown in FIG. 29, the sound generating device for mobile object 1N is configured to be provided to the vehicle C as a mobile object and includes a speaker unit 2N.

The vehicle forms a box-like vehicle interior space A3 surrounded by an inner face of a windshield W (front windshield), an upper face S1, a lower face S2, a front face S3 in a traveling direction of the vehicle C, a pair of side faces S4 opposing in a width direction (including a door body of the vehicle) and a rear face not shown in the traveling direction of the vehicle C, of a vehicle body. Further, an instrumental panel I is provided to the front face S3, and seats (driver's seat and assistant driver's seat) SH are provided so as to face the rear side of the instrumental panel I. In this example, the sound generating device for mobile object 1N is provided in front of the driver's seat, however it may be provided in front of the assistant driver's seat, or it may be provided at both of those positions. It should be noted that, the vehicle body may include a panel and a frame (hollow body), e.g., the vehicle body may be a monocoque body.

The speaker unit 2N is configured in the same manner as the speaker unit 21A, 22A explained in Example 1 and shown in FIG. 5, thus detailed explanations thereof are omitted.

Figure 30:
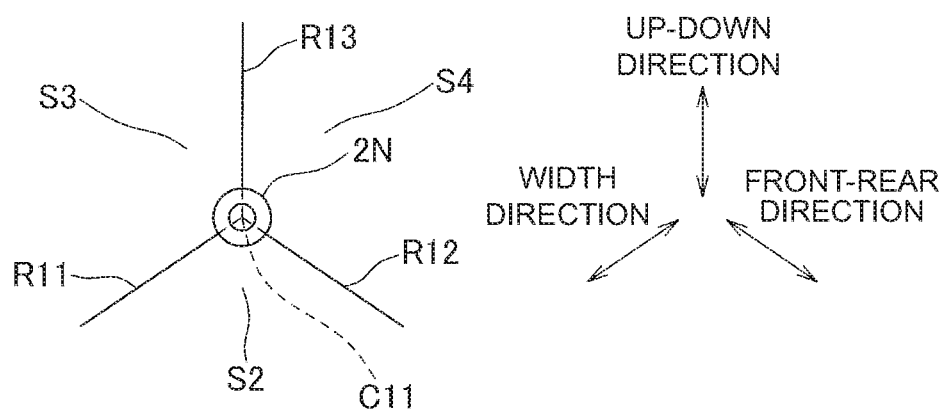
FIG. 30 illustrates an arrangement of the speaker unit shown in FIG. 1.

Next, arrangement of the speaker unit 2N described above will be explained with reference to FIG. 29 and FIG. 30. As shown in FIG. 29 and FIG. 30, a front face side (a diaphragm side) of the speaker unit 2N is arranged below the instrumental panel I and facing a corner C11 at which the front face S3, the lower face S2 and the side face S4 on the driver's seat side meet. As such, a sound from the front face of the speaker unit 2N is emitted towards the corner C11.

A sound emitted from the speaker unit 2N is reflected on the corner C11 and the faces S2-S4 surrounding the corner C11, travels towards an opposed corner opposed to the corner C11 (i.e., a corner where the upper face S1, the rear face and the side face on the assistant driver's seat meet), reflected again by the opposed corner and surrounding portions, and travels towards the corner C11. In this manner, a sound wave traveling from the corner C11 to the opposed corner and a sound wave traveling from the opposed corner to the corner C11 together form a standing wave with a wavelength according to the distance between the corner C11 and the opposed corner. A frequency of this standing wave and a resonance frequency of the speaker unit 2N substantially match with each other, thus a low-pitched sound emitted from the speaker unit 2N forms a standing wave in the vehicle interior space A3. As described above, the speaker unit 2N has the resonance frequency according to the standing wave that is formed in the vehicle interior space A3, thus, of the sound emitted from the speaker unit 2N, resonating components form the standing wave.

When a sound is emitted as described above, the sound emitted from the front face side of the speaker unit 2N echoes in the vehicle interior space A3.

According to the above-described configuration, a sound of the speaker unit 2N is emitted towards the corner C11 at which three faces of the plurality of faces meet, thereby a low-pitched sound emitted from the speaker unit 2N is reflected on at least two faces and is likely to echo within the vehicle interior space A3 of the vehicle C. Further, an acoustic characteristic such as a sound pressure in a low-pitched sound region of the sound generating device for mobile object 1N can be improved, making it easy to reduce the noise in the low-pitched sound region.

Further, since the ¼ wavelength of the resonance sound generated by the tubular part 4 and the vibration member 103 as the resonance element is longer than twice a distance between tragi (e.g., 0.15 m), a difference between absolute values of the sound pressures at right and left ears produced when the sound wave of the resonance sound has reached to a head of a user (a passenger of the mobile object) can be reduced. That is, a path difference of up to the distance between the tragi may be produced between the sound waves reaching to the right and left ears of the user. At this time, with the ¼ wavelength of the resonance sound being longer than twice the distance between the tragi, the phase difference between the sound waves reaching to the right and left ears is reduced, and thus the difference between the absolute values of the sound pressures is reduced. Consequently, the right/left difference of the effect obtained by forming the above-described flat region can be reduced. Further, even when the positional relationship between the sound generating device and the head of the user has changed (for example when the passenger on a seat has moved his/her head), the right/left difference can be reduced in the similar manner.

In Example 12, the front face of the speaker unit 2N is arranged to face the corner C11, but the present invention is not limited to this. As long as a sound from the speaker unit 2N is emitted towards the corner C11, the back face of the speaker unit 2N may be arranged to face the corner C11.

In addition, the speaker unit 2N as described above may be configured in the similar manner as the speaker units 21B, 22B, . . . 21F, 21F explained in Examples 2-6 and shown in FIGS. 13, 14 and 18-20.

In addition, the sound generating device for mobile object 1N as described above may be configured in the similar manner as the sound generating device for mobile object 1G-1M explained in Examples 7-11 and shown in FIGS. 21, and 23-27.

Example 13

Figure 31:
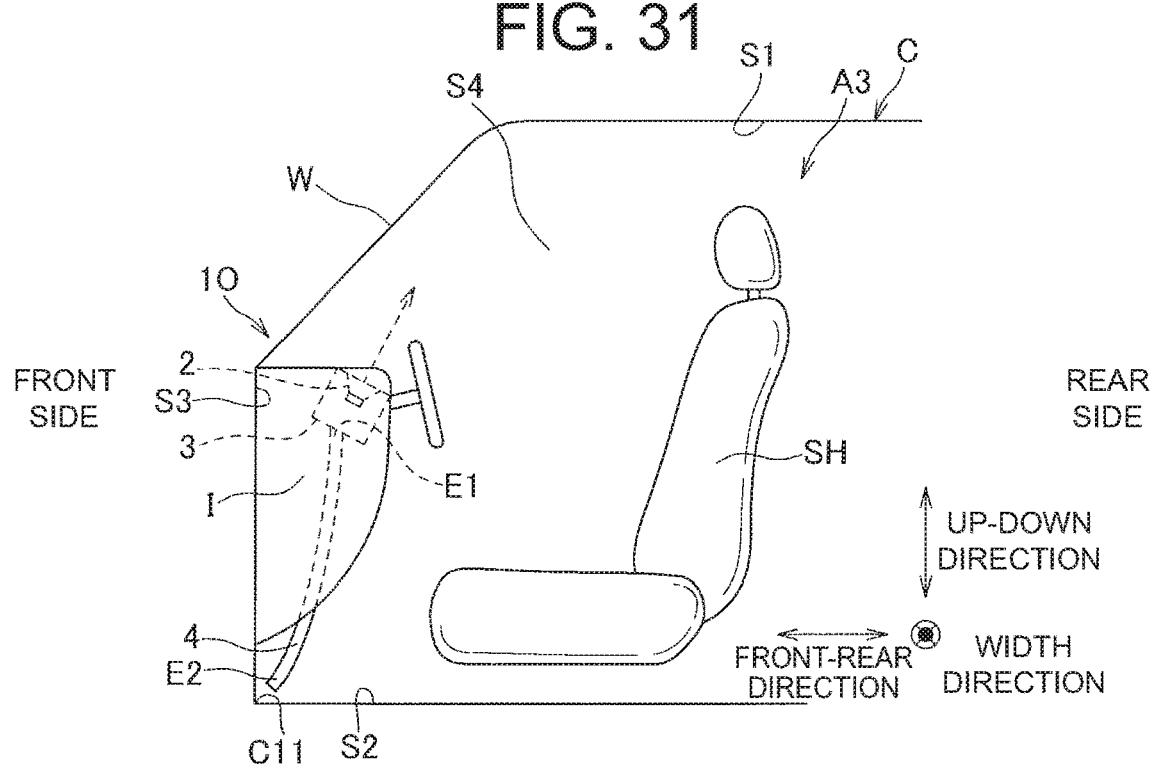
FIG. 31 is a side view of a mobile object provided with a sound generating device according to Example 13 of the present invention.
Figure 32:
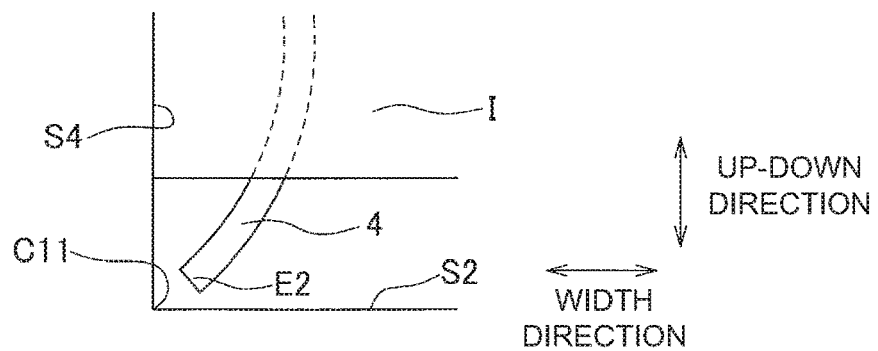
FIG. 32 is a front view of a part of a tubular member shown in FIG. 31.
Figure 33:
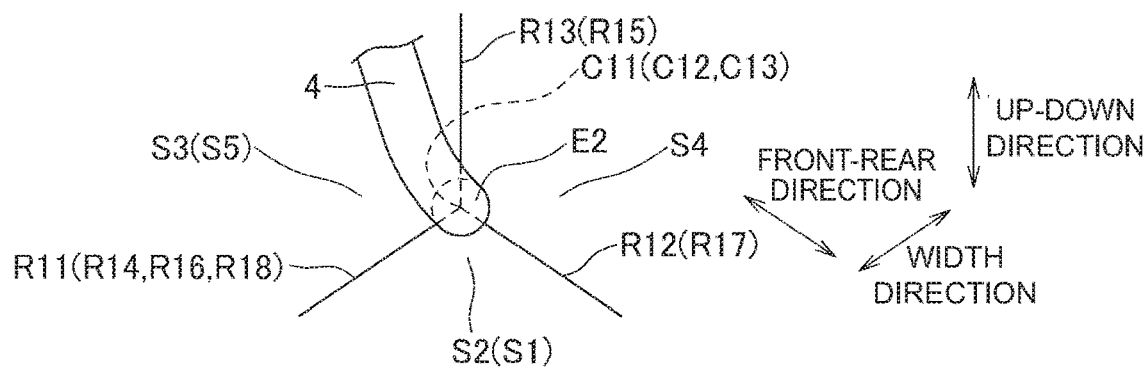
FIG. 33 is a perspective view of the tubular member shown in FIG. 31.
Figure 34:
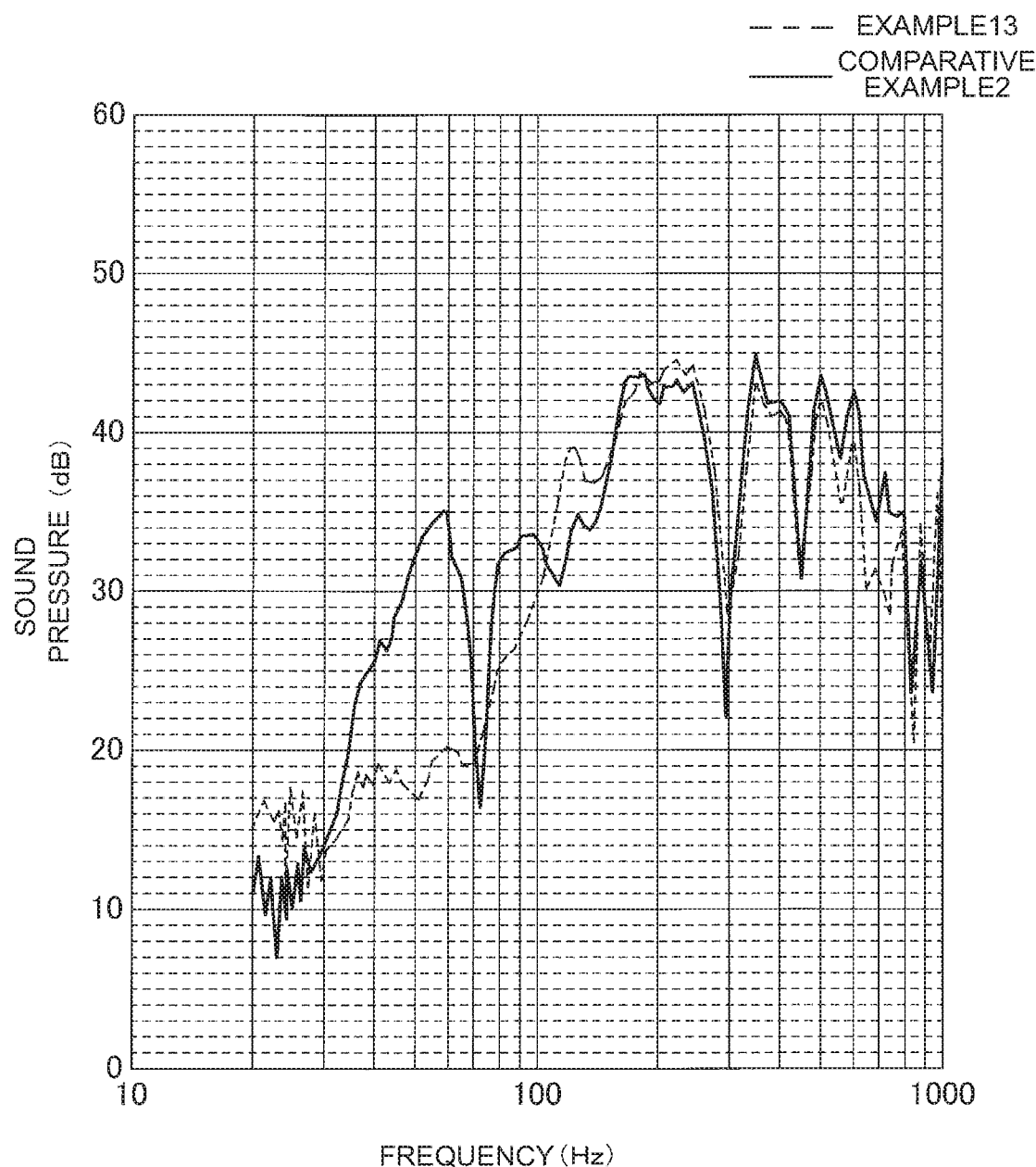
FIG. 34 is a graph showing a frequency dependency of a sound pressure in the sound generating device of Example 13 and a sound generating device of Comparative Example 2.

FIG. 31 is a side view of a vehicle C provided with a sound generating device for mobile object 1O according to Example 13 of the present invention. FIG. 32 is a front view of a part of a tubular member of the sound generating device 1O. FIG. 33 is a perspective view of the tubular member. FIG. 34 is a graph showing a frequency dependency of a sound pressure of the sound generating device for mobile object 1O of Example 13 and a sound generating device for mobile object of Comparative Example 2.

As shown in FIG. 31, the sound generating device for mobile object 1O is configured to be provided to the vehicle C as an mobile object, and includes a speaker unit 2, an enclosure 3 as an accommodation part accommodating the speaker unit 2 and a tubular member 4 connected to the enclosure 3.

In Example 13, the resonance element may be provided to at least one of the speaker unit 2, the enclosure 3 and the tubular member 4. That is, as the speaker unit 2, the one with the resonance element such as the elastic member 8A-8E as shown in Examples 1-5 may be used. Further, the enclosure 3 may be provided with the resonance elements such as the tubular part 102 and/or the vibration member 103 as shown in Examples 7-11. Further, the tubular member 4 may be provided with the resonance element as such the vibration member and/or the tubular member, or, since the tubular member 4 itself has a resonance frequency, the tubular member 4 itself may be arranged as the resonance element by setting its frequency to be different from the lowest resonance frequency of the speaker unit 2. In this case, the tubular member 4 may be utilized as the resonance element, reducing cost.

A diaphragm of the speaker unit 2 is arranged such that a sound emitting side (front face side) of the speaker unit 2 faces upward and a magnetic circuit side (back face side) faces downward. Further, the speaker unit 2 may be provided to the instrumental panel I such that a vibration direction (sound emitting direction) of the diaphragm of the speaker unit 2 is inclined at a certain angle (e.g., 30°) with respect to an upper face of the instrumental panel I. The inclination angle of the diaphragm may be set appropriately according to an angle of the windshield W and/or a distance between the speaker unit 2 and the seat SH and such, and a central axis or the diaphragm of the speaker unit 2 may not be inclined. Alternatively, the central axis or the diaphragm of the speaker unit 2 may be arranged to face the driver's seat or the assistant driver's seat.

The enclosure 3 is formed into a box-like shape and is provided within the instrumental panel I. The diaphragm is arranged at a top face of the enclosure 3, and the speaker unit 2 is arranged in an interior space formed by a bottom face and four side faces of the enclosure 3, thereby a back face of the speaker unit 2 is accommodated in the enclosure 3. Further, the enclosure 3 may be arranged to be inclined according to the diaphragm. Further, the enclosure 3 is arranged in the vicinity of the side face S4 in the width direction. With the speaker unit 2 accommodated in the enclosure 3 as described above, the speaker unit 2 is provide within the instrumental panel I so as to emit a sound from the front face at the upper face of the instrumental panel I. A sound generated at the back face side of the speaker unit 2 is emitted towards the interior space of the enclosure 3.

The tubular member 4 is made of appropriate metal or resin or the like and is formed into a tubular shape with both ends opened. One end E1 of the tubular member 4 is coupled to the lower face of the enclosure 3 on the back face side of the speaker unit 2, and other end E2 of the tubular member 4 is arranged below the driver's seat (in the vicinity of an accelerator pedal). A cross-sectional shape and a cross-sectional area of the tubular member 4 is substantially constant from the one end E1 side to the other end E2 side, and the tubular member 4 is formed to have a length that provides a resonance frequency (e.g., 30-100 Hz) according to a standing wave formed in the vehicle interior space A3, as described later. With the one end E1 coupled to the bottom face of the enclosure 3, the tubular member 4 is communicated with the interior space of the enclosure 3 at the one end E1. Further, as also shown in FIG. 32 and FIG. 33, below the instrumental panel I, the other end E2 opens towards the corner C11 where the front face S3, the lower face S2 and the side face S4 on the driver's seat side meet.

The tubular member 4 passes through the instrumental panel I on the one end E1 side, and projects outside of the instrumental panel I on the other end E2 side. Further, in the width direction, the tubular member 4 extends once away from the side face S4 on the driver's seat side and then extends back towards the side face S4, from the one end E1 through the other end E2. That is, when viewing the tubular member 4 in the front-rear direction (traveling direction of the vehicle C), the tubular member 4 is curved so as to be convex towards the assistant driver's seat side. Further, in the front-rear direction, the tubular member 4 extends towards the front side as approaching from the one end E1 to the other end E2.

The following will explain traveling and reflection of a sound when the speaker unit 2 in the sound generating device 1O emits the sound. Firstly, a sound emitted from the front face side of the speaker unit 2 travels obliquely rearward according to the inclination of the diaphragm, and travels towards the vicinity of a headrest of the driver's seat (driver's head). It is noted that the sound emitted from the front face side may be reflected on the windshield W and/or the upper face S1 and then travel towards the headrest.

The sound generated on the back face side of the speaker unit 2 echoes in the interior space of the enclosure 3, enters into the tubular member 4 from the one end E1, and travels in the tubular member 4. At this time, of the sound generated on the back face side of the speaker unit 2, a low-pitched sound region component according to the length of the tubular member 4 resonates in the tubular member 4. Consequently, the sound mainly composed of the low-pitched sound region component is emitted from the other end E2 of the tubular member 4. The sound emitted from the other end E2 is reflected on the corner C11 and the surrounding faces S2-S4, travels towards the opposed corner opposed to the corner C11 (i.e., the corner at which the upper face S1, the rear face and the side face on the assistant driver's seat), reflected again by the opposed corner and the surrounding portions, and travels towards the corner C11. In this manner, the sound wave traveling from the corner C11 to the opposed corner and the sound wave traveling from the opposed corner to the corner C11 together form a standing wave with a wavelength according to the distance between the corner C11 and the opposed corner. A frequency of this standing wave and a resonance frequency of the tubular member 4 substantially match with each other, thus a low-pitched sound amplified by the tubular member 4 and emitted from the other end E2 forms a standing wave in the vehicle interior space A3. As described above, the tubular member 4 has the resonance frequency according to the standing wave that is formed in the vehicle interior space A3, thus, of the sound emitted from the other end E2, resonating components form the standing wave.

When a sound is emitted as described above, the sound emitted from the front face side of the speaker unit 2 and mainly composed of a middle and high-pitched sound region component and the sound emitted from the other end E2 of the tubular member 4 and mainly composed of a low-pitched sound region component echo in the vehicle interior space A3.

In the following, an acoustic characteristic of the sound generating device 1O of Example 13 will be explained in detail. Firstly, in the sound generating device 1O of Example 13, a capacity of the enclosure 3 (volume of the internal space) is set to 1L, an inner diameter of the tubular member 4 is set to 32 mm, and a length of the tubular member 4 is set to 500 mm. As Comparative Example 2, the sound generating device for mobile object is prepared in which the other end E2 of the tubular member 4 in the sound generating device 1O is closed such that almost no sound is emitted therefrom. For the sound generating device for mobile object of Example 13 and of Comparative Example 2, a frequency dependency of a sound pressure is measured in the vicinity of the headrest of the driver's seat.

Measurement results of the frequency dependency of the sound pressure of the sound generating devices of Example 13 and Comparative Example 2 as described above are shown in a graph of FIG. 34. In FIG. 34, a horizontal axis indicates a frequency (Hz) of a measured sound, a vertical axis indicates a sound pressure (dB), a solid line corresponds to Example 13, and a dotted line corresponds to Comparative Example 2. The horizontal axis is indicated in a logarithmic scale. As can be seen from these measurement results, the sound pressure is higher in Example 13 than Comparative Example 2 at about 30 Hz to 70 Hz, especially, about 15 dB higher at around about 60 Hz. Consequently, the results show that the acoustic characteristic have improved in the low-pitched sound region with the sound emitted from the other end E2 of the tubular member 4.

According to the configuration described above, with the other end E2 of the tubular member 4 opening towards the corner C11 at which the three faces of the plurality of faces surrounding the vehicle interior space A3 meet, the low-pitched sound emitted from the other end E2 is reflected on the three faces and is likely to echo in the vehicle interior space A3, thereby improving the acoustic characteristic in the low-pitched sound region of the sound generating device 1O and making it easy to reduce the noise in the low-pitched sound region.

In addition, if the speaker unit 2 is configured to emit a sound such that the sound pressure in the middle and high-pitched sound region is higher than the sound pressure in the low-pitched sound region, then the vibration of the speaker unit 2 may be reduced, thereby preventing the vibration from propagating to the vehicle body and generating an abnormal sound. Further, with the acoustic characteristic in the low-pitched sound region improved as described above, it is possible to obtain a good acoustic characteristic even when using the small-sized speaker unit 2 in which the sound pressure is low in the low-pitched sound region. Further, since the sound pressure of the low-pitched sound emitted from the front face of the speaker unit 2 is relatively low, the sound emitted from the front face of the speaker unit 2 and the sound emitted from the other end E2 of the tubular member 4 are not likely to weaken each other in the low-pitched sound region.

In the sound generating device 1O, the sound in the middle and high-pitched sound region is emitted mainly from the front face of the speaker unit 2, and the sound in the low-pitched sound region is emitted mainly from the other end E2 of the tubular member 4. An optimum emission location may differ between the middle and high-pitched sound region (e.g., 1000 to 10000 Hz) and the low-pitched sound region (e.g., 10 to 1000 Hz), but as a location at which the sound in the middle and high-pitched sound region is emitted and a location at which the sound in the low-pitched sound region is emitted are separated, the respective locations may be arranged at optimum locations, thereby an excellent acoustic characteristic can be obtained.

Further, with the other end E2 of the tubular member 4 opened towards the corner C11, the sound emitted from the other end E2 forms a standing wave between the corner C11 and the opposed corner. At this time, a distance between the corner C11 and the opposed corner is longer than the pair of opposed faces (the upper face S1 and the lower face S2, or the front face S3 and the rear face, or the pair of side faces S4), thus the standing wave with a long wavelength can be formed, thereby making the low-pitched sound to echo efficiently in the vehicle interior space A3.

Further, with the speaker unit 2 and the enclosure 3 provided within the instrumental panel I, and the tubular member 4 passing through the instrumental panel I, it is possible to keep a good appearance of the vehicle C when the vehicle C is provided with the sound generating device 1O.

Example 14

Figure 35:
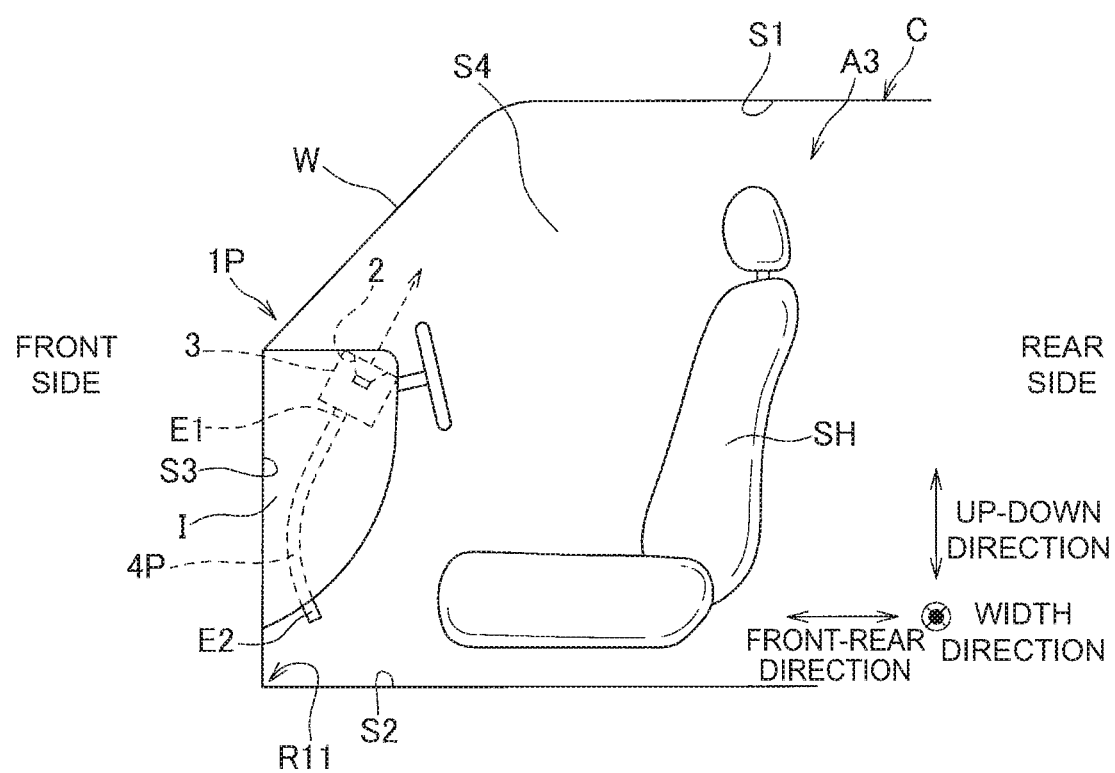
FIG. 35 is a side view of a mobile object provided with a sound generating device according to Example 14 of the present invention.

Next, a sound generating device for mobile object according to Example 14 of the present invention will be explained with reference to FIG. 35 and FIG. 36. FIG. 35 is a side view of a vehicle C provided with a sound generating device for mobile object 1P according to Example 14 of the present invention. FIG. 36 is a graph showing a frequency dependency of a sound pressure in the sound generating device for mobile object 1P of Example 14 and a sound generating device for mobile object of Comparative Example 3.

As shown in FIG. 35, the sound generating device for mobile object 1P includes a speaker unit 2, an enclosure 3 and a tubular member 4P.

One end E1 of the tubular member 4P is communicated with an interior space of the enclosure 3, and other end E2 of the tubular member 4P is arranged below the driver's seat (in the vicinity of an accelerator pedal). That is, the other end E2 opens in the vicinity of a first intersecting part R11 at which the front face S3 and a lower face S2 intersect each other. An opening direction of the other end E2 is not directed to the first intersecting part R11, it is inclined somewhat in the rearward direction with respect to the downward direction. It should be noted that the other end E2 may be provided at a location in the vicinity of the side face S4 in the width direction, or may be provided distant from the side face S4. In the front-rear direction, the tubular member 4P extends one towards the front side and then extends back towards the rear side, from the one end E1 through the other end E2, thus it is curved so as to be convex towards the front side when viewed from the width direction.

The following will explain traveling and reflection of a sound emitted from the other end E2 of the tubular member 4P in the sound generating device for mobile object 1P. As in the case with Example 13, a sound mainly composed of a low-pitched sound region component is emitted from the other end E2, reflected on the lower face S2 in the vicinity of the first intersecting part R11, and travels towards a second intersecting part at which the rear face and the upper face S1 intersect each other. Further, this sound is reflected on the second intersecting part and the surrounding portions and travels towards the first intersecting part R11. In this manner, a sound wave traveling from the first intersecting part R11 to the second intersecting part and a sound wave traveling from the second intersecting part to the first intersecting part R11 together form a standing wave with a wavelength according to a distance between the pair of intersecting parts.

In the following, an acoustic characteristic of the sound generating device for mobile object 1P of Example 14 will be explained in detail. Firstly, in the sound generating device for mobile object 1P of Example 14, a capacity of the enclosure 3 (volume of the internal space) is set to 1L, an inner diameter of the tubular member 4P is set to 32 mm, and a length of the tubular member 4P is set to 700 mm. As Comparative Example 3, the sound generating device for mobile object is prepared in which the other end E2 of the tubular member 4P in the sound generating device for mobile object 1P is closed such that almost no sound is emitted therefrom. For the sound generating device for mobile object of Example 14 and of Comparative Example 3, a frequency dependency of a sound pressure is measured in the vicinity of the headrest of the driver's seat.

Measurement results of the frequency dependency of the sound pressure of the sound generating devices for mobile object of Example 14 and Comparative Example 3 as described above are shown in a graph of FIG. 36. In FIG. 36, a horizontal axis indicates a frequency (Hz) of a measured sound, a vertical axis indicates a sound pressure (dB), a solid line corresponds to Example 14, and a dotted line corresponds to Comparative Example 3. The horizontal axis is indicated in a logarithmic scale. As can be seen from these measurement results, the sound pressure is higher in Example 14 than Comparative Example 3 at about 30 Hz to 100 Hz, especially, about 15 dB higher at around about 50 Hz. Consequently, the results show that the acoustic characteristics have improved in the low-pitched sound region with the sound emitted from the other end E2 of the tubular member 4P.

According to the configuration described above, the similar advantageous effect as Example 13 can be obtained. Further, with the other end E2 of the tubular member 4P opened in the vicinity of the first intersecting part R11, the sound emitted from the other end E2 forms a standing wave between the pair of intersecting parts. At this time, a distance between the pair of intersecting parts is longer than a distance between the pair of opposed faces (the upper face S1 and the lower face S2, or the front face S3 and the rear face, or the pair of side faces S4), thus the standing wave with a long wavelength can be formed, thereby making the low-pitched sound to echo efficiently in the vehicle interior space A3.

The present invention is not limited to the examples described above, it may include other configurations and such capable of achieving the object of the present invention, and modifications and such as indicated below are also included in the present invention.

Figure 37A:
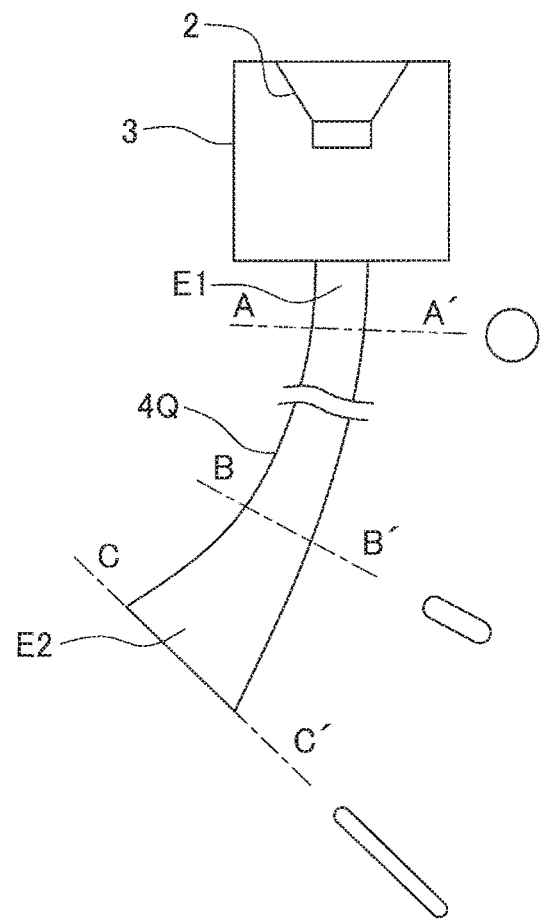
FIG. 37A is a front view of a speaker unit of a sound generating device according to a first modified example of Examples 13 and 14.

For example, in Example 13, the cross-sectional shape and the cross-sectional area of the tubular member 4 is arranged to be substantially constant. However, as shown in FIG. 37A as a first modified example, in accordance with the internal structure of the instrumental panel I, a tubular member 4Q may be used which has an increased inner diameter in a region near the other end in the longitudinal direction, and which has the constant cross-sectional area but the varying cross-sectional shape as approaching from the one end E1 connected to the enclosure 3 to the other end E2. Specifically, the tubular member 4Q may be used which has the cross-sectional shape that is substantially true circle on the one end E1 side and becomes a flat oval shape (a long diameter of the oval becomes longer) as approaching to the other end E2, as shown in the cross-sectional views in FIG. 37A that are taken along a line A-A', a line B-B' and a line C-C'. According to this configuration, the acoustic characteristic of the sound emitted from the other end E2 of the tubular member 4Q can be improved. Further, for example, the tubular member may have the cross-sectional shape that varies entirely in the longitudinal direction as approaching to the other end, or the cross-sectional shape that varies at a central portion in the longitudinal direction as approaching to the other end.

Figure 37B:
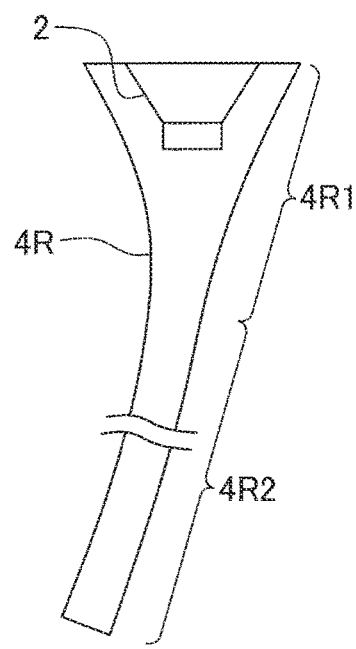
FIG. 37B is a front view of a speaker unit of a sound generating device according to a second modified example of Examples 13 and 14.

Further, in Example 14, the enclosure 3 as an accommodation part and the tubular member 4 are separate members, however, as shown in FIG. 37B as a second modified example, a tubular accommodation part 4R may be used in which the accommodation part and the tubular member are integrally formed. The tubular accommodation part 4R includes a portion at which an inner diameter is reduced as extending from the speaker unit 2 side to the other side. This portion corresponds to an accommodation part 4R1, and a portion of the tubular accommodation part 4R on the opposite side of the speaker unit 2 across the accommodation part 4R1 corresponds to a tubular part 4R2. That is, one end of the tubular part 4R2 is arranged continuous with the accommodation part 4R1.

In Example 14, the speaker unit 2 and the enclosure 3 are configured to be provided to the instrumental panel I. However, the speaker unit 2 and the enclosure 3 may be provided to other positions.

Figure 38A:
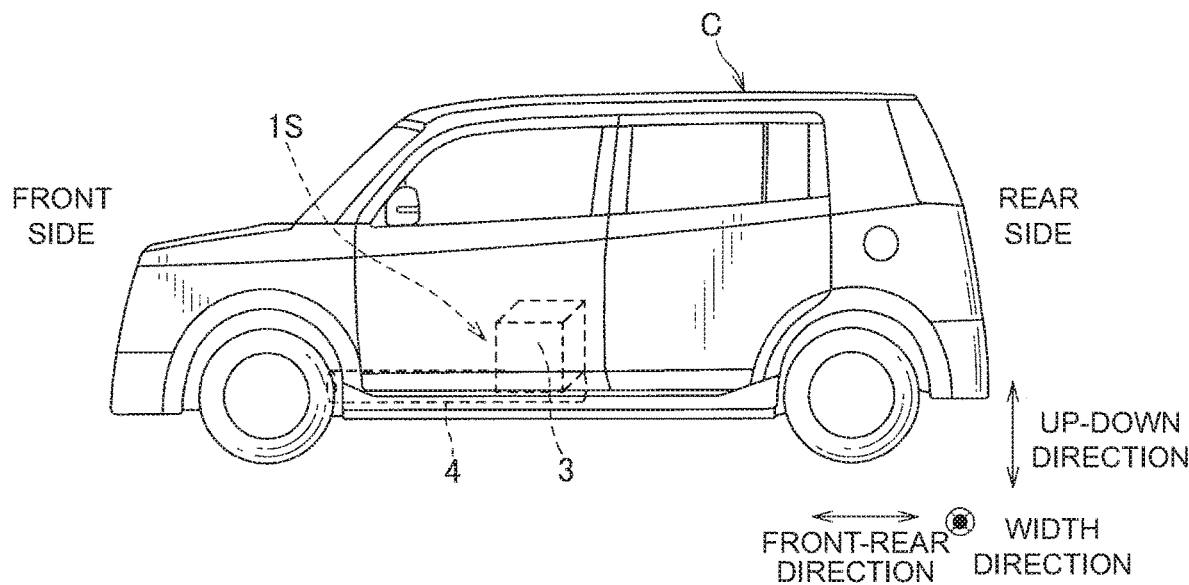
FIGS. 38A-38C are side views of a speaker unit of a sound generating device according to a third modified example of Examples 13 and 14.
Figure 38B:
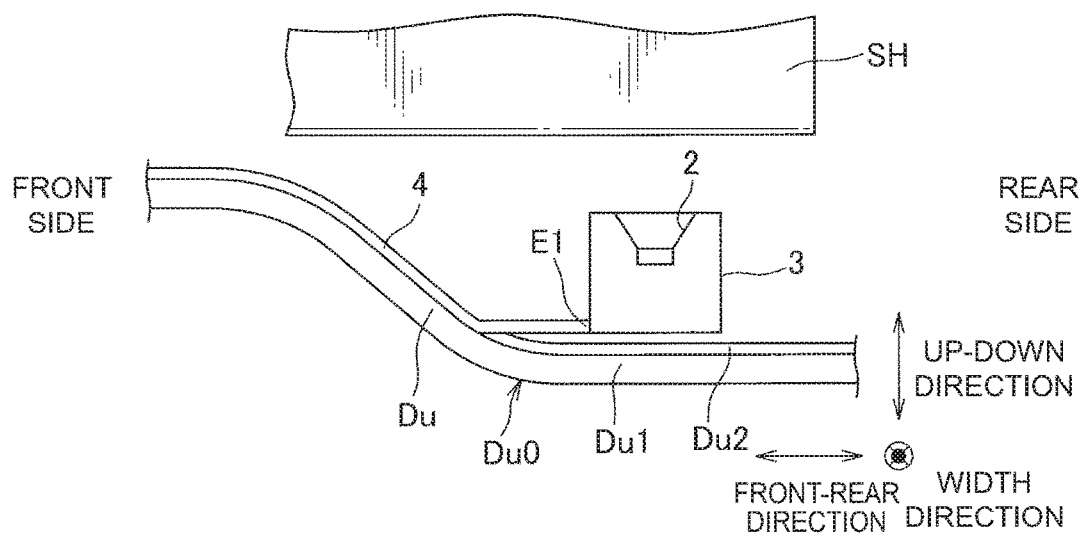
Figure 38C:
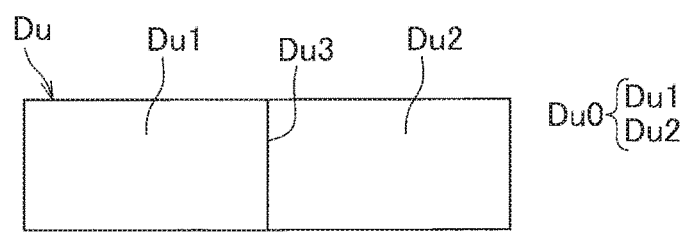

For example, as illustrated in FIGS. 38A to 38C as a third modified example, a sound generating device for mobile object 1S may include a speaker unit 2 and an enclosure 3 provided below a seat SH of a vehicle. An air conditioning duct Du is provided to the vehicle C provided with the sound generating device for mobile object 1S. The air conditioning duct Du extends from an air conditioner provided in the front side (e.g., inside an instrumental panel) to the front-rear direction to deliver a cool air or a warm air below a rear seat, and includes a tubular passage portion Du0 as shown in FIG. 38C. The passage portion Du0 is partitioned by a partition portion Du3, thereby includes a first passage Du1 through which a cool air or a warm air passes and a second passage Du2. The second passage Du2 is provided for purpose of reinforcement of the first passage Du1, for example.

A tubular member 4 of the sound generating device for mobile object 1S includes one end E1 connected to a front face of the enclosure 3, and the tubular member 4 extends towards the front side and is connected to the second passage Du2, and then the second passage Du2 serves as the tubular member and extends towards the front side. The tubular member 4 is separated from the second passage Du2 on its other end side and opens towards an intersecting part or a corner on the front side. That is, a portion of the tubular member 4 between the one end E1 and the other end is formed integrally with the air conditioning duct Du. Alternatively, the second passage may not be formed at the air conditioning duct Du, and in this case a part of the tubular member 4 may be formed integrally with the first passage Du1.

According to the sound generating device for mobile object 1S of the third modified example, the air conditioning duct Du can be used as the tubular member 4, thereby reducing cost and utilizing a space formed at the vehicle C for passing the air conditioning duct Du. Further, since the other end of the tubular member 4 is opening towards the corner or the intersecting part, the acoustic characteristic such as a sound pressure in the low-pitched sound region can be improved even if an installation space for the speaker unit 2 below the seat SH is narrow.

Figure 39A:
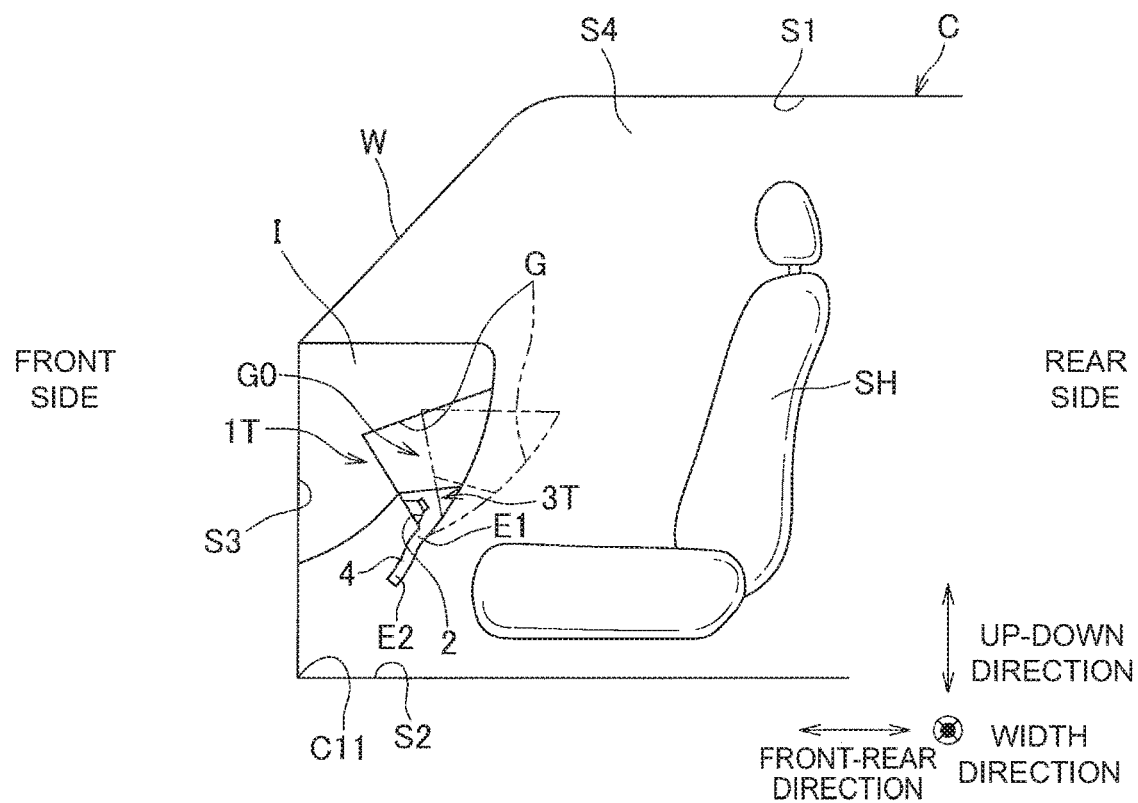
FIGS. 39A-39B are side views of a speaker unit of a sound generating device according to a fourth modified example of Examples 13 and 14.

Further, as illustrated in FIG. 39A as a fourth modified example, a sound generating device for mobile object 1T may include a speaker unit 2 and an enclosure 3T formed as a part of a glovebox G as a box provided to an instrumental panel I of the vehicle C. The instrumental panel I of the vehicle C provided with the sound generating device for mobile object 1T includes the glovebox G configured to open and close (shown with a two-dot chain line) by rotating around a rotational axis arranged along a width direction. A space on the side below the glovebox G is partitioned from another portion G0 (a space for accommodating an object), thereby forming the enclosure 3T. The speaker unit 2 is accommodated in the enclosure 3T with a front face thereof facing to outside the glovebox G, while facing to the front side and to downward side. One end E1 of the tubular member 4 is connected to the lower side of the enclosure 3T, and the other end E2 of the tubular member 4 opens towards a corner C11.

Figure 39B:
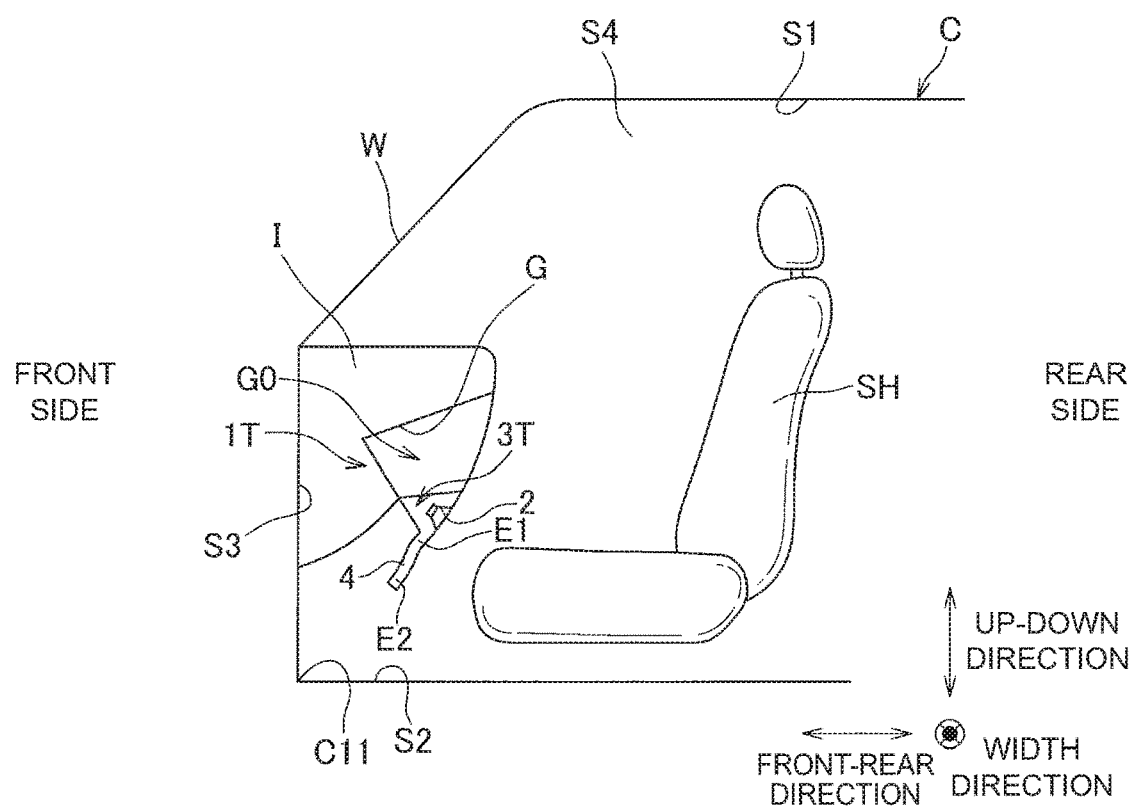

Herein, the other end E2 of the tubular member 4 may open towards an intersecting part at which a front face S3 and a lower face S2 intersect. Alternatively, as shown in FIG. 39B, the front face of the speaker unit 2 may face the rear side of the vehicle C in the traveling direction. The enclosure 3T may be formed at the already-existing glovebox G attached to the vehicle C and the speaker unit 2 may be accommodated therein, or the glovebox G that is provided in advance with the sound generating device for mobile object 1T may be prepared. Further, the glovebox G may not be partitioned, and a closed space or a sealed space formed by closing the glovebox G may serve as the enclosure.

According to the sound generating device for mobile object 1T of the fourth modified example, since the enclosure 3T is a part of the glovebox G, it is easy to direct the other end of the tubular member 4 to the corner C11. Further, even if the size of the speaker unit 2 is minimized to avoid reducing a space within the glovebox G, since the other end E2 of the tubular member 4 is directed to the corner C11 or the intersecting part, the acoustic characteristic such as a sound pressure in the low-pitched sound region can be improved, making it easy to reduce the noise in the low-pitched sound region.

Figure 40:
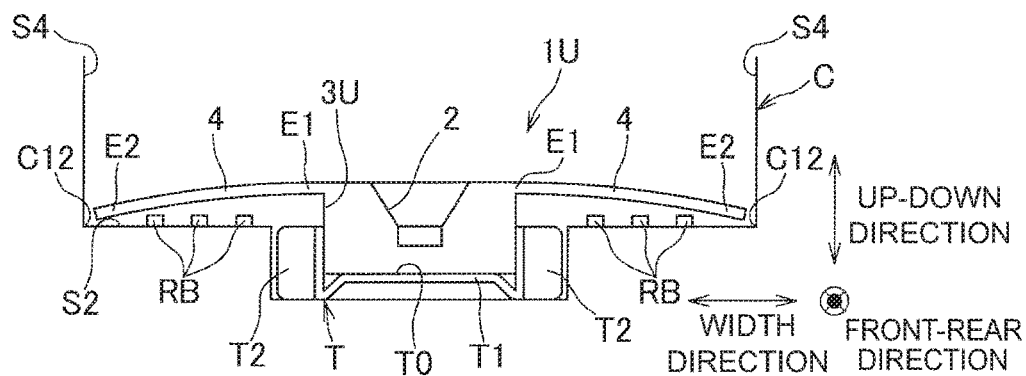
FIG. 40 is a back view of a speaker unit of a sound generating device according to a fifth modified example of Examples 13 and 14.

Further, as shown in FIG. 40 as a fifth modified example, a sound generating device for mobile object 1V may include a speaker unit 2 and an enclosure 3U provided inside a wheel T1 of a spare tire T accommodated in a vehicle interior space A3. The spare tire T is accommodated in a tire accommodation part formed in the rear side of the vehicle C in the traveling direction, for example, and includes the wheel T1 and a tire T2. The wheel T1 includes a recessed portion T0 formed on a face of the wheel T1 that faces inward in the width direction when being attached to the vehicle C and used. An inner periphery of the recessed portion T0 is formed into a circular tube-like shape, and the enclosure 3U is formed to have a circular tube-like shape having an outer peripheral dimension designed substantially equal to or slightly smaller than the recessed portion T0. The enclosure 3U is accommodated within this recessed portion T0.

A height of the enclosure 3U is higher than a depth of the recessed portion T0. A portion (lower portion) of the enclosure 3U is accommodated in the recessed portion T0, and another portion (upper portion) of the enclosure 3U is projecting from the recessed portion T0. However, an entire of the enclosure 3U in the up-down direction may be accommodated in the recessed portion T0. One ends E1 of the two tubular members 4 are connected to the enclosure 3U, respectively. The other end E2 of the tubular member 4 may open towards a corner C12 at which the side face S4, the lower face S2 and the rear face of the vehicle C meet, or alternatively, it may open towards a corner at which the side face S4, the upper face and the rear face meet, or it may open towards an intersecting part at which the rear face and other faces (the side face S4 and the lower face S2 or the upper face) meet.

Herein, the lower face S2 of the vehicle has a concave-convex surface formed by reinforcement ribs RB extending in the front-rear direction or the width direction, and a plate-like cover may be provided on this surface. In this case, a gap formed between this concave-convex surface and the cover may be used as a tubular member.

According to the sound generating device for mobile object 1V of the fifth modified example, since the other end E2 of the tubular member 4 is opening towards the corner C12 or the intersecting part, the acoustic characteristic such as a sound pressure in the low-pitched sound region can be improved even if the speaker unit 2 is downsized to be accommodated in the recessed portion T0 of the spare tire T.

Figure 41A:
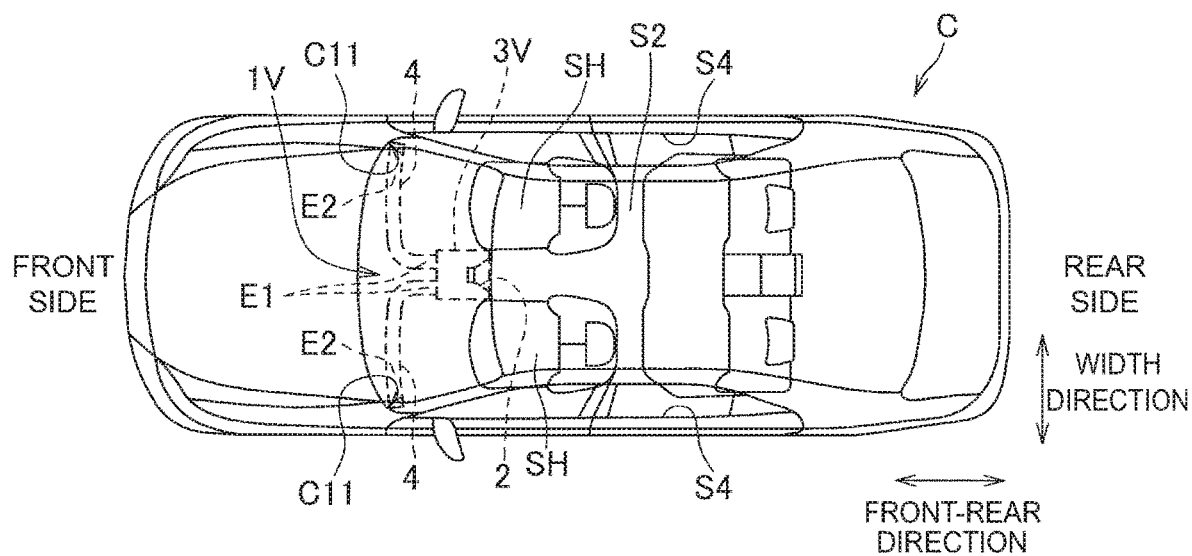
FIGS. 41A-41B are plan views of a speaker unit of a sound generating device according to a sixth modified example of Examples 13 and 14.

Further, as illustrated in FIG. 41A as a sixth modified example, a sound generating device for mobile object 1V may include a speaker unit 2 and an enclosure 3V provided at a central portion in the width direction of the vehicle C. The speaker unit 2 and the enclosure 3V are provided between and below the two front seats SH, and one ends E1 of two tubular members 4 are connected to a front face of the enclosure 3V. Of the two tubular members 4, one extends in the right direction with respect to the traveling direction and the other extends in the left direction. That is, in the width direction, the two tubular members 4 extend in the opposite directions with respect to each other. Further, the other ends E2 of the two tubular members 4 open towards corners C11 on the right and left sides, respectively.

Figure 41B:
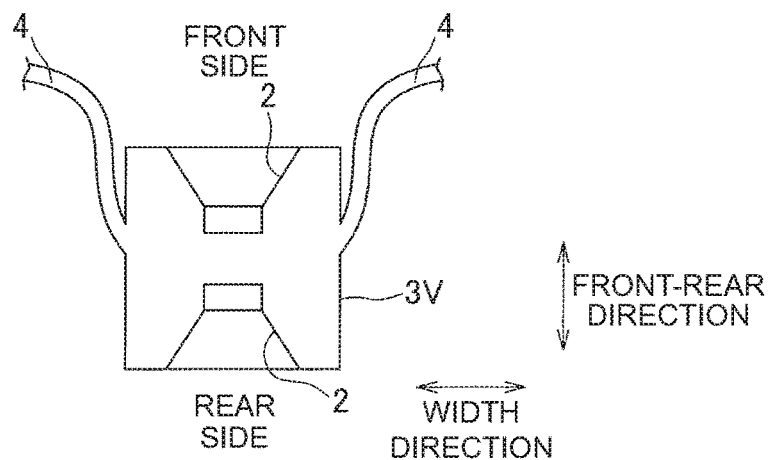

The other end E2 of the tubular member 4 may open towards an intersecting part at which a side face S4 and a lower face S2 of the vehicle C meet. In addition, as shown in FIG. 41B, the enclosure 3V may accommodate the two speakers 2, such that one speaker unit 2 emits a sound to the front side, while the other speaker unit 2 emits a sound to the rear side. According to such configuration, sounds emitted from back face sides of the two speaker units 2 weaken each other, preventing the enclosure 3 from vibrating during the sound emitting.

According to the sound generating device for mobile object 1V of the sixth modified example, it is possible to use the space between and below the two front seats SH. Further, since the other end E2 of the tubular member 4 is opening towards the corner C11 or the intersecting part, the acoustic characteristic such as a sound pressure in the low-pitched sound region can be improved even if an installation space in this space is narrow. Further, a low-pitched sound emitted from the other ends E2 of the tubular members 4 echoes on both sides in the width direction, thereby providing a reproduced sound having a tremendous impact to a passenger. Since the back faces of the two speaker units 2 are connected to each other, it is possible to prevent the vibration of the speaker units 2 themselves from propagating inside the vehicle C.

Figure 42A:
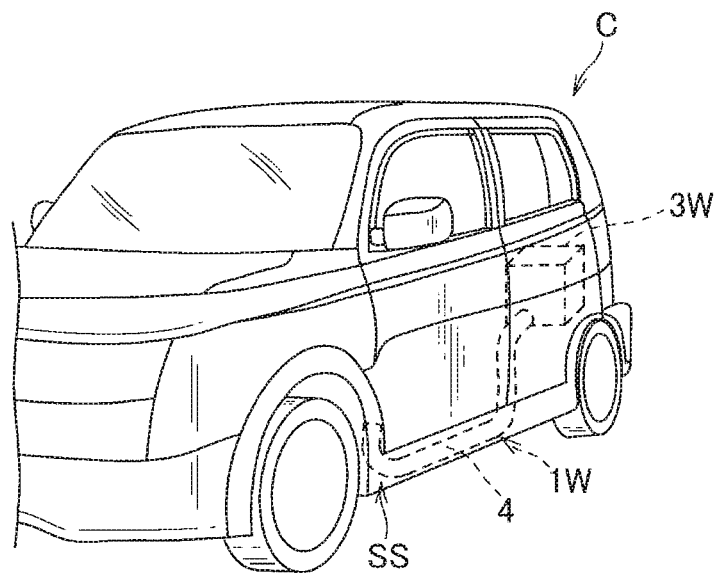
FIGS. 42A-42B are a perspective view and a side view, respectively, of a speaker unit of a sound generating device according to a seventh modified example of Examples 13 and 14.
Figure 42B:
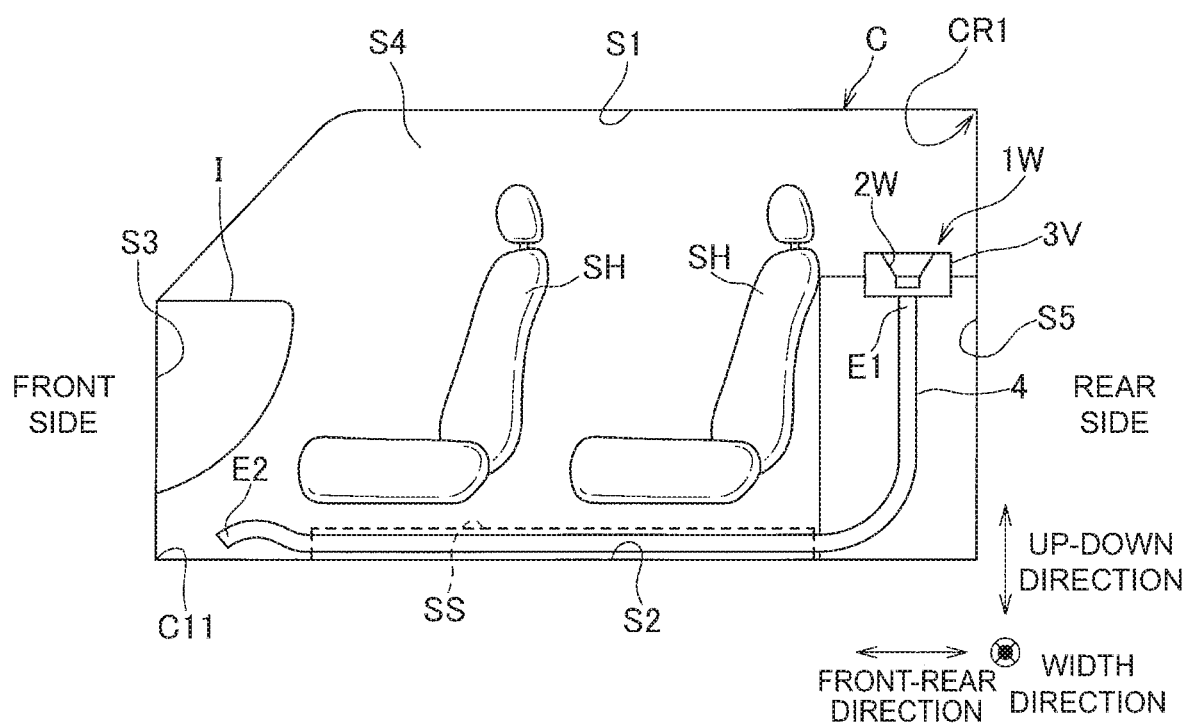

Further, as illustrated in FIG. 42A and FIG. 42B as a seventh modified example, a sound generating device for mobile object 1W may include a reproduction only speaker unit 2W and an enclosure 3W provided on the rear side of the vehicle C in the traveling direction and provided in the vicinity of an intersecting part CR1 at which an upper face S1 and a rear face S5 of the vehicle C meet, and a tubular member 4 extending through inside a side sill SS of the vehicle C to the corner C11 on the front side. The enclosure 3W is provided at a central portion in the width direction and on the rear side of a head rest of a rear seat SH, in which the speaker unit 2W is accommodated with its front face facing upward, and one end E1 of the tubular member 4 is connected to a lower face of the enclosure 3W. The tubular member 4 extends from the lower face of the speaker unit 2W downward and towards one side face of the vehicle C, and extends, below a door body of the vehicle C, through inside the side sill SS extending in the front-rear direction to the front side. Further, on the front side with respect to the side sill SS, the tubular member 4 extends once upward and then extends downward, thereby the other end E2 opens towards the corner C11.

A sound emitted from the speaker unit 2W heads to the intersecting part CR1, and a sound emitted from the other end of the tubular member 4 heads towards the corner C11. Herein, the enclosure may be arranged on one of the right and left sides in the width direction, such that a sound emitted from the speaker unit heads to a corner at which the upper face S1, the side face S4 and the rear face S5 meet. Further, as long as the other end E2 of the tubular member 4 opens towards the intersecting part located on the front side with respect to the side sill SS, the other end E2 of the tubular member 4 may open towards an intersecting part at which the front face S3 and the lower face S2 meet, or towards an intersecting part at which the lower face S2 and a portion of the side face S4 on the front side with respect to the side sill SS meet.

According to the sound generating device for mobile object 1W of the seventh modified example, the low-pitched sounds emitted from the speaker unit 2W and the other end E2 of the tubular member 4 are reflected at the front and rear corners or intersecting parts, thereby the acoustic characteristic such as a sound pressure in the low-pitched sound region can be further improved, making it easy to reduce the noise in the low-pitched sound region.

Further, the frequency dependency of a sound emitted from the speaker unit may be set appropriately. Even if a sound pressure of a low-pitched sound region emitted from the front face side of the speaker unit is high, if a sound pressure of the low-pitched sound that resonates in the tubular member and emitted from the other end of the tubular member is sufficiently high, then the sound pressure of the low-pitched sound can be ensured even if the sound from the front face side and the sound from the other end weaken each other. That is, in a case where the sound pressure of the low-pitched sound is increased sufficiently as a result of the resonance in the tubular member, it is possible to use a speaker unit that emits a sound such that the same degree of sound pressure is provide from the low-pitched sound region to the middle and high-pitched sound region, or a speaker unit that emits a sound such that the sound pressure is higher in the low-pitched sound region than in the middle and high-pitched sound region, or a speaker unit for the middle and high-pitched sound region (a tweeter). In addition, the shape of the speaker unit is not limited to a certain shape, and it may be a cone type or a dome type.

Further, in Example 14, it is configured such that a sound is emitted from the front face side of the speaker unit 2 on the upper face of the instrumental panel I, however the speaker unit may emit sound from the front face side on a rear face (face that faces the driver's seat) of the instrumental panel I. Further, the speaker unit 2 is provided within the instrumental panel I, however the speaker unit may be provided outside the instrumental panel I (e.g., mounted on the upper face of the instrumental panel I). At this time, the tubular member may not be arranged to pass through the instrumental panel I but to follow the outer side of the instrumental panel I. According to such configuration, when the sound generating device for mobile object is to be installed to the vehicle afterwards, it can be installed easily.

Further, in Example 14, the other end E2 of the tubular member 4 opens towards the corner C11 at which the front face S3, the lower face S2 and the side face S4 on the driver's seat side meet. However, the other end E2 can open to any direction as long as it opens towards a corner (corner C11-C13 shown in FIG. 33) at which any three faces of the plurality of faces surrounding the vehicle interior space A3 (an inner face of the windshield W, the upper face S1, the lower face S2, the front face S3, the pair of side faces S4 and the rear face) meet. Further, the other end of the tubular member may open towards an intersecting part (intersecting part R11-R18 shown in FIG. 33) at which two of the plurality of faces described above meet, or may open so as to face one face, or may be arranged along the face.

Herein, the corner C11 is a corner at which the front face S3, the lower face S2 and the side face S4 of the vehicle C meet, the corner C12 is a corner at which the rear face S5, the lower face S2 and the side face S4 of the vehicle C meet, and the corner C13 is a corner at which the rear face S5, the upper face S1 and the side face S4 of the vehicle C meet. Further, the intersecting part R11 is an intersecting part at which the front face S3 and the lower face S2 of the vehicle C meet, the intersecting part R12 is an intersecting part at which the lower face S2 and the side face S4 of the vehicle C meet, the intersecting part R13 is an intersecting part at which the front face S3 and the side face S4 of the vehicle C meet, the intersecting part R14 is an intersecting part at which the rear face S5 and the lower face S2 of the vehicle C meet, the intersecting part R15 is an intersecting part at which the rear face S5 and the side face S4 of the vehicle C meet, the intersecting part R16 is an intersecting part at which the front face S3 and the upper face S1 of the vehicle C meet, the intersecting part R17 is an intersecting part at which the upper face S1 and the side face S4 of the vehicle C meet, and the intersecting part R18 is an intersecting part at which the rear face S5 and the upper face S1 of the vehicle C meet.

Further, in Examples 13 and 14, the sounds emitted from the other ends E2, E2 form the standing wave between the pair of corners or the pair of intersecting parts. However, the other end may open such that the standing wave is formed between the pair of faces (e.g., between the front face and the rear face, or between the pair of side faces or between the lower face and the upper face of the mobile object).

Further, in Example 14, one sound generating device 1P is configured to be provided to the vehicle C. However, it is possible to combine a pair of sound generating devices in which the other ends of the tubular members are arranged at opposing positions. For example, the sound generating device 1P of Example 14 may be combined with a sound generating device for mobile object including the other end of the tubular member provided on the opposed corner. At this time, it is preferable to arrange the other ends so a node of the standing wave formed by one sound generating device for mobile object is displaced from a node of the standing wave formed by the other sound generating device for mobile object. Further, it is more preferable to arrange the other ends so a node of the one standing wave substantially matches with an antinode of the other standing wave. According to such configuration, by displacing the nodes of the two standing waves or by matching the node and the antinode of the two standing waves, a location dependency of a sound pressure in the vehicle interior space A3 can be reduced.

Further, in Example 12, the ¼ wavelength of the resonance sound is set to be longer than twice a distance between tragi. However, the ¼ wavelength of the resonance sound may be set to be longer than a distance between tragi. Alternatively, the ¼ wavelength of the resonance sound may be set to be equal to or less than a distance between tragi, if a phase difference is not likely to be produced between the sound waves reaching to the right and left ears of the user, e.g., if the sound generating device is arranged in front of or at back of a user and a path difference is not likely to be produced between the sound waves reaching to the right and left ears of the user.

Example 15

Figure 43:
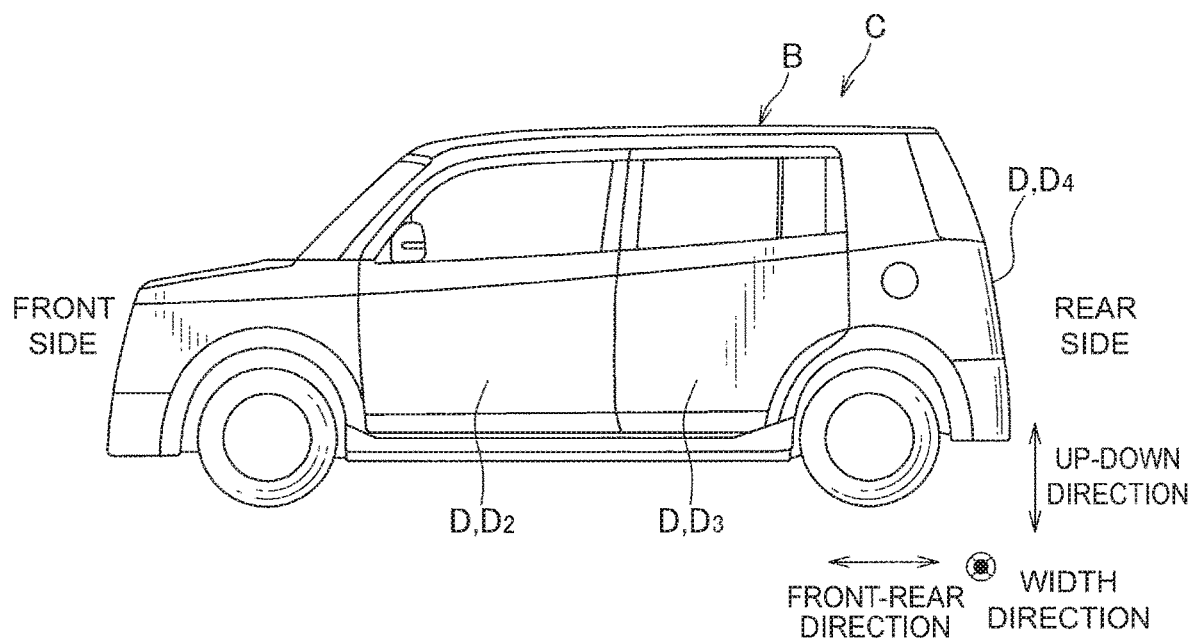
FIG. 43 is a side view of a mobile object including a sound generating device for mobile object according to an example of the present invention.
Figure 44:
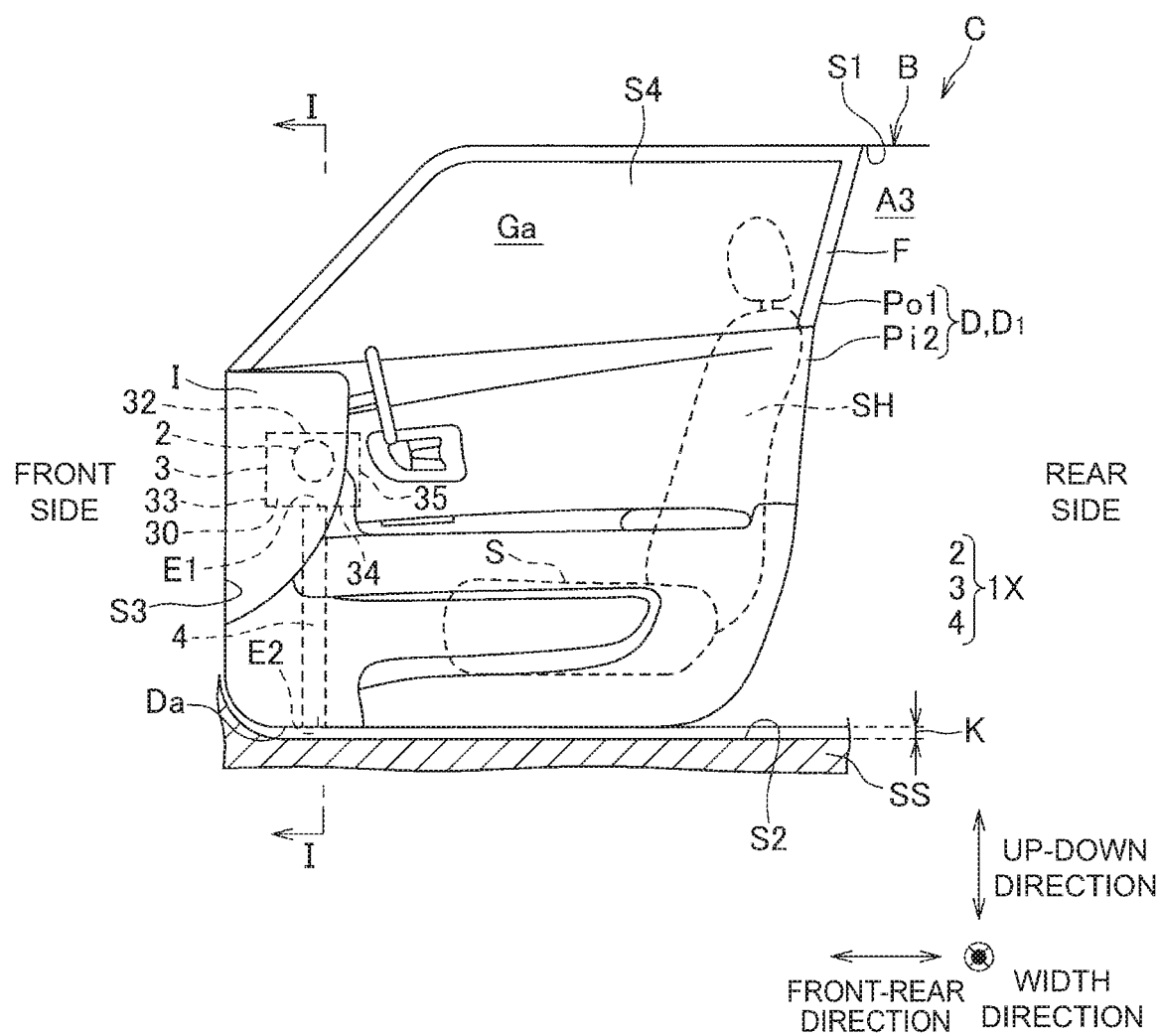
FIG. 44 shows a part of the mobile object.
Figure 45:
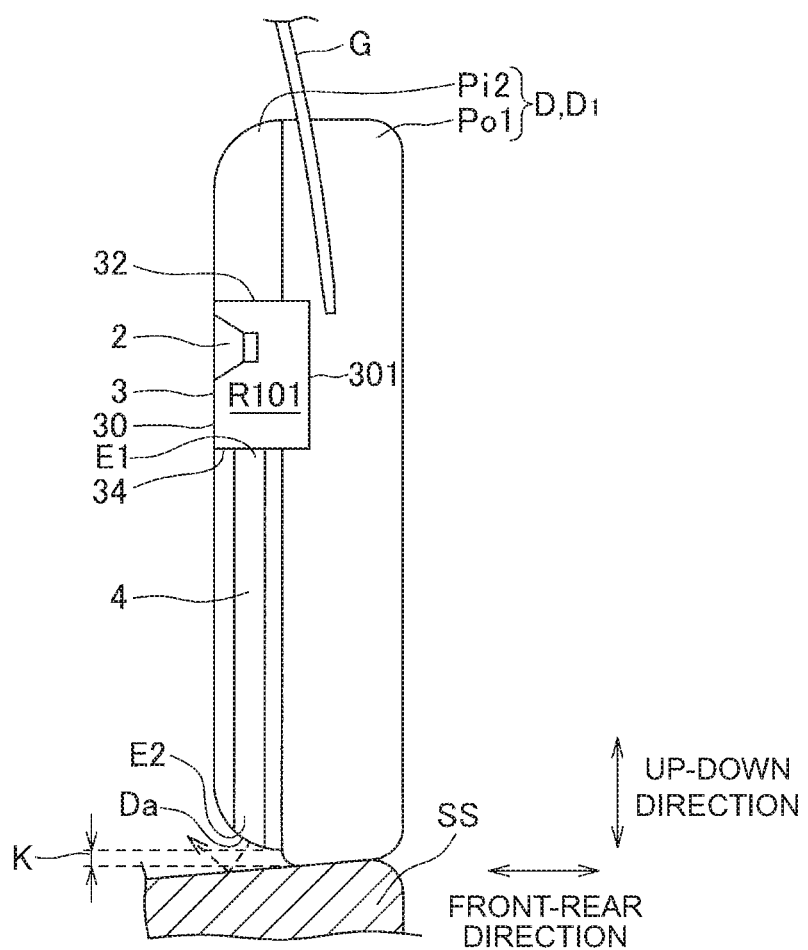
FIG. 45 is a schematic diagram showing a cross section taken along a line I-I in FIG. 44.
Figure 46:
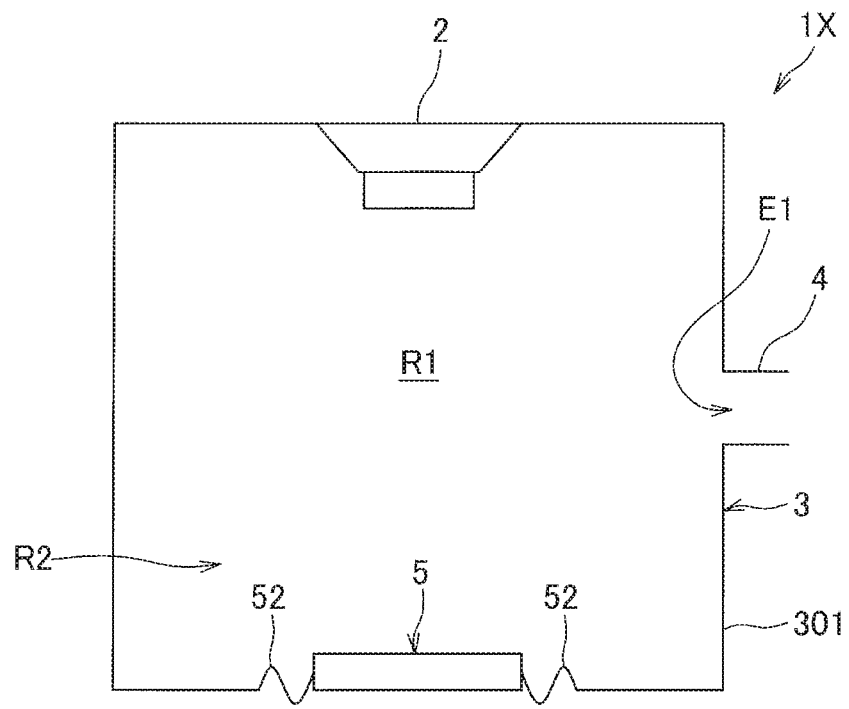
FIG. 46 is a cross-sectional view of the sound generating device for mobile object.
Figure 47:
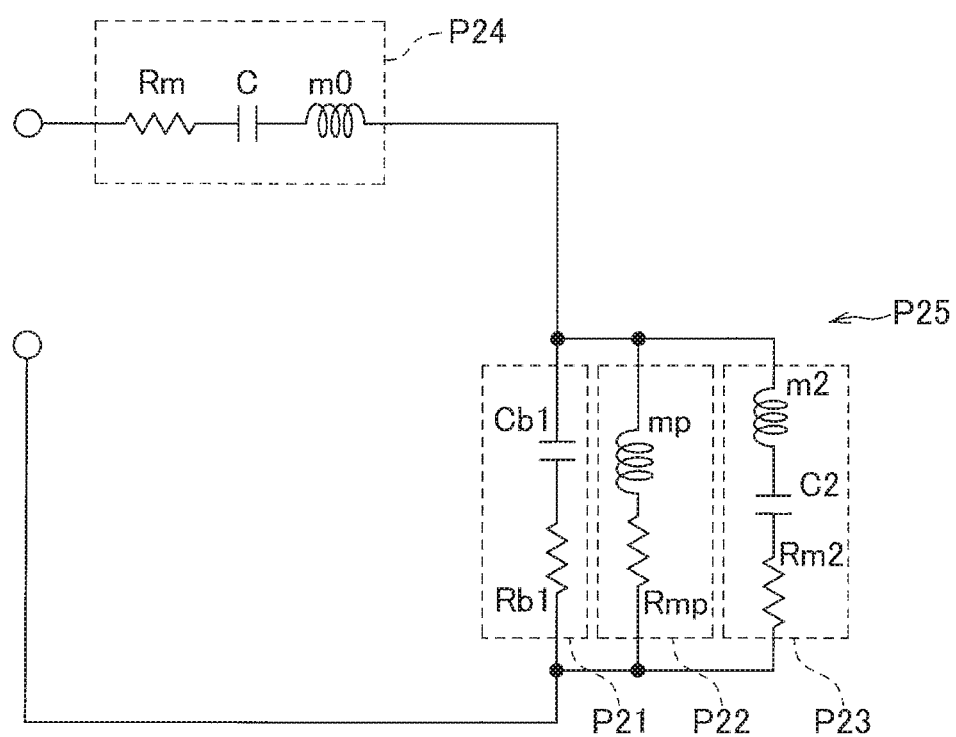
FIG. 47 is an equivalent circuit diagram produced by replacing mechanical elements of the sound generating device for mobile object with circuit elements.
Figure 48:
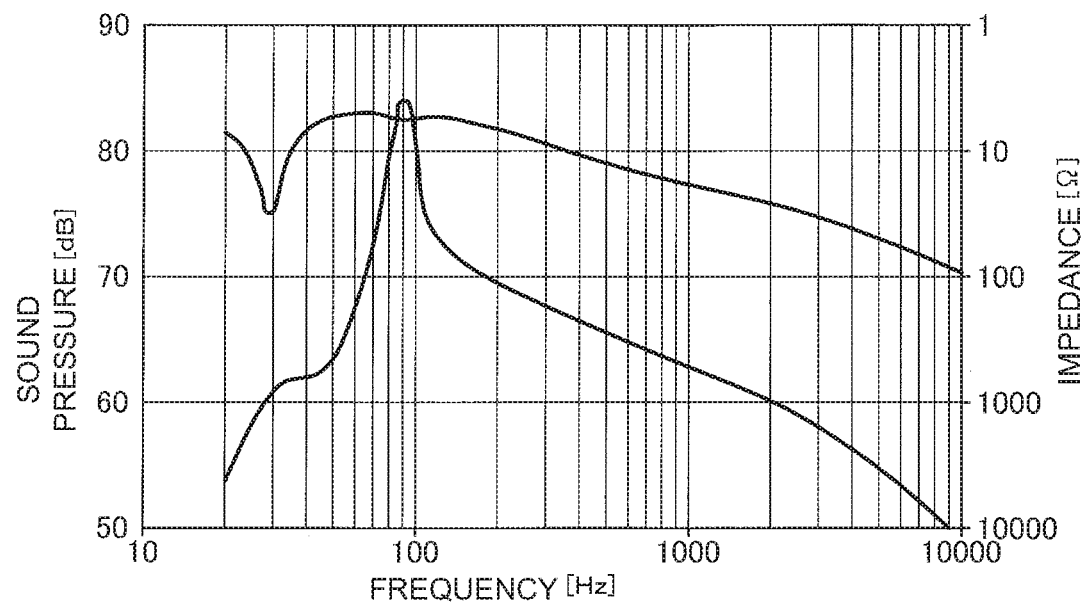
FIG. 48 is a graph showing an impedance of the equivalent circuit and a frequency characteristic of a generated sound of the sound generating device for mobile object.
Figure 49:
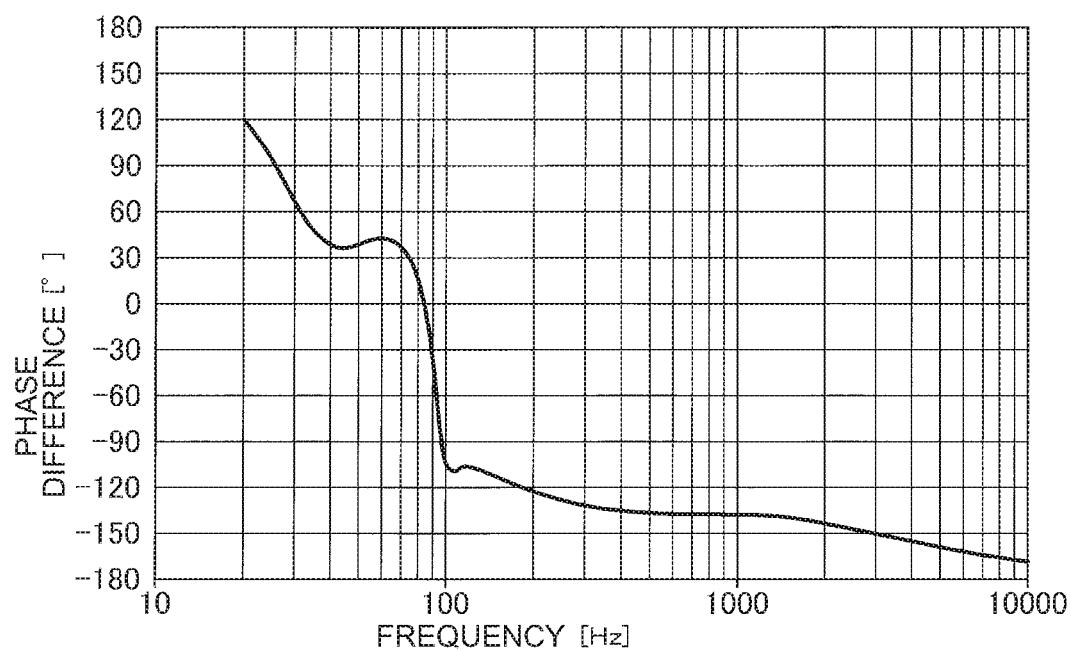
FIG. 49 is a graph showing a frequency dependency of a phase difference between an input signal and a generated sound in the sound generating device for mobile object.

In the following, examples of the present invention will be explained with reference to FIG. 43 to FIG. 48. FIG. 43 is a side view of a vehicle C as a mobile object including a sound generating device for mobile object 1X according to an example of the present invention. FIG. 44 is a side view showing a part of the vehicle. FIG. 45 is a schematic diagram showing a cross section taken along a line I-I in FIG. 44. FIG. 46 is a cross-sectional view of the sound generating device for mobile object 1X. FIG. 47 is an equivalent circuit diagram produced by replacing mechanical elements of the sound generating device for mobile object 1X with circuit elements. FIG. 48 is a graph showing an impedance of the equivalent circuit and a frequency characteristic of a generated sound of the sound generating device for mobile object 1X. FIG. 49 is a graph showing a frequency dependency of phase difference between an input signal and a generated sound in the sound generating device for mobile object 1X.

The vehicle C forms a box-like vehicle interior space A3 (space) surrounded by an inner face of a windshield (front windshield) not shown, an upper face (top face) S1, a lower face (bottom face) S2, the front face S3 on the front side in a traveling direction of the vehicle C, a pair of side faces S4 (including a door body such as a vehicle door D) opposing in a width direction (right-left direction) and a rear face (not shown) on the rear side in the traveling direction of the vehicle C, of a vehicle body B. Further, the front face S3 is provided with an instrumental panel I, and front seats (driver's seat and assistant driver's seat) are provided so as to face the rear side of the instrumental panel I, and rear seats are provided on the rear side of the front seats. In FIG. 44, the assistant driver's seat is omitted, so the driver's seat is denoted by a reference sign "SH".

In this example, as shown in FIG. 43 and FIG. 44, the sound generating device for mobile object 1X is provided in a vehicle door D, $D_1$ (shown in FIG. 44) as the door body located on the width direction side of the driver's seat. However, the sound generating device for mobile object 1X may be provided to a vehicle door D, $D_2$ (shown in FIG. 43) located on the assistant driver's seat side, or may be provided to both of them. Further, the sound generating device for mobile object 1X may be provided to a vehicle door D, $D_3$ (shown in FIG. 43) of the rear seat, or may be provide to a back door D, $D_4$ (shown in FIG. 43) facing the front face S3. That is, the present invention may be applied to any vehicle door D of the vehicle C.

The vehicle C includes the vehicle body B constituting a frame, and the vehicle doors D attached to a frame which is a part of the vehicle body B. Herein, the vehicle body B may include a panel and a frame (a hollow body), e.g., the vehicle body B may be a monocoque body. The vehicle door D includes an outer panel Po1 made of metal which is a vehicle exterior member and an inner panel Pi2 made of synthetic resin which is a vehicle interior decorative component facing the outer panel Po1. The outer panel Po1 is provided with a window frame Fw, and an opening of the window frame Fw is opened and closed by a liftable glass Ga. The inner panel Pi2 is arranged to overlap the outer panel Po1 such that its upper end corresponds to a lower end portion of the window frame Fw of the outer panel Po1. The frame is formed into a frame-like shape formed by an upper end portion, a lower end portion (side sill SS), a front end portion and a rear end portion so as to surround the vehicle door D. In the frame, a portion that forms the lower end portion is described as the side sill SS.

Here, with the vehicle door D closed (a state in which the vehicle door D covers the opening of the frame), a gap K as a part of the vehicle interior space A3 exists between a lower face Da of the inner panel Pi2 of the vehicle door D (the lower end portion of the vehicle door D) and the side sill SS. A sound wave is emitted from this gap K towards the vehicle interior space A3. That is, the other end E2 of a later-described tubular member (acoustic tube) 4 opens towards the gap K.

As described above, the gap K exists between the lower face Da of the inner panel Pi2 of the vehicle door D and the side sill SS. A length of the gap K in the up-down direction of the vehicle door D gradually increases as approaching to the vehicle interior space A3. That is, an inclined face is formed such that a vertical distance from the lower face Da of the inner panel Pi2 to the side sill SS increases as approaching to the vehicle interior space A3. Alternatively, the side sill SS may include an inclined face such that the vertical distance from the lower face Da of the inner panel Pi2 increases as approaching to the vehicle interior space A3, or both of them forming the gap K may include the inclined faces.

As described above, the gap K is formed so as to gradually increase as approaching to the vehicle interior space A3. That is, the length of the gap in the up-down direction of the vehicle door D is widened towards inside the box-like vehicle interior space A3.

As shown in FIG. 44 to FIG. 46, the sound generating device for mobile object 1X includes a speaker unit 2 configured to be provided to the vehicle C, an enclosure 3 accommodating the speaker unit 2 and the tubular member 4 connected to the enclosure 3. The sound generating device for mobile object 1X is configured to be provided to the vehicle C as a mobile object together with an external device including a sound collecting part configured to collect noise and a transmission part configured to transmit an input signal to the speaker unit 2, such that the sound generating device for mobile object 1X and the external device together constitute a noise cancelling device.

The speaker unit 2 includes a frame, a diaphragm connected to the frame, an edge connecting the diaphragm to the frame, a tubular voice coil connected to the diaphragm, a damper connecting the voice coil to the frame, and a magnetic circuit inserted inside the voice coil, and is a commonly used cone-type speaker unit. Other configurations are also possible, for example, a thin-type speaker and such may be used as the speaker unit.

The speaker unit 2 is provided at the inner panel Pi2 on the upper side and the front side. That is, the speaker unit 2 is provided so as to be located on the upper side with respect to a seat face S of the seat SH mounted on the vehicle C. Further, the diaphragm is arranged such that the sound emitting side of the speaker unit 2 faces one side in the width direction (the driver's seat side or the assistant driver's seat side), and the back side (opposite side of the sound emitting side, i.e., the magnet circuit side) of the speaker unit 2 faces the other side in the width direction. It is noted that the vibration direction (sound emitting direction) of the diaphragm of the speaker unit 2 with respect to the inner face of the vehicle door D may be set appropriately in accordance with a distance between the speaker unit 2 and the seat SH and such.

The enclosure 3 includes an enclosure body 301 formed into a box-like shape and forming a rear space R1 by surrounding the rear side (opposite side of the sound emitting side) of the speaker unit 2. The enclosure body 301 partitions the rear space R101 and the outside space.

The enclosure body 301 includes a tubular member 4 and a vibration member 5. The tubular member 4 is provided to a portion of the enclosure body 301 that extends along the sound emitting direction, and the vibration member 5 is provided to a portion of the enclosure body 301 that faces the speaker unit 2. However, the tubular member 4 and the vibration member 5 may be provided at appropriate positions of the enclosure body 301, respectively.

With the speaker unit 2 accommodated in the enclosure 3 described above, the speaker unit 2 is provided inside the inner panel Pi2 so as to emit a sound wave towards the vehicle interior space A3 of the inner panel Pi2. Further, a sound wave generated on the back side (opposite side of the sound emitting side) of the speaker unit 2 is emitted towards the rear space R101 of the enclosure 3. For the sound wave emitted towards the rear space R101, a component of a low-pitched sound region in accordance with a length of the tubular member 4 resonates inside the tubular member and is emitted from the other end E2.

One end E1 of the tubular member 4 is communicated with the rear space R101, and the other end E2 of the tubular member 4 opens into the vehicle interior space A3. As shown in FIG. 44 and FIG. 45, the tubular member 4 extends downward inside the inner panel Pi2 so as to open towards the lower face Da of the inner panel Pi2. In FIG. 46, a right-left direction of the drawing corresponds to an up-down direction in FIG. 44 and FIG. 45. Further, the other end E2 opens towards the side sill SS. The tubular member 4 is provided so as to emit a sound wave from the gap K between the inner panel Pi2 and the side sill SS towards the vehicle interior space A3.

The vibration member 5 includes a weight part 51 and an elastic support part 52. The weight part 51 is a weight that is formed into a plate-like shape from a metallic member, for example. The elastic support part 52 is formed from an elastic member such as rubber, for example, and is provided to a periphery of the weight part 51. An opening is formed at a portion of the enclosure body 301 where the vibration member 5 is provided, and this opening is closed by the vibration member 5. That is, the elastic support part 52 connects an outer edge of the weight part 51 and an inner edge of the opening of the enclosure body 301, thereby supporting the weight part 51 in a manner capable of being vibrated with respect to the enclosure body 301.

The weight part 51 will vibrate due to a compression wave of air (sound wave) in the front accommodation part 32 produced by vibration of the diaphragm of the speaker unit 2. The vibration member 5 has a resonance frequency according to a mechanical resistance, a compliance and a vibration mass of the weight part 51 and the elastic support part 52. At this time, the resonance frequency of the vibration member 5 is set to a value different from the lowest resonance frequency of the speaker unit 2 (i.e., the lowest resonance frequency of the speaker unit not having the resonance element). Consequently, with a sound emitted from the speaker unit 2, the vibration member 5 generates a resonance sound having a different frequency from the lowest resonance frequency of the speaker unit 2, thereby functioning as the resonance element.

In the sound generating device for mobile object 1X described above, the vibration member 5 as the resonance element is provided. Thus, a sound emitted from a front side of the speaker unit 2 through the rear space R101 and emitted from the tubular member 4 to the vehicle interior space A3 will have an increased sound pressure not only at the lowest resonance frequency of the speaker unit 2 but also at the resonance frequency of the vibration member 5.

The following will explain a frequency dependency of sound pressure (sound pressure characteristic) and a frequency dependency of a phase difference (phase characteristic) between a generated sound and an input signal to an voice coil of the speaker unit 2, with respect to a sound emitted by the sound generating device for mobile object 1X.

Firstly, an equivalent circuit produced by replacing mechanical elements of the sound generating device for mobile object 1X with circuit elements is shown in FIG. 47. A part P21 given by the enclosure 3, a part P22 given by the tubular member 4 and a part P23 given by the vibration member 5 are connected in parallel. This entire part in which these parts are connected in parallel is referred to as a part P25. In addition, a part P24 given by the speaker unit 2 and the part P25 given by the front elements are connected in series.

The enclosure 3 includes a compliance determined by its volume and a mechanical resistance at the time of vibration. In the part P21 given by the enclosure 3, a capacitor Cb1 given by the compliance and a resistor Rb1 given by the mechanical resistance are connected in series.

The tubular member 4 includes a vibration mass of gas inside the tubular member 4 and a mechanical resistance at the time of vibration. In the part P22 given by the tubular member 4, a coil mp given by the vibration mass and a resistor Rmp given by the mechanical resistance are connected in series.

The vibration member 5 includes a vibration mass of the weight part 51 and the elastic support part 52, a compliance of the elastic support part 52 and a mechanical resistance at the time of vibration. In the part P23 given by the vibration member 5, a coil m2 given by the vibration mass, a capacitor C2 given by the compliance and a resistor Rm2 given by the mechanical resistance are connected in series.

The speaker unit 2 includes mechanical resistances of a damper and an edge, compliances of the damper and the edge, vibration masses of the diaphragm, the damper and the edge. In the part P24 given by the speaker unit 2, a resistor Rm given by the mechanical resistances, a capacitor C given by the compliances and a coil m0 given by the vibration masses are connected in series.

By replacing the mechanical elements with the circuit elements as described above, a combined impedance of the entire circuit can be obtained. Based on such impedance, the sound pressure characteristic of the sound generating device for mobile object 1X can be obtained, and the phase characteristic can be obtained based on the sound pressure characteristic.

Simulation results of the frequency dependency of the impedance and the sound pressure characteristic of the sound generating device for mobile object 1X obtained based on the equivalent circuit as described above are shown in FIG. 48. In FIG. 48, a vertical axis on the left side corresponds to the sound pressure characteristic, and a vertical axis on the right side corresponds to an impedance. A horizontal axis indicating a frequency is indicated in a logarithmic scale.

The sound pressure characteristic in the sound generating device for mobile object 1X includes a peak (about 30 Hz) according to the lowest resonance frequency of the speaker unit 2 and a sub-peak (about 90 Hz) formed by other circuit elements. The frequency of the sub-peak is determined mainly by resonance frequencies of the tubular member 4 and the vibration member 5 (element resonance frequencies).

A Simulation result of the phase characteristic of the sound generating device for mobile object 1X is shown in FIG. 49. In FIG. 49, values for the phase of −180° or less are indicated as values with 360° added, and values for the phase of 180° or more are indicated as values with 360° subtracted. At around the lowest resonance frequency (about 30 Hz) of the speaker unit 2, the rate of change of the phase difference is large and the graph has a sharp shape, and the absolute value of the phase difference tends to increase as the frequency increases, but a downward convex portion is formed in this simulation result. This downward convex portion is formed due to the sub-peak described above. Thus, in the frequency range of about 40 to 80 Hz, the phase difference falls within about 30 to 50°. That is, a flat region (about 40 to 80 Hz) in which the change in the phase difference is small is formed in the graph of the phase characteristic.

The wavelength corresponding to the sub-peak at 90 Hz is 3.4 m (¼ wavelength is 0.85 m). Thus, the ¼ wavelength of the resonance sound generated by the vibration member 5 as the resonance element is sufficiently longer than twice a distance between tragi.

When performing a noise cancelling by the sound generating device for mobile object 1X as described above, if there is a phase difference produced between the noise signal and the cancelling signal emitted from the sound generating device for mobile object 1X, then cancelling effect may be deteriorated, or noise may be increased. For example, FIG. 11 shows waves of the noise signal, the cancelling signal having the same amplitude as the noise signal and a combined signal of these signals, in the case where the phase difference between the noise signal and the cancelling signal is 60°. The sound pressure of the sound that is actually generated in a space in which the noise signal and the cancelling signal are emitted, corresponds to the amplitude of the combined signal. In the example shown in FIG. 11, if the noise signal and the cancelling signal are equal in the amplitude, then the amplitude of the noise signal and the amplitude of the combined signal are equal, and the cancelling effect cannot be obtained when the phase difference between the noise signal and the cancelling signal exceeds 60°.

Thus, a phase characteristic of the sound generating device for mobile object 1X may be calculated by simulation or actually measured in advance, and the input signal can be controlled such that the emitted sound has a phase opposite to a phase of the noise.

According to the configuration described above, the enclosure 3 includes the vibration member 5 as the resonance element and the flat region is formed in the graph of the phase characteristic. Thus, at the frequencies in the flat region, the sound generated from the sound generating device for mobile object 1X can be easily made to have a phase opposite to a phase of the noise, making it easy to reduce the noise. At this time, the flat region can be adjusted by appropriately setting the element resonance frequency of the vibration member 5, thereby the frequency range in which the noise can be easily reduced can be adjusted.

Further, by providing the vibration member 5 as the resonance element, the element resonance frequency can be adjusted by adjusting the mechanical resistance, the compliance and the vibration mass of the vibration member 5, enabling to form the flat region at an appropriate frequency range.

Further, by providing the tubular member 4 having the one end E1 communicated with the rear space R101 of the enclosure 3 and the other end E2 opening into the vehicle interior space A3, of the sound generated in the rear space R101 of the speaker unit 2, a low-pitched sound region component according to the length of the tubular member 4 resonates in the tubular member 4 and is emitted from the other end E2.

Further, the other end E2 of the tubular member 4 opens into the vehicle interior space A3 at below the vehicle door D. Thus, even when the speaker unit 2 is provided above the seat face S of the seat SH of the vehicle C, the low-pitched sound region component is emitted at a lower position of the vehicle door D at which the acoustic characteristic of the low-pitched sound region component is high, thus the acoustic characteristic such as a sound pressure in the low-pitched sound region in the sound generating device for mobile object 1X can be improved.

Further, with the acoustic characteristic of the low-pitched sound region improved as described above, it is possible to obtain a good acoustic characteristic even when using a small-sized speaker unit in which a sound pressure in the low-pitched sound region is lower compared to the low-pitched sound reproducing speaker (e.g., a woofer or a subwoofer). Consequently, it is possible to reduce a diameter of the speaker unit 2.

Further, since the other end E2 of the tubular member 4 opens towards the gap K between the lower face Da of the vehicle door D and the side sill SS facing the lower face Da, the low-pitched sound region component emitted from the other end E2 reflects on the two faces that are the lower face Da of the vehicle door D and the side sill SS that form the gap K. Consequently, it is likely to echo inside the vehicle interior space A3, thus the acoustic characteristic such as a sound pressure in the low-pitched sound region in the sound generating device for mobile object 1X can be improved.

Further, since the length of the gap K in the up-down direction of the vehicle door D increases as approaching inside the vehicle interior space A3 (e.g., a location where the seat SH is located), the length of the gap K in the up-down direction of the vehicle door D is widened as approaching inside the vehicle interior space A3, and this flare effect can prevent a wind noise or prevent an air disturbance. Moreover, the low-pitched sound region component emitted from the other end E2 of the tubular member 4 is reflected on the two faces that are the lower face Da of the vehicle door D and the side sill SS that form the gap K and is likely to echo inside the vehicle interior space A3, thereby improving the acoustic characteristic such as a sound pressure of the low-pitched sound region in the sound generating device for mobile object 1X.

Further, since the other end E2 of the tubular member 4 opens at the location lower than the position of the seat face S of the seat SH in the vehicle C, it is possible to make the low-pitched sound to echo efficiently in the vehicle interior space A3.

Further, since the tubular member 4 is arranged inside the vehicle door D, it is possible to make the low-pitched sound to echo efficiently in the vehicle interior space A3.

Further, since the ¼ wavelength of the resonance sound generated by the tubular member 4 and the vibration member 5 as the resonance elements is longer than twice a distance between tragi (e.g., 0.15 m), a difference between absolute values of the sound pressures at right and left ears produced when the sound wave of the resonance sound has reached to a head of a user (a passenger of the mobile object) can be reduced. That is, a path difference of up to the distance between the tragi may be produced between the sound waves reaching to the right and left ears of the user. At this time, with the ¼ wavelength of the resonance sound being longer than twice the distance between the tragi, the phase difference between the sound waves reaching to the right and left ears is reduced, and thus the difference between the absolute values of the sound pressures is reduced. Consequently, the right/left difference of the effect obtained by forming the above-described flat region can be reduced. Further, even when the positional relationship between the sound generating device and the head of the user has changed (for example when the passenger on a seat has moved his/her head), the right/left difference can be reduced in the similar manner.

It is noted that the sound generating device for mobile object 1X according to the example of the present invention may be used as a noise cancelling device capable of cancelling a noise sound (for example, a sound that generates during movement of the vehicle C and such) in a compartment of the vehicle C and such.

Although preferred configurations and methods and such for implementing the present invention have been disclosed above, the present invention is not limited to these. That is, although the present invention is mainly shown and described with respect to certain examples, a person skilled in the art can make various modifications regarding shape, material, number or other detailed configurations with respect to examples described herein without departing from a technical idea and an object of the present invention. Therefore, since descriptions herein limiting shape, material or the like disclosed herein are described for illustrative purpose only to help understand the present invention and thus do not limit the present invention, a name of a member described without a part or all of limitations of shape, material or the like are also within the present invention.

For example, in the example described above, the resonance element is provided to any location on the speaker unit 2, the enclosure 3 and the tubular member 4. However, the present invention is not limited to these, and the resonance element may be arranged at the plurality of locations on them, or a plurality of resonance elements may be arranged to one location or to a plurality of locations. Further, the shape and/or structure of the tubular member 4 may be designed appropriately to make the tubular member 4 itself to also serve as the resonance element. This case should also be interpreted as one embodiment of a state in which "the resonance element is arranged at the tubular member".

Further, although the vibration member 5 is shown as the resonance element in the example described above, the resonance element may take other forms as long as the resonance element has a resonance frequency and upon vibration forms the sub-peak on the sound pressure characteristic of the sound generating device for mobile object 1X. For example, a vibration member not including a weight part and constituted of only an elastic member may be used as the resonance element. At this time, weight of the elastic member itself corresponds to a vibration mass.

Further, although the sound generating device for mobile object 1X includes the tubular member 4 in the example described above, the present invention is not limited to this, and the sound generating device for mobile object 1X may not include the tubular member 4. Further, although the tubular member 4 is provided inside the vehicle door D, D1, the present invention is not limited to this. For example, the speaker unit 2 and the enclosure 3 may be accommodated in the vehicle door D,D₁, while only the tubular member 4 may be provided outside the vehicle door D, D₁.

Further, although the other end E2 of the tubular member 4 opens to the lower face Da of the inner panel Pi2 in the example described above, the present invention is not limited to this. For example, as long as the other end of the tubular member 4 opens towards the vehicle interior space A3, the other end of the tubular member 4 may open to a lower face of the outer panel Po1, or may open towards the vehicle interior space A3 at above the vehicle door D.

Further, although the speaker unit 2 is provided above the seat face S in the example described above, the present invention is not limited to this. The speaker unit 2 may be provided below the seat face S.

Further, in the example described above, the ¼ wavelength of the resonance sound generated by the vibration member 5 as the resonance element is set to be longer than twice a distance between tragi. However, the ¼ wavelength of the resonance sound may be set to be longer than a distance between tragi. Alternatively, the ¼ wavelength of the resonance sound may be set to be equal to or less than a distance between tragi, if a phase difference is not likely to be produced between the sound waves reaching to the right and left ears of the user, e.g., if the sound generating device is arranged in front of or at back of a user and a path difference is not likely to be produced between the sound waves reaching to the right and left ears of the user.

Example 16

Firstly, a speaker system for active noise control according to Example 16 will be explained.

Figure 50:
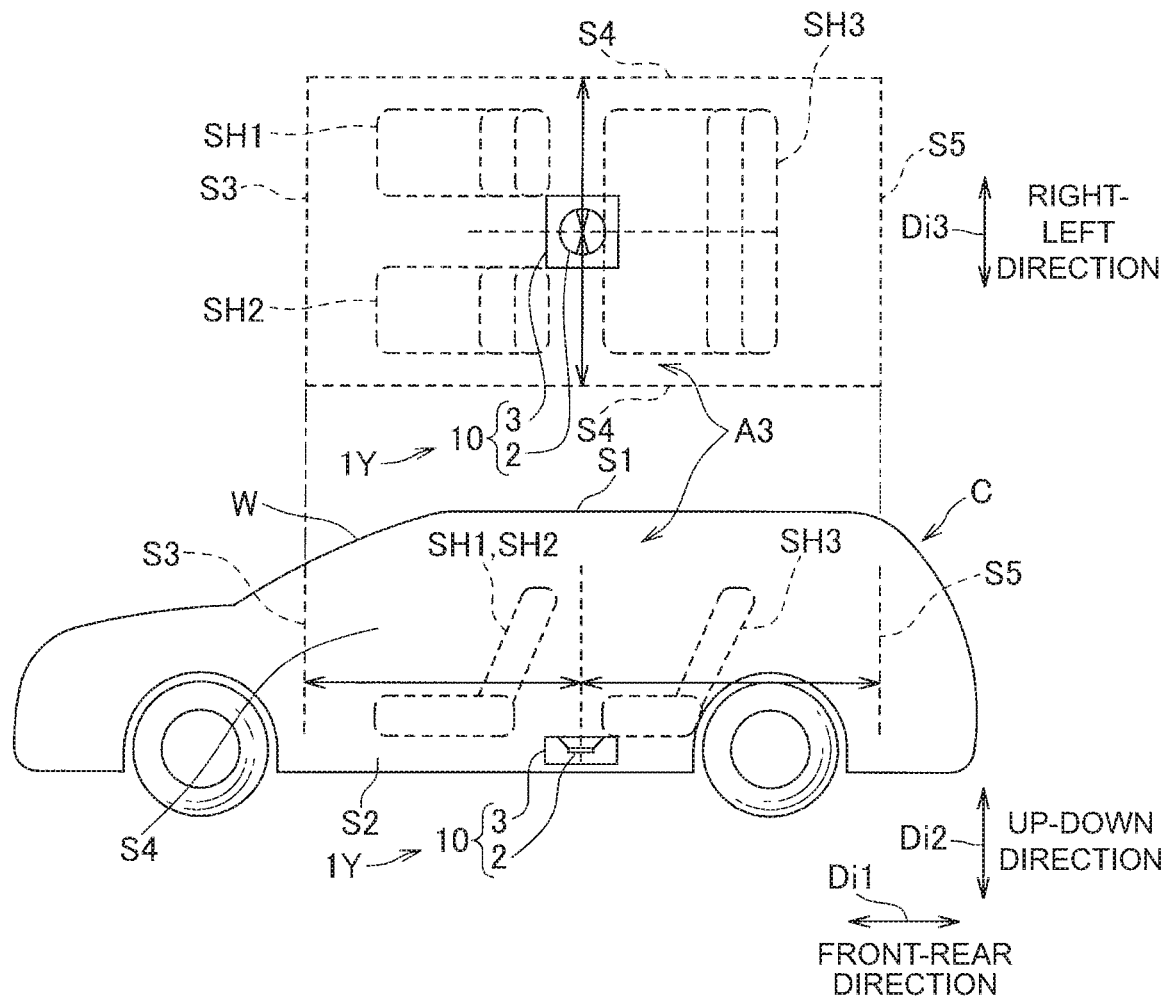
FIG. 50 is a schematic diagram showing a speaker system for active noise control according to Example 16 of the present invention.

FIG. 50 is a schematic diagram showing a speaker system for active noise control according to Example 16 of the present invention.

A speaker system for active noise control 1Y of this example is configured to be provided to the vehicle C as a mobile object, and includes one speaker device 10 that emits a sound having a phase substantially opposite to that of a noise collected at a noise collecting part not shown to cancel the noise.

The vehicle C forms a box-like vehicle interior space A3 as described below. The vehicle interior space A3 is defined, in an up-down direction Di2 of the vehicle C, by an inner face of a windshield (front windshield) W, and an upper face (top face) S1 and a lower face (bottom face) S2 of a vehicle body. In a traveling direction (front-rear direction Di1) of the vehicle C, it is defined by the inner face of a windshield (front windshield) W and the front face S3 and a rear face S5 in the front-rear direction Di1 of the vehicle C. In a width direction of the vehicle C (right-left direction Di3), it is defined by a pair of side faces S4 (including a door body of the vehicle). A driver's seat SH1 and an assistant driver's seat SH2 are provided on the front side of the vehicle interior space A3, and a three-seat bench-like rear seat SH3 is provided on the rear side.

The speaker device 10 includes a speaker unit 2 as a sound emitting part that emits a sound, and an enclosure 3 accommodating the speaker unit 2.

The speaker unit 2 is configured in a similar fashion as the speaker unit 21A, 22A shown in FIG. 5 and explained in Example 1, thus a detailed explanation thereof is omitted herein.

In the speaker system for active noise control 1Y of this example, the speaker device 10 including the speaker unit 2 that emits a cancelling sound that can be easily made to have a phase opposite to a phase of the noise as shown in Example 1 described above, is arranged at the following position. That is, the speaker device 10 is arranged such that, in the vehicle interior space A3, the speaker unit 2 itself is positioned substantially at the center in both of the front-rear direction Di1 and the right-left direction Di3 of the vehicle C. Specifically, as shown in FIG. 50, it is arranged on the lower face S2 at a position between the driver's seat SH1 and the assistant driver's seat SH2, and the rear seat SH3, and at substantially the center in the right-left direction Di3, with the diaphragm 300 facing to the upper face S1. If the right-left direction Di3 is smaller compared to the front-rear direction Di1, then it is not necessary to arrange it at the center in the right-left direction Di3.

The phase characteristic of the speaker device 10 of this example includes a peak (about 45 Hz) according to the lowest resonance frequency of the speaker unit 2 and a sub-peak (about 100 Hz) formed by the elastic member 8A. The frequency of the sub-peak is determined mainly by a resonance frequency of the elastic member 8A (element resonance frequency).

The wavelength corresponding to the sub-peak at 100 Hz is 3.4 m (¼ wavelength is 0.85 m). Thus, the ¼ wavelength of the resonance sound produced by the elastic member 8A as the resonance element is sufficiently longer than twice a distance between tragi (e.g., 0.15 m).

Figure 51:
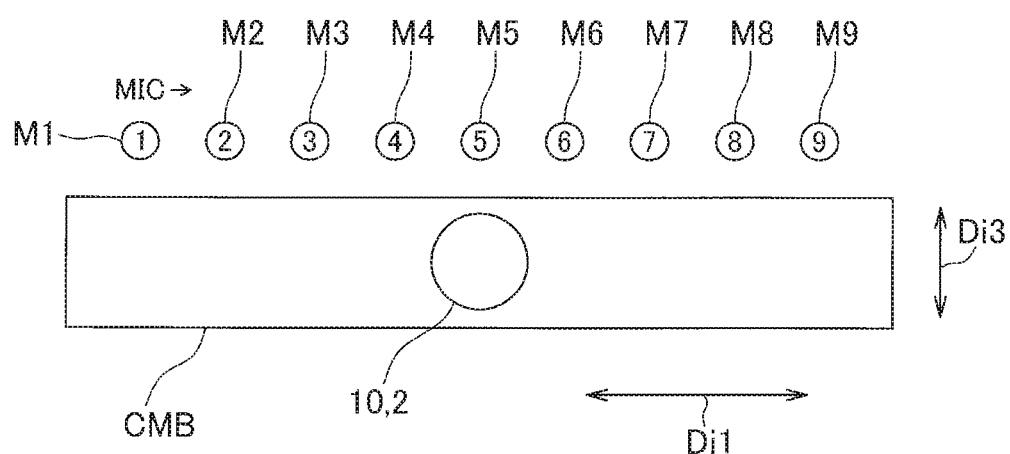
FIG. 51 is a schematic diagram showing a miniature box for simulation adapted for the speaker system for active noise control shown in FIG. 50.

In this example, by arranging the speaker device 10 at the above-described position, the following advantageous effects can be obtained for the cancelling sound to be emitted to the vehicle interior space A3. In the following, the advantageous effects that can be obtained by such position of the speaker device 10 are explained with reference to a simulation that uses a miniature box assumed as the vehicle C. FIG. 51 is a schematic diagram showing a miniature box for simulation adapted for the speaker system for active noise control shown in FIG. 50.

In this simulation, the speaker unit 2 of the speaker device 10 is positioned substantially at the center of the miniature CMB assumed as the vehicle C in both of the front-rear direction Di1 and the right-left direction Di3. For purpose of studying, nine sound collecting microphones M1 to M9 are aligned in the front-rear direction Di1. This simulation is an actual measurement simulation in which a sound pressure and a phase difference with respect to an input signal are measured for the cancelling sound emitted from the speaker unit 2 and collected by each of the collecting microphones M1 to M9.

Figure 52:
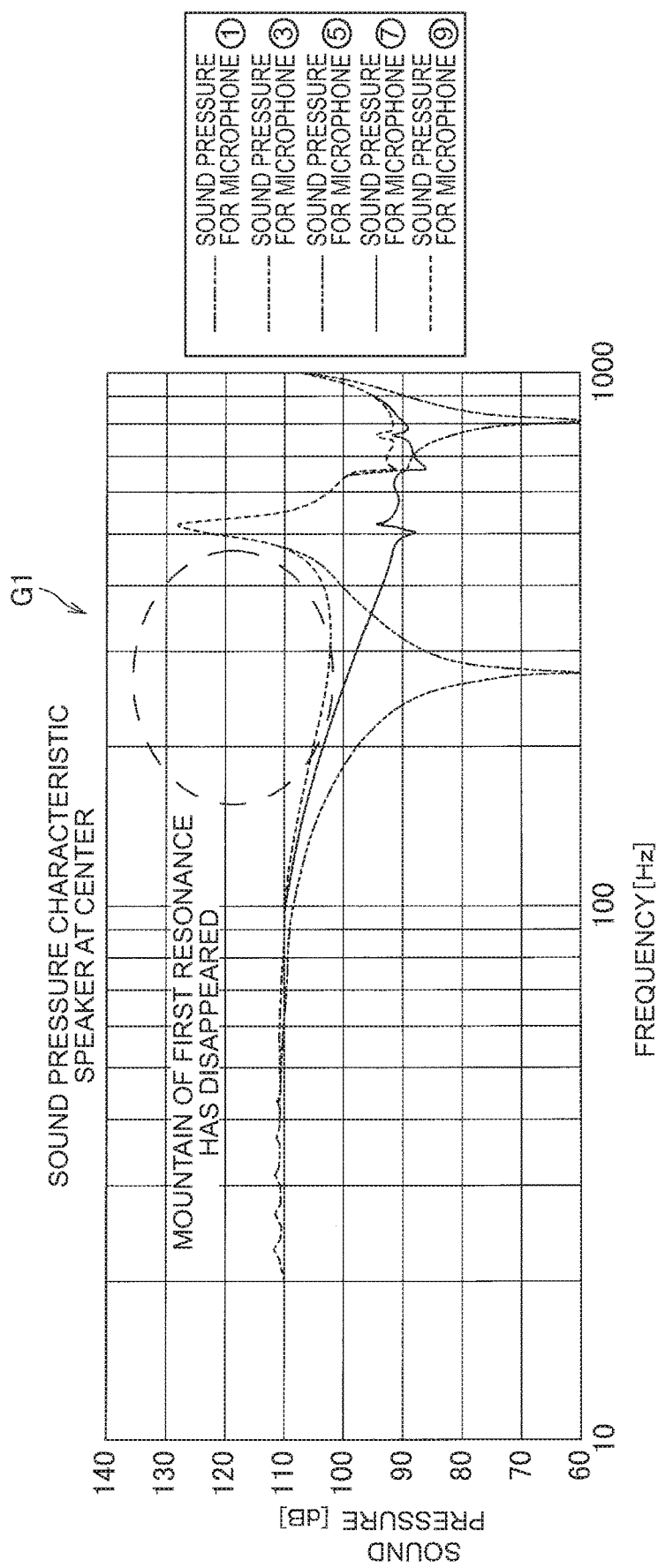
FIG. 52 is a graph showing a sound pressure characteristic of cancelling sounds collected at sound collecting microphones arranged at respective locations in the miniature box shown in FIG. 51.
Figure 53:
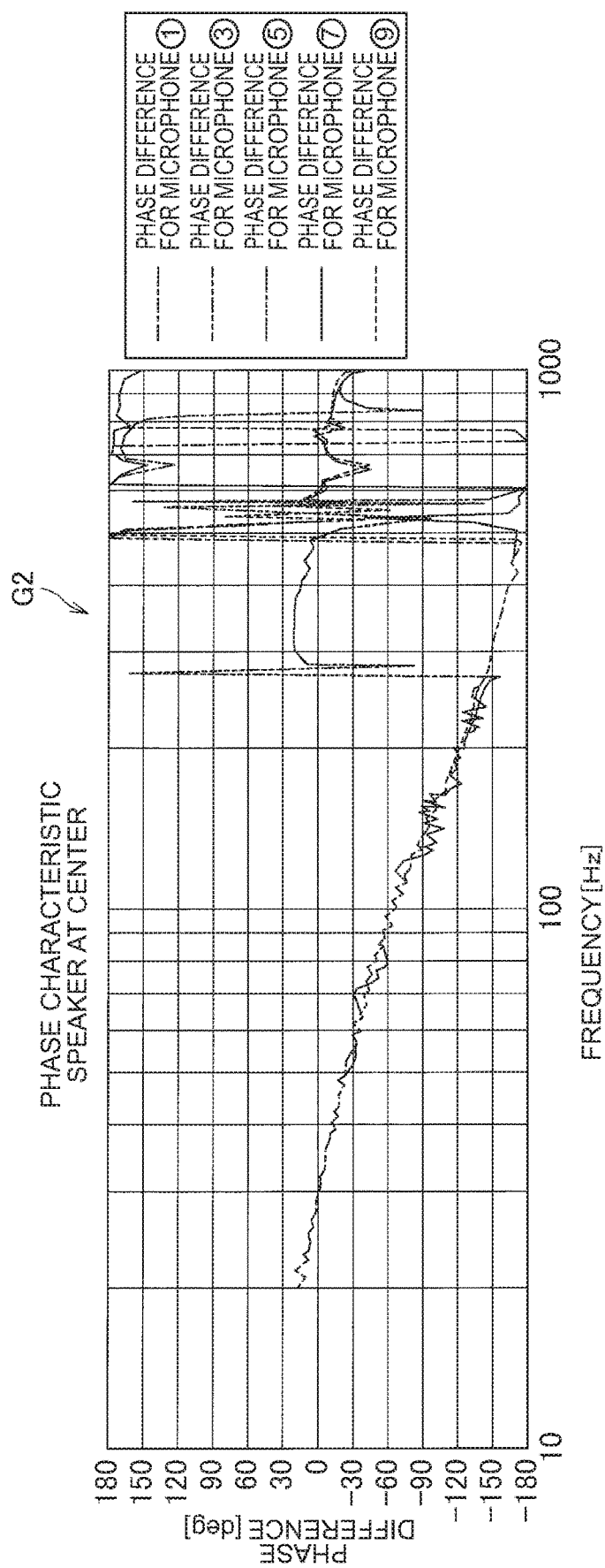
FIG. 53 is a graph showing a phase characteristic of cancelling sounds collected at the sound collecting microphones arranged at respective locations in the miniature box shown in FIG. 51.

FIG. 52 is a graph showing a sound pressure characteristic of the cancelling sounds collected at the sound collecting microphones arranged at the respective locations in the miniature box shown in FIG. 51. FIG. 53 is a graph showing a phase characteristic of the cancelling sounds collected at the sound collecting microphones arranged at the respective locations in the miniature box shown in FIG. 51.

In a graph G1 of the sound pressure characteristic shown in FIG. 52, a vertical axis corresponds to sound pressure (dB) of the cancelling sound and a horizontal axis corresponds to frequency (Hz) of the cancelling sound. The sound pressure characteristic of the cancelling sound at a first collecting microphone M1 is indicated by a one-dot chain line, the sound pressure characteristic of the cancelling sound at a third collecting microphone M3 is indicated by a two-dot chain line, the sound pressure characteristic of the cancelling sound at a fifth collecting microphone M5 is indicated by a three-dot chain line, the sound pressure characteristic of the cancelling sound at a seventh collecting microphone M7 is indicated by a solid line, and the sound pressure characteristic of the cancelling sound at a ninth collecting microphone M9 is indicated by a dotted line.

In graph G2 of the phase characteristic shown in FIG. 53, a vertical axis corresponds to phase difference (deg) of a cancelling sound with respect to an input signal, and a horizontal axis corresponds to frequency (Hz). The phase characteristic of the cancelling sound at the first collecting microphone M1 is indicated by a one-dot chain line, the phase characteristic of the cancelling sound at the third collecting microphone M3 is indicated by a two-dot chain line, the phase characteristic of the cancelling sound at the fifth collecting microphone M5 is indicated by a three-dot chain line, the phase characteristic of the cancelling sound at the seventh collecting microphone M7 is indicated by a solid line, and the phase characteristic of the cancelling sound at a ninth collecting microphone M9 is indicated by a dotted line.

Herein, to look at the effect of the position of the speaker device 10 of this example, in this simulation, two comparative examples located at different positions from the speaker device 10 of this example are also subjected to the similar measurement.

Figure 54:
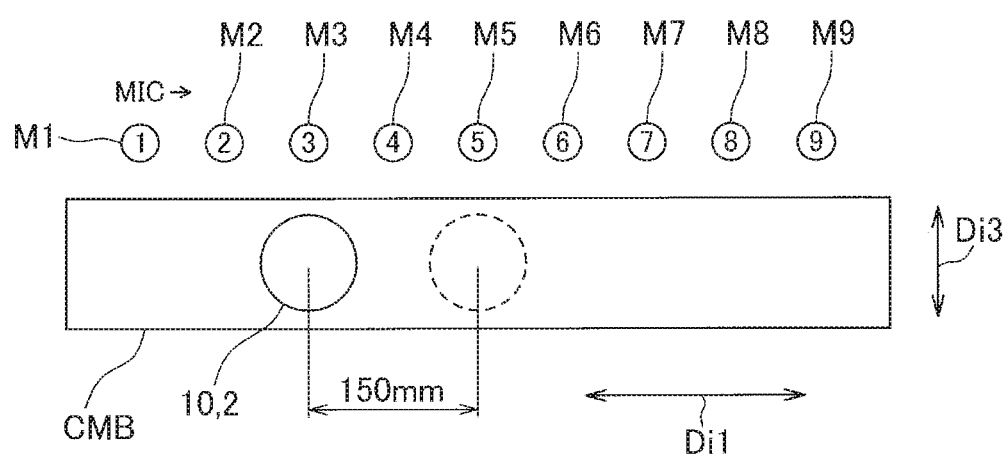
FIG. 54 is a schematic diagram showing a miniature box for simulation corresponding to Comparative Example 4.
Figure 55:
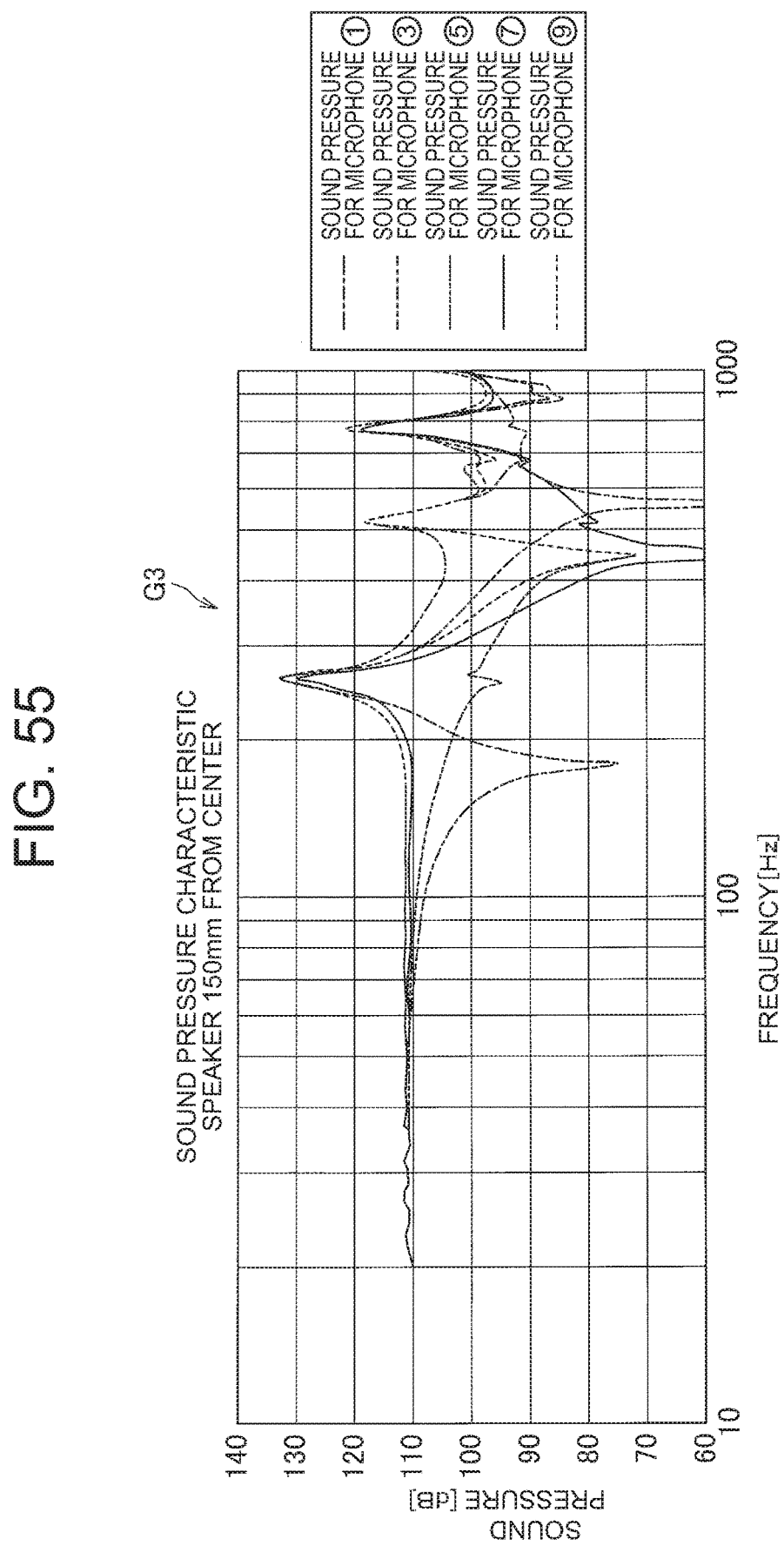
FIG. 55 is a graph showing a sound pressure characteristic of cancelling sounds collected at sound collecting microphones arranged at respective locations in the miniature box of Comparative Example 4 shown in FIG. 54.
Figure 58:
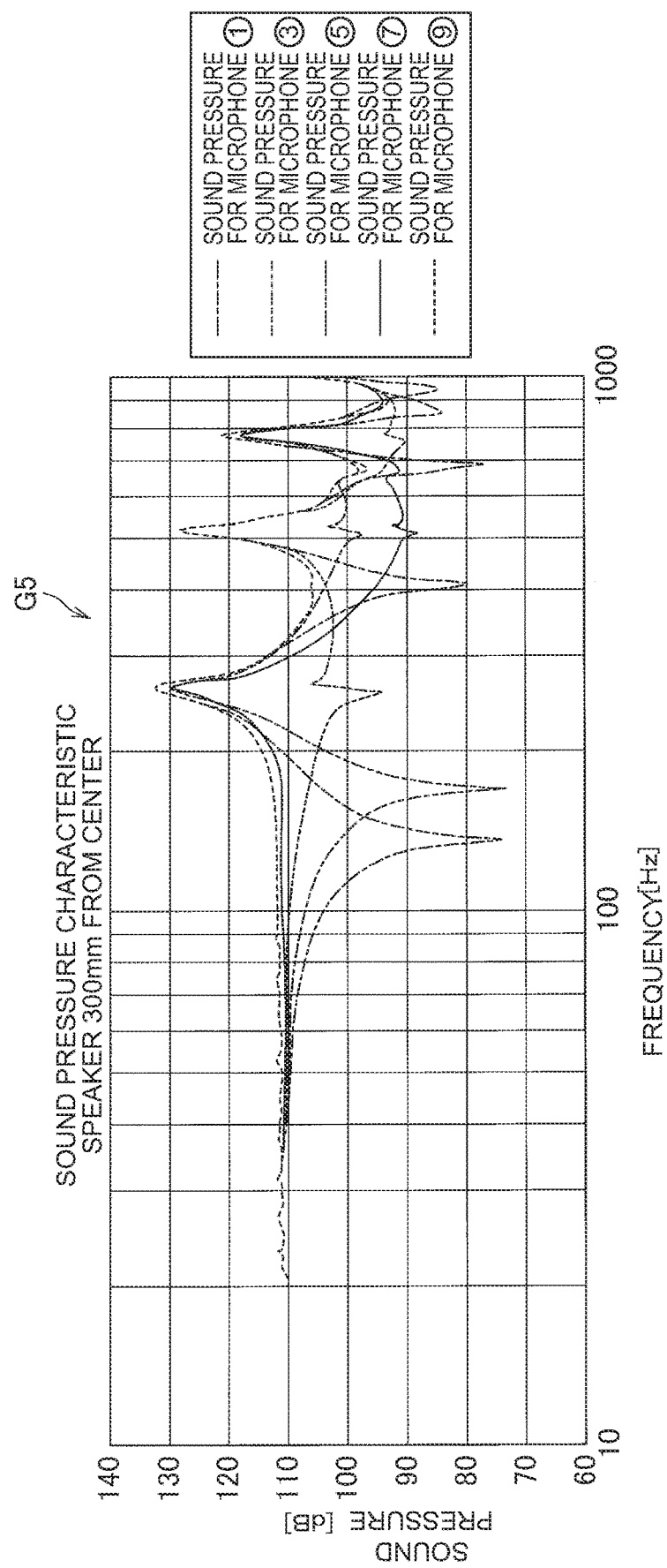
FIG. 58 is a graph showing sound pressure characteristic of cancelling sounds collected at sound collecting microphones arranged at respective locations in the miniature box of Comparative Example 4 shown in FIG. 57.

FIG. 54 is a schematic diagram showing a miniature box for simulation corresponding to Comparative Example 4. FIG. 55 is a graph showing a sound pressure characteristic of cancelling sounds collected at sound collecting microphones arranged at respective locations in the miniature box of Comparative Example 4 shown in FIG. 54. FIG. 58 is a graph showing a phase characteristic of cancelling sounds collected at the sound collecting microphones arranged at respective locations in the miniature box of Comparative Example 4 shown in FIG. 54.

Figure 56:
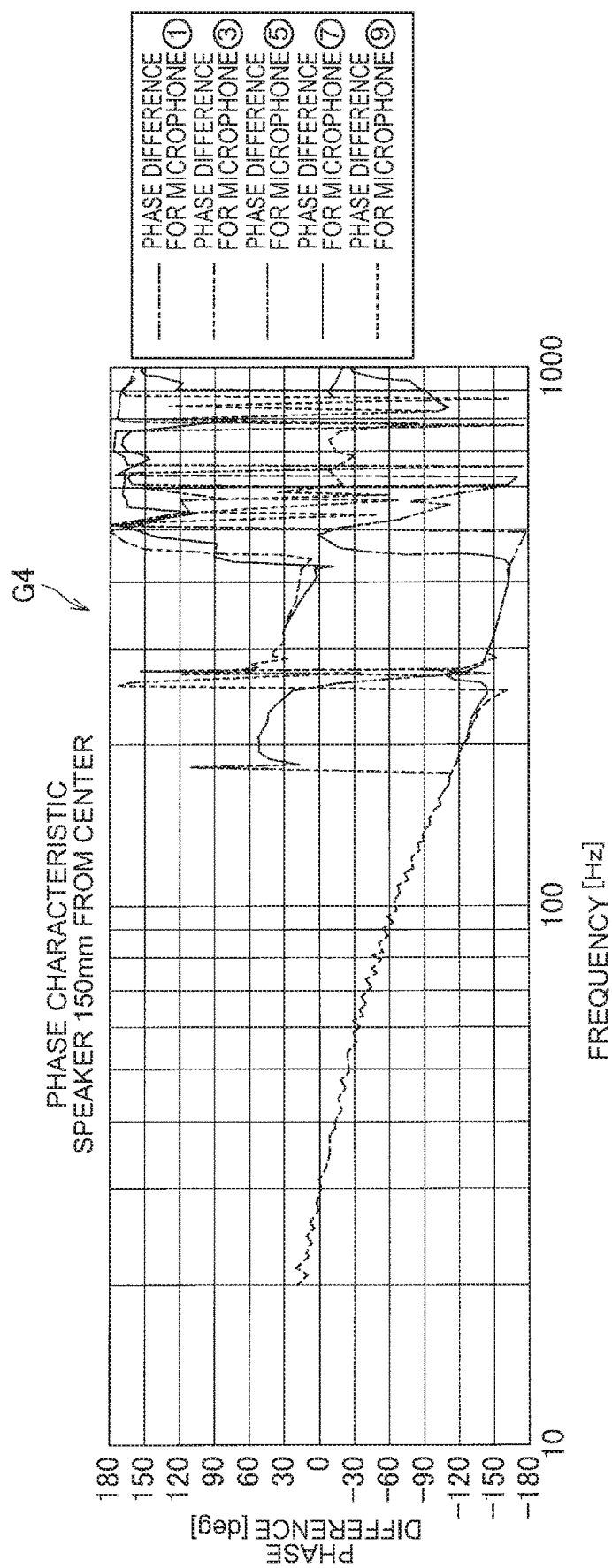
FIG. 56 is a graph showing a phase characteristic of cancelling sounds collected at the sound collecting microphones arranged at respective locations in the miniature box of Comparative Example 4 shown in FIG. 54.

In the simulations of Comparative Example 4 shown in FIG. 54 to FIG. 56, the speaker unit 2 of the speaker device 10 is positioned at a position displaced 150 mm to the front side from substantially the center of the miniature CMB in the front-rear direction Di1. In the right-left direction Di3, the speaker unit 2 of the speaker device 10 is positioned substantially at the center.

A graph G3 of the sound pressure characteristic shown in FIG. 55 and a graph G4 of the phase characteristic shown in FIG. 56 are similar to the graph G1 of the sound pressure characteristic shown in FIG. 52 and the graph G2 of the phase characteristic shown in FIG. 53, respectively. In the graph G3 of the sound pressure characteristic of FIG. 55, the sound pressure characteristic of the respective cancelling sounds at the first sound collecting microphone M1, the third sound collecting microphone M3, the fifth sound collecting microphone M5, the seventh sound collecting microphone M7 and the ninth sound collecting microphone M9, under the condition of Comparative Example 4, are shown with various types of lines. Similarly, in the graph G4 of the phase characteristic of FIG. 56, the phase characteristic of the respective cancelling sounds at the first sound collecting microphone M1, the third sound collecting microphone M3, the fifth sound collecting microphone M5, the seventh sound collecting microphone M7 and the ninth sound collecting microphone M9, are shown with various types of lines.

Figure 57:
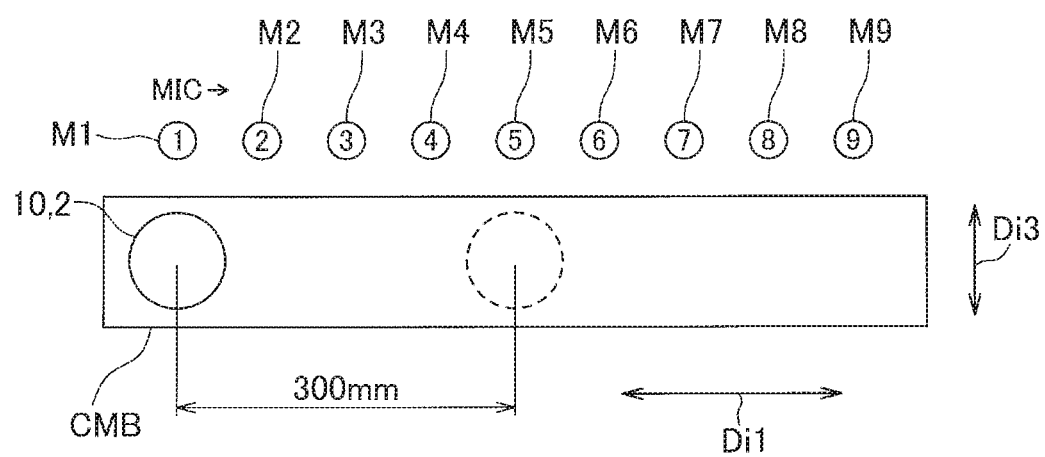
FIG. 57 is a schematic diagram showing a miniature box for simulation corresponding to Comparative Example 4.
Figure 59:
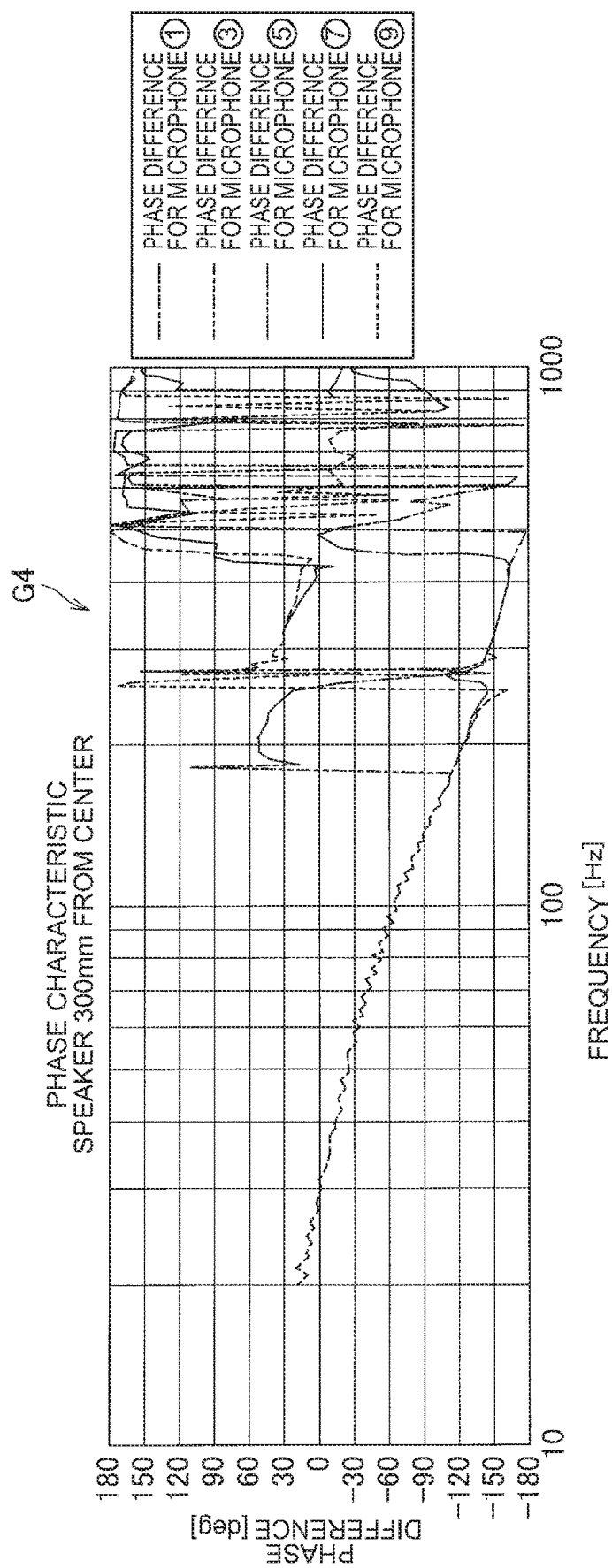
FIG. 59 is a graph showing a phase characteristic of cancelling sounds collected at the sound collecting microphones arranged at respective locations in the miniature box of Comparative Example 4 shown in FIG. 57.

FIG. 57 is a schematic diagram showing a miniature box for simulation corresponding to Comparative Example 4. FIG. 58 is a graph showing a sound pressure characteristic of cancelling sounds collected at sound collecting microphones arranged at respective locations in the miniature box of Comparative Example 4 shown in FIG. 57. FIG. 59 is a graph showing a phase characteristic of cancelling sounds collected at the sound collecting microphones arranged at respective locations in the miniature box of Comparative Example 4 shown in FIG. 57.

In the simulation of Comparative Example 4 shown in FIG. 57 to FIG. 59, the speaker unit 2 of the speaker device 10 is positioned at a position displaced 300 mm to the front side from substantially the center of the miniature CMB in the front-rear direction Di1. In the right-left direction Di3, the speaker unit 2 of the speaker device 10 is positioned substantially at the center.

In the graph G5 of the sound pressure characteristic of FIG. 58, the sound pressure characteristic of the respective cancelling sounds at the first sound collecting microphone M1, the third sound collecting microphone M3, the fifth sound collecting microphone M5, the seventh sound collecting microphone M7 and the ninth sound collecting microphone M9, under the condition of Comparative Example 4, are shown with various types of lines. Similarly, in the graph G4 of the phase characteristic of FIG. 59, the phase characteristic of the respective cancelling sounds at the first sound collecting microphone M1, the third sound collecting microphone M3, the fifth sound collecting microphone M5, the seventh sound collecting microphone M7 and the ninth sound collecting microphone M9, are shown with various types of lines. It is noted that this miniature box is sized to be about ⅕ of an actual vehicle. Thus, when the frequency of the result is converted to the size of the actual vehicle, it is considered that it will be substantially ⅕ of the frequency of the result.

In both of Comparative Example 3 and Comparative Example 4 in which the speaker unit 2 of the speaker device 10 are positioned displaced from substantially the center in the front-rear direction Di1, there is a peak corresponding to a first resonance appearing between 200 Hz to 300 Hz, as shown in FIG. 55 and FIG. 58. When converted in the actual vehicle size, it corresponds to 40 Hz to 50 Hz. As a result, as shown in FIG. 56 and FIG. 59, there is a sudden change in the phase difference around the first resonance frequency in both cases. Thus, in Comparative Example 3 and Comparative Example 4, the sudden change in the phase difference may cause the phase of the cancelling sound in each location likely to be displaced from the phase opposite to the phase of the noise sound, making it difficult to cancel the noise. In addition, the changes in the phase differences vary between the locations of the miniature CMB. As a result, the degree of the cancelling of the noise may vary between the locations.

Here, in general, when a sound is generated in a box-like space, a standing wave may be formed due to reflected sounds between opposing walls of walls defining the space. The first resonance described above is due to this standing wave, and it is considered that in Comparative Example 3 and Comparative Example 4, the effect of this standing wave is strong, causing a variation in the phase difference as described above.

In contrast, in this example, as can be seen from the simulation of FIG. 51 to FIG. 53, firstly, the first resonance peak as the one shown in FIG. 55 and FIG. 58 is shifted to the higher sound region. Consequently, for the middle and low-pitched sound region equal to or less than 100 Hz which is effective in the noise cancelling, both of the sound pressure and the phase difference with respect to the input signal are stabilized regardless of the frequency of the input signal and the locations in the space, as shown in FIG. 52 and FIG. 53.

In this example, both of the sound pressure and the phase difference are stable as described above by arranging the speaker device 10 such that the speaker unit 2 itself is positioned substantially the center in both directions of the front-rear direction Di1 and the right-left direction Di3 in the vehicle interior space A3. Consequently, the cancelling sound by the input signal adjusted based on the collected noise can be made not likely to be displaced from the phase opposite to the phase of the noise at each location in the vehicle interior space A3. As a result, the noise at each location in the vehicle interior space A3 can be cancelled successfully.

Further, in the speaker system for active noise control 1Y of this example, the speaker device 10 includes the speaker unit 2 generating a sound as a sound emitting part. This speaker unit 2 itself is arranged substantially the center in both directions of the front-rear direction Di1 and the right-left direction Di3 of the vehicle C in the vehicle interior space A3. Consequently, the configuration of the system is simplified, making it easy to install the speaker system for active noise control 1Y to the vehicle C.

Further, in the speaker system for active noise control 1Y of this example, the speaker device 10 includes the speaker unit 2 that generates a sound and the enclosure 3 accommodating the speaker unit 2. In addition, the elastic member 8A connected to the diaphragm 300 of the speaker unit 2 is arranged as shown in FIG. 2. This elastic member 8A serves as the resonance element configured to generate a resonance sound of a frequency different from the lowest resonance frequency of the speaker unit 2.

By providing the elastic member 8A as the resonance element, the sound pressure characteristic of the generated sound by the speaker device 10 has a sub-peak at a frequency corresponding to the resonance sound produced by the elastic member 8A, other than a peak corresponding to the lowest resonance frequency of the speaker unit 2. The phase characteristic of the speaker device 10 show a tendency that the phase difference decreases as the frequency increases, but since the sound pressure characteristic includes the sub-peak, the graph of the phase characteristic is deformed so as to be convex downward at the frequency of the sub-peak or in the vicinity thereof. Thus, the graph of the phase characteristic includes a flat region where change in the phase difference is relatively small. At the frequencies in such flat region, the generated sound by the speaker device 10 can be easily made to have a phase opposite to a phase of the noise, thereby making it easy to reduce the noise. The flat region can be adjusted by appropriately setting the frequency of the resonance sound by the elastic member 8A, thereby the frequency range in which the noise can be easily reduced can be adjusted. As a result, the noise at respective locations in the vehicle interior space A3 can be cancelled further successfully.

Further, since the ¼ wavelength of the resonance sound generated by the elastic member 8A as the resonance element is longer than twice a distance between tragi (e.g., 0.15 m), a difference between absolute values of the sound pressures at right and left ears produced when the sound wave of the resonance sound has reached to a head of a user (a passenger of the mobile object) can be reduced. That is, a path difference of up to the distance between the tragi may be produced between the sound waves reaching to the right and left ears of the user. At this time, with the ¼ wavelength of the resonance sound being longer than twice the distance between the tragi, the phase difference between the sound waves reaching to the right and left ears is reduced, and thus the difference between the absolute values of the sound pressures is reduced. Consequently, the right/left difference of the effect obtained by forming the above-described flat region can be reduced. Further, even when the positional relationship between the sound generating device and the head of the user has changed (for example when the passenger on a seat has moved his/her head), the right/left difference can be reduced in the similar manner.

Example 17

Next, a speaker system for active noise control according to Example 17 of the present invention will be explained. In Example 17, an arrangement position of a speaker device is different from Example 16. In the following, Example 17 will be explained focusing on the difference from Example 16.

Figure 60:
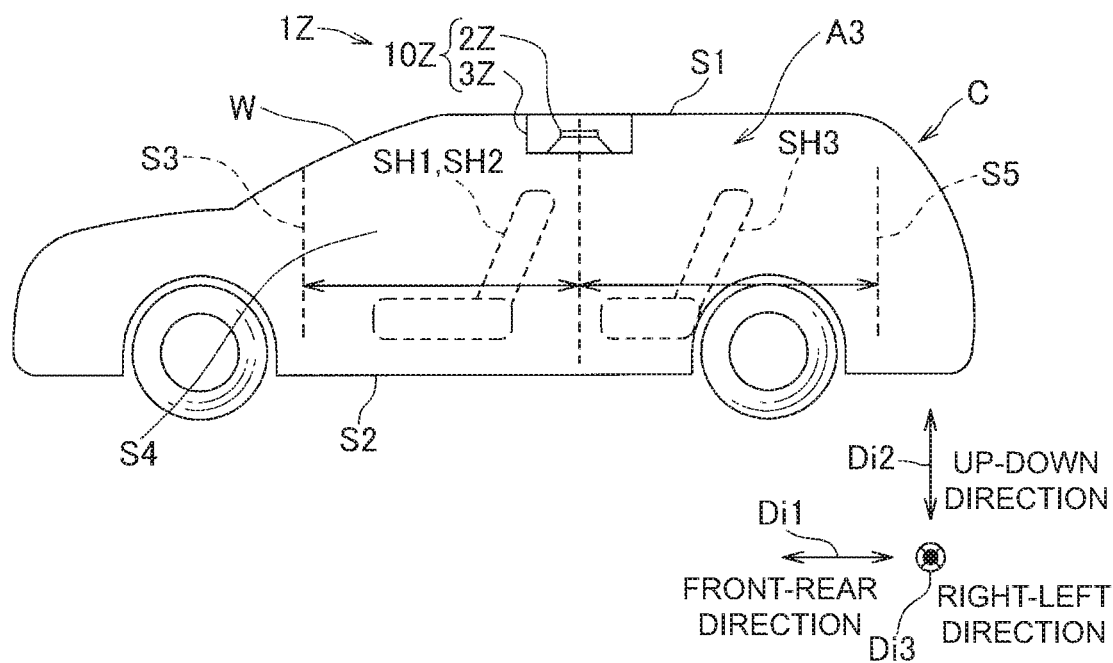
FIG. 60 is a schematic diagram showing a speaker system for active noise control according to Example 17 of the present invention.

FIG. 60 is a schematic diagram showing a speaker system for active noise control according to Example 17 of the present invention. In FIG. 60, elements equivalent to those shown in FIG. 50 are denoted by the same reference signs as FIG. 50, and explanations of these similar elements are omitted in the following.

In a speaker system for active noise control 1Z of this example, a speaker device 10Z is configured as follows. That is, similarly to the speaker unit 2 of Example 1 shown in FIG. 2, the speaker system for active noise control 1Z includes the speaker unit 2Z having the elastic member 8A as the resonance element, and an enclosure 3Z accommodating the speaker unit 2Z.

In this example, the speaker device 10Z is arranged such that the speaker unit 2Z itself is positioned substantially at the center in both of the front-rear direction Di1 and the right-left direction Di3 of a vehicle C in an vehicle interior space A3. Specifically, as shown in FIG. 60, it is arranged on an upper face S1 at a position between a driver's seat SH1 and an assistant driver's seat SH2, and a rear seat SH3, and substantially at the center in the right-left direction Di3, with a diaphragm 300 facing to a lower face S2.

Of course, as in the case of Example 16, in the speaker device 10Z arranged at this position also, for the middle and low-pitched sound region which is effective in the noise cancelling, the cancelling sound having stable sound pressure characteristic and phase characteristic as shown in FIG. 52 and FIG. 53 can be obtained at respective locations in the vehicle interior space A3. Consequently, the speaker system for active noise control 1Z of this example can also successfully cancel the noise at the respective locations in the vehicle interior space A3.

Example 18

Next, a speaker system for active noise control according to Example 18 of the present invention will be explained. In Example 18 also, arrangement position of a speaker device is different from Example 16. In the following, Example 18 will be explained focusing on the difference from Example 16.

Figure 61:
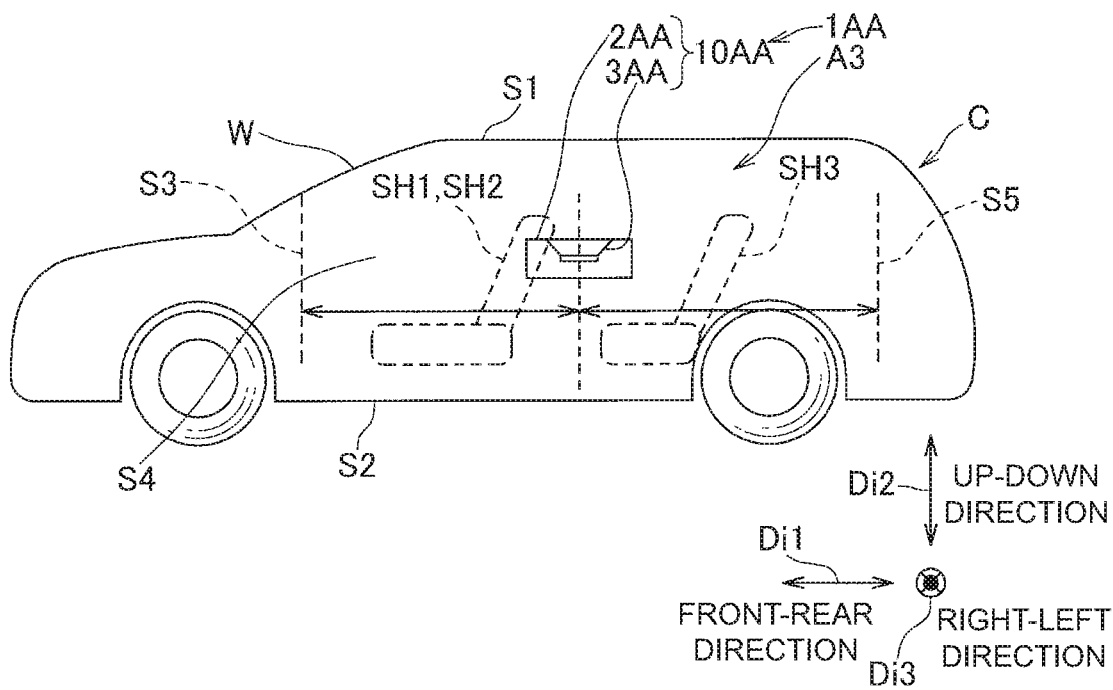
FIG. 61 is a schematic diagram showing a speaker system for active noise control according to Example 18 of the present invention.

FIG. 61 is a schematic diagram showing a speaker system for active noise control according to Example 18 of the present invention. In FIG. 61 also, elements equivalent to those shown in FIG. 50 are denoted by the same reference signs as FIG. 50, and explanations of these equivalent elements are omitted in the following.

In a speaker system for active noise control 1AA of this example also, a speaker device 10AA is includes a speaker unit 2AA similar to the speaker unit 2 of Example 1 shown in FIG. 2, and an enclosure 3AA accommodating the speaker unit 2AA.

In this example, the speaker device 10AA is arranged such that the speaker unit 2AA itself is positioned substantially at the center in both of the front-rear direction Di1 and the right-left direction Di3 of a vehicle C in an vehicle interior space A3. Specifically, as shown in FIG. 60, it is arranged at a position between a driver's seat SH1 and an assistant driver's seat SH2, and a rear seat SH3, and substantially at the center in the right-left direction Di3, with a diaphragm 300 facing to an upper face S1. In addition, in this example, the speaker device 10AA is arranged such that the speaker unit 2AA itself is positioned substantially at the center also in the up-down direction Di2 of the vehicle C in the vehicle interior space A3.

As in the case of Example 16, the speaker system for active noise control 1AA of this example having the speaker device 10AA arranged at this position can also successfully cancel out the noise at respective locations in the vehicle interior space A3. Further, according to this example, for the up-down direction Di2 also, the cancelling sound having stable sound pressure characteristic and phase characteristic can be obtained at respective locations in the vehicle interior space A3. Consequently, according to the speaker system for active noise control 1AA of this example can further successfully cancel out the noise at respective locations in the vehicle interior space A3.

Example 19

Next, a speaker system for active noise control according to Example 19 of the present invention will be explained. In Example 19, a speaker unit provided to a speaker device is different from Example 16. In the following, Example 19 will be explained focusing on the difference from Example 16.

Figure 62:
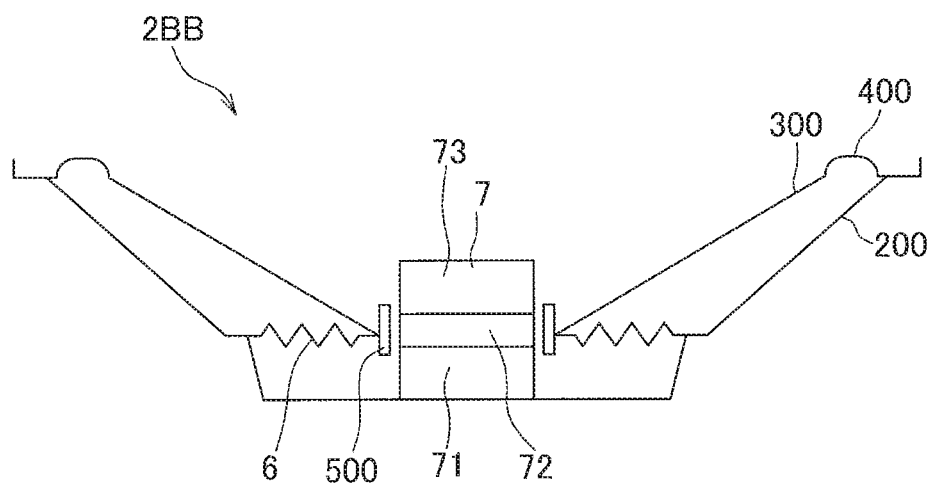
FIG. 62 is a diagram showing an interior structure of a speaker unit provided in a speaker system for active noise control according to Example 19 of the present invention.

FIG. 62 is a diagram showing an interior structure of a speaker unit provided in a speaker system for active noise control according to Example 19 of the present invention. In FIG. 62, elements equivalent to those shown in FIG. 2 are denoted by the same reference signs as FIG. 2, and explanations of these equivalent elements are omitted in the following.

Unlike the speaker unit 21A, 22A of Example 1 shown in FIG. 2, a speaker unit 2BB of this example is not provided with the elastic member 8A. Thus, the speaker unit 2BB of this example has its original lowest resonance frequency, and the sound pressure changes in the vicinity of this frequency. In this example, when controlling the input signal for the cancelling sound of the speaker unit 2BB, the control that takes into account the original lowest resonance frequency will be performed.

Of course, as in the case of Example 16, in this example also, the speaker device having this speaker unit 2BB is arranged at the same position as Example 16 shown in FIG. 50, thereby obtaining the advantageous effect of suppressing the effect of the standing wave. It should be noted, however, that in Example 16, by providing the elastic member 8A to the speaker unit 2, the sound pressure characteristic and the phase characteristic can be stabilized for the generated sound of the speaker device itself, thereby further successfully cancelling out the noise, as described above.

In is noted that, the speaker device 10, 10AA described above may have the same configuration as the sound generating device for mobile object 1G shown in FIG. 21 explained in Example 7.

Example 20

Next, a speaker system for active noise control according to Example 20 of the present invention will be explained. In Example 20, structure of a speaker device is different from Example 16. In the following, Example 20 will be explained focusing on this difference from Example 16.

Figure 63:
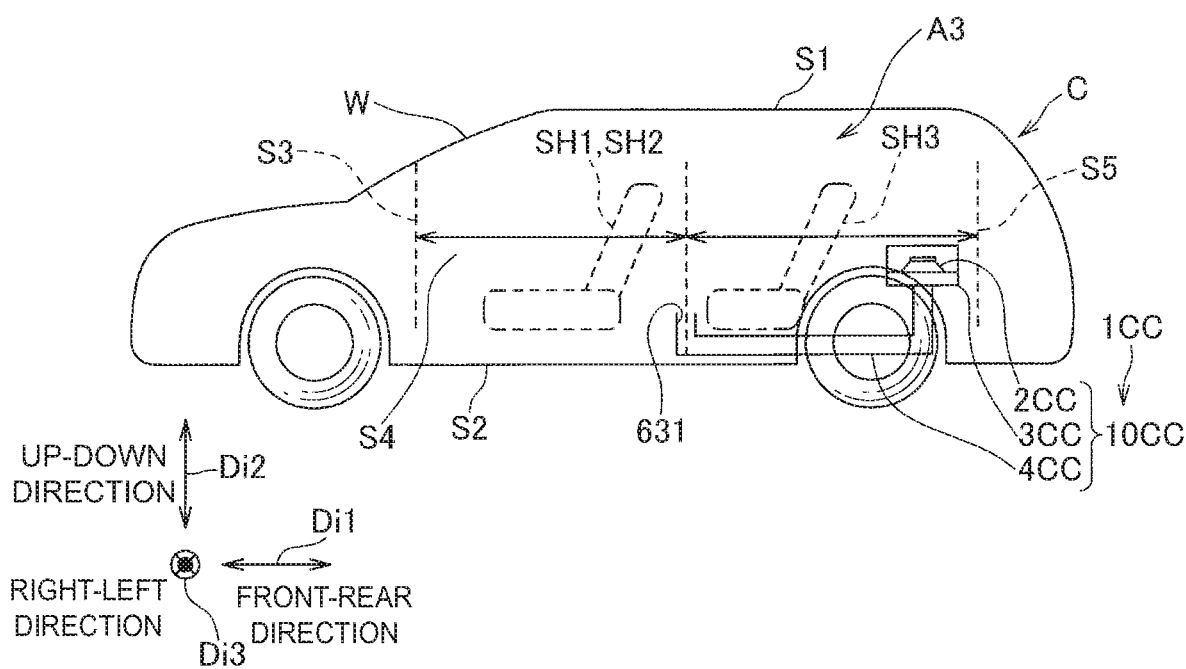
FIG. 63 is a diagram showing a speaker system for active noise control according to Example 20 of the present invention.

FIG. 63 is a diagram showing a speaker system for active noise control according to Example 20 of the present invention. In FIG. 63, elements equivalent to those shown in FIG. 50 are denoted by the same reference signs as FIG. 50, and explanations of these equivalent elements are omitted in the following.

In a speaker system for active noise control 1CC of this example, a speaker device 10CC is configured as follows. That is, the speaker device 10CC includes the speaker unit 2CC that emits a sound, an enclosure 3CC accommodating the speaker unit 2CC, and an acoustic tube 4CC as a sound emitting part that guides the sound of the speaker unit 2CC and emits the sound from an opening 631 at one end. The speaker unit 2CC is similar to the speaker unit 21A, 22A of Example 1 shown in FIG. 2. The acoustic tube 4CC is a tubular member, and the other end on the opposite side of the above-described opening 631 is connected to a wall of the enclosure 3CC on the sound emitting side of the speaker unit 2CC and opens towards the speaker unit 2CC.

In this example, the enclosure 3CC accommodating the speaker unit 2CC is arranged in the vicinity of the rear face S5 in the vehicle interior space A3. Further, this enclosure 3CC is arranged such that the sound emitting side of the speaker unit 2CC is located on a lower face S2 side of the vehicle interior space A3. The acoustic tube 4CC extending from this enclosure 3CC extends along the lower face S2 towards a location located substantially at the center in both directions of the front-rear direction Di1 and the right-left direction Di3 in the vehicle interior space A3. The opening 631 of the acoustic tube 4CC is arranged at this location located substantially at the center. In this example, in the up-down direction Di2, the opening 631 of the acoustic tube 4CC is located close to the lower face S2 in the vehicle interior space A3.

In the speaker system for active noise control 1CC of this example, the noise cancelling sound is emitted from the opening 631 arranged at the above-described location located substantially at the center. Consequently, the effect of the standing wave can be suppressed as in the case where the speaker unit is arranged at this location located substantially at the center, thereby successfully cancelling out the noise at respective locations in the vehicle interior space A3.

In this example, for the enclosure 3CC accommodating the speaker unit 2CC, the degree of freedom in designing of the arrangement in the vehicle interior space A3 is increased. Thus, in this example, based on the high degree of freedom in designing, the arrangement of the enclosure 3CC is chosen to be in the vicinity of the rear face S5. Similarly, for the arrangement route of the acoustic tube 4CC also, high degree of freedom in designing is guaranteed, and based on this high degree of freedom, the arrangement route along the lower face S2 is chosen.

Example 21

Next, a speaker system for active noise control according to Example 21 of the present invention will be explained. In Example 21 also, structure of a speaker device is different from Example 16. In the following, Example 21 will be explained focusing on this difference from Example 16.

Figure 64:
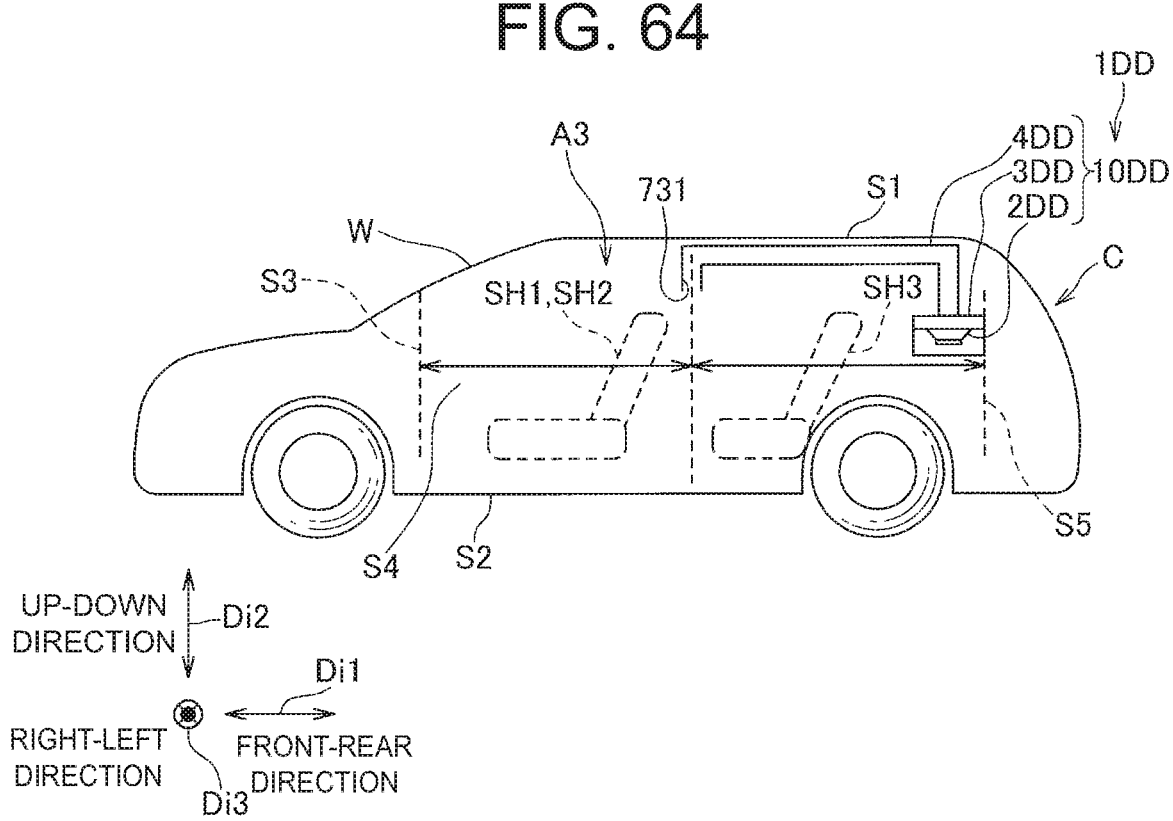
FIG. 64 is a diagram showing a speaker system for active noise control according to Example 21 of the present invention.

FIG. 64 is a diagram showing a speaker system for active noise control according to Example 21 of the present invention. In FIG. 64 also, elements equivalent to those shown in FIG. 50 are denoted by the same reference signs as FIG. 50, and explanations of these equivalent elements are omitted in the following.

A speaker system for active noise control 1DD of this example is a modified example of the speaker system for active noise control 1CC of Example 20 shown in FIG. 63. In a speaker device 10DD of this example also, an enclosure 3DD accommodating a speaker unit 2DD is arranged in the vicinity of the rear face S5 of the vehicle interior space A3, and an acoustic tube 4DD extends from this enclosure 3DD.

In this example, the enclosure 3DD is arranged such that a sound emitting side of the speaker unit 2DD is on the upper face S1 side. The acoustic tube 4DD extends from a wall of the enclosure 3DD on the upper face S1 side and extends along the upper face S1. An opening 731 of this acoustic tube 4DD is located at a location substantially at the center in both directions of the front-rear direction Di1 and the right-left direction Di3 in the vehicle interior space A3. In this example, in the up-down direction Di2, the opening 731 of the acoustic tube 4DD is located close to the upper face S1 in the vehicle interior space A3.

Of course, according to the speaker system for active noise control 1DD of this example also, the effect of the standing wave can be suppressed as in the case of Example 16, thereby successfully cancelling out the noise at respective locations in the vehicle interior space A3.

Further, as in the case of Example 20, in this example also, for the enclosure 3DD accommodating the speaker unit 2DD and for the acoustic tube 4DD, the arrangement of the enclosure 3DD in the vicinity of the rear face S5 and the arrangement route of the acoustic tube 4DD along the lower face S2 is chosen based on the high degree of freedom in designing of the arrangement.

Example 22

Next, a speaker system for active noise control according to Example 22 of the present invention will be explained. In Example 22 also, structure of a speaker device is different from Example 16. In the following, Example 22 will be explained focusing on this difference from Example 16.

Figure 65:
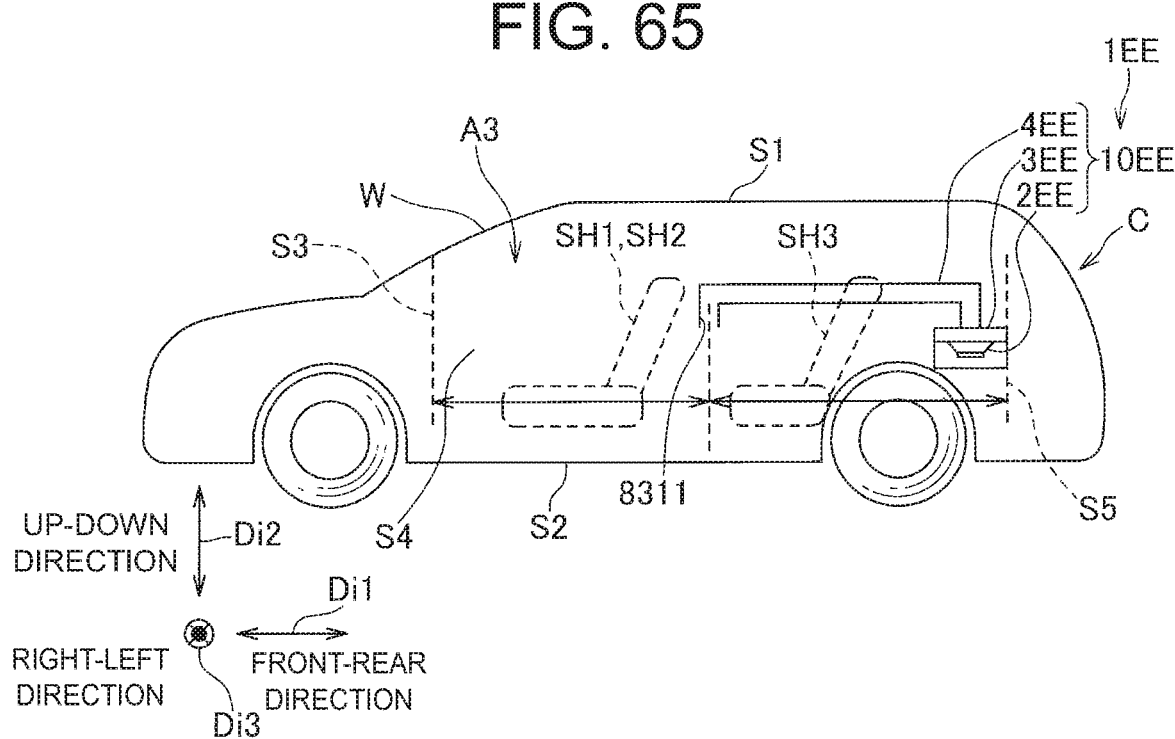
FIG. 65 is a diagram showing a speaker system for active noise control according to Example 22 of the present invention.

FIG. 65 is a diagram showing a speaker system for active noise control according to Example 22 of the present invention. In FIG. 65 also, elements equivalent to those shown in FIG. 50 are denoted by the same reference signs as FIG. 50, and explanations of these equivalent elements are omitted in the following.

A speaker system for active noise control 1EE of this example is also a modified example of the speaker system for active noise control 1CC of Example 20 shown in FIG. 63. In a speaker device 10EE of this example also, an enclosure 3EE accommodating a speaker unit 2EE is arranged in the vicinity of the rear face S5 of the vehicle interior space A3.

An acoustic tube 4EE extends from a wall of the enclosure 3EE on the upper face S1 side which is the sound emitting side of the speaker unit 2EE. In this example, the acoustic tube 4EE extends close to the center in the up-down direction Di2, not close to the upper face S1. An opening 8311 of this acoustic tube 4EE is located at a location substantially at the center in all directions of the front-rear direction Di1, the right-left direction Di3 and the up-down direction Di2 in the vehicle interior space A3.

Of course, according to the speaker system for active noise control 1EE of this example also, the effect of the standing wave can be suppressed as in the case of Example 16, thereby successfully cancelling out the noise at respective locations in the vehicle interior space A3. In addition, in this example, the opening 8311 of the acoustic tube 4EE is arranged substantially at the center also in the up-down direction Di2, thus the noise at respective locations in the vehicle interior space A3 can be cancelled out even more successfully.

Further, as in the case of Example 20, in this example also, for the enclosure 3EE accommodating the speaker unit 2EE and for the acoustic tube 4EE, the arrangement of the enclosure 3EE and the arrangement route of the acoustic tube 4EE is chosen based on the high degree of freedom in designing of the arrangement.

Example 23

Next, a speaker system for active noise control according to Example 23 of the present invention will be explained. In Example 23 also, structure of a speaker device is different from Example 16. In the following, Example 23 will be explained focusing on this difference from Example 16.

Figure 66:
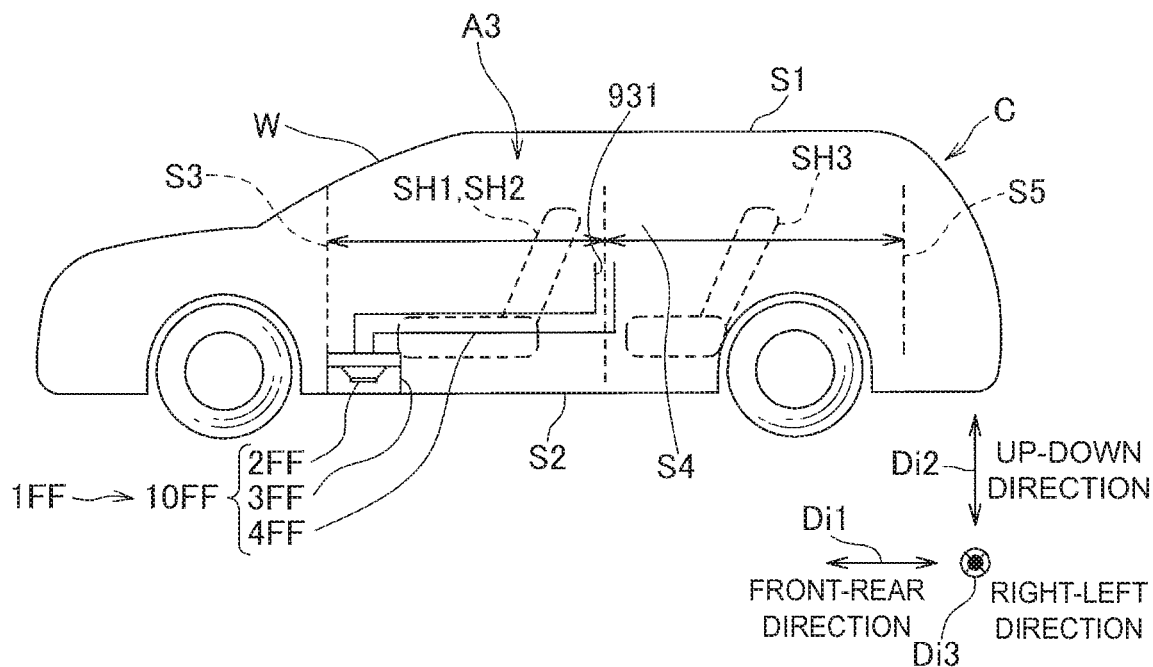
FIG. 66 is a diagram showing a speaker system for active noise control according to Example 23 of the present invention.

FIG. 66 is a diagram showing a speaker system for active noise control according to Example 23 of the present invention. In FIG. 66 also, elements equivalent to those shown in FIG. 50 are denoted by the same reference signs as FIG. 50, and explanations of these equivalent elements are omitted in the following.

A speaker system for active noise control 1FF of this example is also a modified example of the speaker system for active noise control 1CC of Example 20 shown in FIG. 63. In a speaker device 10FF of this example, an enclosure 3FF accommodating a speaker unit 2FF is arranged on the lower face S2 in the vicinity of the front face S3 in the vehicle interior space A3.

An acoustic tube 4FF extends from a wall of the enclosure 3FF on the upper face S1 side which is the sound emitting side of the speaker unit 2FF. In this example, the acoustic tube 4FF extends close to the center in the up-down direction Di2, not close to the lower face S2. An opening 931 of this acoustic tube 4FF is located at a location substantially at the center in all directions of the front-rear direction Di1, the right-left direction Di3 and the up-down direction Di2 in the vehicle interior space A3.

Of course, according to the speaker system for active noise control 1FF of this example also, the effect of the standing wave can be suppressed as in the case of Example 16, thereby successfully cancelling out the noise at respective locations in the vehicle interior space A3. In addition, in this example, the opening 931 of the acoustic tube 4FF is arranged substantially at the center also in the up-down direction Di2, thus the noise at respective locations in the vehicle interior space A3 can be cancelled out even more successfully.

Further, as in the case of Example 20, in this example also, for the enclosure 3FF accommodating the speaker unit 2FF and for the acoustic tube 4FF, the arrangement of the enclosure 3FF and the arrangement route of the acoustic tube 4FF is chosen based on the high degree of freedom in designing of the arrangement.

As described above, in Example 20 to Example 23 explained with reference to FIG. 63 to FIG. 66, the speaker unit 2CC, . . . , 2FF as a sound source of the cancelling sound, and the opening 631, . . . , 931 of the acoustic tube 4FF as a sound emitting opening of the cancelling sound are independent elements, respectively. Consequently, the degree of freedom in designing for the arrangement of the enclosure 3CC, . . . , 2FF accommodating the speaker unit 2CC, . . . , 2FF and for the arrangement route of the acoustic tube 4CC, . . . , 4FF increases, making the design and installation to the vehicle C to be easy.

The present invention is not limited to Examples 16 to 23 described above, and may include other configurations capable of achieving the object of the present invention, and modifications and such as described below are also included in the present invention.

For example, as an example of the speaker device as described in the present invention, Examples 16 to 23 show the speaker devices 10, . . . , 10FF having the cone type speaker units 2, . . . , 2FF. However, the speaker device as described in the present invention is not limited in the shape of the speaker unit, and the shape of the speaker unit may be a cone type or a dome type.

Further, as an example of the speaker device "including the speaker unit that itself is arranged substantially at a center in both of a front-rear direction and a right-left direction of a mobile object" as described in the present invention, Examples 16 to 18 show the speaker devices 10, 10Z, 10AA described as follows. That is, the speaker devices 10, 10Z, 10AA including the speaker units 2, 2Z, 2AA arranged on the lower face S2, the upper face S1 and substantially at the center in the up-down direction Di2 in the vehicle interior space A3, respectively, are shown. However, the speaker device as described above in the present invention is not limited to these, and the up-down direction of the mobile object may be set arbitrary.

Further, as an example of the speaker device including the speaker unit and the acoustic tube as described in the present invention, Examples 20 to 23 show the speaker devices 10CC, . . . , 10FF as described below. That is, the speaker devices 10CC, 10DD, 10EE including the speaker unit 2CC, 2DD, 2EE arranged in the vicinity of the rear face S5 in the vehicle interior space A3, and the speaker device 10FF arranged in the vicinity of the front face S3, are shown. However, the speaker device as described in the present invention is not limited to these, and the position of the speaker unit may be arranged in any mountable position in the vehicle, regardless of inside or outside the vehicle interior space. In addition, the arrangement route of the acoustic tube of the speaker device may be set arbitrary according to the position of the speaker unit and/or the structure of the vehicle.

Further, as an example of the resonance element as described in the present invention, Examples 16 to 18, 20 to 23 shown the elastic member 8A connected to the diaphragm 300. Further, Example 19 exemplary shows the vibration member 103 and the tubular part 102 provided to the enclosure 31G, 31G. However, the resonance element as described in the present invention is not limited to these, and specific configuration and installation space thereof may be selected arbitrary as long as it generates the resonance sound having the frequency different from the lowest resonance frequency of the speaker unit.

Further, as an example of the acoustic tube as described in the present invention, Examples 20 to 23 show the acoustic tube 4CC, . . . , 4FF which is a separate member from the enclosure 3CC, . . . , 3FF accommodating the speaker unit 2CC, . . . , 2FF. However, the acoustic tube of the present invention is not limited to these, and may be formed integrally with the enclosure, for example. One example of such acoustic tube may include, for example, an enclosure which itself is formed into a tubular shape and serving also as the acoustic tube.

Further, in Example 1 described above, the ¼ wavelength of the resonance sound generated by the elastic member 8A as the resonance element is set to be longer than twice a distance between tragi. However, the ¼ wavelength of the resonance sound may be set longer than a distance between tragi. Alternatively, the ¼ wavelength of the resonance sound may be set to be equal to or less than a distance between tragi, if a phase difference is not likely to be produced between the sound waves reaching to the right and left ears of the user, e.g., if the sound generating device is arranged in front of or at back of a user and a path difference is not likely to be produced between the sound waves reaching to the right and left ears of the user.

Example 24

Figure 67:
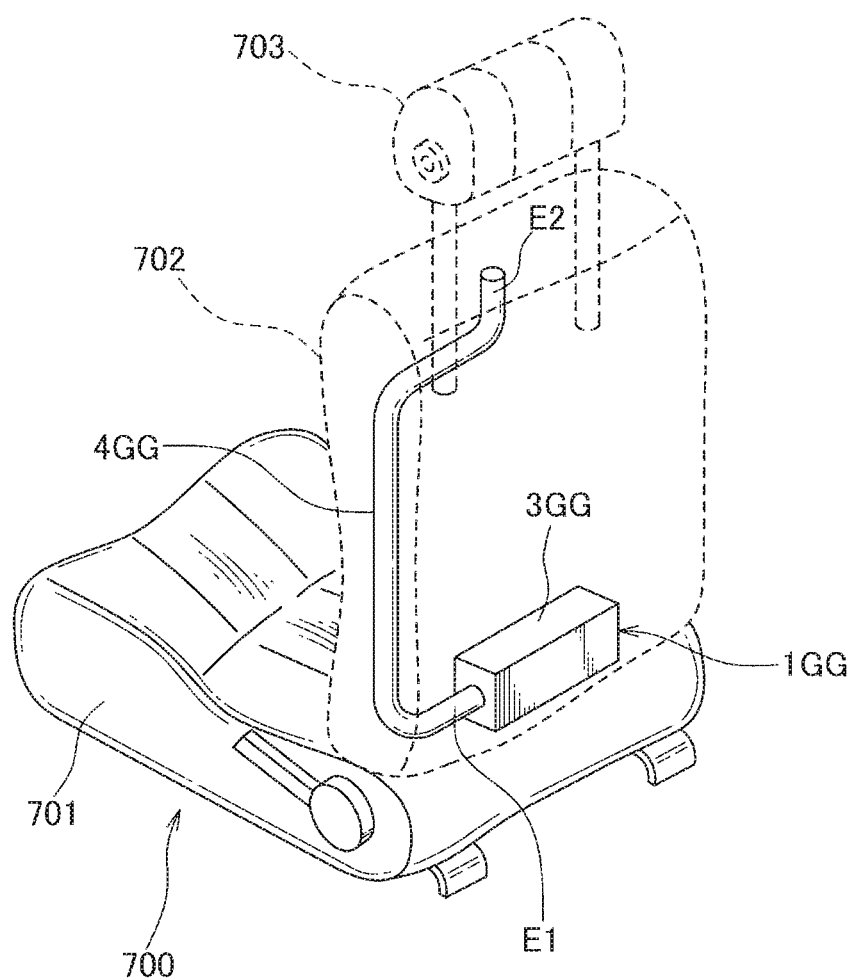
FIG. 67 is a perspective view of a sound generating device for mobile object according to Example 24 of the present invention.
Figure 68:
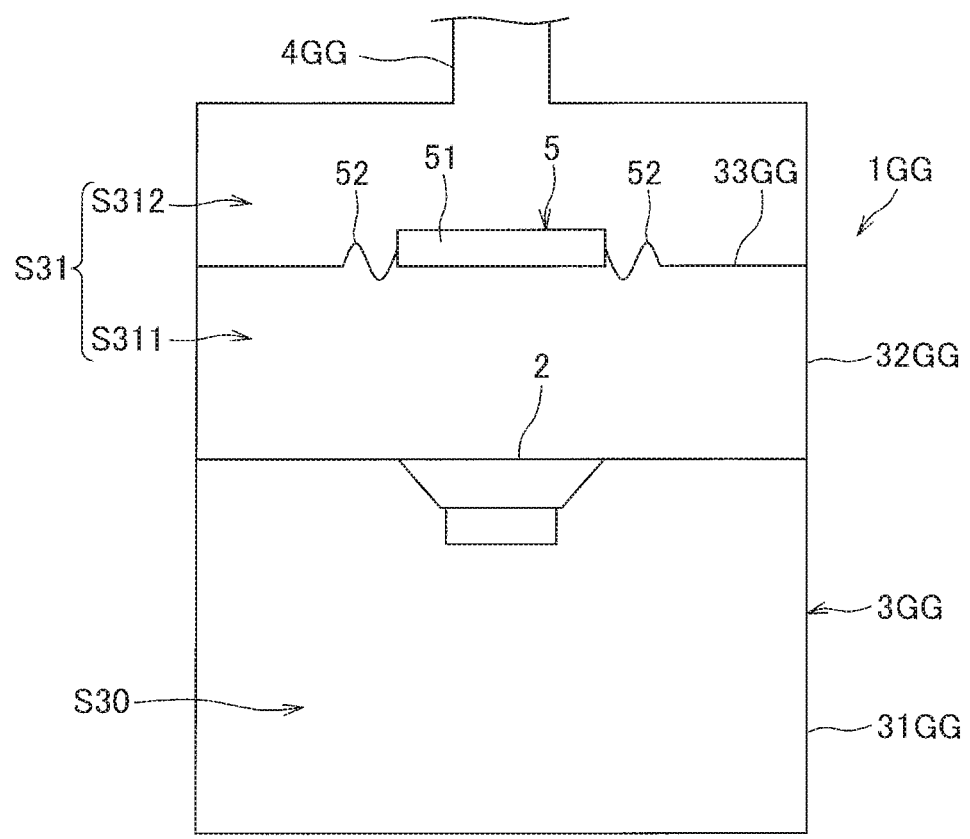
FIG. 68 is a cross-sectional view showing a schematic configuration of the sound generating device for mobile object of FIG. 1.
Figure 69:
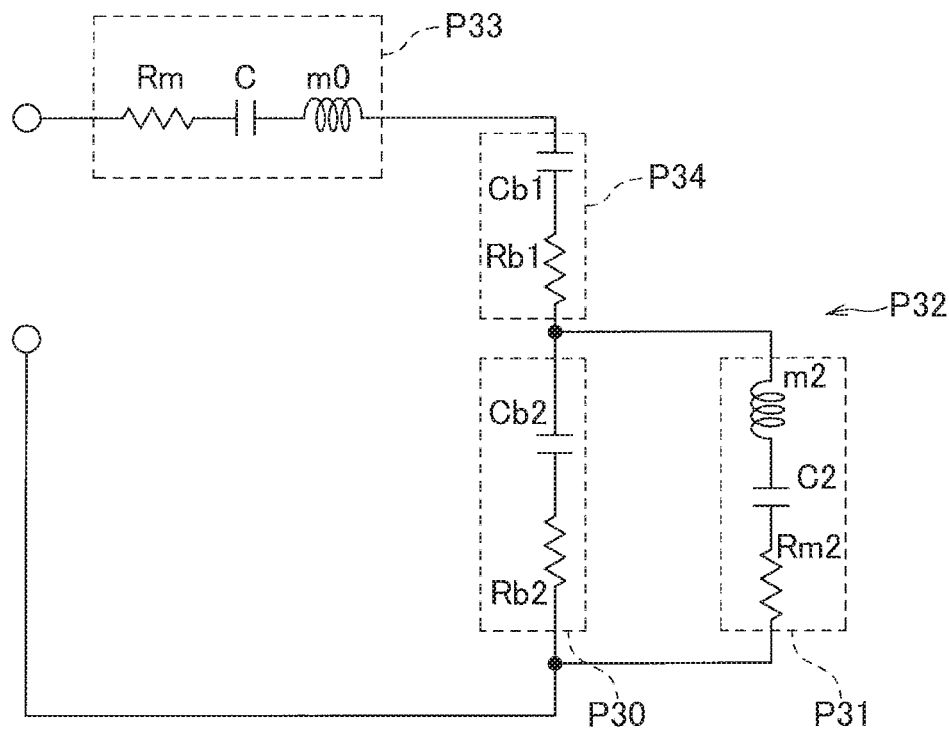
FIG. 69 is an equivalent circuit diagram produced by replacing mechanical elements of the sound generating device for mobile object of FIG. 68 with circuit elements.
Figure 70:
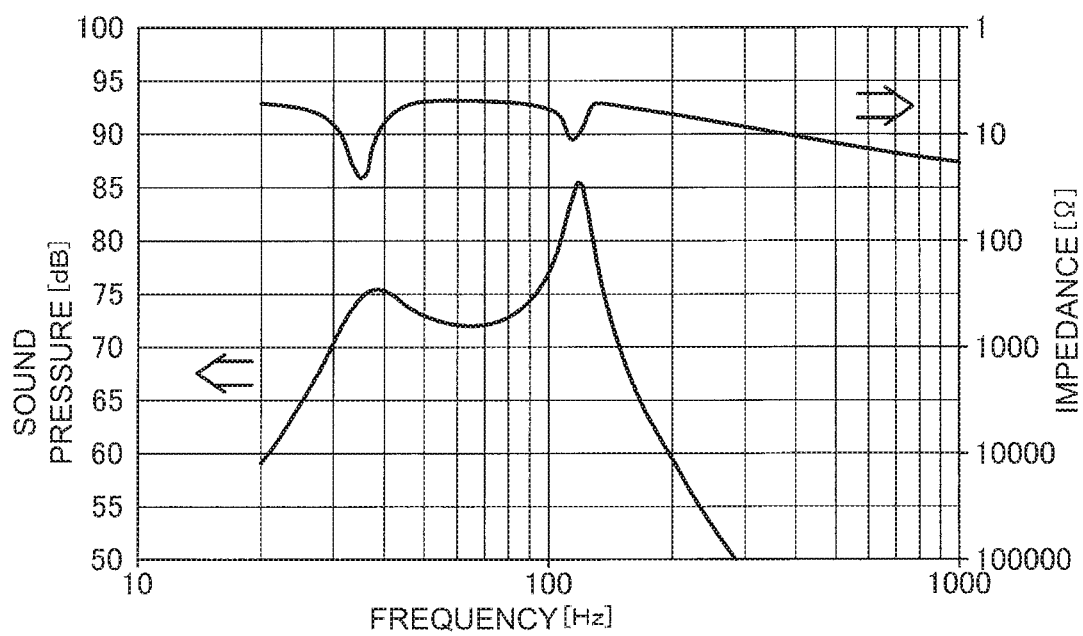
FIG. 70 is a graph showing an impedance of the equivalent circuit and a frequency characteristic of a generated sound of the sound generating device for mobile object of FIG. 68.
Figure 71:
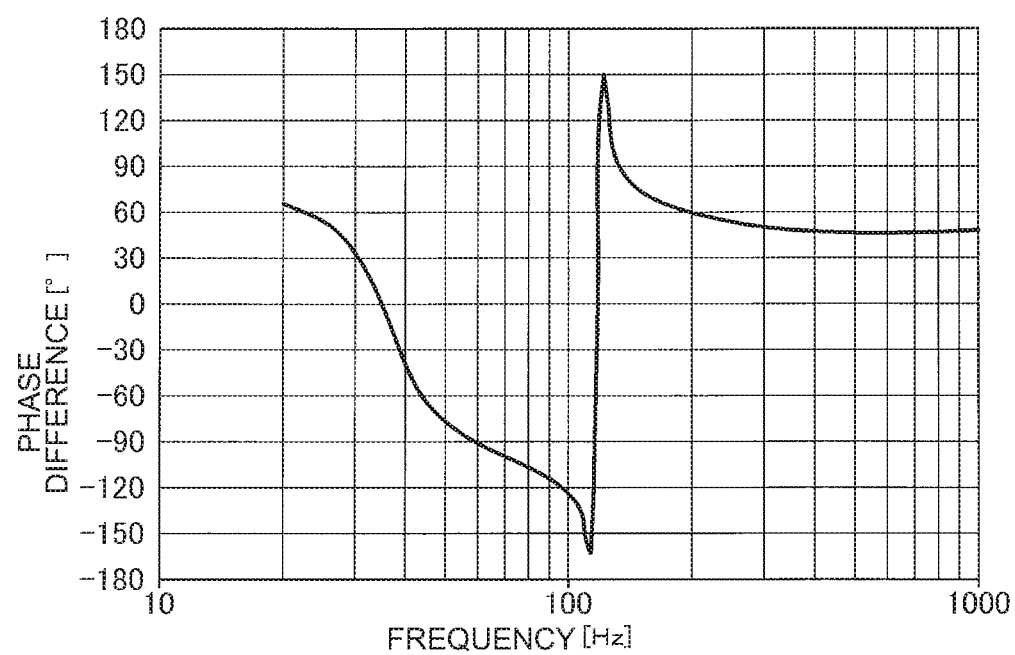
FIG. 71 is a graph showing a frequency dependency of a phase difference between an input signal and a generated sound in the sound generating device for mobile object of FIG. 68.

FIG. 67 is a perspective view of a sound generating device for mobile object 1GG according to Example 24 of the present invention. FIG. 68 is a cross-sectional view showing a schematic configuration of the sound generating device for mobile object 1GG. FIG. 69 is an equivalent circuit diagram produced by replacing mechanical elements of the sound generating device for mobile object 1GG with circuit elements. FIG. 70 is a graph showing an impedance of the equivalent circuit and a frequency characteristic of a generated sound of the sound generating device for mobile object 1GG. FIG. 71 is a graph showing a frequency dependency of phase difference between an input signal and a generated sound in the sound generating device for mobile object 1GG.

As shown in FIG. 67, the sound generating device for mobile object 1GG is accommodated in a chair 700 provided to a vehicle as a mobile object. In FIG. 67, a reference sign 701 indicates a seat portion, a reference sign 702 indicates a back rest, and a reference sign 703 indicates a head rest. As shown in FIG. 68, the sound generating device for mobile object 1GG includes a speaker unit 2 configured to emit a sound towards a box-like space formed by the vehicle, i.e., a passenger compartment, an enclosure 3GG as an accommodation part accommodating the speaker unit 2, and a tubular member 4GG communicated with inside of the enclosure 3GG. Further, the sound generating device for mobile object 1GG is provided to the vehicle together with an external device including a sound collecting part configured to collect noise and a transmission part configured to transmit an input signal to the speaker unit 2, so as to constitute a noise cancelling device together with this external device.

The speaker unit 2 is a commonly used cone type speaker unit including a frame, a diaphragm connected to the frame, an edge connecting the diaphragm to the frame, a tubular voice coil connected to the diaphragm, a damper connecting the voice coil to the frame, and a magnetic circuit inserted inside the voice coil. Herein, as the speaker unit, other configurations such as a thin-type speaker may be used.

The enclosure 3GG includes an enclosure body 31GG surrounding a rear side (an opposite side of a sound emitting side) of the speaker unit 2 and forming a rear space S30, and a front accommodation part 32GG surrounding a front face side (the sound emitting side) of the speaker unit 2 and forming a front space S31, and an inner partition wall 33GG partitioning the front space S31 into a first front space S311 close to the speaker unit 2 and a second front space S312 spaced from the speaker unit 2. As shown in FIG. 67, the enclosure 3GG is accommodated in the lower portion of the back rest 702 of the chair 700.

A vibration member 5 is provided to a part of the inner partition wall 33GG opposed to the speaker unit 2. The vibration member 5 includes a weight part 51 and an elastic support part 52. The weight part 51 is a weight that is formed into a plate-like shape from a metallic member, for example. The elastic support part 52 is formed from an elastic member such as rubber, for example, and is provided to a periphery of the weight part 51. An opening is formed at a portion of the inner partition wall 33GG where the vibration member 5 is provided, and this opening is closed by the vibration member 5. That is, the elastic support part 52 connects an outer edge of the weight part 51 and an inner edge of the opening of the inner partition wall 33GG, thereby supporting the weight part 51 in a manner capable of being vibrated with respect to the inner partition wall 33GG.

The weight part 51 will vibrate due to a compression wave of air (sound wave) in the front accommodation part 32GG produced by vibration of the diaphragm of the speaker unit 2. The vibration member 5 has a resonance frequency according to a mechanical resistance, a compliance and a vibration mass of the weight part 51 and the elastic support part 52. At this time, the resonance frequency of the vibration member 5 is set to a value different from the lowest resonance frequency of the speaker unit 2. Consequently, the sound emitted from the speaker unit 2 makes the vibration member 5 to generates a resonance sound having different frequency from the lowest resonance frequency of the speaker unit 2, thereby functioning as the resonance element.

As shown in FIG. 67, the tubular member 4GG is a metallic hollow pipe and is formed from a part of a frame of the back rest 702. In FIG. 67, elements other than the frame are omitted. One end E1 of the tubular member 4GG is communicated with the second front space S312 of the enclosure 3GG. The other end E2 of the tubular member 4GG is opening, and the sound generated by the speaker unit 2 is emitted from this other end E2, passes through the back rest 702 and is emitted into the passenger compartment. In addition, the other end E2 of the tubular member 4GG is arranged at the upper portion of the back rest 702 and opens to the head rest 703 side.

As described above, by using the frame that is conventionally used for the chair 700 also as the tubular member 4GG, an increase in volume and weight of the chair 700 can be minimized. Further, since the other end E2 of the tubular member 4GG which is a portion that emits a sound is positioned so as to be in the vicinity of ears of a user seated on the chair 700, the noise cancelling sound can be reliably transmitted to the user seated.

In the sound generating device for mobile object 1GG as described above, the vibration member 5 as the resonance element is provided. Thus, a sound emitted from the front side of the speaker unit 2 through the front space S31 and emitted from the tubular member 4 to the outer space will have an increased sound pressure not only at the lowest resonance frequency of the speaker unit 2 but also at the resonance frequency of the vibration member 5.

The following will explain a frequency dependency of a sound pressure (sound pressure characteristic) and a frequency dependency of a phase difference (phase characteristic) between a generated sound and an input signal to the voice coil of the speaker unit 2, with respect to a sound emitted by the sound generating device for mobile object 1GG.

Firstly, an equivalent circuit diagram produced by replacing mechanical elements of the sound generating device for mobile object 1GG with circuit elements is shown in FIG. 69. A part P30 given by the front accommodation part 32GG and a part P31 given by the vibration member 5 are connected in parallel. This entire part in which these parts are connected in parallel is referred to as a part P32 given by the front elements. In addition, a part P33 given by the speaker unit 2, a part P34 given by the enclosure body 31GG and the part P32 given by the front elements are connected in series.

The front accommodation part 32GG includes a compliance determined by its volume and a mechanical resistance at the time of vibration. In the part P30 given by the front accommodation part 32GG, a capacitor Cb2 given by the compliance and a resistor Rb2 given by the mechanical resistance are connected in series.

The vibration member 5 includes vibration masses of the weight part 51 and the elastic support part 52, a compliance of the elastic support part 52 and a mechanical resistance at the time of vibration. In the part P31 given by the vibration member 5, a coil m2 given by the vibration mass, a capacitor C given by the compliance and a resistor Rm2 given by the mechanical resistance are connected in series.

The speaker unit 2 includes mechanical resistances of the damper and the edge, compliances of the damper and the edge, vibration masses of the diaphragm, the damper and the edge. In the part P33 given by the speaker unit 2, a resistor Rm given by the mechanical resistances, a capacitor C given by the compliances and a coil m0 given by the vibration masses are connected in series.

The enclosure body 31GG includes a compliance determined by its volume and a mechanical resistance at the time of vibration. In the part P34 given by the enclosure body 31GG, a capacitor Cb1 given by the compliance and a resistor Rb1 given by the mechanical resistance are connected in series.

By replacing the mechanical elements with the circuit elements as described above, a combined impedance of the entire circuit can be obtained. Based on such impedance, the sound pressure characteristic of the sound generating device for mobile object 1GG can be obtained, and the phase characteristic can be obtained based on the sound pressure characteristic.

Simulation results of the frequency characteristic of the impedance and the sound pressure characteristic of the sound generating device for mobile object 1GG obtained based on the equivalent circuit as described above are shown in FIG. 70. In FIG. 70, a vertical axis on the left side corresponds to the sound pressure characteristic, and a vertical axis on the right side corresponds to an impedance. A horizontal axis indicating a frequency is indicated in a logarithmic scale.

The sound pressure characteristic in the sound generating device for mobile object 1GG includes a peak (about 110 Hz) according to the lowest resonance frequency of the speaker unit 2 and a sub-peak (about 40 Hz) formed by other circuit elements. The frequency of the sub-peak is determined mainly by resonance frequency of the vibration member 5 (element resonance frequency).

A Simulation result of the phase characteristic of the sound generating device for mobile object 1GG is shown in FIG. 71. In FIG. 71, values for the phase of −180° or less are indicated as values with 360° added, and values for the phase of 180° or more are indicated as values with 360° subtracted. At around the lowest resonance frequency (about 110 Hz) of the speaker unit 2, the rate of change of the phase difference is large and the graph has a sharp shape, and the phase difference tends to decrease as the frequency increases, but this graph is deformed so as to be convex downward at around about 40-50 Hz. This portion deformed so as to be convex downward is formed due to the sub-peak described above. Thus, in the frequency range of about 60 to 100 Hz, the phase difference falls within about −120 to −90°. That is, a flat region (about 60 to 100 Hz) in which the change in the phase difference is small is formed in the graph of the phase characteristic.

The wavelength corresponding to the sub-peak at 100 Hz is 0.85 m (¼ wavelength is 0.21 m). Thus, the ¼ wavelength of the resonance sound generated by the vibration member 5 as the resonance element is sufficiently longer than a distance between tragi (for example, 0.15 m).

When performing a noise cancelling by the sound generating device for mobile object 1GG as described above, if there is a phase difference produced between the noise signal and the cancelling signal emitted from the sound generating device for mobile object 1GG, then cancelling effect may be deteriorated, or noise may be increased. For example, FIG. 11 shows waves of the noise signal, the cancelling signal having the same amplitude as the noise signal and a combined signal of these signals, in the case where the phase difference between the noise signal and the cancelling signal is 60°. The sound pressure of the sound that is actually generated in a space in which the noise signal and the cancelling signal are emitted, corresponds to the amplitude of the combined signal. In the example shown in FIG. 11, if the noise signal and the cancelling signal are equal in the amplitude, then the amplitude of the noise signal and the amplitude of the combined signal are equal, and the cancelling effect cannot be obtained when the phase difference between the noise signal and the cancelling signal exceeds 60°.

Thus, a phase characteristic of the sound generating device for mobile object 1GG may be calculated by simulation or actually measured in advance, and the input signal can be controlled such that the emitted sound has a phase opposite to a phase of the noise.

According to the configuration described above, the enclosure 3GG includes the vibration member 5 as the resonance element and the flat region is formed in the graph of the phase characteristic. Thus, at the frequencies in the flat region, the sound generated from the sound generating device for mobile object 1GG can be easily made to have a phase opposite to a phase of the noise, making it easy to reduce the noise. At this time, the flat region can be adjusted by appropriately setting the element resonance frequency of the vibration member 5, thereby the frequency range in which the noise can be easily reduced can be adjusted.

Further, the element resonance frequency can be adjusted by adjusting the mechanical resistance, the compliance and the vibration mass of the vibration member 5, enabling to form the flat region at an appropriate frequency range.

Further, since the ¼ wavelength of the resonance sound generated by the vibration member 5 as the resonance element is longer than a distance between tragi (e.g., 0.15 m), a difference between absolute values of the sound pressures at right and left ears produced when the sound wave of the resonance sound has reached to a head of a user (a passenger of the mobile object) can be reduced. That is, a path difference of up to the distance between the tragi may be produced between the sound waves reaching to the right and left ears of the user. At this time, with the ¼ wavelength of the resonance sound being longer than the distance between the tragi, the phase difference between the sound waves reaching to the right and left ears is reduced, and thus the difference between the absolute values of the sound pressures is reduced. Consequently, the right/left difference of the effect obtained by forming the above-described flat region can be reduced. Further, even when the positional relationship between the sound generating device and the head of the user has changed (for example when the passenger on a seat has moved his/her head), the right/left difference can be reduced in the similar manner.

Example 25

Figure 72:
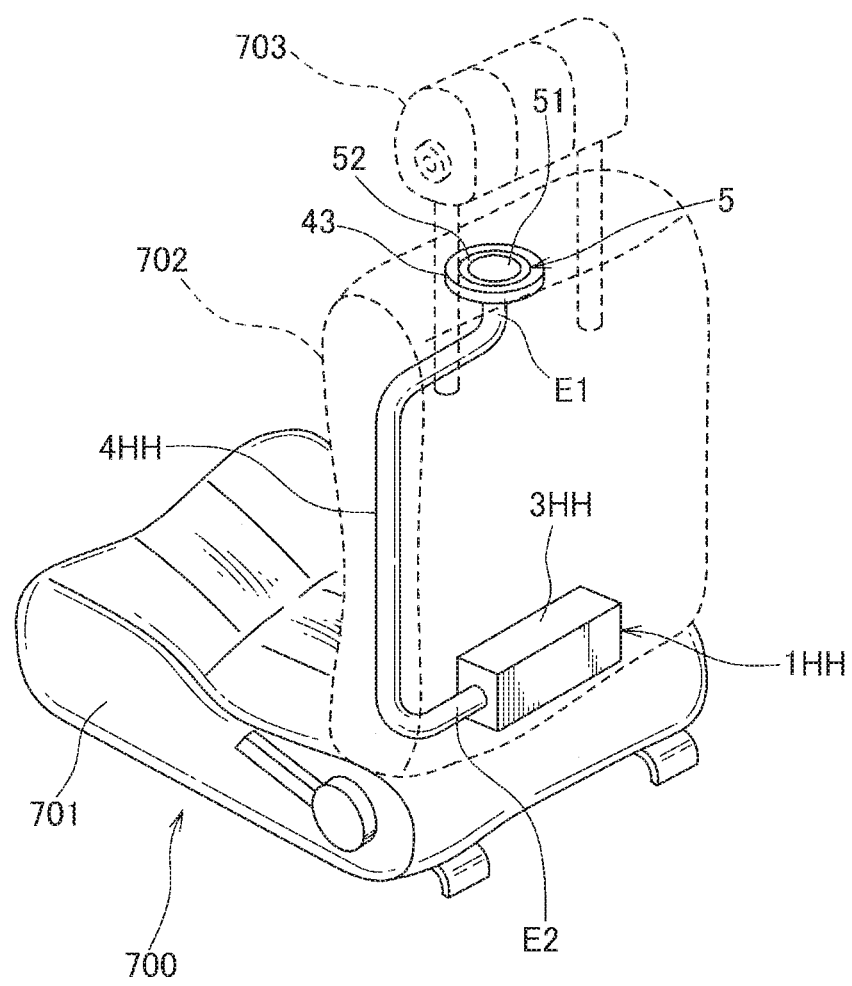
FIG. 72 is a perspective view of a sound generating device for mobile object according to Example 25 of the present invention.
Figure 73:
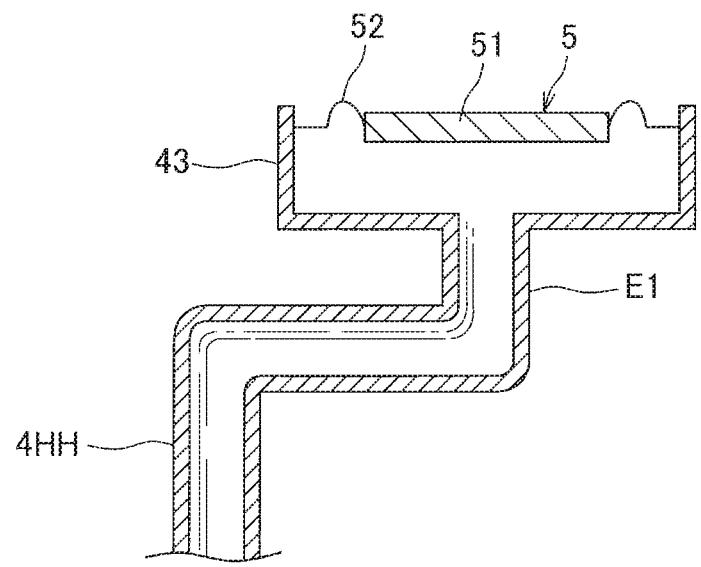
FIG. 73 is a cross-sectional view of a vibration member provided to the other end of a tubular member of FIG. 72.
Figure 74:
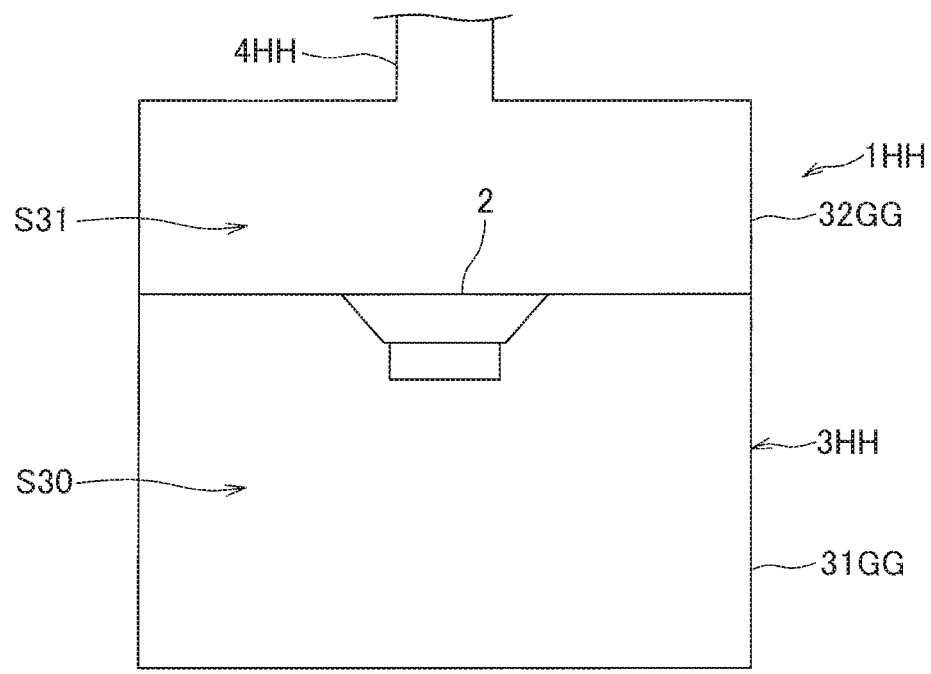
FIG. 74 is a cross-sectional view showing a schematic configuration of the sound generating device for mobile object of FIG. 72.

FIG. 72 is a perspective view of a sound generating device for mobile object 1HH according to Example 25 of the present invention. FIG. 73 is a cross-sectional view of a vibration member 5 provided to the other end E2 of a tubular member 4HH of FIG. 72. FIG. 74 is a cross-sectional view showing a schematic configuration of the sound generating device for mobile object 1HH.

As shown in FIG. 72, the sound generating device for mobile object 1HH is accommodated in a chair 700 provided to a vehicle as a mobile object. As shown in FIG. 72 and FIG. 74, the sound generating device for mobile object 1HH includes the speaker unit 2, the enclosure 3HH and a tubular member 4HH, and constitutes a noise cancelling device as is the case with the sound generating device for mobile object 1GG of Example 24.

The enclosure 3HH includes an enclosure body 31HH and a front accommodation part 32HH. Unlike the enclosure 3GG of Example 24, the enclosure 3HH does not include the inner partition wall 33GG, and is not provided with the vibration member 5.

At the other end E2 of the tubular member 4GG of Example 24, the tubular member 4HH is provided with an expanded part 43 for attaching the vibration member 5. The expanded part 43 is formed into a circular tube-like shape having an inner diameter and an outer diameter greater than those of other portion of the tubular member 4HH, and is connected to the other end E2 and opening to the head rest 703 side.

As is the case with the vibration member 5 of Example 24, the vibration member 5 includes a weight part 51 and an elastic support part 52. The opening of the expanded part 43 is closed by the vibration member 5. That is, the elastic support part 52 connects an outer edge of the weight part 51 and an inner edge of the opening of the expanded part 43, thereby supporting the weight part 51 in a manner capable of being vibrated with respect to the expanded part 43. The resonance frequency of the vibration member 5 is set to a value different from the lowest resonance frequency of the speaker unit 2. As is the case with the vibration member 5 of Example 24, the vibration member 5 generates a resonance sound having different frequency from the lowest resonance frequency of the speaker unit 2, thereby functioning as the resonance element.

As is the case with the sound generating device for mobile object 1GG of Example 24, the sound generating device for mobile object 1HH having the above-described configuration has a sub-peak in the graph of the sound pressure characteristic due to the vibration member 5, forming a flat region in the graph of the phase characteristic. Thus, in the frequencies in the flat region, the sound generated from the sound generating device for mobile object 1HH can be easily made to have a phase opposite to a phase of the noise, making it easy to reduce the noise. At this time, the flat region can be adjusted by appropriately setting the element resonance frequency of the vibration member 5, thereby the frequency range in which the noise can be reduced easily can be adjusted.

Example 26

Figure 75:
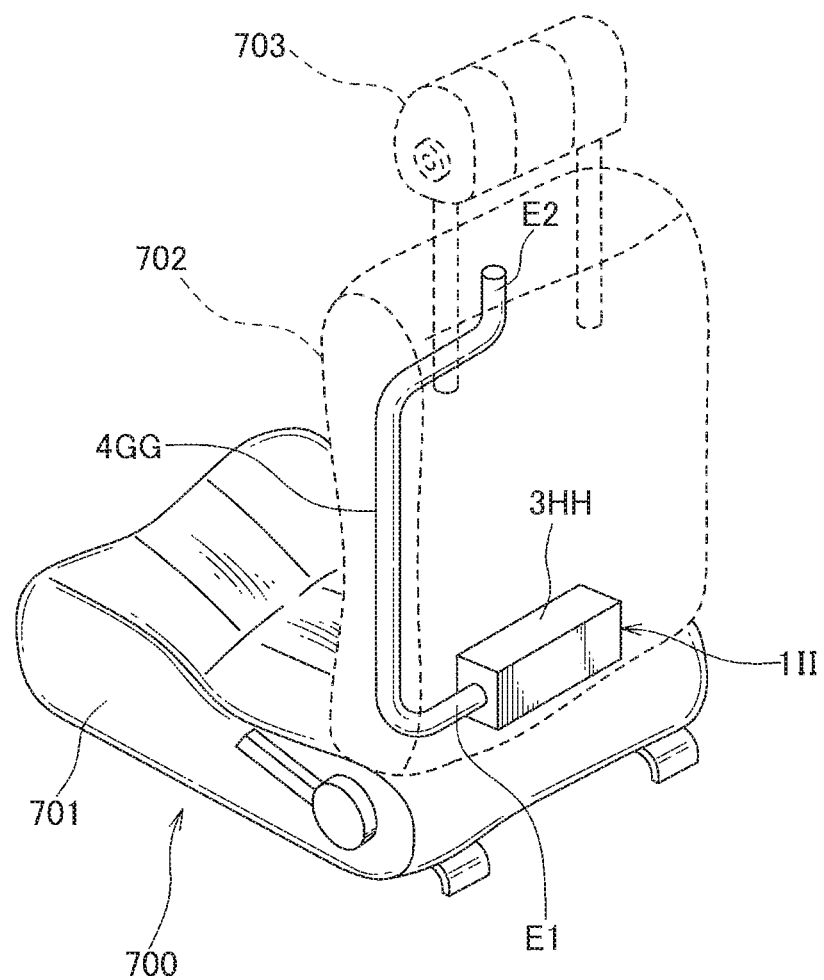
FIG. 75 is a perspective view of a sound generating device for mobile object according to Example 26 of the present invention.
Figure 76:
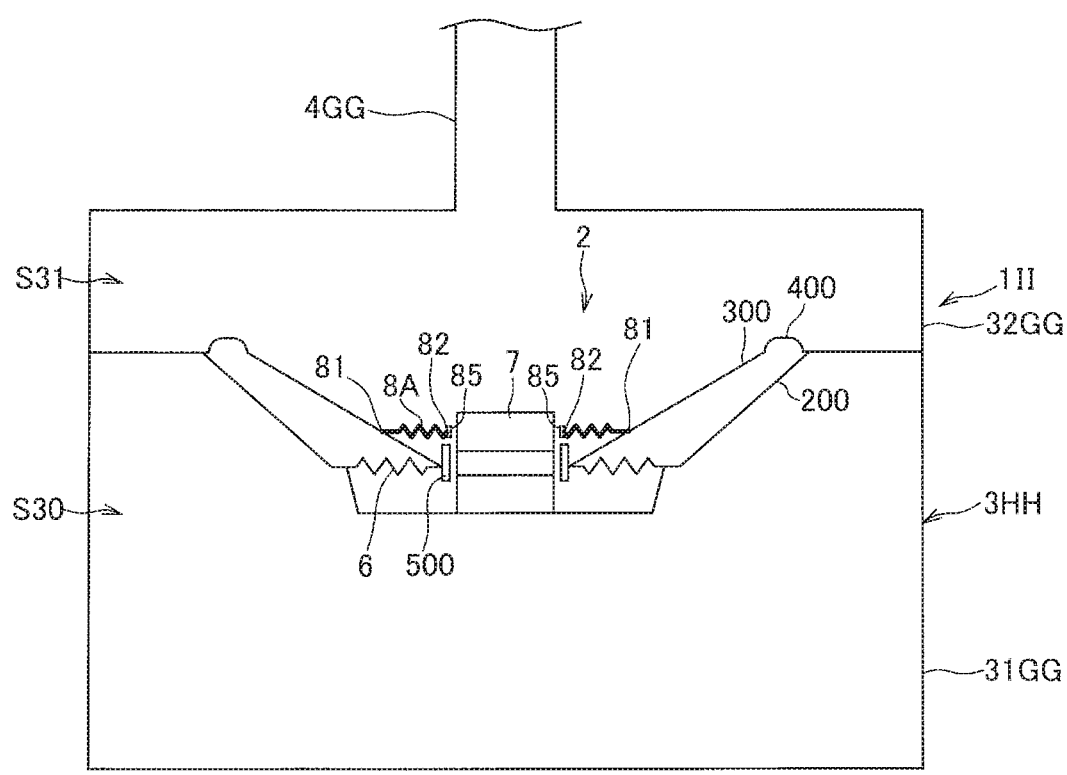
FIG. 76 is a cross-sectional view showing a schematic configuration of the sound generating device for mobile object of FIG. 75.

FIG. 75 is a perspective view of a sound generating device for mobile object 1II of Example 26 according to the present invention. FIG. 76 is a cross-sectional view showing a schematic configuration of the sound generating device for mobile object 1II.

As shown in FIG. 75, the sound generating device for mobile object 1II is accommodated in a chair 700 provided to a vehicle as a mobile object. As shown in FIG. 75 and FIG. 76, the sound generating device for mobile object 1II includes the speaker unit 2, the enclosure 3HH and the tubular member 4GG, and constitutes a noise cancelling device as is the case with the sound generating device for mobile object 1GG of Example 24.

As shown in FIG. 76, the speaker unit 2 has similar configuration as the speaker unit 21A, 22A shown in FIG. 5 explained in Example 1, and includes the elastic member 8A as the resonance element.

As is the case with the enclosure 3HH of Example 25, the enclosure 3HH does not include the inner partition wall 33GG, and is not provided with the vibration member 5.

As is the case with the sound generating device for mobile object 1GG of Example 24, the sound generating device for mobile object 1II having the above-described configuration has a sub-peak in the graph of the sound pressure characteristic due to the elastic member 8A, forming a flat region in the graph of the phase characteristic. Thus, at the frequencies in the flat region, the sound generated from the sound generating device for mobile object 1II can be easily made to have a phase opposite to a phase of the noise, making it easy to reduce the noise. At this time, the flat region can be adjusted by appropriately setting the element resonance frequency of the elastic member 8A, thereby the frequency range in which the noise can be reduced easily can be adjusted.

The present invention is not limited to Examples 24 to 25, it may include other configurations and such capable of achieving the object of the present invention, and modifications and such as indicated below are also included in the present invention.

For example, in Examples 24 to 25 described above, the resonance element is provided to any location of the enclosure 3GG, 3HH, the tubular member 4GG, 4HH, and the speaker unit 2. However, the present invention is not limited to these, and the resonance element may be arranged at the plurality of locations on them, or a plurality of resonance elements may be arranged to one location or to a plurality of locations. Further, the shape and/or structure of the tubular member may be designed appropriately to make the tubular member itself to also serve as the resonance element. This case should also be interpreted as one embodiment of a state in which "the resonance element is arranged at the tubular member".

Further, Examples 23 to 25 exemplary show the vibration member 5 and the elastic member 8A as the resonance element. However, the resonance element may take other form as long as it vibrates with a resonance frequency and thereby forms a sub-peak in the sound pressure characteristic of the sound generating device for mobile object. For example, a vibration member constituted from only the elastic member and not including the weight part may be used as the resonance element. At this time, the weight of the elastic member itself corresponds to the vibration mass.

Further, in Example 24, the ¼ wavelength of the resonance sound generated by the vibration member 5 as the resonance element is set to be longer than a distance between tragi and shorter than twice the distance between tragi. However, the ¼ wavelength of the resonance sound may be set to be longer than twice the distance between tragi. Alternatively, the ¼ wavelength of the resonance sound may be set to be equal to or less than a distance between tragi, if a phase difference is not likely to be produced between the sound waves reaching to the right and left ears of the user, e.g., if the sound generating device is arranged in front of or at back of a user and a path difference is not likely to be produced between the sound waves reaching to the right and left ears of the user.

It is noted that the sound generating device for mobile object according to the examples of the present invention may be used as a noise cancelling device capable of cancelling a noise sound (for example, a sound that generates during movement of the mobile object) in a compartment of the mobile object.

Example 27

Firstly, a speaker system for active noise control according to Example 27 will be explained.

Figure 77:
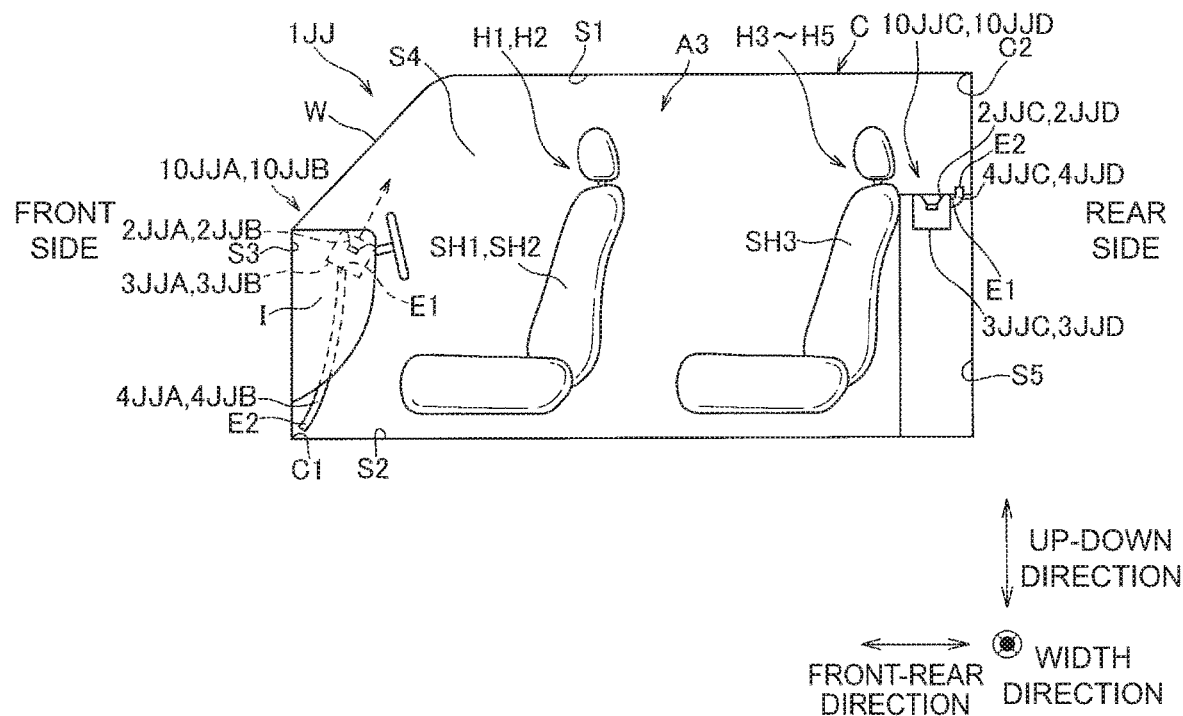
FIG. 77 is a side view of a vehicle provided with a speaker system for active noise control according to Example 27 of the present invention.
Figure 78:
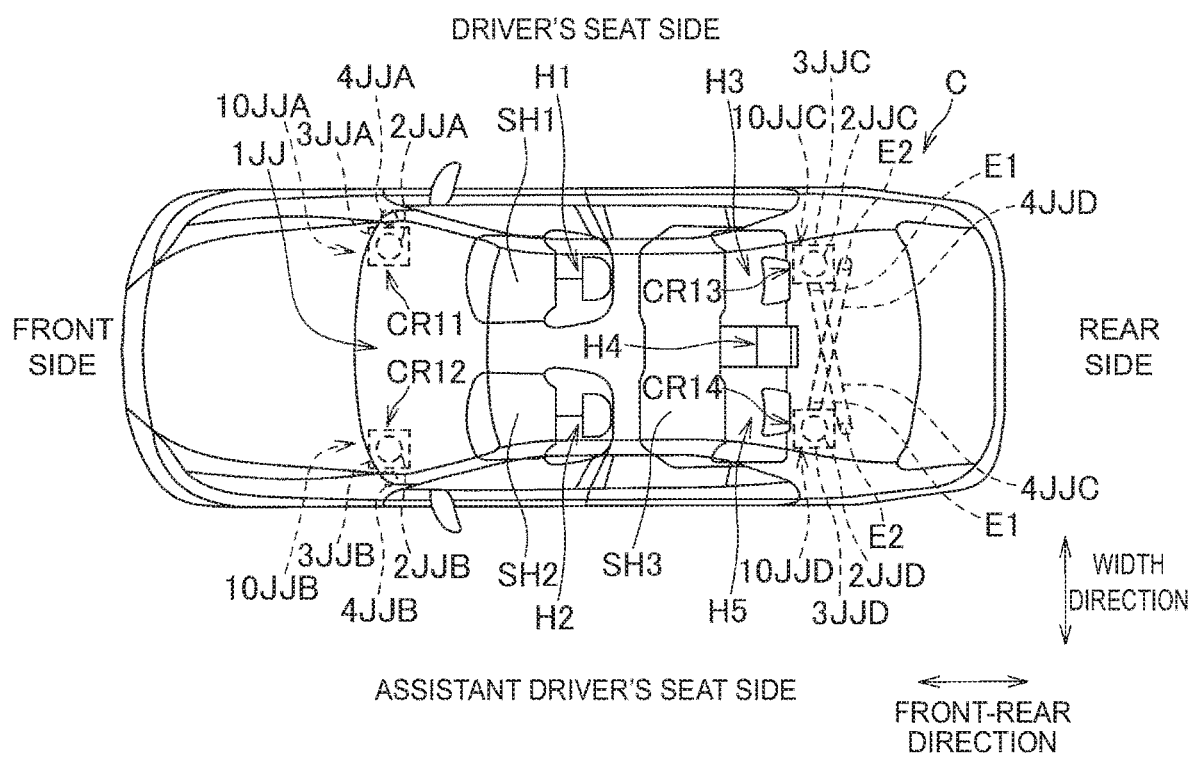
FIG. 78 is a plan view of a vehicle provided with a speaker system for active noise control.
Figure 79:
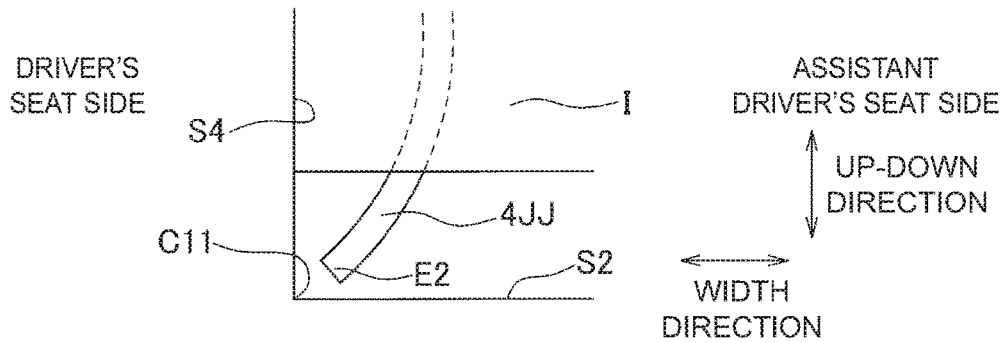
FIG. 79 is a front view of a part of a tubular member of the speaker system for active noise control.
Figure 80:
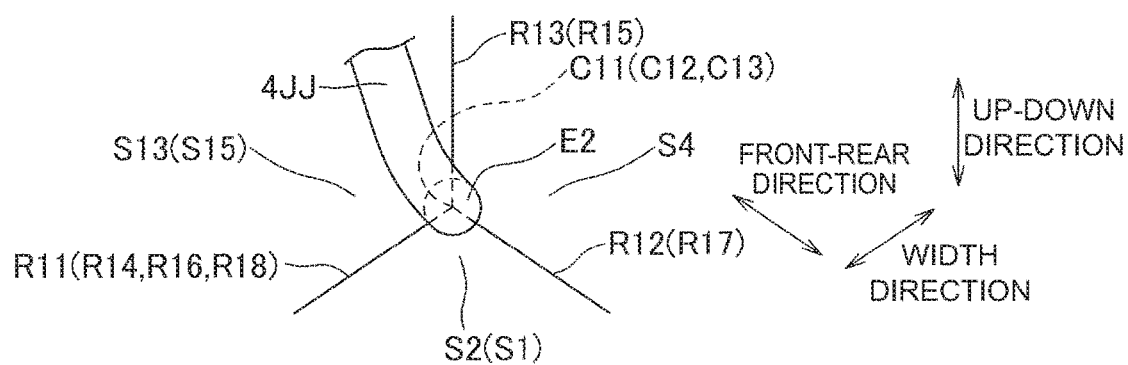
FIG. 80 is a perspective view of the tubular member.
Figure 81:
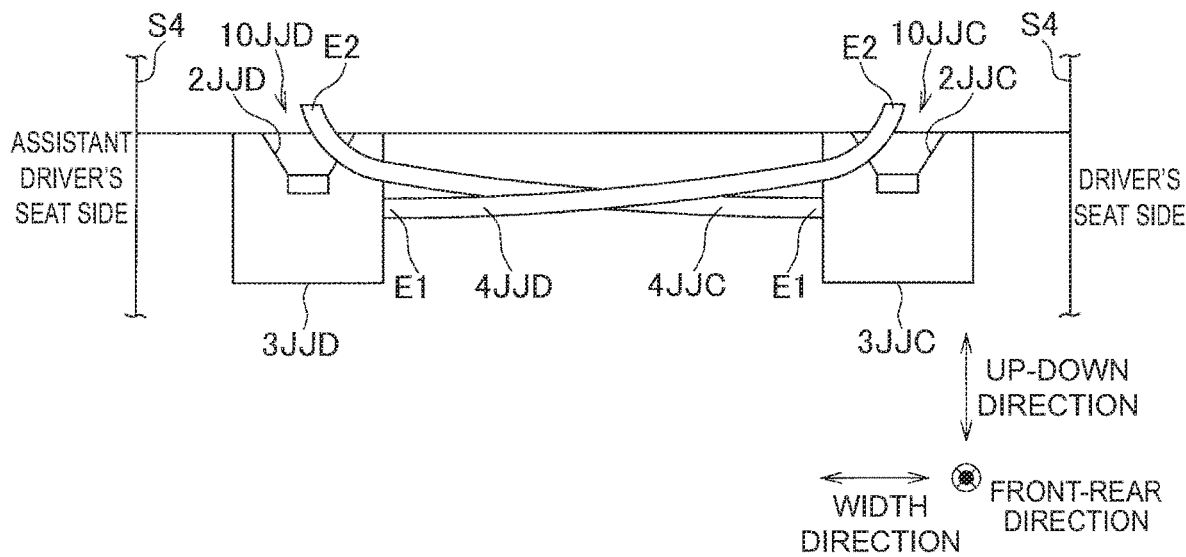
FIG. 81 is a back view of a speaker device arranged on a rear side of the speaker system for active noise control.

FIG. 77 is a side view of a vehicle C provided with a speaker system for active noise control 1JJ according to Example 27 of the present invention. FIG. 78 is a plan view of the vehicle C provided with the speaker system for active noise control 1JJ. FIG. 79 is a front view of a part of a tubular member 4 of the speaker system for active noise control 1JJ. FIG. 80 is a perspective view of the tubular member 4. FIG. 81 is a back view of a speaker device 10C, 10D arranged on a rear side of the speaker system for active noise control 1JJ.

As shown in FIG. 77 and FIG. 78, the speaker system for active noise control 1JJ of this example is provided to the vehicle C as a mobile object, and includes four speaker devices 10JJA-10JJD. This speaker system for active noise control 1JJ is configured to emit, from each of the speaker devices 10JJA-10JJD, a sound having a phase substantially opposite to a phase of the noise collected at a sound collecting part not shown, as a cancelling sound for cancelling out the noise.

The vehicle C forms a box-like vehicle interior space A3 surrounded by an inner face of a windshield (front windshield) W, and an upper face (top face) S1, a lower face (bottom face) S2, a front face S3 in a traveling direction (front-rear direction) of the vehicle C, a pair of side faces S4 (including a door body of the vehicle) opposing in a width direction, and a rear face S5 in the traveling direction of the vehicle C, of a vehicle body. Further, an instrumental panel I is provided to the front face S3, and a driver's seat SH1 and an assistant driver's seat SH2 as front seats are provided so as to face the rear side of the instrumental panel I. Further, a three-seat bench-like rear seat SH3 is provided on the rear side of the driver's seat SH1 and the assistant driver's seat SH2. Positions of heads when passengers have seated on the driver's seat SH1 and the assistant driver's seat SH2 are indicated by a head position H1 and a head position H2, respectively. Positions of heads when passengers have seated on respective seating positions on the rear seat SH3 are indicated by head positions H3 to H5, in order from the driver's seat SH1 side.

In the vehicle interior space A3, the speaker device 10JJA is provided at a corner part CR11 on the front side in the front-rear direction and on the driver's seat SH1 side in the width direction (right side when faced frontward, in the example shown). In the vehicle interior space A3, the speaker device 10JJB is provided at a corner part CR2 on the front side and on the assistant driver's seat SH2 side in the width direction (left side when faced frontward, in the example shown). In the vehicle interior space A3, the speaker device 10C is provided at a corner part CR3 on the rear side in the front-rear direction and on the driver's seat SH1 side. In the vehicle interior space A3, the speaker device 10D is provided at a corner part CR4 on the rear side and on the assistant driver's seat SH2 side. That is, the four speaker devices 10JJA-10JJD are arranged at the corner parts CR11-CR14 different from each other.

By arranging the four speaker devices 10JJA-10JJD inside the vehicle interior space A3, a standing wave of the cancelling sound can be produced in the front-rear direction and the width direction of the vehicle C, thereby improving the acoustic characteristic of the cancelling sound in the vehicle interior space A3. Further, since sound waves are emitted from the speaker devices 10JJA-10JJD towards a passenger seated on the driver's seat SH1, the assistant driver's seat SH2 or the rear seat SH3, the cancelling sound with sufficient sound pressure can be delivered to the respective locations in the vehicle interior space A3. Consequently, the noise in the vehicle interior space A3 can be cancelled out evenly.

The speaker devices 10JJA-10JJD include speaker units 2JJA-2JJD, the enclosures 3JJA-3JJD as accommodation parts accommodating the speaker units 2JJA-2JJD, and tubular members 4JJA-4JJD connected to the enclosures 3JJA-3JJD, respectively. The speaker device 10JJA and the speaker device 10JJB arranged on the front side and opposed in the width direction are configured to be substantially symmetric with respect to a plane perpendicular to the width direction. Further, the speaker device 10JJC and the speaker device 10JJD arranged on the front side have the same symmetry. Thus, in the following, when the explanation is given only for one of the speaker device 10JJA and the speaker device 10JJB, the other one also has the same configuration, and when the explanation is given only for one of the speaker device 10JJC and the speaker device 10JJD, the other one also has the same configuration.

The speaker units 2JJA-2JJD are equivalent to the speaker units 21A, 22A shown in FIG. 80 and already explained in Example 1, thus detailed explanations thereof are omitted.

In the speaker system for active noise control 1JJ of this example, the speaker devices 10JJA-10JJD configured to generate the cancelling sound that is easily made to have a phase opposite to a phase of the noise as described above, are arranged at the four positions described above.

The speaker units 2JJA-2JJD of the respective speaker devices 10JJA-10JJD may be configured to emit a sound wave such that sound pressure of the middle and high-pitched sound region (e.g., 1000 to 10000 Hz) is larger than sound pressure of the low-pitched sound region (e.g., 10 to 1000 Hz). The diaphragm 300 is arranged such that the side to which the speaker unit 2JJA-2JJD emits a sound wave (front face side) faces upward in the vehicle C, while the magnetic circuit side (back face side) faces downward in the vehicle C. Further, the speaker units 2JJA, 2JJB may be provided to the instrumental panel I such that the vibrating direction of the diaphragms 300 (sound emitting direction) of the speaker units 2JJA, 2JJB on the front side is inclined for a predetermined angle (e.g., 30°) with respect to the upper face of the instrumental panel I. Further, the speaker units 2JJC, 2JJD on the rear side may be provided such that the vibrating direction of their diaphragms 300 (or the sound emitting direction) is substantially perpendicular to the upper face S1. When the speaker units 2JJA, 2JJB are mounted to the instrumental panel with the diaphragms 300 inclined with respect to the upper face of the instrumental panel I, the inclination angle of each of the diaphragms 300 with respect to the upper face of the instrumental panel I may be set appropriately and as necessary, in accordance with an angle of the windshield W and/or a distance between the speaker units 2JJA-2JJD and the seat SH and such. Alternatively, the central axes or the diaphragms 300 of the speaker units 2JJA-2JJD may not be inclined. In the case of not inclining the central axis or the diaphragm 300 of the speaker unit 2, the speaker unit 2 may be mounted such that the diaphragm 300 is arranged along the upper face of the instrumental panel I. Further, the central axes or the diaphragms 300 of the speaker units 2JJA-2JJD may be arranged to face each seat SH1, SH2 (each seating position for the rear seat SH3).

The enclosure 3JJA-3JJD is formed into a box-like shape, and includes the speaker unit 2JJA-2JJD arranged in an interior space formed by a bottom face and four faces, such that a part of the speaker unit 2JJA-2JJD on the back face side is accommodated in the enclosure 3JJA-3JJD. The enclosures 3JJA, 3JJB on the front side are provided for example inside the instrumental panel I, and the enclosures 3JJC, 3JJD on the rear side are provided for example above a trunk room. Further, the enclosures 3JJA-3JJD may be provided with an inclined face on the top face, so as to prevent the sound wave emitted from the diaphragm 300 from being reflected on a part of the enclosure 3JJA-3JJD and to allow this sound wave to be emitted into the vehicle interior space A3. Further, the enclosures 3JJA-3JJD are arranged in the vicinity of the side faces S4 in the width direction and are arranged at the corner parts CR11-CR14, respectively.

By being accommodated in the enclosures 3JJA, 3JJB as described above, the speaker units 2JJA, 2JJB on the front side are provided inside the instrumental panel I so as to emit a sound wave from the front face at the upper face of the instrumental panel I. Further, the speaker units 2JJA, 2JJB on the rear side are provided to the upper portion of the trunk room so as to emit a sound wave from the front face towards the upper face S1. Further, sound waves generated on the back face side of the speaker units 2JJA-2JJD are emitted towards the inner spaces of the enclosures 3JJA-3JJD.

The tubular member 4JJA-4JJD is made of appropriate metal or resin or the like and is formed into a tubular shape with both ends opened, and its cross-sectional shape and a cross-sectional area is substantially constant from the one end E1 side to the other end E2 side, and is formed to have a length that provides an appropriate resonance frequency (e.g., 30-100 Hz). It is noted that the tubular members 4JJA, 4JJB on the front side and the tubular members 4JJC, 4JJD on the rear side are substantially the same in length, so the time required from when the speaker units 2JJA-2JJD have operated (when the diaphragms 300 have vibrated) to when the sound waves are emitted at the later-described other ends E2 are substantially the same.

The tubular members 4JJA, 4JJB on the front side are connected to the interior spaces of the enclosures 3JJA, 3JJB by coupling their one ends E1 to the lower faces of the enclosures 3JJA, 3JJB on the back face side of the speaker units 2JJA, 2JJB, and their other ends E2 are arranged below the driver's seat SH1 or the assistant driver's seat SH2 (in the vicinity of an accelerator pedal for the driver's seat SH1). Further, as also shown in FIG. 79 and FIG. 80, below the instrumental panel I, the other ends E2 open towards the corners C11 where the front face S3, the lower face S2 and the side face S4 meet. Further, the tubular members 4JJA, 4JJB pass through inside the instrumental panel I on the one end E1 side and project outside of the instrumental panel I on the other end E2 side. Further, in the width direction, the tubular member 4JJA on the driver's seat SH1 side extends once away from the side face S4 on the driver's seat SH1 side and then extends back towards the side face S4, from the one end E1 through the other end E2. That is, when viewing the tubular member 4JJA in the front-rear direction, the tubular member 4JJA is curved so as to be convex towards the assistant driver's seat side. Further, in the front-rear direction, the tubular members 4JJA, 4JJB extend towards the front side as approaching from the one end E1 to the other end E2.

As shown in FIG. 81, in the width direction of the mobile object, the tubular members 4JJC, 4JJD on the rear side are connected to the interior spaces of the enclosures 3JJC, 3JJD by coupling their one ends E1 to inner side faces of the enclosures 3JJC, 3JJD, and are extending outward. That is, from the one end E1 through the other end E2, the tubular member 4JJC on the driver's seat SH1 side extends from the enclosure 3JJC towards the assistant driver's seat SH2 side, and the tubular member 4JJD on the assistant driver's seat SH2 side extends from the enclosure 3JJD towards the driver's seat SH1 side. Further, in the front-rear direction of the vehicle C, the tubular members 4JJC, 4JJD extend to the rear side from the one end E1 through the other end E2, so the other end E2 of the tubular member 4JJC is positioned on the rear side of the enclosure 3JJD and the other end E2 of the tubular member 4JJD is positioned on the rear side of the enclosure 3JJC. In such manner, the tubular members 4JJC, 4JJD extend so as to intersect with each other. In addition, although the other ends E2 of the tubular members 4JJC, 4JJD are spaced from the upper face S1, they open towards the corners C12 at which the upper face S1, the rear face S5 and the side face S4 meet. It is noted that the corner is defined by the three faces intersecting each other and is included in the intersecting part at which at least two faces meet. That is, the corners C11 on the front side serve as the front side intersecting part, and the corners C12 on the rear side serve as the rear side intersecting part.

The following will explain traveling and reflection of sound waves when the speaker units 2JJA-2JJD in the speaker system for active noise control 1JJ emit the sound waves. Firstly, when the diaphragm 300 has the cone or dome-like shape, for example, the sound waves emitted from the front face side of the speaker units 2JJA, 2JJB on the front side travel obliquely rearward according to the inclination of the diaphragm 300 and will head to the head positions H1, H2 on the front side. It is noted that the sound waves emitted from the front face side may be reflected on the windshield W and/or the upper face S1 and may head to the head positions H1, H2. On the other hand, the sound waves emitted from the front face side of the speaker units 2JJC, 2JJD on the rear side will head to the head positions H3 to H5 on the rear side either directly or after being reflected on the upper face S1 and/or the rear face S5.

The sound waves generated on the back face side of the speaker units 2JJA-2JJD echo in the interior spaces of the enclosures 3JJA-3JJD, enter into the tubular members 4JJA-4JJD from the one ends E1, and travel in the tubular members 4JJA-4JJD. At this time, of the sound waves generated on the back face side of the speaker units 2JJA-2JJD, low-pitched sound region components according to the length of the tubular members 4JJA-4JJD resonate in the tubular members 4JJA-4JJD. Consequently, the sound waves mainly composed of the low-pitched sound region components are emitted from the other ends E2 of the tubular members 4JJA-4JJD. That is, the middle and high-pitched sound region components have been cut in the sound waves emitted from the other end E2 of the tubular members 4JJA-4JJD. Being cut, as used herein, specifically means that the sound pressure of the middle and high-pitched sound region component is made lower than the sound pressure of the low-pitched sound region component. The sound waves emitted from the other ends E2 of the tubular members 4JJA, 4JJB on the front side are reflected on the corners C11 and the surrounding faces S2-S4 and travel towards the corners C12 that are opposed to the corners C11 (i.e., the corners C12 on the opposite side of the corners C11 in the width direction). On the other hand, the sound waves emitted from the other ends E2 of the tubular members 4JJC, 4JJD on the rear side are reflected on the corners C12 and the surrounding faces S1, S5, S4 and travel towards the corners C11 on the opposite side.

The sound waves emitted from the other ends E2 of the tubular members 4JJA, 4JJB on the front side and heading to the corners C12, and the sound waves emitted from the other ends E2 of the tubular members 4JJC, 4JJD on the rear side and heading to the corners C11 together form standing waves between the corners C11, C12 that are opposed to each other in the front-rear direction and the width direction of the vehicle C. These standing waves have fixed ends at the corners C11, C12 and have a wave length according to the distances between the corners C11, C12.

With the sound waves being emitted in a manner as described above, the sound waves mainly composed of the middle and high-pitched sound region component that are emitted from the front face side of the speaker units 2JJA-2JJD and the sound waves mainly composed of the low-pitched sound region component that are emitted from the other end E2 of the tubular members 4JJA-4JJD will echo in the vehicle interior space A3 as the cancelling sound in the respective sound regions.

According to the speaker system for active noise control 1JJ of this example described above, firstly, the elastic members 8A as the resonance elements are provided to the four speaker devices 10JJA-10JJD. Consequently, the sound generated from each of the speaker devices 10JJA-10JJD includes a sub-peak at a frequency corresponding to the resonance sound produced by the resonance element, other than a peak corresponding to the resonance frequency of each speaker unit 2JJA-2JJD. The frequency characteristic of the phase difference (phase characteristic) between the input signal and the generated sound in the speaker device 10JJA-10JJD shows a tendency that the absolute value of the phase difference decreases as the frequency increases. Herein, since the sound pressure characteristic includes the sub-peak, the graph of the phase characteristic is deformed so as to be convex downward at the frequency of the sub-peak or in the vicinity thereof. Thus, the graph of the phase characteristic includes a flat region where change in the phase difference is relatively small. At frequencies in such flat region, it is easy to make the generated sound by the speaker device 10JJA-10JJD to have a phase opposite to a phase of the noise, making it easy to reduce the noise. By appropriately setting the frequency of the resonance sound by the elastic member 8A, the flat region can be adjusted, thus the frequency range in which the noise can be easily reduced can be adjusted. As such, according to the speaker system for active noise control 1JJ of this example, the acoustic characteristic of the noise cancelling sound can be improved for each of the speaker devices 10JJA-10JJD.

Further, the speaker system for active noise control 1JJ includes the four speaker devices 10JJA-10JJD as described above, which are arranged at the four corner parts CR11-CR14 of the vehicle C, respectively. Consequently, even if an empty space at each corner part CR11-CR14 is narrow and small, the sound pressure characteristic of the emitted sound of the entire speaker system for active noise control 1JJ can be improved, thereby improving the acoustic characteristic of the noise cancelling sound.

Further, in the speaker system for active noise control 1JJ of this example, the four speaker devices 10JJA-10JJD are arranged such that at least a part of the sound emitting part is positioned at the four corner parts CR11-CR14, respectively. Consequently, the sound pressure characteristic of the emitted sound of the entire speaker system for active noise control 1JJ can be further improved, thereby further improving the acoustic characteristic of the noise cancelling sound.

Further, in the speaker system for active noise control 1JJ of this example, each speaker device 10JJA-10JJD includes the speaker unit 2JJA-2JJD, the enclosure 3JJA-3JJD and the tubular member 4JJA-4JJD. Consequently, of the sound generated on the back face side of each speaker unit 2JJA-2JJD, the low-pitched sound region component according to the length of the tubular member 4JJA-4JJD resonates in the tubular member 4JJA-4JJD and is emitted from the other end E2. Since the low-pitched sound is likely to echo at the corner parts CR11-CR14, the low-pitched sounds emitted from the tubular members 4JJA-4JJD will echo, thereby improving the acoustic characteristic of especially the low-pitched sound region for the noise cancelling sound.

Further, the speaker system for active noise control 1JJ of this example is configured such that the speaker units 2JJA, 2JJB on the front side and the speaker units 2JJC, 2JJD on the rear side operate with a predetermined time lag. Consequently, the position of the node of the standing wave formed in the vehicle interior space A3 by the emitted sounds of the speaker units 2JJA-2JJD on the front and rear sides can be adjusted appropriately, thereby a good acoustic characteristic can be obtained for the noise cancelling sound.

Further, in the speaker system for active noise control 1JJ of this example, the other ends E2 of the tubular members 4JJA, 4JJB on the front side open towards the corners C11 where the front face S3, the lower face S2 and the side face S4 meet. On the other hand, the other ends E2 of the tubular members 4JJC, 4JJD on the rear side open towards the corners C12 where the upper face S1, the rear face S5 and the side face S4 meet. The wavelength of the standing wave formed by the sound waves emitted from the other ends E2 of the front and rear tubular members 4JJA-4JJD is substantially equal to the distance between the corner C11 of the front side and the corner C12 on the rear side. Since the standing wave having the wavelength equal to the distance between the front and rear corners C11, C12 is generated, the node of this standing wave can be adjusted as described above, thereby improving an acoustic characteristic of the sound having relatively long wavelength (i.e., low-pitched sound) for the noise cancelling sound.

At this time, when the sounds are emitted from the other ends E2 of the tubular members 4JJA-4JJD without a time lag between the front side and the rear side, the node of the standing wave with such wavelength is formed at a midpoint between the corners C11, C12. In this case, the node may be positioned slightly rearward of the head positions H1, H2 of the driver's seat SH1 and the assistant driver's seat SH2, making the sound pressure likely to be reduced at the head positions H1, H2. In this example, the node can be displaced further to the rear side by providing the predetermined time lag, thereby improving the acoustic characteristic of the low-pitched sound for the passengers on the driver's seat SH1 and the assistant driver's seat SH2 for the noise cancelling sound.

When a small-sized speaker unit configured to emit a sound wave such that a sound pressure of the middle and high-pitched sound region is higher than a sound pressure of the low-pitched sound region, i.e., the sound pressure of the low-pitched sound region is low, is employed as the speaker units 2JJA-2JJD, the following advantageous effect can be obtained. According to such small-sized speaker units 2JJA-2JJD, its vibration can be reduced, thereby preventing the vibration from transmitting to the vehicle body producing an abnormal noise. In addition, since the acoustic characteristic of the low-pitched sound region is improved by providing the tubular members 4JJA-4JJD as described above, a good acoustic characteristic can be obtained even when the small-sized speaker units 2JJA-2JJD in which the sound pressure of the low-pitched sound region is low are used. Further, since the sound pressure of the low-pitched sound emitted from the front face of the speaker units 2JJA-2JJD is relatively low, in the low-pitched sound region, the sound wave emitted from the front face of the speaker unit 2JJA-2JJD and the sound wave emitted from the other end E2 of the tubular member 4JJA-4JJD are not likely to weaken each other.

Further, in the speaker system for active noise control 1JJ of this example, the sound wave of the middle and high-pitched sound region is mainly emitted from the front face of the speaker unit 2JJA-2JJD, and the sound wave of the low-pitched sound region is mainly emitted from the other end E2 of the tubular member 4JJA-4JJD. An appropriate emission position may differ between the middle and high-pitched sound region and the low-pitched sound region, and since the position at which the sound wave of the middle-to-high region is emitted and the position at which the sound wave of the low-pitched sound region is emitted are separated from each other, each of these positions can be arranged at an appropriate position, thereby an excellent acoustic characteristic can be obtained for the cancelling sound.

Further, the speaker units 2JJA, 2JJB and the enclosures 3JJA, 3JJB are provided in the instrumental panel I, and the tubular members 4JJA, 4JJB are arranged to pass through the instrumental panel I, thereby keeping a good appearance when the speaker system for active noise control 1JJ is provided to the vehicle C.

Further, the phase characteristic of each of the speaker devices 10JJA-10JJD of this example includes a peak (about 45 Hz) according to the lowest resonance frequency of the speaker units 2JJA-2JJD and a sub-peak (about 100 Hz) formed by the elastic member 8A. The frequency of the sub-peak is determined mainly by a resonance frequency of the elastic member 8A (element resonance frequency).

The wavelength corresponding to the sub-peak at 100 Hz is 3.4 m (¼ wavelength is 0.85 m). Thus, the ¼ wavelength of the resonance sound generated by the elastic member 8A as the resonance element is sufficiently longer than twice a distance between tragi (e.g., 0.15 m).

Example 28

Next, a speaker system for active noise control according to Example 28 will be explained. In Example 28, the structure of the tubular members of the speaker devices 10JJC, 10JJD provided to the rear side of the vehicle C is different from Example 27 described above. In the following, Example 28 will be explained focusing on the difference from Example 27.

Figure 82:
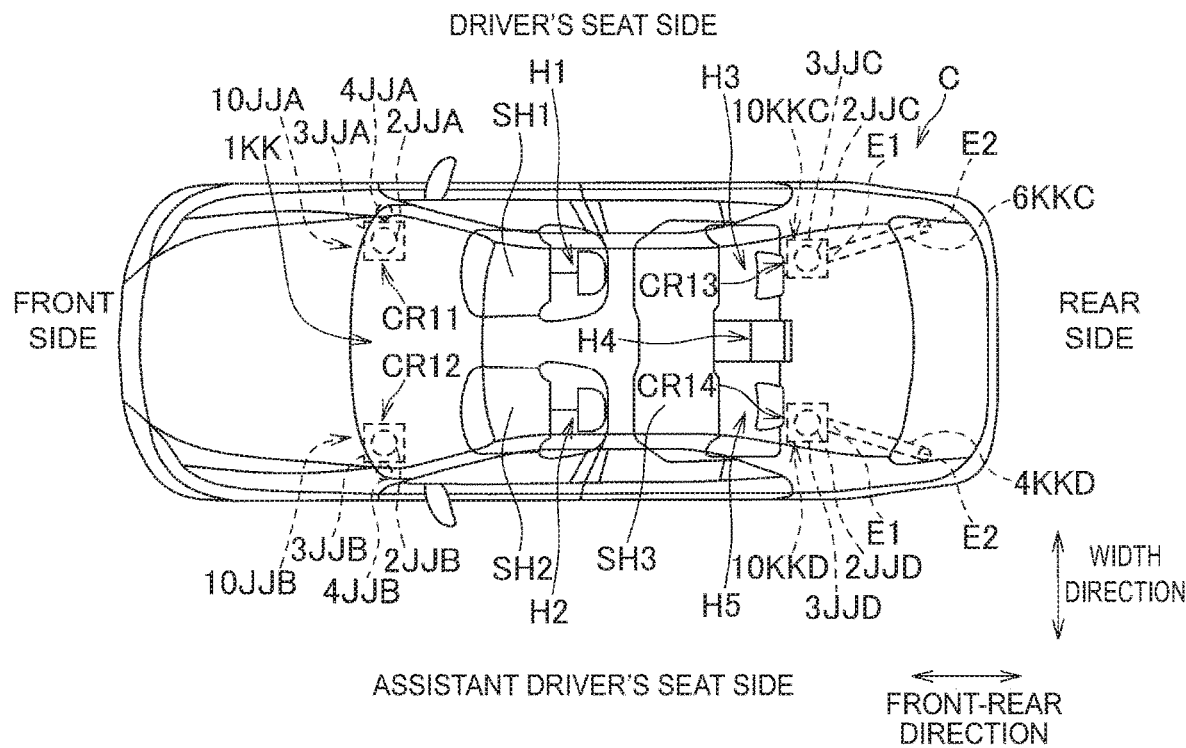
FIG. 82 is a plan view of a mobile object provided with a speaker system for active noise control according to Example 28 of the present invention.
Figure 83:
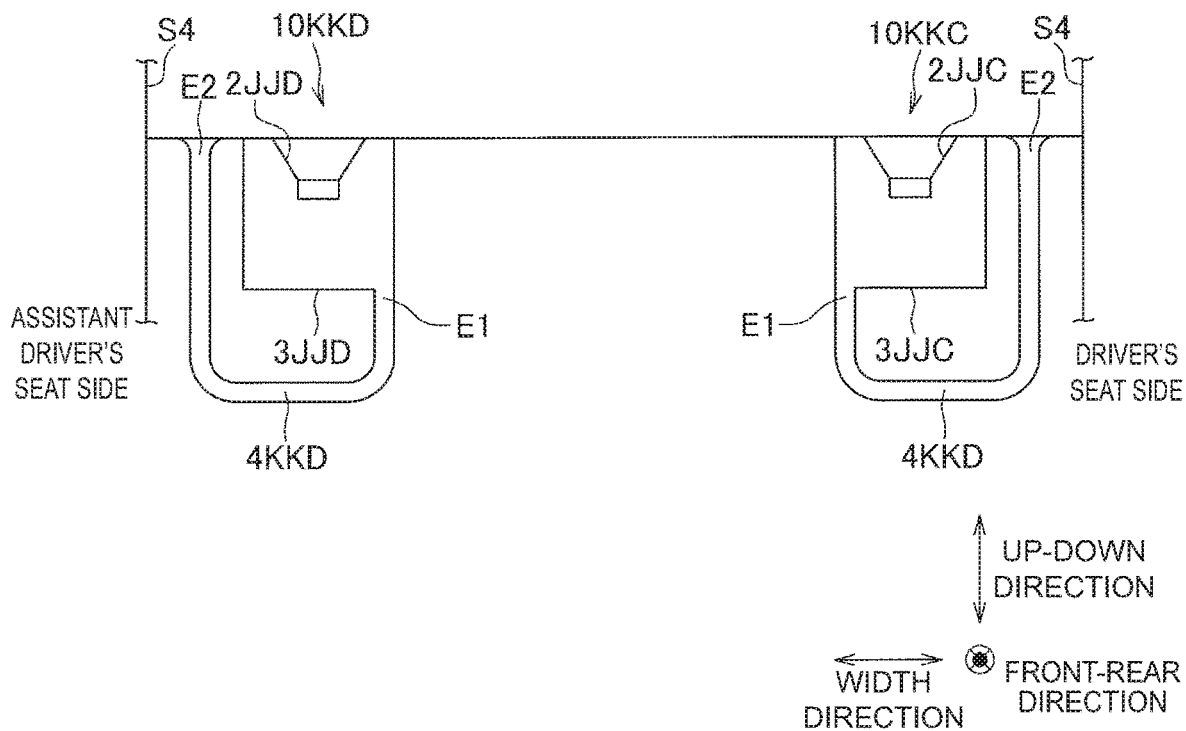
FIG. 83 is a back view of a speaker device arranged on a rear side of the speaker system for active noise control shown in FIG. 82.

FIG. 82 is a plan view of a mobile object provided with a speaker system for active noise control 1KK according to Example 28 of the present invention. FIG. 83 is a back view of speaker devices 10KKC, 10KKD arranged on a rear side of the speaker system for active noise control 1KK shown in FIG. 82. In FIG. 82 and FIG. 83, elements equivalent to the elements of Example 27 shown in FIG. 78 and FIG. 81 are denoted by the same reference signs as FIG. 78 and FIG. 81, and explanations of these similar elements are omitted in the following.

In the speaker system for active noise control 1KK shown in FIG. 82 and FIG. 83, the speaker devices 10KKC, 10KKD provided on the rear side of the vehicle C are configured such that the tubular member 4KKC and the tubular member 4KKD extend towards the rear side in the traveling direction of the vehicle C, and the tubular member 4KKC and the tubular member 4KKD do not interest with each other.

Of course, as is the case with the speaker system for active noise control 1JJ of Example 27 described above, the speaker system for active noise control 1KK of Example 28 as described above can also improve the acoustic characteristic of the noise cancelling sound.

Example 29

Next, a speaker system for active noise control according to Example 29 will be explained. In Example 29, the structure of the four speaker devices is different from Example 27 described above. In the following, Example 29 will be explained focusing on the difference from Example 27.

Figure 84:
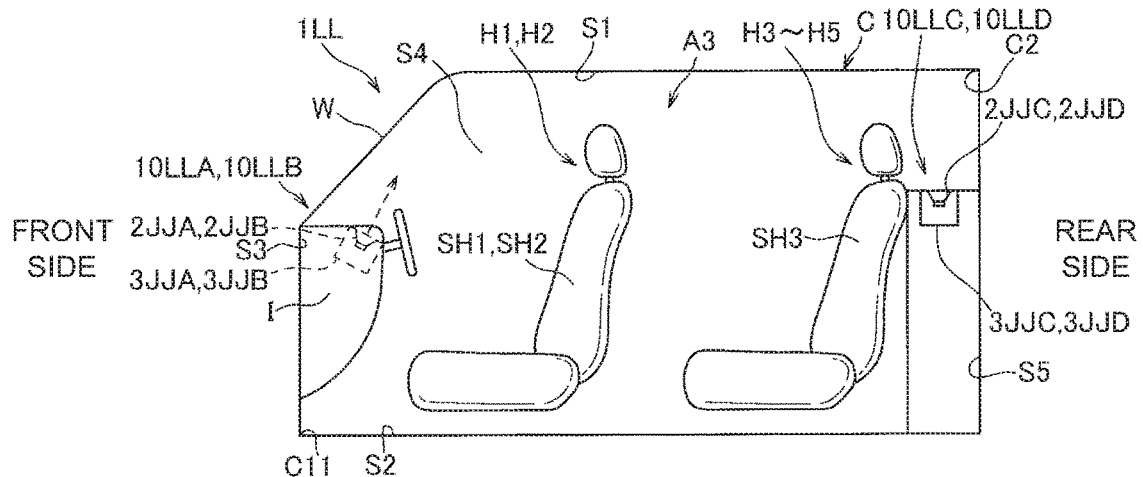
FIG. 84 is a side view of a vehicle provided with a speaker system for active noise control according to Example 29 of the present invention.
Figure 85:
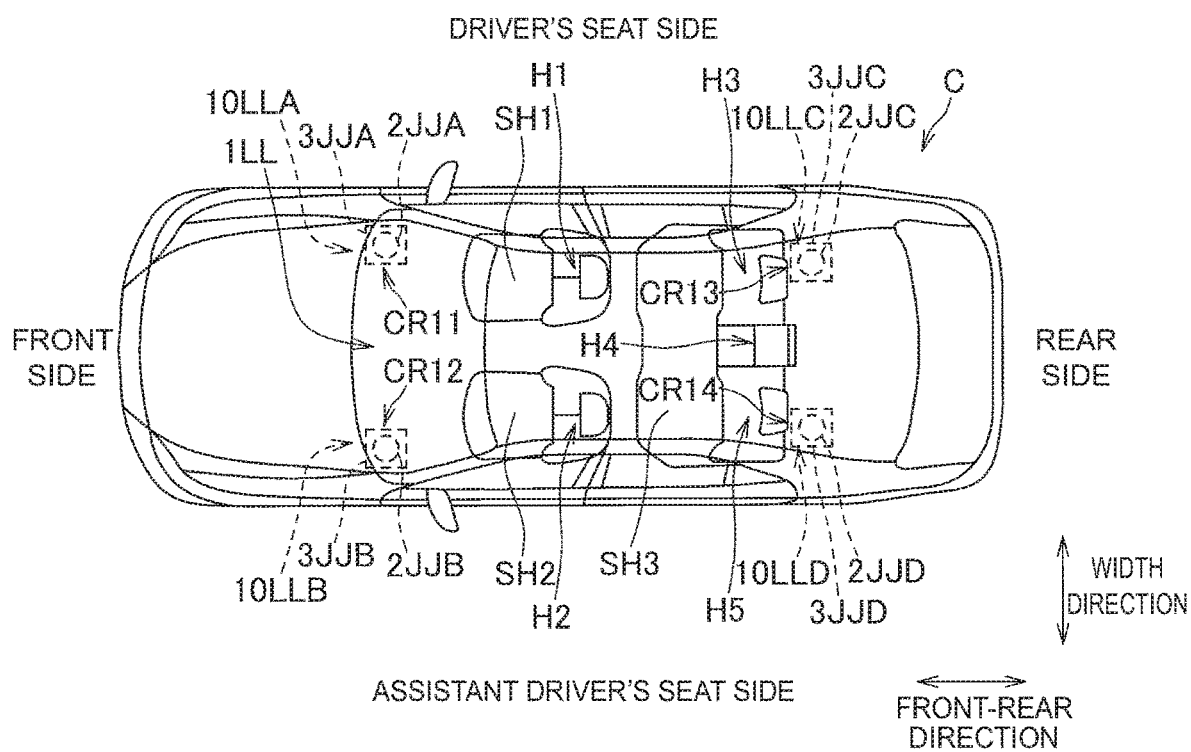
FIG. 85 is a plan view of the vehicle provided with the speaker system for active noise control shown in FIG. 84.

FIG. 84 is a side view of a vehicle C provided with a speaker system for active noise control 1LL according to Example 29 of the present invention. FIG. 85 is a plan view of the vehicle C provided with the speaker system for active noise control 1LL shown in FIG. 84. In FIG. 84 and FIG. 85 also, elements equivalent to the elements of Example 27 shown in FIG. 77 and FIG. 78 are denoted by the same reference signs as FIG. 77 and FIG. 78, and explanations of these similar elements are omitted in the following.

In the speaker system for active noise control 1LL shown in FIG. 77 and FIG. 78, speaker devices 10LLA-10LLD provided to the corners CR11-CR14 on the front and rear sides of the vehicle C do not include the tubular members as shown in Example 27.

This speaker system for active noise control 1LL of Example 29 also provides the advantageous effects obtained by the elastic member 8A as the resonance element provided to each of the speaker units 2JJA-2JJD and by the arrangement of the speaker devices 10LLA-10LLD to the four corners that are the same as Example 27 described above. However, it should be noted that in Example 27, the acoustic characteristic of the cancelling sound can be improved for the low-pitched sound region by providing the tubular member 4JJA-4JJD to each of the speaker devices 10JJA-10JJD, as described above.

Example 3

Next, a speaker system for active noise control according to Example 30 will be explained. In Example 30, the structure of the speaker device for generating the resonance sound having the frequency different from the lowest frequency of the speaker unit is different from Example 27 described above. In the following, Example 30 will be explained focusing on the difference from Example 27.

In Example 30, the speaker device 10JJ may be configured in a similar fashion as the sound generating device 1G shown in FIG. 21 that is already explained in Example 7. In this example, the tubular member 4JJA-4JJD shown in FIG. 77 and FIG. 78 are connected to the enclosure body 301 forming the rear space S11.

The speaker device 10JJ as described above can provide the same advantageous effects as Example 7.

The present invention is not limited to the examples described above, and it may include other configurations and such that can achieve the object of the present invention, and the following modifications and such as shown below are also within the present invention.

For example, in the example described above, the speaker units 2JJA, 2JJB on the front side and the speaker units 2JJC, 2JJD on the rear side operate with a predetermined time lag such that the node of the standing wave is located away from the head position H1, H2 on the front side to the rear side. However, this time lag may be appropriately set according to the relationship between the position of the node and the head position H1-H5 when there is no time lag. For example, if the node is positioned on the front side with respect to the head position H1, H2 when there is no time lag, then the time lag may be set such that the node is located away from the head position H1, H2 further to the front side of the vehicle C. Alternatively, if the node is positioned in the vicinity of the head position H3-H5 on the rear side when there is no time lag, then the time lag may be set such that the node is located away from the head position H3-H5 to the front side of the vehicle C. Further, if the vehicle includes one row of seat or three or more rows of seats in the front-rear direction, then the time lag may be set according to the relationship between the position of the node and the head position in each row when there is no time lag. Further, if the position of the head and the position of the node are located sufficiently away from each other, or if the reduction in the sound pressure due to the node is small, then such time lag may not be provided and the speaker units on the front side and the rear side of the vehicle C may be operated at substantially the same time.

Further, in the example described above, the position of the node is changed for the standing wave having the wavelength that is substantially the same as the distance between the corners C11, C12. However, the position of the node may be changed for the standing wave having other wavelengths. For example, for the standing wave having the wavelength that is about ⅔ of the above-described distance, two nodes are formed between the corners C11, C12. In this case, the time lag may be set such that these nodes are located further away from any one of the head positions H1-H5 of each seat to the front side or the rear side of the vehicle C.

Further, in the examples described above, the speaker system for active noise control 1JJ, 1KK, 1LL includes the four speaker devices 10JJA-10JJD, 10KKC, 10KKD, 10LLA-10LLD provided to the four corners CR11-CR14 of the vehicle C. However, the speaker system for active noise control may include at least two speaker devices. For example, two speaker devices may be provided to the corners on the front side and the rear side in the front-rear direction of the vehicle C, respectively, or to the corners on the one side and the other side in the width direction, respectively.

Further, in the examples described above, the cross-sectional shape and the cross-sectional area of the tubular member 4JJA-4JJD, 4KKC, 4KKD is substantially constant. However, the tubular member may be arranged such that the cross-sectional area is substantially constant while the cross-sectional shape varies. Further, although the tubular members 4JJA, 4JJB on the front side and the tubular members 4JJC, 4JJD, 4KKC, 4KKD on the rear side are substantially the same in length in the examples described above, they may be different in length.

Further, in the examples described above, the enclosure 3JJA-3JJD as an accommodation part and the tubular member 4JJA-4JJD, 4KKC, 4KKD are separate members. However, the enclosure and the tubular member may be integrally formed. For example, the accommodation part may be one tubular member and this tubular member may serve as both of the enclosure and the tubular member.

Further, the frequency characteristic of the sound wave emitted from the speaker unit may be appropriately set. Even if the sound pressure of the low-pitched sound region emitted from the front face side of the speaker unit is high, if the sound pressure of the low-pitched sound that resonates in the tubular member and emitted from the other end is sufficiently high, then the sound pressure of the low-pitched sound can be ensured even if the sound wave from the front face side and the sound wave from the other end weaken each other. That is, in a case where the sound pressure of the low-pitched sound is increased sufficiently as a result of the resonance in the tubular member, it is possible to use a speaker unit that emits a sound wave such that the same degree of the sound pressure is provided from the low-pitched sound region to the middle and high-pitched sound region, or a speaker unit that emits a sound wave such that the sound pressure is higher in the low-pitched sound region than in the middle and high-pitched sound region, or a speaker unit for the middle and high-pitched sound region (a tweeter). In addition, the shape of the speaker unit is not limited to a certain shape, and it may be a cone type or a dome type.

Further, in the examples described above, the speaker unit is configured so as to emit a sound wave from the front face side of the speaker unit 2JJA, 2JJB on the front side at the upper face of the instrumental panel I. However, the speaker unit may be configured so as to emit a sound wave from the front face side of the speaker unit at the lower face of the instrumental panel I (a face facing the driver's seat), for example. Further, although the speaker units 2JJA, 2JJB are provided in the instrumental panel I, the speaker unit may be provided outside of the instrumental panel I (mounted on the upper face of the instrumental panel I, for example). At this time, the tubular member may be provided so as not to pass through the instrumental panel I but to follow the outer side of the instrumental panel I. According to this configuration, when the speaker system for active noise control is to be installed to the vehicle afterwards, it can be installed easily.

Further, in the examples described above, the other end E2 of the tubular member 4JJA-4JJD open towards the corner C11, C12 at which the three faces meet. However, the other end may open towards the intersecting part (R11-R18 shown in FIG. 80) at which two of the plurality of faces surrounding the vehicle interior space A3 (the inner face of the windshield W, the upper face S1, the lower face S2, the front face S3, the pair of side faces S4 and the rear face S5) meet, or may not open towards the intersecting part. Further, the other end E2 of the tubular member 4JJC, 4JJD on the rear side may open towards the corner C13 at which the rear face S5, the upper face S1 and the side face S4 of the vehicle C meet. Herein, the intersecting part R11 is the intersecting part at which the front face S3 and the lower face S2 of the vehicle C meet, the intersecting part R12 is the intersecting part at which the lower face S2 and the side face S4 of the vehicle C meet, the intersecting part R13 is the intersecting part at which the front face S3 and the side face S4 of the vehicle C meet, the intersecting part R14 is the intersecting part at which the rear face S5 and the lower face S2 of the vehicle C meet, the intersecting part R15 is the intersecting part at which the rear face S5 and the side face S4 of the vehicle C meet, the intersecting part R16 is the intersecting part at which the front face S3 and the upper face S1 of the vehicle C meet, the intersecting part R17 is the intersecting part at which the upper face S1 and the side face S4 of the vehicle C meet, and the intersecting part R18 is the intersecting part at which the rear face S5 and the upper face S1 of the vehicle C meet.

Further, in the examples described above, the standing wave is formed between the corners C11, C12 opposed to each other not only in the front-rear direction but also in the width direction (i.e., obliquely). However, in a case where the other ends E2 open towards the intersecting parts, the standing wave may be formed between the intersecting parts opposed to each other only in the front-rear direction. In this case, the node can be displaced for the standing wave having the wavelength corresponding to the distance between the intersecting part opposed to each other in the front-rear direction.

Although preferred configurations and methods and such for implementing the present invention have been disclosed above, the present invention is not limited to these. That is, a person skilled in the art can make various modifications regarding shape, material, number or other detailed configurations. The descriptions herein limiting shape, material or the like disclosed herein are described for illustrative purpose only to help understand the present invention. Thus, since these descriptions do not limit the present invention, a name of a member described without a part or all of limitations of shape, material or the like are also within the present invention.

LIST OF REFERENCE SIGNS 1A-1M sound generating device for mobile object
11 vehicle body
21A-21F speaker unit
22A-22F speaker unit
31A, 31G-32K enclosure
32A, 32G-32K enclosure
41 stopper member
42 stopper member
102 tubular member
103 vibration member
C vehicle (mobile object)
F frame
P1, P2 pillar

The invention claimed is:

1. A sound generating device for mobile object comprising:
   a speaker unit configured to emit a sound towards a box-like space formed by a mobile object; and
   an enclosure accommodating the speaker unit, wherein the speaker unit is provided with
   a resonance element configured to generate a resonance sound of a frequency different from a lowest resonance frequency of the speaker unit, the resonance element being an elastic member connected to a diaphragm of the speaker unit, the elastic member having an outer periphery connected to the diaphragm and an inner periphery connected to a weight, and
   at least a part of the enclosure also serves as a body of the mobile object.

2. The sound generating device for mobile object as claimed in claim 1, wherein the enclosure also serves as a frame that forms the body of the mobile object.

3. The sound generating device for mobile object as claimed in claim 2, wherein
   the frame is formed into a tubular shape and is closed by a stopper member, and
   the enclosure is formed by the stopper member and the frame.

4. The sound generating device for mobile object as claimed in claim 1, wherein the enclosure is formed by at least one of a pillar as the body, a side sill, a reinforcement, a cross member, an under cover and a center tunnel.

5. The sound generating device for mobile object as claimed in claim 1, wherein a ¼ wavelength of the resonance sound is longer than a distance between tragi of a human head.

6. The sound generating device for mobile object as claimed in claim 5, wherein the ¼ wavelength of the resonance sound is longer than twice the distance between the tragi.

7. A mobile object comprising the sound generating device for mobile object as claimed in claim 1.

8. A mobile object comprising the sound generating device for mobile object as claimed in claim 2.

9. A mobile object comprising the sound generating device for mobile object as claimed in claim 3.

10. A mobile object comprising the sound generating device for mobile object as claimed in claim 4.

11. A mobile object comprising the sound generating device for mobile object as claimed in claim 5.

12. A mobile object comprising the sound generating device for mobile object as claimed in claim 6.

* * * * *